United States Patent
Yu et al.

(10) Patent No.: US 10,264,045 B2
(45) Date of Patent: *Apr. 16, 2019

(54) METHOD AND SERVER FOR SEARCHING FOR DATA STREAM DIVIDING POINT BASED ON SERVER

(71) Applicant: HUAWEI TECHNOLOGIES CO.,LTD., Shenzhen, Guangdong (CN)

(72) Inventors: Chuanshuai Yu, Chengdu (CN); Chengwei Zhang, Chengdu (CN); Linbo Xu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/938,845

(22) Filed: Mar. 28, 2018

(65) Prior Publication Data

US 2018/0219930 A1 Aug. 2, 2018

Related U.S. Application Data

(63) Continuation of application No. 15/235,407, filed on Aug. 12, 2016, now Pat. No. 9,967,304, which is a (Continued)

(30) Foreign Application Priority Data

Feb. 14, 2014 (WO) ................ PCT/CN2014/072115

(51) Int. Cl.
  *H04L 29/06* (2006.01)
  *H04L 12/801* (2013.01)
  *G06F 3/06* (2006.01)

(52) U.S. Cl.
  CPC .......... *H04L 65/602* (2013.01); *G06F 3/0608* (2013.01); *G06F 3/0641* (2013.01); *G06F 3/0673* (2013.01); *H04L 47/10* (2013.01)

(58) Field of Classification Search
  None
  See application file for complete search history.

(56) References Cited

U.S. PATENT DOCUMENTS 5,990,810 A * 11/1999 Williams .............. G06F 3/0608
                                                  341/51
8,639,669 B1   1/2014 Douglis et al.
(Continued)

FOREIGN PATENT DOCUMENTS

CN         1997011 A      7/2007
CN       101547138 A      9/2009
(Continued)

OTHER PUBLICATIONS

Deepak R. et al, "Improving Duplicate Elimination in Storage Systems", ACM Transactions on Storage, vol. 2. No. 4, Jul. 2006, 23 pages.

(Continued)

*Primary Examiner* — Backhean Tiv
(74) *Attorney, Agent, or Firm* — James Anderson Harrison

(57) ABSTRACT

Embodiments of the present invention provide a method for searching for a data stream dividing point based on a server. In the embodiments of the present invention, a data stream dividing point is searched for by determining whether at least a part of data in a window of M windows meets a preset condition, and when the at least a part of data in the window does not meet the preset condition, a length of N*U is skipped, so as to obtain a next potential dividing point, thereby improving efficiency of searching for a data stream dividing point.

24 Claims, 31 Drawing Sheets

Related U.S. Application Data continuation of application No. PCT/CN2014/072648, filed on Feb. 27, 2014.

(56) References Cited

U.S. PATENT DOCUMENTS

| | | | |
|---|---|---|---|
| 9,465,808 B1* | 10/2016 | Karr | G06F 17/30156 |
| 2008/0133561 A1 | 6/2008 | Dubnicki et al. | |
| 2009/0013129 A1 | 1/2009 | Bondurant | |
| 2010/0318782 A1 | 12/2010 | Auradkar et al. | |
| 2011/0071989 A1* | 3/2011 | Wilson | G06F 17/30156 707/692 |
| 2011/0125719 A1* | 5/2011 | Jayaraman | G06F 17/30156 707/692 |
| 2011/0125720 A1* | 5/2011 | Jayaraman | G06F 17/30156 707/692 |
| 2011/0125722 A1* | 5/2011 | Rao | G06F 17/3015 707/693 |
| 2011/0289281 A1* | 11/2011 | Spackman | G06F 12/0223 711/154 |
| 2011/0302137 A1* | 12/2011 | Dawkins | G06F 17/30159 707/640 |
| 2011/0307447 A1* | 12/2011 | Sabaa | H04L 67/2842 707/637 |
| 2011/0307659 A1* | 12/2011 | Hans | G06F 3/0613 711/114 |
| 2012/0078931 A1* | 3/2012 | Jaquette | H04N 21/2181 707/758 |
| 2012/0079184 A1* | 3/2012 | Jaquette | G06F 3/0611 711/111 |
| 2012/0084527 A1* | 4/2012 | Jayaraman | G06F 17/30156 711/165 |
| 2012/0136842 A1 | 5/2012 | Zhu et al. | |
| 2012/0166401 A1* | 6/2012 | Li | G06F 17/3033 707/692 |
| 2012/0183219 A1 | 7/2012 | Han | |
| 2012/0311188 A1* | 12/2012 | Li | H03M 7/3088 709/247 |
| 2013/0018853 A1* | 1/2013 | Jayaraman | G06F 3/0641 707/692 |
| 2013/0054544 A1 | 2/2013 | Li et al. | |
| 2013/0086009 A1* | 4/2013 | Li | G06F 17/30159 707/692 |
| 2013/0138620 A1 | 5/2013 | Yakushev et al. | |
| 2013/0290279 A1* | 10/2013 | Aronovich | G06F 7/00 707/692 |
| 2014/0012822 A1* | 1/2014 | Aronovich | G06F 3/0641 707/692 |
| 2014/0019874 A1 | 1/2014 | Li et al. | |
| 2014/0095439 A1* | 4/2014 | Ram | G06F 17/30159 707/640 |
| 2014/0114934 A1* | 4/2014 | Chakraborty | G06F 3/0608 707/692 |
| 2014/0244604 A1* | 8/2014 | Oltean | H03M 7/3091 707/693 |

FOREIGN PATENT DOCUMENTS

| | | |
|---|---|---|
| CN | 102082575 A | 6/2011 |
| CN | 102214210 A | 10/2011 |
| CN | 102591892 A | 7/2012 |
| CN | 102646117 A | 8/2012 |
| CN | 103324699 A | 9/2013 |
| JP | 2010515114 A | 5/2010 |
| JP | 2011065268 A | 3/2011 |
| RU | 2011150271 A | 6/2013 |
| WO | 2012044366 A1 | 4/2012 |
| WO | 2012140686 A1 | 10/2012 |

OTHER PUBLICATIONS

Zhou Jingli et al, "Optimization for Data De-duplication Algorithm Based on Storage Environment Aware", Computer Science, vol. 38, No. 2, Feb. 2011, 5 pages.

Eshghi K et al: "A Framework for Analyzing and Improving Content-Based Chunking Algorithms", Hewlett-Packard Labs Technical Report HPL-2005-30(R.1), 2005, 12 pages.

Athicha Muthitacharoen et al, "A Low-bandwidth Network File System", the Defense Advanced Research Projects Agency (DARPA) and the Space and Naval Warfare Systems Center, SanDiego, 2001, 14 pages.

Dutch T. Meyer et al, "A Study of Practical Deduplication", 2012, 13 pages.

Lu Guanlin, "An Efficient Data Deduplication Design with Flash-Memory Based Solid State Drive", Jan. 2012, 16 pages.

Erik Kruus et al, "Bimodal Content Defined Chunking for Backup Streams", 2010, 14 pages.

Ahmed El-Shimi et al, "Primary Data Deduplication—Large Scale Study and System Design", 2012, 12 pages.

Yu Chuanshuai et al:"leap-based content defined chunking-theory and implementation", 31st Symposium on Mass Sotrage Systems and Technologies(MSST), May 30-Jun. 5, 2015, Santa Clara, CA, USA, May 30, 2015, XP055349817, 12 pages.

Shobha:"performance evaluation of various chunking techniques in data de-duplication", International Journal of Advance Research in Computer Science and Management Studies, vol. 4, No. 6, Jun. 2016, XP055350318, 6 pages.

Ao Li et al, "Data Deduplication Techniques", Journal of Software vol. 21, No. 5, May 2010, 14 pages.

Wang Shupeng, "Development and Application of De-Duplication Technology", ZTE Communications, Oct. 2010, 6 pages.

* cited by examiner

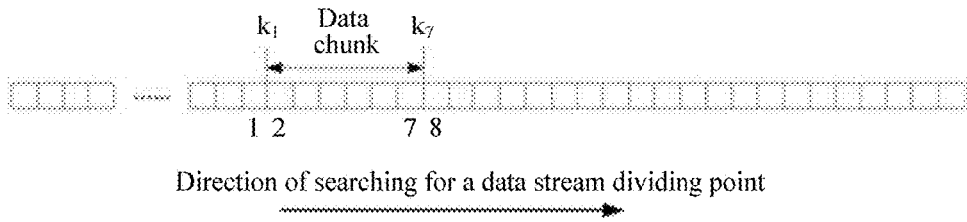

Direction of searching for a data stream dividing point

FIG. 2

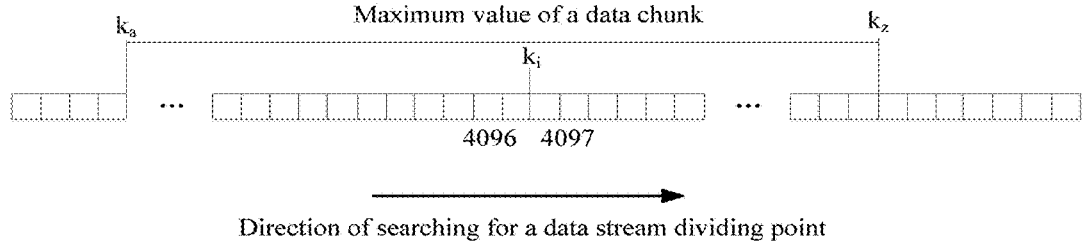

Direction of searching for a data stream dividing point

FIG. 3

| Determine a point $p_{iz}$ and a window $W_{iz}[p_{iz}-A_z, p_{iz}+B_z]$ corresponding to the point $p_{iz}$ for a current potential dividing point $k_t$ according to a rule | 401 |

| Determine whether at least a part of data in the window $W_{iz}[p_{iz}-A_z, p_{iz}+B_z]$ meets a preset condition $C_z$; when the at least a part of data in the window $W_{iz}[p_{iz}-A_z, p_{iz}+B_z]$ does not meet the preset condition $C_z$, skip N minimum units U for searching for a data stream dividing point from the point $p_{iz}$ along a direction of searching for a data stream dividing point, where N*U is not greater than $|B_z|+\max_x(|A_x|+|(k_t-p_{ix})|)$, so as to obtain a new potential dividing point, and perform step 401; and when at least a part of data in each window $W_{ix}[p_{ix}-A_x, p_{ix}+B_x]$ of M windows of the current potential dividing point $k_t$ meets a preset condition $C_x$, select the current potential dividing point $k_t$ as a data stream dividing point | 402 |

FIG. 4

Direction of searching for a data stream dividing point

Determine a corresponding window $W_{iz}[k_i-A_z, k_i+B_z]$ for a current potential dividing point $k_i$ according to the rule — 2001

Determine whether at least a part of data in the window $W_{iz}[k_i-A_z, k_i+B_z]$ meets a preset condition $C_z$;
when the at least a part of data in the window $W_{iz}[k_i-A_z, k_i+B_z]$ does not meet the preset condition $C_z$, skip N minimum units U for searching for a data stream dividing point from the current potential dividing point $k_i$ along a direction of searching for a data stream dividing point, where N*U is not greater than $|B_z|+ \max_x(|A_x|)$, so as to obtain a new potential dividing point, and perform step 2001; and
when at least a part of data in each window $W_{ix}[k_i-A_x, k_i+B_x]$ of M windows of the current potential dividing point $k_i$ meets the preset condition $C_z$, select the current potential dividing point $k_i$ as a data stream dividing point — 2002

FIG. 20

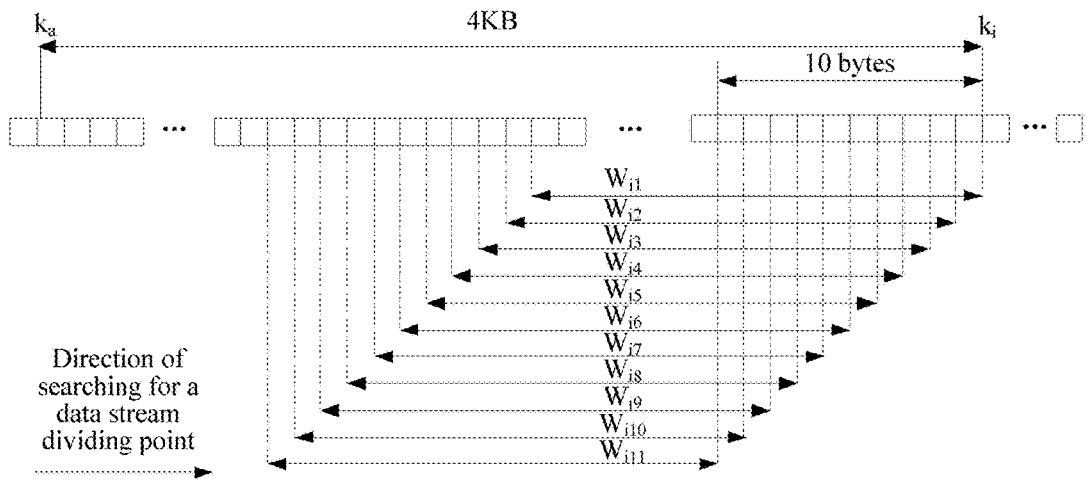

FIG. 21

Direction of searching for a data stream dividing point

METHOD AND SERVER FOR SEARCHING FOR DATA STREAM DIVIDING POINT BASED ON SERVER

CROSS-REFERENCE TO RELATED APPLICATIONS

This application is a continuation of U.S. patent application Ser. No. 15/235,407, filed on Aug. 12, 2016, which is a continuation of International Application No. PCT/CN2014/072648, filed on Feb. 27, 2014, which claims priority to International Application No. PCT/CN2014/072115, filed on Feb. 14, 2014. All of the afore-mentioned patent applications are hereby incorporated by reference in their entireties.

TECHNICAL FIELD

The present invention relates to the field of information technologies, and in particular, to a method and a server for searching for a data stream dividing point based on a server.

BACKGROUND

As data amounts keep growing, it becomes a critical challenge to provide sufficient data storage in the storage field currently. At present, a manner of addressing such a challenge is using a deduplication technology by means of a redundancy feature of data that needs to be stored, so as to reduce an amount of stored data.

In an algorithm of eliminating duplicate data based on a content defined chunk (CDC) in the prior art, a data stream to be stored is first divided into multiple data chunks. To divide a data stream into data chunks, a suitable dividing point needs to be found in the data stream, and data between two adjacent dividing points in the data stream forms one data chunk. A feature value of a data chunk is calculated, so as to find whether data chunks having a same feature value exist. If the data chunks having a same feature value are found, it is regarded that duplicate data exists. Specifically, in a technology of eliminating duplicate data based on a content defined chunk, a sliding window technique is applied to search for a dividing point of a chunk based on content of a file, that is, a Rabin fingerprint of data in a window is calculated to determine a data stream dividing point. It is assumed that a dividing point is searched for from left to right in a data stream. A fingerprint of data in a sliding window is calculated each time, and after a modulo operation is performed on a fingerprint value based on a given integer K, a result of the modulo operation is compared with a given remainder R. If the result of the modulo operation equals the given remainder R, the right end of the window is a data stream dividing point. Otherwise, the window continues to be slid rightward by one byte, and calculation and comparison are performed sequentially and cyclically until the end of the data stream is reached. In a process of eliminating duplicate data based on a content defined chunk, a large quantity of computing resources need to be consumed to search for a data stream dividing point, which therefore becomes a bottleneck in improving performance of eliminating duplicate data.

SUMMARY

According to a first aspect, an embodiment of the present invention provides a method for searching for a data stream dividing point based on a server, where a rule is preset on the server, where the rule is: for a potential dividing point k, determining M points $p_x$, a window $W_x[p_x-A_x, p_x+B_x]$ corresponding to the point $p_x$, and a preset condition $C_x$ corresponding to the window $W_x[p_x-A_x, p_x+B_x]$, where x indicates consecutive natural numbers from 1 to M, M≥2, and $A_x$ and $B_x$ are integers; and the method includes:

(a) determining a point $p_{iz}$ and a window $W_{iz}[p_{iz}-A_z, p_{iz}+B_z]$ corresponding to the point $p_{iz}$ for a current potential dividing point $k_i$ according to the rule, where i and z are integers, and 1≤z≤M;

(b) determining whether at least a part of data in the window $W_{iz}[p_{iz}-A_z, p_{iz}+B_z]$ meets a preset condition $C_z$; and when the at least a part of data in the window $W_{iz}[p_{iz}-A_z, p_{iz}+B_z]$ does not meet the preset condition $C_z$, skipping N minimum units U for searching for a data stream dividing point from the point $p_{iz}$ along a direction of searching for a data stream dividing point, where N*U is not greater than $\|B_z\|+\max_x(\|A_x\|+\|(k_i-p_{ix})\|)$, so as to obtain a new potential dividing point, and performing step (a); and (c) when at least a part of data in each window $W_{ix}[p_{ix}-A_x, p_{ix}+B_x]$ of M windows of the current potential dividing point $k_i$ meets the preset condition $C_x$, selecting the current potential dividing point $k_i$ as a data stream dividing point.

According to a second aspect, an embodiment of the present invention provides a method for searching for a data stream dividing point based on a server, where a rule is preset on the server, where the rule is: for a potential dividing point k determining M windows $W_x[k-A_x, k+B_x]$, and a preset condition $C_x$ corresponding to the window $W_x[k-A_x, k+B]$, where x indicates consecutive natural numbers from 1 to M, M≥2, and $A_x$ and $B_x$ are integers; and the method includes:

(a) determining a corresponding window $W_{iz}[k_i-A_z, k_i+B_z]$ for a current potential dividing point $k_i$ according to the rule, where i and z are integers, and 1≤z≤M;

(b) determining whether at least a part of data in the window $W_{iz}[k_i-A_z, k_i+B_z]$ meets a preset condition $C_z$; and when the at least a part of data in the window $W_{iz}[k_i-A_z, k_i+B_z]$ does not meet the preset condition $C_z$, skipping N minimum units U for searching for a data stream dividing point from the current potential dividing point $k_i$ along a direction of searching for a data stream dividing point, where N*U is not greater than $\|B_z\|+\max_x(\|A_x\|, \|)$, so as to obtain a new potential dividing point, and performing step (a); and (c) when at least a part of data in each window $W_{ix}[k_i-A_x, k_i+B_x]$ of M windows of the current potential dividing point $k_i$ meets the preset condition $C_x$, selecting the current potential dividing point $k_i$ as a data stream dividing point.

With reference to the second aspect, in a first possible implementation manner, the rule further includes that at least two windows $W_{ie}[k_i-A_e, k_i+B_e]$ and $W_{if}[k_i-A_f, k_i+B_f]$ meet conditions $|A_e+B_e|=|A_f+B_f|$ and $C_e=C_f$.

With reference to the first possible implementation manner of the second aspect, in a second possible implementation manner, the rule further includes that $A_e$ and $A_f$ are positive integers.

With reference to the first possible implementation manner or the second possible implementation manner of the second aspect, in a third possible implementation manner, the rule further includes $A_e-1=A_f$ and $B_e+1=B_f$.

With reference to the second aspect, or any one of the first to third possible implementation manners of the second aspect, in a fourth possible implementation manner, the determining whether at least a part of data in the window $W_{iz}[k_i-A_z, k+B_z]$ meets the preset condition $C_z$ specifically includes:

determining, by using a random function, whether the at least a part of data in the window $W_{iz}[k_i-A_z, k_i+B_z]$ meets the preset condition $C_z$.

With reference to the fourth possible implementation manner of the second aspect, in a fifth possible implementation manner, the determining, by using a random function, whether the at least a part of data in the window $W_{iz}[k_i-A_z, k_i+B_z]$ meets the preset condition $C_z$ is specifically: determining, by using a hash function, whether the at least a part of data in the window $W_{iz}[k_i-A_z, k_i+B_z]$ meets the preset condition $C_z$.

With reference to the second aspect, or any one of the first to fifth possible implementation manners of the second aspect, in a sixth possible implementation manner, when the at least a part of data in the window $W_{iz}[k_i-A_z, k_i+B_z]$ does not meet the preset condition $C_z$, the N minimum units U for searching for a data stream dividing point are skipped from the current potential dividing point $k_i$ along the direction of searching for a data stream dividing point, so as to obtain the new potential dividing point, and according to the rule, a left boundary of a window $W_{ic}[k_i-A_c, k_i+B_c]$ that is determined for the new potential dividing point coincides with a right boundary of the window $W_{iz}[k_i-A_z, k_i+B_z]$ or a left boundary of a window $W_{ic}[k_i-A_c, k_i+B_c]$ that is determined for the new potential dividing point falls within a range of the window $W_{iz}[k_i-A_z, k_i+B_z]$, where the window $W_{ic}[k_i-A_c, k_i+B_c]$ determined for the new potential dividing point is a window ranking the first in a sequence, which is obtained according to the direction of searching for a data stream dividing point, of M windows that are determined for the new potential dividing point according to the rule.

With reference to the fourth possible implementation manner of the second aspect, in a seventh possible implementation manner, the determining, by using a random function, whether the at least a part of data in the window $W_{iz}[k_i-A_z, k_i+B_z]$ meets the preset condition $C_z$ specifically includes:

selecting F bytes in the window $W_{iz}[k_i-A_z, k_i+B_z]$, and using the F bytes repeatedly H times to obtain F*H bytes in total, where F≥1, each byte is formed by 8 bits, which are denoted as $a_{m,1}, \ldots,$ and $a_{m,8}$, representing the 1st bit to the 8th bit of an mth byte in the F*H bytes, bits corresponding to the F*H bytes can be represented as:

$$\begin{pmatrix} a_{1,1} & a_{1,2} & \ldots & a_{1,8} \\ a_{2,1} & a_{2,2} & \ldots & a_{2,8} \\ M & M & M & M \\ a_{F*H,1} & a_{F*H,2} & \ldots & a_{F*H,8} \end{pmatrix},$$

where when $a_{m,n}=1, V_{am,n}=1$, and when $a_{m,n}=0, V_{am,n}=-1$, where $a_{m,n}$ represents any one of $a_{m,1}, \ldots,$ and $a_{m,8}$, a matrix $V_a$ is obtained according to a conversion relationship between $a_{m,n}$ and $V_{am,n}$ from the bits corresponding to the F*H bytes, the matrix $V_a$ is represented as:

$$\begin{pmatrix} V_{a1,1} & V_{a1,2} & \Lambda & V_{a1,8} \\ V_{a2,1} & V_{a2,2} & \Lambda & V_{a2,8} \\ M & M & M & M \\ V_{aF*H,1} & V_{aF*H,2} & \Lambda & V_{aF*H,8} \end{pmatrix},$$

F*H*8 random numbers are selected from random numbers following normal distribution to form a matrix R, the matrix R is represented as:

$$\begin{pmatrix} h_{1,1} & h_{1,2} & \ldots & h_{1,8} \\ h_{2,1} & h_{2,2} & \ldots & h_{2,8} \\ M & M & M & M \\ h_{F*H,1} & h_{F*H,2} & \ldots & h_{F*H,8} \end{pmatrix},$$

random numbers in an mth row of the matrix $V_a$ and an mth row of the matrix R are multiplied and products are added to obtain a value, which is specifically represented as $S_{am}=V_{am,1}*h_{m,1}+V_{am,2}*h_{m,2}+ \ldots +V_{am,8}*h_{m,8}$, $S_{a1}$, $S_{a2}, \ldots,$ and $S_{aF*H}$ are obtained in a same way, a quantity K of values greater than 0 among $S_{a1}, S_{a2}, \ldots,$ and $S_{aF*H}$ is counted, and when K is an even number, the at least a part of data in the window $W_{iz}[k_i-A_z, k_i+B_z]$ meets the preset condition $C_z$.

In the embodiments of the present invention, a data stream dividing point is searched for by determining whether at least a part of data in a window of M windows meets a preset condition, and when the at least a part of data in the window does not meet the preset condition, a length of N*U is skipped, so as to obtain a next potential dividing point, thereby improving efficiency of searching for a data stream dividing point.

BRIEF DESCRIPTION OF DRAWINGS

FIG. 2 is a schematic diagram of a data stream dividing point;

FIG. 3 is a schematic diagram of searching for a data stream dividing point;

FIG. 4 is a schematic diagram of a method according to an embodiment of the present invention;

FIG. 20 is a schematic diagram of a method according to an embodiment of the present invention;

FIG. 21 and FIG. 22 are schematic diagrams of an implementation manner of searching for a data stream dividing point;

DESCRIPTION OF EMBODIMENTS

With ongoing progress of storage technologies, amounts of generated data grow increasingly, and a large amount of data has raised the highest requirement for storage capacity. Purchase costs of IT equipment increase along with storage capacity. To mitigate the demand conflict between the amounts of data and the storage capacity and lower purchase costs of IT equipment, a technology of eliminating duplicate data is introduced to the field of data storage.

Figure 1:
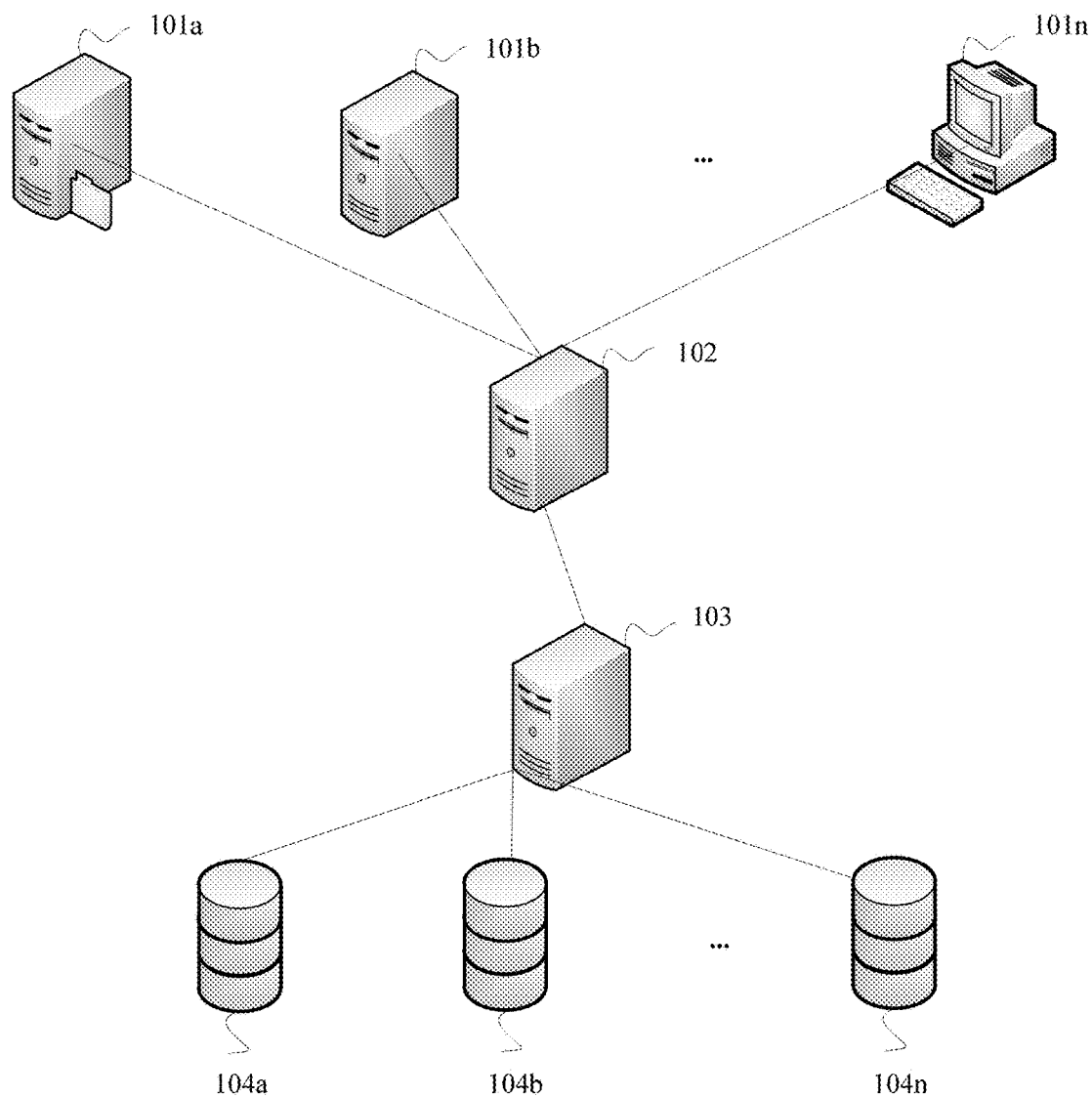
FIG. 1 is a schematic diagram of an application scenario according to an embodiment of the present invention.

A use scenario of an embodiment of the present invention is a data backup scenario. Data backup is a process of making, by using a backup server, a backup of data onto another storage medium to prevent data loss due to various reasons. FIG. 1 shows an architecture of a data backup system. The data backup system includes clients (101*a*, 101*b*, ..., and 101*n*), a backup server 102, a duplicate data elimination server (referred to as a deduplication server or a duplication elimination server for short) 103, and storage devices (104*a*, 104*b*, ..., and 104*n*). The clients (101*a*, 101*b*, ..., and 101*n*) may be application servers, work stations or the like. The backup server 102 is configured to make a backup of data generated by the clients. The deduplication server 103 is configured to execute a task of eliminating duplicate data for backup data. The storage devices (104*a*, 104*b*, ..., and 104*n*) serve as storage media that store data from which duplicate data has been eliminated, and may be storage media such as disk arrays and tape libraries. The clients (101*a*, 101*b*, ..., and 101*n*), the backup server 102, the duplicate data elimination server 103, and the storage devices (104*a*, 104*b*, ..., and 104*n*) may be connected in a manner such as by using a switch, a local area network, the Internet, or an optical fiber. The foregoing devices may be located at a same site, or may be located at different sites. The backup server 102, the duplication elimination server 103, and the storage devices (104*a*, 104*b*, ..., and 104*n*) may be independent physical devices, or may be physically integrated into a whole in specific implementation, or the backup server 102 and the duplication elimination server 103 are integrated into a whole, or the duplication elimination server 103 and the storage devices (104*a*, 104*b*, ..., and 104*n*) are integrated into a whole, or the like.

The deduplication server 103 performs an operation of eliminating duplicate data on a data stream of backup data, where the operation generally includes the following steps:

(1) searching for a data stream dividing point: searching for a data stream dividing point in a data stream according to a specific algorithm;

(2) performing division according to the found data stream dividing point to obtain data chunks;

(3) calculating a feature value of each data chunk: calculating the feature value of the data chunk, which serves as a feature for identifying the data chunk; and adding the feature value obtained by means of calculation to a data chunk feature list of a file corresponding to the data stream, where an SHA-1 or MD5 algorithm is generally used to calculate a feature value of a data chunk;

(4) detecting a same data chunk: comparing the feature value of the data chunk obtained by means of calculation with a feature value that already exists in the data chunk feature list to determine whether an identical data chunk exists; and (5) eliminating duplicate data block: if it is found by detecting a same data chunk that a feature value the same as that of the data chunk exists in the data chunk feature list, skipping storage of the data chunk or determining whether to store the data chunk according to a storage quantity of duplicate data chunks that is determined according to a backup policy.

It can be known, from the step of performing, by the deduplication server 103, the operation of eliminating duplicate data on a data stream of backup data, that the search for a data stream dividing point, serving as a key step in the operation of eliminating duplicate data, directly determines performance of duplicate data elimination.

In an embodiment of the present invention, the deduplication server 103 receives a backup file sent by the backup server 102, and performs processing of eliminating duplicate data on the file. A backup file to be processed is usually presented in the form of a data stream on the deduplication server 103. When the deduplication server 103 searches for a dividing point in a data stream, a minimum unit for searching for a data stream dividing point usually needs to be determined. Specifically, as shown in FIG. 2, for example, a potential dividing point $k_1$ is located between two consecutive minimum units, whose sequence numbers are 1 and 2, for searching for a data stream dividing point. A potential dividing point refers to a point for which it needs to be determined whether the point can serve as a data stream dividing point. When the point $k_1$ is a data stream dividing point, in a direction of searching for a data stream dividing point shown by an arrow in FIG. 2, a next potential dividing point $k_7$ is searched for, that is, a point located between two consecutive minimum units, whose sequence numbers are 7 and 8, for searching for a data stream dividing point. When the potential dividing point $k_7$ is a data stream dividing point, data between the two adjacent data stream dividing points $k_1$, and $k_7$ is 1 data chunk. The minimum unit for searching for a data stream dividing point may specifically be determined according to an actual requirement, and here 1 byte is used as an example, that is, all the minimum units, whose sequence numbers are 1, 2, 7, and 8, for searching for a data stream dividing point have a size of 1 byte. The direction of searching for a data stream dividing point shown in FIG. 2 usually represents a search direction from a file header to a file trailer or a direction from a file trailer to a file header, and in this embodiment, the search direction from a file header to a file trailer is used as an example.

In a scenario of eliminating duplicate data, a smaller data chunk generally indicates a higher rate of eliminating duplicate data and an easier way to find a duplicate data chunk, but a larger amount of metadata generated from that; moreover, after a data chunk diminishes to a degree, the rate of eliminating duplicate data no longer increases, but the amount of metadata increases rapidly. Therefore, a size of a data chunk may be controlled. In actual applications, a minimum value of a data chunk, for example, 4 KB (4096 bytes), is usually set; in consideration of the rate of eliminating duplicate data at the same time, a maximum value of a data chunk is also set, that is, the size of a data chunk cannot exceed the maximum value, for example, 12 KB (12288 bytes). A specific implementation manner is shown in FIG. 3. The deduplication server 103 searches for a data stream dividing point along the direction shown by the arrow. $k_a$ is a currently found data stream dividing point, and from $k_a$, a next potential dividing point is searched for in the direction of searching for a data stream dividing point. To meet the requirement of a minimum data chunk, usually starting from a data stream dividing point, a size of the minimum data chunk is skipped along a direction of searching for a data stream dividing point, and the search starts from an end position of the minimum data chunk, that is, the end position of the minimum data chunk serves as a next potential dividing point $k_i$. In this embodiment of the present invention, a minimum data chunk of 4 KB, that is, 4*1024=4096 bytes may be first skipped from the point $k_a$ along the direction of searching for a data stream dividing point. 4096 bytes are skipped from the point $k_a$ along the direction of searching for a data stream dividing point, and the point $k_i$ is obtained at an end position of a 4096th byte to serve as a potential dividing point. For example, $k_i$ is located between two consecutive minimum units, whose sequence numbers are 4096 and 4097, for searching for a data stream dividing point. Still using FIG. 3 as an example, $k_a$ is a currently found data stream dividing point, and a next data stream dividing point is searched for along the direction shown in FIG. 3. If no next data stream dividing point is found after a maximum value of a data chunk is exceeded, starting from the point $k_a$ in the direction of searching for a data stream dividing point, a point ic at which the maximum value of a data chunk is reached serves as the next data stream dividing point and forced division is performed.

An embodiment of the present invention provides a method for searching for a data stream dividing point based on a deduplication server, which, as shown in FIG. 4, includes:

A rule is preset on a deduplication server 103, where the rule is: for a potential dividing point k, determining M points $p_x$, a window $W_x[p_x-A_x, p_x+B_x]$ corresponding to the point $p_x$, and a preset condition $C_x$ corresponding to the window $W_x[p_x-A_x, p_x+B_x]$, where x indicates consecutive natural numbers from 1 to M, M≥2, and $A_x$ and $B_x$ are integers, where a distance between $p_x$ and the potential dividing point k is $d_x$ minimum units for searching for a data stream dividing point, the minimum unit for searching for a data stream dividing point is represented as U, and in this embodiment, U=1 byte. In an implementation manner shown in FIG. 3, about a value of M, in one implementation manner, a value of M*U is not greater than a preset maximum distance between two adjacent data stream dividing points, that is, a preset maximum length of a data chunk. It is determined whether at least a part of data in a window $W_z[p_z-A_z, p_z+B_z]$ corresponding to a point $p_z$ meets a preset condition $C_z$, where, z is an integer, 1≤z≤M, and $(p_z-A_z)$ and $(p_z+B_z)$ represent two boundaries of the window $W_z$. When it is determined that at least a part of data in a window $W_z[p_z-A_z, p_z+B_z]$ of any one point $p_z$ does not meet the preset condition $C_z$, N bytes are skipped from the point $p_z$ corresponding to the window $W_z[p_z-A_z, p_z+B_z]$ that does not meet the preset condition along a direction of searching for a data stream dividing point, where N≤$\|B_z\|$+max$_x$($\|A_x\|$+$\|(k-p_x)\|$), where $\|(k-p_x)\|$ represents a distance between any point of the M points $p_x$ and the potential dividing point k, max$_x$($\|A_x\|$+$\|(k-p_x)\|$) represents a maximum value of a sum of an absolute value of the distance between the any point of the M points $p_x$ and the potential dividing point k and an absolute value of $A_x$ corresponding to the any point, and $\|B_z\|$ represents an absolute value of $B_z$ in $W_z[p_z-A_z, p_z+B_z]$. A principle for setting a value of N is specifically introduced in the following embodiments. When it is determined that at least a part of data in each window $W_x[p_x-A_x, p_x+B_x]$ of the M windows meets the preset condition $C_x$, the potential dividing point k is a data stream dividing point.

Specifically, for a current potential dividing point $k_i$, the following steps are performed according to the rule:

Step 401: Determine a point $p_{iz}$ and a window $W_{iz}[p_{iz}-A_z, p_{iz}+B_z]$ corresponding to the point $p_{iz}$ for a current potential dividing point $k_i$ according to the rule, where i and z are integers, and 1≤z≤M.

Step 402: Determine whether at least a part of data in the window $W_{iz}[p_{iz}-A_z, p_{iz}+B_z]$ meets a preset condition $C_z$;

when the at least a part of data in the window $W_{iz}[p_{iz}-A_z, p_{iz}+B_z]$ does not meet the preset condition $C_z$, skip N minimum units U for searching for a data stream dividing point from the point $p_{iz}$ along a direction of searching for a data stream dividing point, where N*U is not greater than $\|B_z\|$+max$_x$($\|A_x\|$+$\|(k_i-p_{ix})\|$), so as to obtain a new potential dividing point, and perform step 401; and when at least a part of data in each window $W_{ix}[p_{ix}-A_x, p_{ix}+B_x]$ of M windows of the current potential dividing point $k_i$ meets the preset condition $C_x$, select the current potential dividing point $k_i$ as a data stream dividing point.

Further, the rule further includes that at least two points $p_e$ and $p_f$ meet conditions $A_e=A_f$, $B_e=B_f$, and $C_e=C_f$.

The rule further includes: relative to the potential dividing point k, the at least two points $p_e$ and $p_f$ are in a direction opposite to the direction of searching for a data stream dividing point.

The rule further includes that a distance between the at least two points $p_e$ and $p_f$ is 1 U.

The determining whether at least a part of data in the window $W_{iz}[p_{iz}-A_z, p_{iz}+B_z]$ meets a preset condition $C_z$ specifically includes:

determining, by using a random function, whether the at least a part of data in the window $W_{iz}[p_{iz}-A_z, p_{iz}+B_z]$ meets the preset condition $C_z$.

The determining, by using a random function, whether the at least a part of data in the window $W_{iz}[p_{iz}-A_z, p_{iz}+B_z]$ meets the preset condition $C_z$ is specifically: determining, by using a hash function, whether the at least a part of data in the window $W_{iz}[p_{iz}-A_z, p_{iz}+B_z]$ meets the preset condition $C_z$.

When the at least a part of data in the window $W_{iz}[p_{iz}-A_z, p_{iz}+B_z]$ does not meet the preset condition $C_z$, the N minimum units U for searching for a data stream dividing point are skipped from the point $p_{iz}$ along the direction of searching for a data stream dividing point, so as to obtain the new potential dividing point, and according to the rule, a left boundary of a window $W_{ic}[p_{ic}-A_c, p_{ic}+B_c]$ corresponding to a point $p_{ic}$ that is determined for the new potential dividing point coincides with a right boundary of the window $W_{iz}$ $[p_{iz}-A_z, p_{iz}+B_z]$ or a left boundary of a window $W_{ic}[p_{ic}-A_c, p_{ic}+B_c]$ corresponding to a point $p_{ic}$ that is determined for the new potential dividing point falls within a range of the window $W_{iz}[p_{iz}-A_z, p_{iz}+B_z]$, where the point $p_{ic}$ determined for the new potential dividing point is a point ranking the first in a sequence, which is obtained according to the direction of searching for a data stream dividing point, of M points that are determined for the new potential dividing point according to the rule.

In this embodiment of the present invention, a data stream dividing point is searched for by determining whether at least a part of data in a window of M windows meets a preset condition, and when the at least a part of data in the window does not meet the preset condition, a length of N*U is skipped, where N*U is not greater than $\|B_z\|+\max_x(\|A_x\|+\|(k_i-p_{ix})\|)$, so as to obtain a next potential dividing point, thereby improving efficiency of searching for a data stream dividing point.

In a process of eliminating duplicate data, to ensure an even size of a data chunk, a size of an average data chunk (also referred to as an average chunk) is considered. That is, while limits on a size of a minimum data chunk and a size of a maximum data chunk are met, the size of the average data chunk is determined to ensure an even size of an obtained data chunk. A probability (represented as P(n)) of finding a data stream dividing point depends on two factors, that is, the quantity M of the points $p_x$ and a probability that at least a part of data in the window $W_x[p_x-A_x, p_x+B_x]$ corresponding to the point $p_x$ meets the preset condition $C_x$, where the former affects a length for skipping, the latter affects a probability of skipping, and the two together affect the size of the average chunk. Generally, when the size of the average chunk is fixed, as the quantity M of the points $p_x$ increases, the probability that at least a part of data in a window $W_x[p_x-A_x, p_x+B_x]$ corresponding to a single point $p_x$ meets the preset condition $C_x$ also increases. For example, the rule preset on the deduplication server 103 is: for a potential dividing point k, determining 11 points $p_x$, where x indicates consecutive natural numbers from 1 to 11 separately, and a probability that at least a part of data in a window $W_x[p_x-A_x, p_x+B_x]$ corresponding to any point $p_x$ of the 11 points meets the preset condition $C_x$ is 1/2. Another group of rules preset on the deduplication server 103 is: selecting 24 points p for the potential dividing point k, where x indicates consecutive natural numbers from 1 to 24 separately, and a probability that at least a part of data in a window $W_x[p_x-A_x, p_x+B_x]$ corresponding to any point $p_x$ of the 24 points meets the preset condition $C_x$ is 3/4. For the setting of a probability that at least a part of data in a specific window $W_x[p_x-A_x, p_x+B_x]$ meets the preset condition $C_x$, reference may be made to the description of the part of determining whether the at least a part of data in the window $W_x[p_x-A_x, p_x+B_x]$ meets the preset condition $C_x$. P(n) depends on the two factors, that is, the quantity M of points $p_x$ and the probability that at least a part of data in the window $W_x[p_x-A_x, p_x+B_x]$ corresponding to the point $p_x$ meets the preset condition $C_x$, and P(n) represents a probability that no data stream dividing point is found after n minimum units for searching for a data stream dividing point in a search from a start position/previous data stream dividing point of a data stream. A process of calculating P(n) that depends on the two factors is actually an n-step Fibonacci sequence, which is described below in detail. After P(n) is obtained, 1−P(n) is a distribution function of a data stream dividing point, and (1−P(n))−(1−P(n−1))=P(n−1)−P(n) is a probability that a data stream dividing point is found at an nth point, that is, a density function of a data stream dividing point. Integration $$\sum_{n=4*1024}^{12*1024} n \times (P(n-1) - P(n))$$

may be performed according to the density function of a data stream dividing point, so as to obtain an expected length of a data stream dividing point, that is, the size of the average chunk, where 4*1024 (bytes) represents a length of the minimum data chunk, and 12*1024 (bytes) represents a length of the maximum data chunk.

Figure 5:
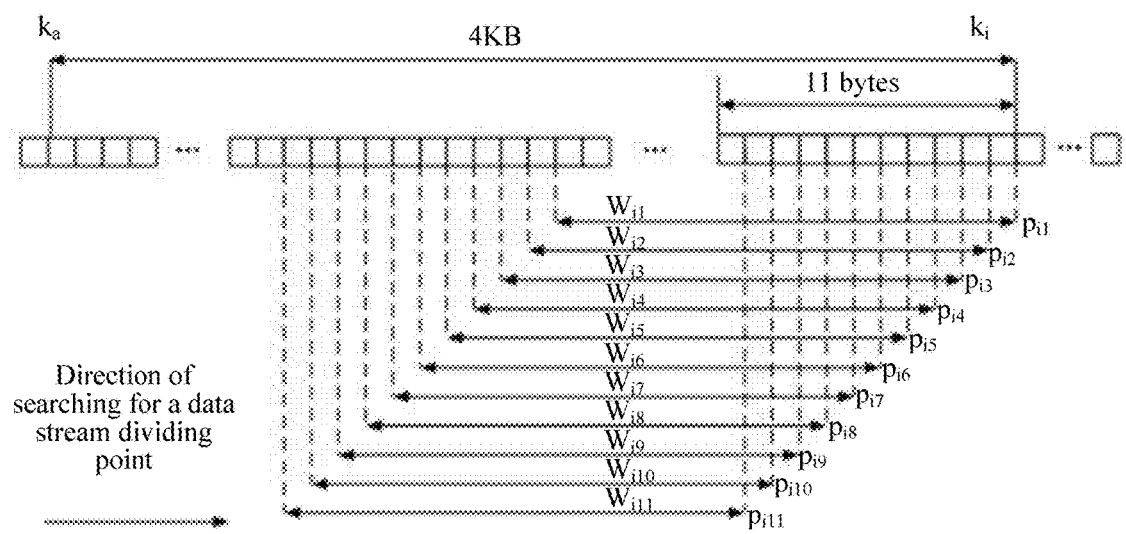
FIG. 5 and FIG. 6 are schematic diagrams of an implementation manner of searching for a data stream dividing point.
Figure 6:
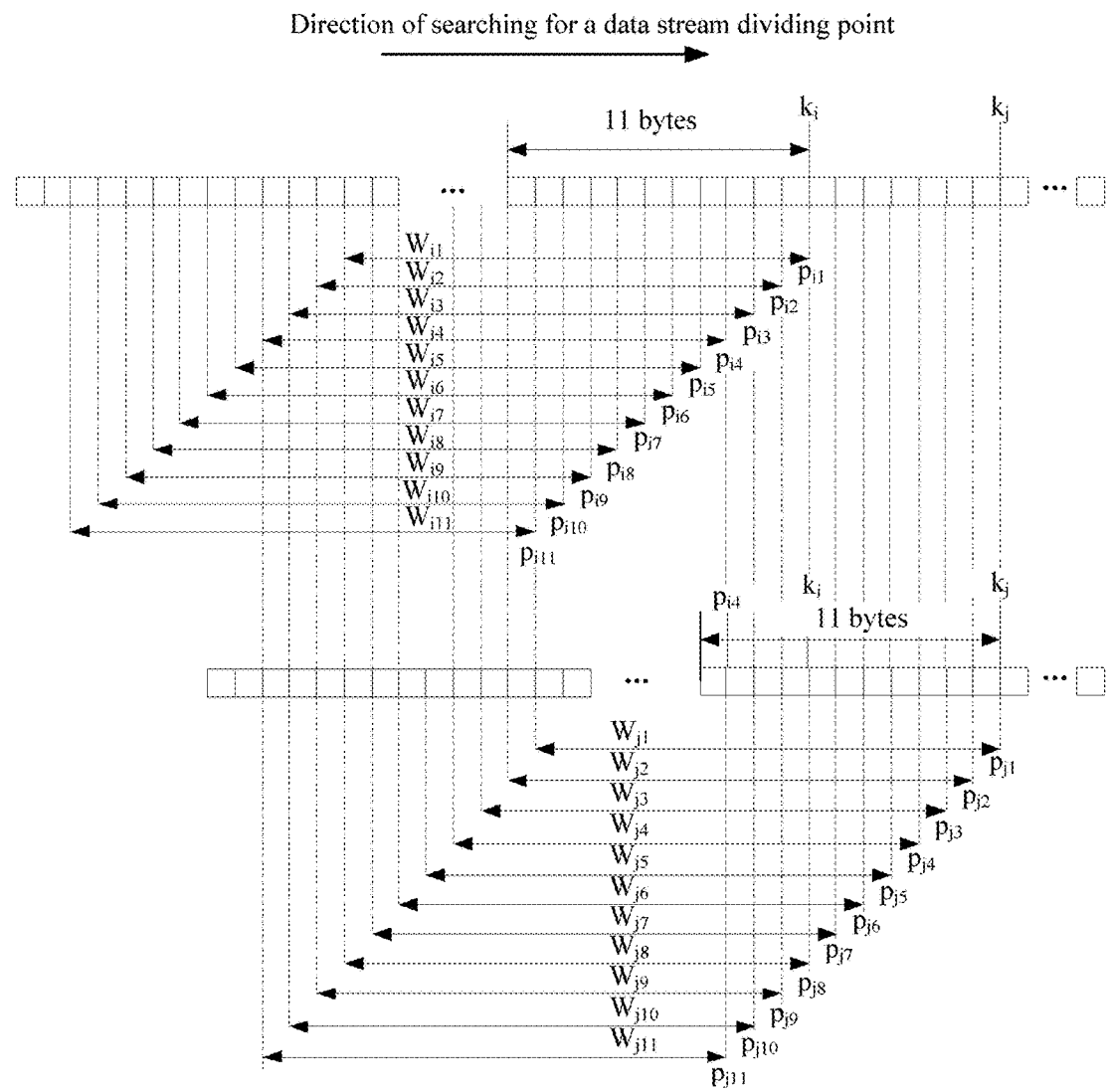

On the basis of the search for a data stream dividing point shown in FIG. 3, in an implementation manner shown in FIG. 5, a rule is preset on a deduplication server 103, where the rule is: for a potential dividing point k, determining 11 points $p_x$, a window $W_x[p_x-A_x, p_x+B_x]$ (window $W_x$ for short) corresponding to the point $p_x$, and a preset condition $C_x$ corresponding to the window $W_x[p_x-A_x, p_x+B_x]$, where $A_1=A_2=A_3=A_4=A_5=A_6=A_7=A_8=A_9=A_{10}=A_{11}=169$, $B_1=B_2=B_3=B_4=B_5=B_6=B_7=B_8=B_9=B_{10}=B_{11}=0$, and $C_1=C_2C_3=C_4=C_5=C_6=C_7=C_8=C_9=C_{10}=_{11}$. A distance between the point $p_x$ and the potential dividing point k is $d_x$ bytes. Specifically, a distance between a point $p_1$ and the potential dividing point k is 0 byte, a distance between a point $p_2$ and the potential dividing point k 1 byte, a distance between a point $p_3$ and the potential dividing point k is 2 bytes, a distance between a point $p_4$ and the potential dividing point k is 3 bytes, a distance between a point $p_5$ and the potential dividing point k is 4 bytes, a distance between a point $p_6$ and the potential dividing point k is 5 bytes, a distance between a point $p_7$ and the potential dividing point k is 6 bytes, a distance between a point $p_8$ and the potential dividing point k is 7 bytes, a distance between a point $p_9$ and the potential dividing point k is 8 bytes, a distance between a point $p_{10}$ and the potential dividing point k is 9 bytes, a distance between a point $p_{11}$ and the potential dividing point k is 10 bytes, and relative to the potential dividing point k, all the points $p_2, p_3, p_4, p_5, p_6, p_7, p_8, p_9, p_{10}$, and $p_{11}$ are in a direction opposite to a direction of searching for a data stream dividing point. $k_a$ is a data stream dividing point, and the direction of searching for a data stream dividing point shown in FIG. 5 is from left to right. After a minimum data chunk of 4 KB is skipped from the data stream dividing point $k_a$, an end position of the minimum data chunk of 4 KB serves as a next potential dividing point $k_i$, and a point $p_{ix}$ is determined for the potential dividing point $k_i$. In this embodiment, according to the rule preset on the deduplication server 103, x indicates consecutive natural numbers from 1 to 11 separately. In the implementation manner shown in FIG. 5, 11 points are determined for the potential dividing point $k_i$, and are $p_{i1}, p_{i2}, p_{i3}, p_{i4}, p_{i5}, p_{i6}, p_{i7}, p_{i8}, p_{i9}, p_{i10}$, and $p_{i11}$ separately, and windows corresponding to the points $p_{i1}, p_{i2}, p_{i3}, p_{i4}, p_{i5}, p_{i6}, p_{i7}, p_{i8}, p_{i9}, p_{i10}$, and $p_{i11}$ are $W_{i1}[p_{i1}-169, p_{i1}]$, $W_{i2}[p_{i2}-169, p_{i2}]$, $W_{i3}[p_{i3}-169, p_{i3}]$, $W_{i4}[p_{i4}-169, p_{i4}]$, $W_{i5}[p_{i5}-169, p_{i5}]$, $W_{i6}[p_{i6}-169, p_{i6}]$, $W_{i7}[p_{i7}-169, p_{i7}]$, $W_{i8}[p_{i8}-169, p_{i8}]$, $W_{i9}[p_{i9}-169, p_{i9}]$, $W_{i10}[p_{i10}-169, p_{i10}]$, and $W_{i11}[p_{i11}-169, p_{i11}]$ respectively. The foregoing windows are separately referred to as $W_{i1}, W_{i2}, W_{i3}, W_{i4}, W_{i5}, W_{i6}, W_{i7}, W_{i8}, W_{i9} W_{i10}$, and $W_{i11}$ for short. A distance between the point $p_{ix}$ and the potential dividing point $k_i$ is $d_x$ bytes. Specifically, a distance between $p_{i1}$ and $k_i$ is 0 byte, a distance between $p_{i2}$ and $k_i$ is 1 byte, a distance between $p_{i3}$ and $k_i$ is 2 bytes, a distance between $p_{i4}$ and $k_i$ is 3 bytes, a distance between $p_{i5}$ and $k_i$ is 4 bytes, a distance between $p_{i6}$ and $k_i$ is 5 bytes, a distance between $p_{i7}$ and $k_i$ is 6 bytes, a distance between $p_{i8}$ and $k_i$ is 7 bytes, a distance between $p_{i9}$ and $k_i$ is 8 bytes, a distance between $p_{i10}$ and $k_i$ is 9 bytes, a distance between $p_{i11}$ and $k_i$ is 10 bytes, and relative to the potential dividing point $k_i$, all $p_{i2}, p_{i3}, p_{i4}, p_{i5}, p_{i6} p_{i7}, p_{i8}, p_{i9}, p_{i10}$, and $p_{i11}$ are in a direction opposite to the direction of searching for a data stream dividing point. It is determined whether at least a part of data in $W_{i1}[p_{i1}-169, p_{i1}]$ meets a preset condition $C_1$, it is determined whether at least a part of data in $W_{i2}[p_{i2}-169, p_{i2}]$ meets a preset condition $C_2$, it is determined whether at least a part of data in $W_{i3}[p_{i3}-169, p_{i3}]$ meets a preset condition $C_3$, it is determined whether at least a part of data in $W_{i4}[p_{i4}-169, p_{i4}]$ meets a preset condition $C_4$, it is determined whether at least a part of data in $W_{i5}[p_{i5}-169, p_{i5}]$ meets a preset condition $C_5$, it is determined whether at least a part of data in $W_{i6}[p_{i6}-169, p_{i6}]$ meets a preset condition $C_6$, it is determined whether at least a part of data in $W_{i7}[p_{i7}-169, p_{i7}]$ meets a preset condition $C_7$, it is determined whether at least a part of data in $W_{i8}[p_{i8}-169, p_{i8}]$ meets a preset condition $C_8$, it is determined whether at least a part of data in $W_{i9}[p_{i9}-169, p_{i9}]$ meets a preset condition $C_9$, it is determined whether at least a part of data in $W_{i10}, [p_{i10}-169, p_{i10}]$ meets a preset condition $C_{10}$, and it is determined whether at least a part of data in $W_{i11}[p_{i11}-169, p_{i11}]$ meets a preset condition $C_{11}$. When it is determined that the at least a part of data in the window W meets the preset condition $C_1$, the at least a part of data in the window $W_{i2}$ meets the preset condition $C_2$, the at least a part of data in the window $W_{i3}$ meets the preset condition $C_3$, the at least a part of data in the window W meets the preset condition $C_4$, the at least a part of data in the window $W_{i5}$ meets the preset condition $C_5$, the at least a part of data in the window $W_{i6}$ meets the preset condition $C_6$, the at least a part of data in the window $W_{i7}$ meets the preset condition $C_7$, the at least a part of data in the window $W_{i8}$ meets the preset condition $C_8$, the at least a part of data in the window $W_{i9}$ meets the preset condition $C_9$, the at least a part of data in the window $W_{i10}$ meets the preset condition $C_{10}$, and the at least a part of data in the window $W_{i11}$ meets the preset condition $C_{11}$, the current potential dividing point $k_i$ is a data stream dividing point. When the at least a part of data in any window of the 11 windows does not meet the corresponding preset condition, for example, as shown in FIG. 6, at least a part of data in $W_{i5}[p_{i5}-169, p_{i5}]$ does not meet the corresponding preset condition $C_5$, N bytes are skipped from the point $p_{i5}$ along the direction of searching for a data stream dividing point, where the N bytes are not greater than $\|B_5\|+\max_x(\|A_x\|+\|(k_i-p_{ix})\|)$. In an implementation manner shown in FIG. 6, the N bytes that are skipped are not greater than 179 bytes, and in this embodiment, N=11, so as to obtain a next potential dividing point. For differentiation from the potential dividing point $k_i$, the new potential dividing point is represented as $k_1$ here. According to the rule preset on the deduplication server 103 in the implementation manner shown in FIG. 5, 11 points are determined for the potential dividing point $k_j$, and are $p_{j1}, p_{j2}, p_{j3}, p_{j4}, p_{j5}, p_{j6}, p_{j7}, p_{j8}, p_{j9}, p_{j10}$, and $p_{j11}$ separately, and windows corresponding to the points $p_{j1}, p_{j2}, p_{j3}, p_{j4}, p_{j5}, p_{j6}, p_{j7}, p_{j8}, p_{j9}, p_{j10}$, and $p_{j11}$ are determined, and are $W_{j1}[p_{j1}-169, p_{j1}]$, $W_{j2}[p_{j2}-169, p_{j2}]$, $W_{j3}[p_{j3}-169, p_{j3}]$, $W_{j4}[p_{j4}-169, p_{j4}]$, $W_{j5}[p_{j5}-169, p_{j5}]$, $W_{j6}[p_{j6}-169, p_{j6}]$, $W_{j7}[p_{j7}-169, p_{j7}]$, $W_{j8}[p_{j8}-169, p_{j8}]$, $W_{j9}[p_{j9}-169, p_{j9}]$, $W_{j10}[p_{j10}-169, p_{j10}]$, and $W_{j11}[p_{j11}-169, p_{j11}]$ respectively. A distance between $p_{jx}$ and the potential dividing point $k_j$ is $d_x$ bytes. Specifically, a distance between $p_{j1}$ and $k_j$ is 0 byte, a distance between $p_{j2}$ and $k_j$ is 1 byte, a distance between $p_{j3}$ and $k_j$ is 2 bytes, a distance between $p_{j4}$ and $k_j$ is 3 bytes, a distance between $p_{j5}$ and $k_j$ is 4 bytes, a distance between $p_{j6}$ and $k_j$ is 5 bytes, a distance between $p_{j7}$ and $k_j$ is 6 bytes, a distance between $p_{j8}$ and $k_j$ is 7 bytes, a distance between $p_{j9}$ and $k_j$ is 8 bytes, a distance between $p_{j10}$ and $k_j$ is 9 bytes, a distance between $p_{j11}$ and $k_j$ is 10 bytes, and relative to the potential dividing point $k_j$, all $p_{j1}, p_{j2}, p_{j3}, p_{j4}, p_{j5}, p_{j6}, p_{j7}, p_{j8}, p_{j9}, p_{j10}$, and $p_{j11}$ are in a direction opposite to the direction of searching for a data stream dividing point. In the implementation manner shown in FIG. 6, when the 11th window $W_{j11}[p_{j11}-169, p_{j11}]$ is determined for the potential dividing point $k_j$, to ensure that a range between the potential dividing point $k_i$ and the potential dividing point $k_j$ all fall within a determining range, in this implementation manner, it may be ensured that a left boundary of the window $W_{j11}[p_{j11}-169, p_{j11}]$ coincides with a right boundary $p_{i5}$ of $W_{i5}[p_{i5}-169, p_{i5}]$ or falls within a range of $W_{i5}[p_{i5}-169, p_{i5}]$, where the point $p_{j11}$ determined for the potential dividing point $k_j$ is a point ranking the first in a sequence, which is obtained according to the direction of searching for a data stream dividing point, of M points that are determined for the potential dividing point $k_j$ according to the rule. Therefore, within such a limit, when the at least a part of data in $W_{i5}[p_{i5}-169, p_{i5}]$ does not meet the preset condition $C_5$, a distance for skipping from $p_{i5}$ along the direction of searching for a data stream dividing point is not greater than $\|B_5\|+\max_x(\|A_x\|+\|(k_i-p_{ix})\|)$, where M=11, and 11*U is not greater than $\max_x(\|A_x\|+\|(k_i-p_{ix})\|)$, and therefore, a distance for skipping from $p_{i5}$ along the direction of searching for a data stream dividing point is not greater than 179. It is determined whether at least a part of data in $W_{j1}[p_{j1}-169, p_{j1}]$ meets the preset condition $C_1$, it is determined whether at least a part of data in $W_{j2}[p_{j2}-169, p_{j2}]$ meets the preset condition $C_2$, it is determined whether at least a part of data in $W_{j3}[p_{j3}-169, p_{j3}]$ meets the preset condition $C_3$, it is determined whether at least a part of data in $W_{j4}[p_{j4}-169, p_{j4}]$ meets the preset condition $C_4$, it is determined whether at least a part of data in $W_{j5}[p_{j5}-169, p_{j5}]$ meets the preset condition $C_5$, it is determined whether at least a part of data in $W_{j6}[p_{j6}-169, p_{j6}]$ meets the preset condition $C_6$, it is determined whether at least a part of data in $W_{j7}[p_{j7}-169, p_{j7}]$ meets the preset condition $C_7$, it is determined whether at least a part of data in $W_{j8}[p_{j8}-169, p_{j8}]$ meets the preset condition $C_8$, it is determined whether at least a part of data in $W_{j9}[p_{j9}-169, p_{j9}]$ meets the preset condition $C_9$, it is determined whether at least a part of data in $W_{j10}[p_{j10}-169, p_{j10}]$ meets the preset condition $C_{10}$, and it is determined whether at least a part of data in $W_{j11}[p_{j11}-169, p_{j11}]$ meets the preset condition $C_{11}$. Certainly, in this embodiment of the present invention, the rule is also followed when it is determined whether the potential dividing point $k_a$ is a data stream dividing point, specific implementation is not described again, and reference may be made to the description of determining the potential dividing point $k_i$. When it is determined that the at least a part of data in the window $W_{j1}$ meets the preset condition $C_1$, the at least a part of data in the window $W_{j2}$ meets the preset condition $C_2$, the at least a part of data in the window $W_{j3}$ meets the preset condition $C_3$, the at least a part of data in the window $W_{j4}$ meets the preset condition $C_4$, the at least a part of data in the window $W_{j5}$ meets the preset condition $C_5$, the at least a part of data in the window $W_{j6}$ meets the preset condition $C_6$, the at least a part of data in the window $W_{j7}$ meets the preset condition $C_7$, the at least a part of data in the window $W_{j3}$ meets the preset condition $C_8$, the at least a part of data in the window $W_{j9}$ meets the preset condition $C_9$, the at least a part of data in the window $W_{j10}$ meets the preset condition $C_{10}$, and the at least a part of data in the window $W_{j11}$ meets the preset condition $C_{11}$, the current potential dividing point $k_j$ is a data stream dividing point, and data between $k_j$ and $k_a$ forms 1 data chunk. Meanwhile, a minimum chunk size of 4 KB is skipped in a manner the same as that of $k_a$ to obtain a next potential dividing point, and it is determined, according to the rule preset on the deduplication server 103, whether the next potential dividing point is a data stream dividing point. When it is determined that the potential dividing point $k_j$ is not a data stream dividing point, 11 bytes are skipped in a manner the same as that of $k_i$ to obtain a next potential dividing point, and it is determined, according to the rule preset on the deduplication server 103 and the foregoing method, whether the next potential dividing point is a data stream dividing point. When no data stream dividing point is found after a set maximum data chunk is exceeded, an end position of the maximum data chunk serves as a forced dividing point.

In the implementation manner shown in FIG. 5, according to the rule preset on the deduplication server 103, starting from determining whether the at least a part of data in $W_{i1}[p_{i1}-169, p_{i1}]$ meets the preset condition $C_1$, when it is determined that the at least a part of data in $W_{i1}[p_{i1}-169, p_{i1}]$ meets the preset condition $C_1$, it is determined that the at least a part of data in $W_{i2}[p_{i2}-169, p_{i2}]$ meets the preset condition $C_2$, it is determined that the at least a part of data in $W_{i3}[p_{i3}-169, p_{i3}]$ meets the preset condition $C_3$, it is determined that the at least a part of data in $W_{i4}[p_{i4}-169, p_{i4}]$ meets the preset condition $C_4$, and it is determined that the at least a part of data in $W_{i5}[p_{i5}-169, p_{i5}]$ does not meet the preset condition $C_5$, 10 bytes are skipped from the point $p_{i5}$, along the direction of searching for a data stream dividing point, and a new potential dividing point is obtained at an end position of a 10th byte, which is represented as $k_g$ here for differentiation from other potential dividing points. According to the rule preset on the deduplication server 103, 11 points $p_{gx}$ are determined for the potential dividing point $k_g$, where x indicates consecutive natural numbers from 1 to 11 separately, and are $p_{g1}$, $p_{g2}$, $p_{g3}$, $p_{g4}$, $p_{g5}$, $p_{g6}$, $p_{g7}$, $p_{g8}$, $p_{g9}$, $p_{g10}$, and $p_{g11}$ separately, and windows corresponding to the points $p_{g1}$, $p_{g2}$, $p_{g3}$, $p_{g4}$, $p_{g5}$, $p_{g6}$, $p_{g7}$, $p_{g8}$, $p_{g9}$, $p_{g10}$, and $p_{g11}$ are determined, and are $W_{g1}[p_{g1}-169, p_{g1}]$, $W_{g2}[p_{g2}-169, p_{g2}]$, $W_{g3}[p_{g3}-169, p_{g3}]$, $W_{g4}[p_{g4}-169, p_{g4}]$, $W_{g5}[p_{g5}-169, p_{g5}]$, $W_{g6}[p_{g6}-169, p_{g6}1]$, $W_{g7}[p_{g7}-169, p_{g7}]$, $W_{g8}[p_{g8}-169, p_{g8}]$, $W_{g9}[p_{g9}-169, p_{g9}]$, $W_{g10}[p_{g10}-169, p_{g10}]$, and $W_{g11}[p_{g11}-169, p_{g11}]$ respectively. A distance between $p_{gx}$ and the potential dividing point $k_g$ is d bytes. Specifically, a distance between $p_{g1}$ and $k_g$ is 0 byte, a distance between $p_{g2}$ and $k_g$ is 1 byte, a distance between $p_{g3}$ and $k_g$ is 2 bytes, a distance between $p_{g4}$ and $k_g$ is 3 bytes, a distance between $p_{g5}$ and $k_g$ is 4 bytes, a distance between $p_{g6}$ and $k_g$ is 5 bytes, a distance between $p_{g7}$ and $k_g$ is 6 bytes, a distance between $p_{g8}$ and $k_g$ is 7 bytes, a distance between $p_{g9}$ and $k_g$ is 8 bytes, a distance between $p_{g10}$ and $k_g$ is 9 bytes, a distance between $p_g$ and $k_g$ is 10 bytes, and relative to the potential dividing point $k_g$, all $p_{g1}$, $p_{g2}$, $p_{g3}$, $p_{g4}$, $p_{g5}$, $p_{g6}$, $p_{g7}$, $p_{g8}$, $p_{g9}$, $p_{g10}$, and $p_{g11}$ are in a direction opposite to the direction of searching for a data stream dividing point. It is determined whether at least a part of data in $W_{g1}[p_{g1}-169, p_{g1}]$ meets the preset condition $C_1$, it is determined whether at least a part of data in $W_{g2}[p_{g2}-169, p_{g2}]$ meets the preset condition $C_2$, it is determined whether at least a part of data in $W_{g3}[p_{g3}-169, p_{g3}]$ meets the preset condition $C_3$, it is determined whether at least a part of data in $W_{g4}[p_{g4}-169, p_{g4}]$ meets the preset condition $C_4$, it is determined whether at least a part of data in $W_{g5}[p_{g5}-169, p_{g5}]$ meets the preset condition $C_5$, it is determined whether at least a part of data in $W_{g6}[p_{g6}-169, p_{g6}]$ meets the preset condition $C_6$, it is determined whether at least a part of data in $W_{g7}[p_{g7}-169, p_{g7}]$ meets the preset condition $C_7$, it is determined whether at least a part of data in $W_{g8}[p_{g8}-169, p_{g8}]$ meets the preset condition $C_8$, it is determined whether at least a part of data in $W_{g9}[p_{g9}-169, p_{g9}]$ meets the preset condition $C_9$, it is determined whether at least a part of data in $W_{g10}[p_{g10}-169, p_{g10}]$ meets the preset condition $C_{10}$, and it is determined whether at least a part of data in $W_{g11}[p_{g11}-169, p_{g11}]$ meets the preset condition $C_{11}$. Therefore, the point $p_{g11}$ corresponding to the potential dividing point $k_g$ coincides with the point $p_{i5}$ corresponding to the potential dividing point $k_i$, the window $W_{g11}[p_{g11}-169, p_{g11}]$ corresponding to the point $p_{g11}$ coincides with the window $W_{i5}[p_{i5}-169, p_{i5}]$ corresponding to the point $p_{i5}$, and $C_5=C_{11}$; therefore, for the potential dividing point $k_i$, when it is determined that the at least a part of data in $W_{i5}[p_{i5}-169, p_{i5}]$ does not meet the preset condition $C_5$, the potential dividing point $k_g$ obtained by skipping 10 bytes from the point $p_{i5}$, along the direction of searching for a data stream dividing point still does not meet a condition of serving as a data stream dividing point. Therefore, if repeated calculation exists when 10 bytes are skipped from the point $p_{i5}$ along the direction of searching for a data stream dividing point, then repeated calculation can be reduced and efficiency is higher when 11 bytes are skipped from the point $p_{i5}$, along the direction of searching for a data stream dividing point. Therefore, a speed of searching for a data stream dividing point is increased. When a probability that at least a part of data in the window $W_x[p_x-A_x, p_x+B_x]$ corresponding to the point $p_x$ that is determined according to the preset rule meets the preset condition $C_x$ is 1/2, that is, a probability of executing skipping is 1/2, at most 179 bytes can be skipped each time.

In this implementation manner, a preset rule is: for a potential dividing point k, determining 11 points $p_x$, a window $W_x[p_x-A_x, p_x+B_x]$ corresponding to the point $p_x$, and a preset condition $C_x$ corresponding to the window $W_x[p_x-A_x, p_x+B_x]$, where x indicates consecutive natural numbers from 1 to 11 separately, where a probability that at least a part of data in the window $W_x[p_x-A_x, p_x+B_x]$ corresponding to the point $p_x$ meets the preset condition is 1/2, and P(n) can be calculated by using the two factors, that is, the quantity of points $p_x$ and the probability that at least a part of data in the window $W_x[p_x-A_x, p_x+B_x]$ corresponding to the point $p_x$ meets the preset condition. Moreover, $A_1=A_2=A_3=A_4=A_5=A_6=A_7=A_8=A_9=A_{10}=A_{11}=169$, $B_1=B_2=B_3=B_4=B_5=B_6=B_7=B_8=B_9=B_{10}=B_{11}=0$, and $C_1=C_2=C_3=C_4=C_5=C_6=C_7=C_8=C_9=C_{10}=C_{11}$, where a distance between $p_x$ and the potential dividing point k is $d_x$ bytes. Specifically, a distance between $p_1$ and the potential dividing point k is 0 byte, a distance between $p_2$ and k is 1 byte, a distance between $p_3$ and k is 2 bytes, a distance between $p_4$ and k is 3 bytes, a distance between $p_5$ and k is 4 bytes, a distance between $p_6$ and k is 5 bytes, a distance between $p_7$ and k is 6 bytes, a distance between $p_8$ and k is 7 bytes, a distance between $p_9$ and k is 8 bytes, a distance between $p_{10}$ and k is 9 bytes, a distance between $p_{11}$ and k is 10 bytes, and relative to the potential dividing point k, all $p_2$, $p_3$, $p_4$, $p_5$, $p_6$, $p_7$, $p_8$, $p_9$, $p_{10}$ and $p_{11}$ are in a direction opposite to the direction of searching for a data stream dividing point. Therefore, whether the potential dividing point k is a data stream dividing point depends on whether it exists that at least a part of data in each window of windows corresponding to the 11 consecutive points meets the preset condition $C_x$. After a minimum chunk length of 4096 bytes is skipped from a start position/previous data stream dividing point of a data stream, a 4086th point is found by going back by 10 bytes in a direction opposite to the direction of searching for a data stream dividing point, and no data stream dividing point exists at the point; therefore, P(4086)=1, and P(4087)=1, . . . , P(4095)=1, and so on. At an 4096th point, that is, a point which is used to obtain the minimum chunk, with a probability of $(1/2)^{11}$, at least a part of data in each window of the windows corresponding to the 11 points meets the preset condition $C_x$. Hence, with a probability of $(1/2)^{11}$, a data stream dividing point exists; with a probability of $1-(1/2)^{11}$, no data stream dividing point exists; therefore $P(11)=1-(1/2)^{11}$.

Figure 34:
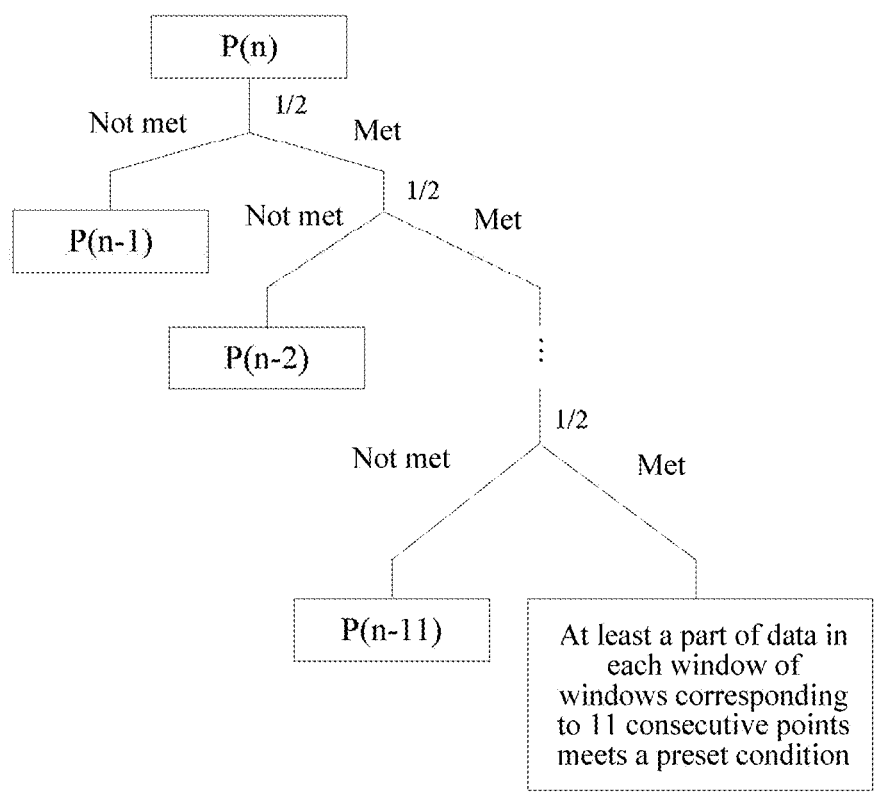
FIG. 34 and FIG. 35 are schematic diagrams of probability that at least a part of data in a window meets a preset condition.

As shown in FIG. 34, at an nth point, there may be 12 cases of obtaining P(n) by means of recursion.

Case 1: With a probability of 1/2, at least a part of data in a window corresponding to the nth point does not meet a preset condition; in this case, with a probability of P(n−1), 11 consecutive points do not exist among (n−1) points before the nth point, where at least a part of data in each window of windows corresponding to the 11 consecutive points separately meets a preset condition. Therefore, P(n) includes 1/2*P(n−1). A case in which the at least a part of data in the window corresponding to the nth point does not meet the preset condition, and 11 consecutive points exist among the (n−1) points before the nth point, where at least a part of data in each window of windows corresponding to the 11 consecutive points separately meets the preset condition, is not related to P(n).

Case 2: With a probability of 1/2, at least a part of data in a window corresponding to the nth point meets a preset condition, and with the probability of 1/2, at least a part of data in a window corresponding to an (n−1)th point does not meet a preset condition; in this case, with a probability of P(n−2), 11 consecutive points do not exist among (n−2) points before the (n−1) point, where at least a part of data in each window of windows corresponding to 11 consecutive points separately meets a preset condition. Therefore, P(n) includes 1/2*1/2*P(n−2). A case in which the at least a part of data in the window corresponding to the nth point meets the preset condition, the at least a part of data in the window corresponding to the (n−1)th point does not meet the preset condition, and 11 consecutive points exist among the (n−2) points before the (n−1)th point, where at least a part of data in each window of windows corresponding to the 11 consecutive points separately meets the preset condition, is not related to P(n).

According to the foregoing description, case 11: With a probability of $(1/2)^{10}$, at least a part of data in windows corresponding to nth to (n−9)th points meets a preset condition, and with a probability of 1/2, at least a part of data in a window corresponding to an (n−10)th point does not meet a preset condition; in this case, with a probability of P(n−11), 11 consecutive points do not exist among (n−11) points before the (n−10) point, where at least a part of data in each window of windows corresponding to the 11 consecutive points separately meets the preset condition. Therefore, P(n) includes $(1/2)^{10}*1/2*P(n-11)$. A case in which the at least a part of data in the windows corresponding to the nth to (n−9)th points meets the preset condition, the at least a part of data in the window corresponding to the (n−10)th point does not meet the preset condition, and 11 consecutive points exist among the (n−11) points before the (n−10)th point, where at least a part of data in each window of windows corresponding to the 11 consecutive points separately meets the preset condition, is not related to P(n).

Case 12: With a probability of $(1/2)^{11}$, at least a part of data in windows corresponding to nth to (n−10)th points meets a preset condition, and this case is not related to P(n).

Therefore, $P(n)=1/2*P(n-1)+(1/2)^2*P(n-2)+ \ldots + (1/2)^{11}*P(n-11)$. Another preset rule is: for a potential dividing point k, determining 24 points $p_x$, a window $W_x[p_x-A_x, p_x+B_x]$ corresponding to the point $p_x$, and a preset condition $C_x$ corresponding to the window $W_x[p_x-A_x, p_x+B_x]$, where x indicates consecutive natural numbers from 1 to 24 separately, where a probability that at least a part of data in the window $W_x[p_x-A_x, p_x+B_x]$ corresponding to the point $p_x$ meets the preset condition $C_x$ is 3/4, and P(n) can be calculated by using the two factors, that is, the quantity of points $p_x$ and the probability that at least a part of data in the window $W_x[p_x-A_x, p_x+B_x]$ corresponding to the point $p_x$ meets the preset condition. Moreover, $A_1=A_2=A_3=A_4=A_5=A_6=A_7=A_8=A_9=A_{10}=A_{11}=169$, $B_1=B_2=B_3=B_4=B_5=B_6=B_7=B_8=B_9=B_{10}=B_{11}=0$, and $C_1=C_2=C_3=C_4=C_5=C_6=C_7=C_8=C_9= \ldots =C_{22}=C_{23}=C_{24}$, where a distance between $p_x$ and the potential dividing point k is d bytes. Specifically, a distance between $p_1$ and the potential dividing point k is 0 byte, a distance between $p_2$ and k is 1 byte, a distance between $p_3$ and k is 2 bytes, a distance between $p_4$ and k is 3 bytes, a distance between $p_5$ and k is 4 bytes, a distance between $p_6$ and k is 5 bytes, a distance between $p_7$ and k is 6 bytes, a distance between $p_8$ and k is 7 bytes, a distance between $p_9$ and k is 8 bytes, . . . , a distance between $p_{22}$ and k is 21 bytes, a distance between $p_{23}$ and k is 22 bytes, a distance between $p_{24}$ and k is 23 bytes, and relative to the potential dividing point k, all $p_2$, $p_3$, $p_4$, $p_5$, $p_6$, $p_7$, $p_8$, $p_9$, . . . , $p_{22}$, $p_{23}$, and $p_{24}$ are in a direction opposite to the direction of searching for a data stream dividing point. Therefore, whether the potential dividing point k is a data stream dividing point depends on whether it exists that at least a part of data in each window of windows corresponding to the 24 consecutive points meets the preset condition $C_x$, and calculation can be performed by using the following formulas:

$$P(4073)=1, P(4074)=1, \ldots, P(4095)=1, P(4096)= 1-(3/4)^{24}, \text{ and}$$

$$P(n)=1/4*P(n-1)+1/4*(3/4)*P(n-2)+ \ldots + 1/4*(3/4)^{23}*P(n-24).$$

After calculation, P(5*1024)=0.78, P(11*1024)=0.17, and P(12*1024)=0.13. That is, if no data stream dividing point is found with a probability of 13% after a search proceeds to a point at a distance of 12 KB from a start position/previous data stream dividing point of a data stream, and forced division is performed. A density function of a data stream dividing point is obtained by using this probability, and after integration, it is obtained that on average, a data stream dividing point is found after a search proceeds to a point at a distance about 7.6 KB from the start position/previous data stream dividing point of the data stream, that is, an average chunk length is about 7.6 KB. Different from that at least a part of data in windows corresponding to 11 consecutive points meets a preset condition with a probability of 1/2, a conventional CDC algorithm can achieve an effect of an average chunk length being 7.6 KB only when one window meets a condition with a probability of $1/2^{12}$.

Figure 7:
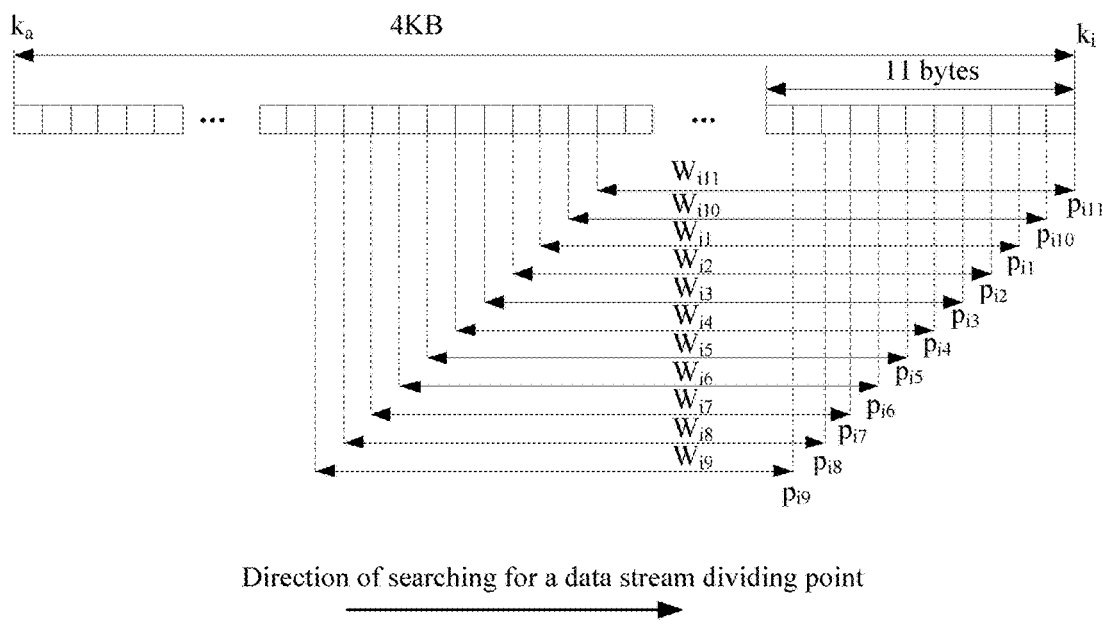
FIG. 7 and FIG. 8 are schematic diagrams of an implementation manner of searching for a data stream dividing point.
Figure 8:
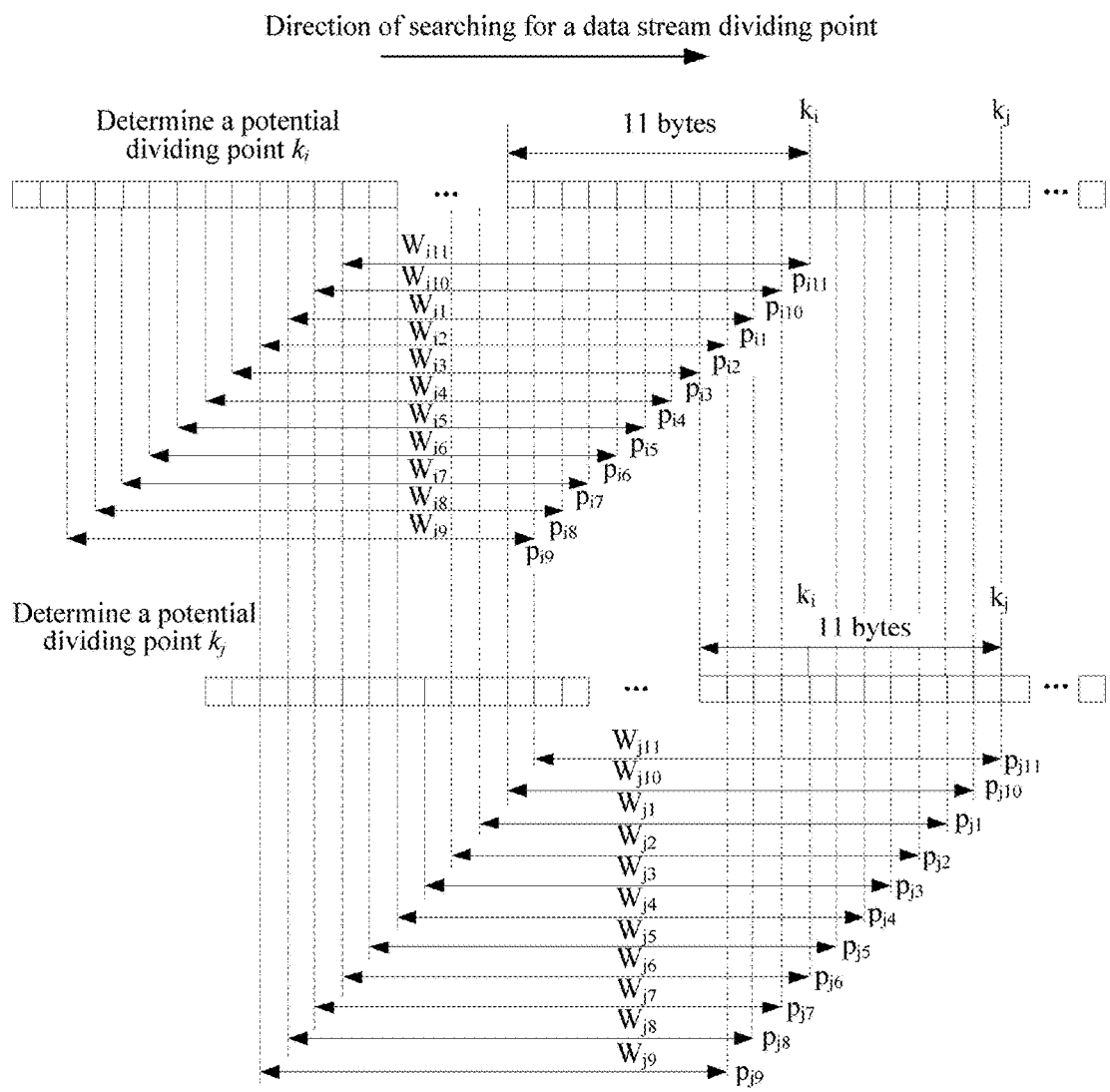

On the basis of the search for a data stream dividing point shown in FIG. 3, in an implementation manner shown in FIG. 7, a rule is preset on a deduplication server 103, where the rule is: for a potential dividing point k, determining 11 points $p_x$, a window $W_x[p_x-A_x, p_x+B_x]$ corresponding to the point $p_x$, and a preset condition $C_x$ corresponding to the window $W_x[p_x-A_x, p_x+B_x]$, where x indicates consecutive natural numbers from 1 to 11 separately, where a probability that at least a part of data in the window $W_x[p_x-A_x, p_x+B_x]$ corresponding to the point $p_x$ meets the preset condition $C_x$ is 1/2, $A_1=A_2=A_3=A_4=A_5=A_6=A_7=A_8=A_9=A_{10}=A_{11}=169$, $B_1=B_2=B_3=B_4=B_5=B_6=B_7=B_8=B_9=B_{10}=B_{11}=0$, and $C_1=C_2=C_3=C_4=C_5=C_6=C_7=C_8=C_9=C_{10}=C_{11}$, where a distance between $p_x$ and the potential dividing point k is d bytes. Specifically, a distance between $p_1$ and the potential dividing point k is 2 bytes, a distance between $p_2$ and k is 3 bytes, a distance between $p_3$ and k is 4 bytes, a distance between $p_4$ and k is 5 bytes, a distance between $p_5$ and k is 6 bytes, a distance between $p_6$ and k is 7 bytes, a distance between $p_7$ and k is 8 bytes, a distance between $p_8$ and k is 9 bytes, a distance between $p_9$ and k is 10 bytes, a distance between $p_{i10}$ and k is 1 byte, a distance between $p_{i11}$ and k is 0 byte, and relative to the potential dividing point k, all $p_1$, $p_2$, $p_3$, $p_4$, $p_5$, $p_6$, $p_7$, $p_8$, $p_9$, and $p_{10}$ are in a direction opposite to a direction of searching for a data stream dividing point. $k_a$ is a data stream dividing point, and the direction of searching for a data stream dividing point shown in FIG. 7 is from left to right. After a minimum data chunk of 4 KB is skipped from the data stream dividing point $k_a$, an end position of the minimum data chunk of 4 KB serves as a next potential dividing point $k_i$, and a point $p_{ix}$ is determined for the potential dividing point $k_i$. In this embodiment, according to the rule preset on the deduplication server 103, x indicates consecutive natural numbers from 1 to 11 separately. In the implementation manner shown in FIG. 7, according to the preset rule, 11 points are determined for the potential dividing point $k_i$, and are $p_{i1}$, $p_{i2}$, $p_{i3}$, $p_{i4}$, $p_{i5}$, $p_{i6}$, $p_{i7}$, $p_{i8}$, $p_{i9}$, $p_{i10}$, and $p_{i11}$ separately, and windows corresponding to the points $p_{i1}$, $p_{i2}$, $p_{i3}$, $p_{i4}$, $p_{i5}$, $p_{i6}$, $p_{i7}$, $p_{i8}$, $p_{i9}$, $p_{i10}$, and $p_{i11}$ are $W_{i1}[p_{i1}-169, p_{i1}]$, $W_{i2}[p_{i2}-169, p_{i2}]$, $W_{i3}[p_{i3}-169, p_{i3}]$, $W_{i4}[p_{i4}-169, p_{i4}]$, $W_{i5}[p_{i5}-169, p_{i5}]$, $W_{i6}[p_{i6}-169, p_{i6}]$, $W_{i7}[p_{i7}-169, p_{i7}]$, $W_{i8}[p_{i8}-169, p_{i8}]$, $W_{i9}[p_{i9}-169, p_{i9}]$, $W_{i10}[p_{i10}-169, p_{i10}]$, and $W_{i11}[p_{i11}-169, p_{i11}]$ respectively. A distance between the point $p_{ix}$ and the potential dividing point $k_i$ is $d_{ix}$ bytes. Specifically, a distance between $p_{i1}$ and $k_i$ is 2 bytes, a distance between $p_{i2}$ and k is 3 bytes, a distance between $p_{i3}$ and $k_i$ is 4 bytes, a distance between $p_{i4}$ and $k_i$ is 5 bytes, a distance between $p_{i5}$ and $k_i$ is 6 bytes, a distance between $p_{i6}$ and $k_i$ is 7 bytes, a distance between $p_{i7}$ and $k_i$ is 8 bytes, a distance between $p_{i8}$ and $k_i$ is 9 bytes, a distance between $p_{i9}$ and $k_i$ is 10 bytes, a distance between $p_{i10}$ and $k_i$ is 1 byte, a distance between $p_{i11}$ and $k_i$ is 0 byte, and relative to the potential dividing point $k_i$, all $p_{i1}$, $p_{i2}$, $p_{i3}$, $p_{i6}$, $p_{i7}$, $p_{i8}$, $p_{i9}$, and $p_{i10}$ are in a direction opposite to the direction of searching for a data stream dividing point. It is determined whether at least a part of data in $W_{i1}[p_{i1}-169, p_{i1}]$ meets a preset condition $C_1$, it is determined whether at least a part of data in $W_{i2}[p_{i2}-169, p_{i2}]$ meets a preset condition $C_2$, it is determined whether at least a part of data in $W_{i3}[p_{i3}-169, p_{i3}]$ meets a preset condition $C_3$, it is determined whether at least a part of data in $W_{i4}[p_{i4}-169, p_{i4}]$ meets a preset condition $C_4$, it is determined whether at least a part of data in $W_{i5}[p_{i5}-169, p_{i5}]$ meets a preset condition $C_5$, it is determined whether at least a part of data in $W_{i6}[p_{i6}-169, p_{i6}]$ meets a preset condition $C_6$, it is determined whether at least a part of data in $W_{i7}[p_{i7}-169, p_{i7}]$ meets a preset condition $C_7$, it is determined whether at least a part of data in $W_{i8}[p_{i8}-169, p_{i8}]$ meets a preset condition $C_8$, it is determined whether at least a part of data in $W_{i9}[p_{i9}-169, p_{i9}]$ meets a preset condition $C_9$, it is determined whether at least a part of data in $W_{i10}[p_{i10}-169, p_{i10}]$ meets a preset condition $C_{10}$, and it is determined whether at least a part of data in $W_{i11}[p_{i11}-169, p_{i11}]$ meets a preset condition $C_{11}$. When it is determined that the at least a part of data in the window $W_{i1}$ meets the preset condition $C_1$, the at least a part of data in the window $W_{i2}$ meets the preset condition $C_2$, the at least a part of data in the window $W_{i3}$ meets the preset condition $C_3$, the at least a part of data in the window $W_{i4}$ meets the preset condition $C_4$, the at least a part of data in the window $W_{i5}$ meets the preset condition $C_5$, the at least a part of data in the window $W_{i6}$ meets the preset condition $C_6$, the at least a part of data in the window $W_{i7}$ meets the preset condition $C_7$, the at least a part of data in the window $W_{i8}$ meets the preset condition $C_8$, the at least a part of data in the window $W_{i9}$ meets the preset condition $C_9$, the at least a part of data in the window $W_{i10}$ meets the preset condition $C_{10}$, and the at least a part of data in the window $W_{i11}$ meets the preset condition $C_{11}$, the current potential dividing point $k_i$ is a data stream dividing point. When the at least a part of data in any window of the 11 windows does not meet the corresponding preset condition, as shown in FIG. 8, that the at least a part of data in $W_{i3}[p_{i3}-169, p_{i3}]$ does not meet the preset condition $C_3$ and 11 bytes are skipped from the point $p_{i3}$ along a direction of searching for a data stream dividing point is used as an example for description. As shown in FIG. 8, when it is determined that $W_3$ does not meet a preset condition, from $p_3$ that serves as a start point, N bytes are skipped along the direction of searching for a data stream dividing point, where the N bytes are not greater than $\|B_3\|+\max_x(\|A_x\|+\|(k_i-p_{ix})\|)$. In the implementation manner shown in FIG. 6, N bytes are skipped, and specifically are not greater than 179 bytes, and in this embodiment, N=11. A next potential dividing point is obtained at an end position of an 11th byte. For differentiation from the potential dividing point $k_i$, the new potential dividing point is represented as $k_j$ here. According to the rule preset on the deduplication server 103, 11 points are determined for the potential dividing point $k_j$, and are $p_{j1}$, $p_{j2}$, $p_{j3}$, $p_{j4}$, $p_{j5}$, $p_{j6}$, $p_{j7}$, $p_{j8}$, $p_{j9}$, $p_{j10}$ and $p_{j11}$ separately, and windows corresponding to the points $p_{j1}$, $p_{j2}$, $p_{j3}$, $p_{j4}$, $p_{j5}$, $p_{j6}$, $p_{j7}$, $p_{j8}$, $p_{j9}$, $p_{j10}$ and $p_{j11}$ are determined, and are $W_{i1}[p_{j1}-169, p_{j1}]$, $W_{j2}[p_{j2}-169, p_{j2}]$, $W_{j3}[p_{j3}-169, p_{j3}]$, $W_{j4}[p_{j4}-169, p_{j4}]$, $W_{j5}[p_{j5}-169, p_{j5}]$, $W_{j6}[p_{j6}-169, p_{j6}]$, $W_{j7}[p_{j7}-169, p_{j7}]$, $W_{j8}[p_{j8}-169, p_{j8}]$, $W_{j9}[p_{j9}-169, p_{j9}]$, $W_{j10}[p_{j10}-169, p_{j10}]$, and $W_{j11}[p_{j11}-169, p_{j11}]$ respectively. A distance between $p_{jx}$ and the potential dividing point $k_j$ is $d_x$ bytes. Specifically, a distance between $p_{j1}$ and $k_j$ is 2 bytes, a distance between $p_{j2}$ and $k_j$ is 3 bytes, a distance between $p_{j3}$ and $k_j$ is 4 bytes, a distance between $p_{j4}$ and $k_j$ is 5 bytes, a distance between $p_{j5}$ and $k_j$ is 6 bytes, a distance between $p_{j4}$ and $k_j$ is 7 bytes, a distance between $p_{j7}$ and $k_j$ is 8 bytes, a distance between $p_{j8}$ and $k_j$ is 9 bytes, a distance between $p_{j9}$ and $k_j$ is 10 bytes, a distance between $p_{j10}$ and $k_j$ is 1 byte, a distance between $p_{j11}$ and k is 0 byte, and relative to the potential dividing point $k_j$, all $p_{j1}$, $p_{j2}$, $p_{j3}$, $p_{j4}$, $p_{j5}$, $p_{j6}$, $p_{j7}$, $p_{j8}$, $p_{j9}$, and $p_{j10}$ are in a direction opposite to the direction of searching for a data stream dividing point. It is determined whether at least a part of data in $W_{j1}[p_{j1}-169, p_{j1}]$ meets the preset condition $C_1$, it is determined whether at least a part of data in $W_{j2}[p_{j2}-169, p_{j2}]$ meets the preset condition $C_2$, it is determined whether at least a part of data in $W_{j3}[p_{j3}-169, p_{j3}]$ meets the preset condition $C_3$, it is determined whether at least a part of data in $W_{j4}[p_{j4}-169, p_{j4}]$ meets the preset condition $C_4$, it is determined whether at least a part of data in $W_{j5}[p_{j5}-169, p_{j5}]$ meets the preset condition $C_5$, it is determined whether at least a part of data in $W_{j6}[p_{j6}-169, p_{j6}]$ meets the preset condition $C_6$, it is determined whether at least a part of data in $W_{j7}[p_{j7}-169, p_{j7}]$ meets the preset condition $C_7$, it is determined whether at least a part of data in $W_{j8}[p_{j8}-169, p_{j8}]$ meets the preset condition $C_8$, it is determined whether at least a part of data in $W_{j9}[p_{j9}-169, p_{j9}]$ meets the preset condition $C_9$, it is determined whether at least a part of data in $W_{j10}[p_{j10}-169, p_{j10}]$ meets the preset condition $C_{10}$, and it is determined whether at least a part of data in $W_{j11}[p_{j11}-169, p_{j11}]$ meets the preset condition $C_{11}$. Certainly, in this embodiment of the present invention, the rule is also followed when it is determined whether the potential dividing point $k_a$ is a data stream dividing point, specific implementation is not described again, and reference may be made to the description of determining the potential dividing point $k_i$. When it is determined that the at least a part of data in the window $W_{j1}$ meets the preset condition $C_1$, the at least a part of data in the window $W_{j2}$ meets the preset condition $C_2$, the at least a part of data in the window $W_{j3}$ meets the preset condition $C_3$, the at least a part of data in the window $W_{j4}$ meets the preset condition $C_4$, the at least a part of data in the window $W_{j5}$ meets the preset condition $C_5$, the at least a part of data in the window $W_{j6}$ meets the preset condition $C_6$, the at least a part of data in the window $W_{j7}$ meets the preset condition $C_7$, the at least a part of data in the window $W_{j8}$ meets the preset condition $C_8$, the at least a part of data in the window $W_{j9}$ meets the preset condition $C_9$, the at least a part of data in the window $W_{j10}$ meets the preset condition $C_{10}$, and the at least a part of data in the window $W_{j11}$ meets the preset condition $C_{11}$, the current potential dividing point $k_j$ is a data stream dividing point, and data between $k_j$ and $k_a$ forms 1 data chunk. Meanwhile, a minimum chunk size of 4 KB is skipped in a manner the same as that of $k_a$ to obtain a next potential dividing point, and it is determined, according to the rule preset on the deduplication server 103, whether the next potential dividing point is a data stream dividing point. When it is determined that the potential dividing point $k_j$ is not a data stream dividing point, 11 bytes are skipped in a manner the same as that of $k_i$ to obtain a next potential dividing point, and it is determined, according to the rule preset on the deduplication server 103 and the foregoing method, whether the next potential dividing point is a data stream dividing point. When no data stream dividing point is found after a set maximum data chunk is exceeded, an end position of the maximum data chunk serves as a forced dividing point. Certainly, implementation of the method is restricted by a length of the maximum data chunk and a size of a file forming the data stream, which is not described herein again.

Figure 9:
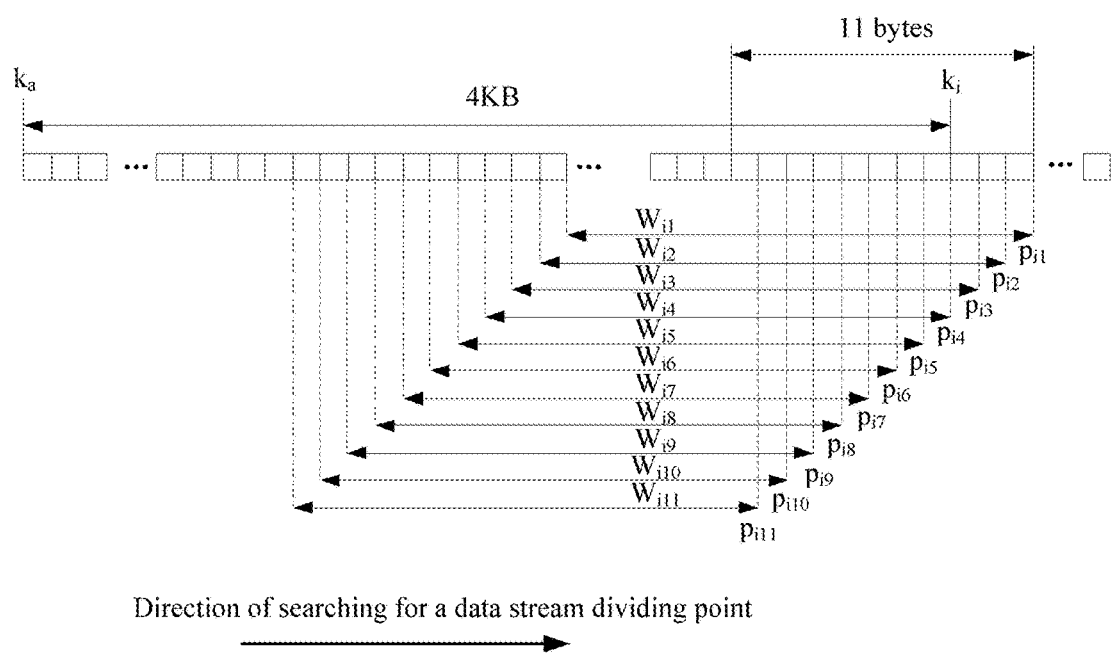
FIG. 9 and FIG. 10 are schematic diagrams of an implementation manner of searching for a data stream dividing point.
Figure 10:
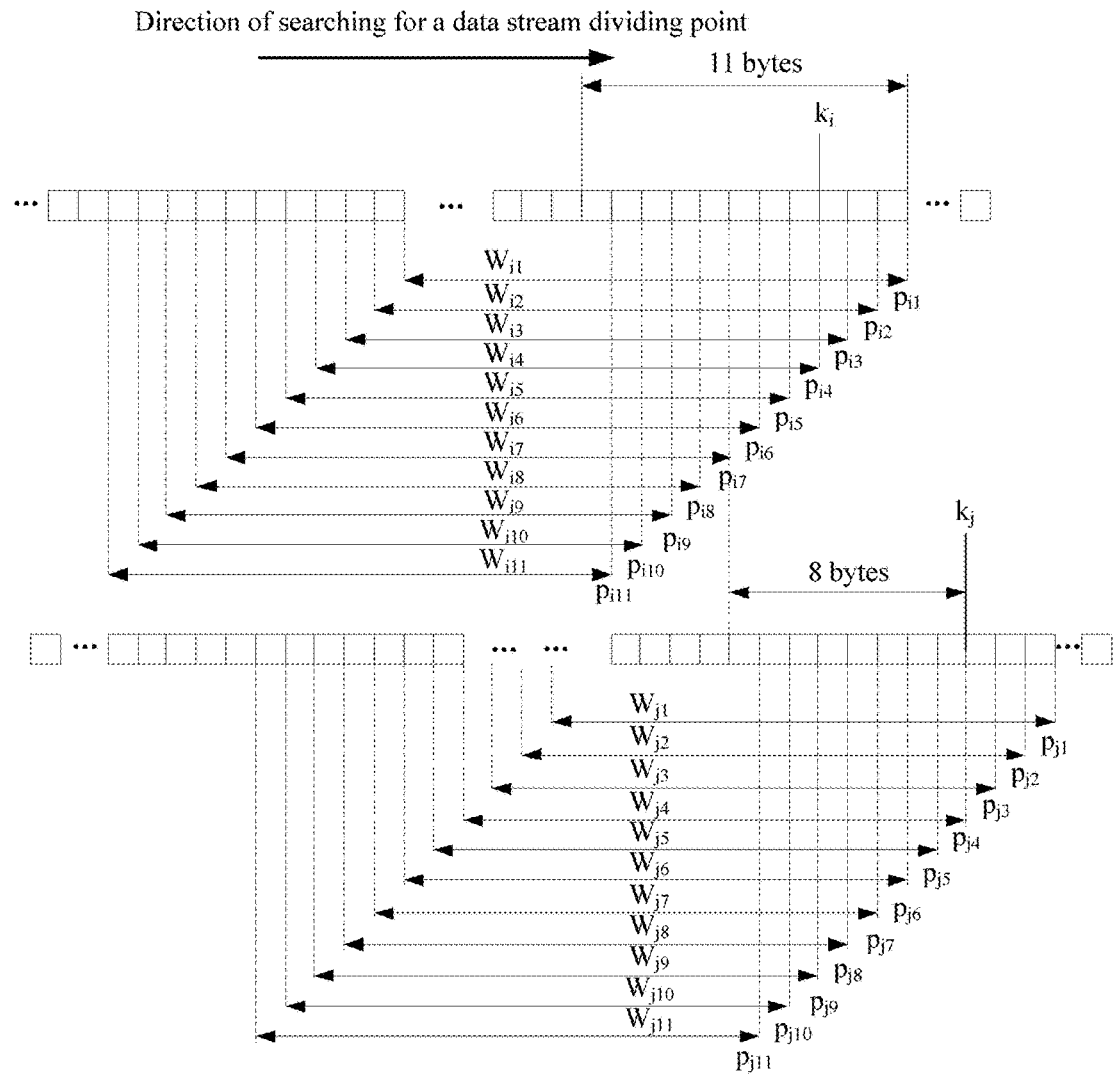

On the basis of the search for a data stream dividing point shown in FIG. 3, in an implementation manner shown in FIG. 9, a rule is preset on a deduplication server 103, where the rule is: for a potential dividing point k, determining 11 points $p_x$, a window $W_x[p_x-A_x, p_x+B_x]$ corresponding to the point $p_x$, and a preset condition $C_x$ corresponding to the window $W_x[p_x-A_x, p_x+B_x]$, where $A_1=A_2=A_3=A_4=A_5=A_6=A_7=A_8=A_9=A_{10}=A_{11}=169$, $B_1=B_2=B_3=B_4=B_5=B_6=B_7=B_8=B_9=B_{10}=B_{11}=0$, and $C_1=C_2=C_3=C_4=C_5=C_6=C_7=C_8=C_9=C_{10}=C_{11}$. A distance between $p_x$ and the potential dividing point $k_x$ is $d_x$ bytes. Specifically, a distance between $p_1$ and the potential dividing point k is 3 bytes, a distance between $p_2$ and k is 2 bytes, a distance between $p_3$ and k is 1 byte, a distance between $p_4$ and k is 0 byte, a distance between $p_5$ and k is 1 byte, a distance between $p_6$ and k is 2 bytes, a distance between $p_7$ and k is 3 bytes, a distance between $p_8$ and k is 4 bytes, a distance between $p_9$ and k is 5 bytes, a distance between $p_{10}$ and k is 6 bytes, a distance between $p_{11}$ and k is 7 bytes, all $p_5$, $p_6$, $p_7$, $p_8$, $p_9$, $p_{10}$, and $p_{11}$ are, relative to the potential dividing point k, in a direction opposite to a direction of searching for a data stream dividing point, and all $p_1$, $p_2$, and $p_3$ are, relative to the potential dividing point k, in the direction of searching for a data stream dividing point. $k_a$ is a data stream dividing point, and the direction of searching for a data stream dividing point shown in FIG. 9 is from left to right. After a minimum data chunk of 4 KB is skipped from the data stream dividing point $k_a$, an end position of the minimum data chunk of 4 KB serves as a next potential dividing point $k_i$, and a point $p_{ix}$ is determined for the potential dividing point $k_i$. In this embodiment, according to the rule preset on the deduplication server 103, x indicates consecutive natural numbers from 1 to 11 separately. In the implementation manner shown in FIG. 9, 11 points are determined for a potential dividing point $k_i$, and are $p_{i1}$, $p_{i2}$, $p_{i3}$, $p_{i4}$, $p_{i5}$, $p_{i6}$, $p_{i7}$, $p_{i8}$, $p_{i9}$, $p_{i10}$, and $p_{i11}$ separately, and windows corresponding to the points $p_{i1}$, $p_{i2}$, $p_{i3}$, $p_{i4}$, $p_{i5}$, $p_{i6}$, $p_{i7}$, $p_{i8}$, $p_{i9}$, $p_{i10}$, and $p_{i11}$ are $W_{i1}[p_{i1}-169, p_{i1}]$, $W_{i2}[p_{i2}-169, p_{i2}]$, $W_{i3}[p_{i3}-169, p_{i3}]$, $W_{i4}[p_{i4}-169, p_{i4}]$, $W_{i5}[p_{i5}-169, p_{i5}]$, $W_{i6}[p_{i6}-169, p_{i6}]$, $W_{i7}[p_{i7}-169, p_{i7}]$, $W_{i8}[p_{i8}-169, p_{i8}]$, $W_{i9}[p_{i9}-169, p_{i9}]$, $W_{i10}[p_{i10}-169, p_{i10}]$, and $W_{i11}[p_{i11}-169, p_{i11}]$ respectively. A distance between $p_{ix}$ and the potential dividing point $k_i$ is $d_x$ bytes. Specifically, a distance between $p_{i1}$ and $k_i$ is 3 bytes, a distance between $p_{i2}$ and $k_i$ is 2 bytes, a distance between $p_{i3}$ and $k_i$ is 1 byte, a distance between $p_{i4}$ and $k_i$ is 0 byte, a distance between $p_{i5}$ and $k_i$ is 1 byte, a distance between $p_{i6}$ and $k_i$ is 2 bytes, a distance between $p_{i7}$ and $k_i$ is 3 bytes, a distance between $p_{i8}$ and $k_i$ is 4 bytes, a distance between $p_{i9}$ and $k_i$ is 5 bytes, a distance between $p_{i10}$ and $k_i$ is 6 bytes, a distance between $p_{i11}$ and $k_i$ is 7 bytes, all $p_{i5}$, $p_{i6}$, $p_{i7}$, $p_{i8}$, $p_{i9}$, $p_{i10}$, and $p_{i11}$ are, relative to the potential dividing point $k_i$, in a direction opposite to the direction of searching for a data stream dividing point, and all $p_{i1}$, $p_{i2}$, and $p_{i3}$ are, relative to the potential dividing point k in the direction of searching for a data stream dividing point. It is determined whether at least a part of data in $W_{i1}[p_{i1}-169, p_{i1}]$ meets a preset condition $C_1$, it is determined whether at least a part of data in $W_{i2}[p_{i2}-169, p_{i2}]$ meets a preset condition $C_2$, it is determined whether at least a part of data in $W_{i3}[p_{i3}-169, p_{i3}]$ meets a preset condition $C_3$, it is determined whether at least a part of data in $W_{i4}[p_{i4}-169, p_{i4}]$ meets a preset condition $C_4$, it is determined whether at least a part of data in $W_{i5}[p_{i5}-169, p_{i5}]$ meets a preset condition $C_5$, it is determined whether at least a part of data in $W_{i6}[p_{i6}-169, p_{i6}]$ meets a preset condition $C_6$, it is determined whether at least a part of data in $W_{i7}[p_{i7}-169, p_{i7}]$ meets a preset condition $C_7$, it is determined whether at least a part of data in $W_{i8}[p_{i8}-169, p_{i8}]$ meets a preset condition $C_8$, it is determined whether at least a part of data in $W_{i9}[p_{i9}-169, p_{i9}]$ meets a preset condition $C_9$, it is determined whether at least a part of data in $W_{i10}[p_{i10}-169, p_{i10}]$ meets a preset condition $C_{10}$, and it is determined whether at least a part of data in $W_{i11}[p_{i11}-169, p_{i11}]$ meets a preset condition $C_{11}$. When it is determined that the at least a part of data in the window $W_{i1}$ meets the preset condition $C_1$, the at least a part of data in the window $W_{i2}$ meets the preset condition $C_2$, the at least a part of data in the window $W_{i3}$ meets the preset condition $C_3$, the at least a part of data in the window $W_{i4}$ meets the preset condition $C_4$, the at least a part of data in the window $W_{i5}$ meets the preset condition $C_5$, the at least a part of data in the window $W_{i6}$ meets the preset condition $C_6$, the at least a part of data in the window $W_{i7}$ meets the preset condition $C_7$, the at least a part of data in the window $W_{i8}$ meets the preset condition $C_8$, the at least a part of data in the window $W_{i9}$ meets the preset condition $C_9$, the at least a part of data in the window $W_{i10}$ meets the preset condition $C_{10}$, and the at least a part of data in the window $W_{i11}$ meets the preset condition $C_{11}$, the current potential dividing point $k_i$ is a data stream dividing point. When the at least a part of data in any window of the 11 windows does not meet the corresponding preset condition, for example, as shown in FIG. 10, at least a part of data in $W_{i7}[p_{i7}-169, p_{i7}]$ does not meet a corresponding preset condition, N bytes are skipped from the point $p_{i7}$ along the direction of searching for a data stream dividing point, where the N bytes are not greater than $\|B_4\|+\max_x (\|A_x\|+\|(k_i-p_{ix})\|)$. In an implementation manner shown in FIG. 10, N bytes that are skipped are specifically not greater than 179 bytes, and in this embodiment, specifically, N=8, so as to obtain a new potential dividing point. For differentiation from the potential dividing point $k_i$, the new potential dividing point is represented as $k_j$ here. According to the rule preset on the deduplication server 103 in the implementation manner shown in FIG. 9, 11 points are determined for the potential dividing point $k_j$, and are $p_{j1}$, $p_{j2}$, $p_{j3}$, $p_{j4}$, $p_{j5}$, $p_{j6}$, $p_{j7}$, $p_{j8}$, $p_{j9}$, $p_{j10}$, and $p_{j11}$ separately, and windows corresponding to the points $p_{j1}$, $p_{j2}$, $p_{j3}$, $p_{j4}$, $p_{j5}$, $p_{j6}$, $p_{j7}$, $p_{j8}$, $p_{j9}$, $p_{j10}$, and $p_{j11}$ are determined, and are $W_{j1}[p_{j1}-169, p_{j1}]$, $W_{j2}[p_{j2}-169, p_{j2}]$, $W_{j3}[p_{j3}-169, p_{j3}]$, $W_{j4}[p_{j4}-169, p_{j4}]$, $W_{j5}[p_{j5}-169, p_{j5}]$, $W_{j6}[p_{j6}-169, p_{j6}]$, $W_{j7}[p_{j7}-169, p_{j7}]$, $W_{j8}[p_{j8}-169, p_{j8}]$, $W_{j9}[p_{j9}-169, p_{j9}]$, $W_{j10}[p_{j10}-169, p_{j10}]$, and $W_{j11}[p_{j11}-169, p_{j11}]$ respectively. A distance between $p_{jx}$ and the potential dividing point $k_j$ is $d_x$ bytes. Specifically, a distance between $p_{j1}$ and $k_j$ is 3 bytes, a distance between $p_{j2}$ and $k_j$ is 2 bytes, a distance between $p_{j3}$ and $k_j$ is 1 byte, a distance between $p_{j4}$ and $k_j$ is 0 byte, a distance between $p_{j5}$ and $k_j$ is 1 byte, a distance between $p_{j6}$ and $k_j$ is 2 bytes, a distance between $p_{j7}$ and $k_j$ is 3 bytes, a distance between $p_{j8}$ and $k_j$ is 4 bytes, a distance between $p_{j9}$ and $k_j$ is 5 bytes, a distance between $p_{j10}$ and $k_j$ is 6 bytes, a distance between $p_{j11}$ and $k_j$ is 7 bytes, all $p_{j5}$, $p_{j6}$, $p_{j7}$, $p_{j8}$, $p_{j9}$, $p_{j10}$, and $p_{j11}$ are, relative to the potential dividing point $k_j$, in a direction opposite to the direction of searching for a data stream dividing point, and all $p_{j1}$, $p_{j2}$, and $p_{j3}$ are, relative to the potential dividing point $k_j$, in the direction of searching for a data stream dividing point. It is determined whether at least a part of data in $W_{j1}[p_{j1}-169, p_{j1}]$ meets the preset condition $C_1$, it is determined whether at least a part of data in $W_{j2}[p_{j2}-169, p_{j2}]$ meets the preset condition $C_2$, it is determined whether at least a part of data in $W_{j3}[p_{j3}-169, p_{j3}]$ meets the preset condition $C_3$, it is determined whether at least a part of data in $W_{j4}[p_{j4}-169, p_{j4}]$ meets the preset condition $C_4$, it is determined whether at least a part of data in $W_{j5}[p_{j5}-169, p_{j5}]$ meets the preset condition $C_5$, it is determined whether at least a part of data in $W_{j6}[p_{j6}-169, p_{j6}]$ meets the preset condition $C_6$, it is determined whether at least a part of data in $W_{j7}[p_{j7}-169, p_{j7}]$ meets the preset condition $C_7$, it is determined whether at least a part of data in $W_{j8}[p_{j8}-169, p_{j8}]$ meets the preset condition $C_8$, it is determined whether at least a part of data in $W_{j9}[p_{j9}-169, p_{j9}]$ meets the preset condition $C_9$, it is determined whether at least a part of data in $W_{j10}[p_{j10}-169, p_{j10})]$ meets the preset condition $C_{10}$, and it is determined whether at least a part of data in $W_{j11}[p_{j11}-169, p_{j11}]$ meets the preset condition $C_{11}$. Certainly, in this embodiment of the present invention, the rule is also followed when it is determined whether the potential dividing point $k_a$ is a data stream dividing point, specific implementation is not described again, and reference may be made to the description of determining the potential dividing point $k_i$. When it is determined that the at least a part of data in the window $W_{j1}$ meets the preset condition $C_1$, the at least a part of data in the window $W_{j2}$ meets the preset condition $C_2$, the at least a part of data in the window $W_{j3}$ meets the preset condition $C_3$, the at least a part of data in the window $W_{j4}$ meets the preset condition $C_4$, the at least a part of data in the window $W_{j5}$ meets the preset condition $C_5$, the at least a part of data in the window $W_{j6}$ meets the preset condition $C_6$, the at least a part of data in the window $W_{j7}$ meets the preset condition $C_7$, the at least a part of data in the window $W_{j8}$ meets the preset condition $C_8$, the at least a part of data in the window $W_{j9}$ meets the preset condition $C_9$, the at least a part of data in the window $W_{j10}$ meets the preset condition $C_{10}$, and the at least a part of data in the window $W_{j11}$ meets the preset condition $C_{11}$, the current potential dividing point $k_j$ is a data stream dividing point, and data between $k_j$ and $k_a$ forms 1 data chunk. Meanwhile, a minimum chunk size of 4 KB is skipped in a manner the same as that of $k_a$ to obtain a next potential dividing point, and it is determined, according to the rule preset on the deduplication server 103, whether the next potential dividing point is a data stream dividing point.

When it is determined that the potential dividing point $k_j$ is not a data stream dividing point, 8 bytes are skipped in a manner the same as that of $k_i$ to obtain a next potential dividing point, and it is determined, according to the rule preset on the deduplication server 103 and the foregoing method, whether the next potential dividing point is a data stream dividing point. When no data stream dividing point is found after a set maximum data chunk is exceeded, an end position of the maximum data chunk serves as a forced dividing point.

Figure 11:
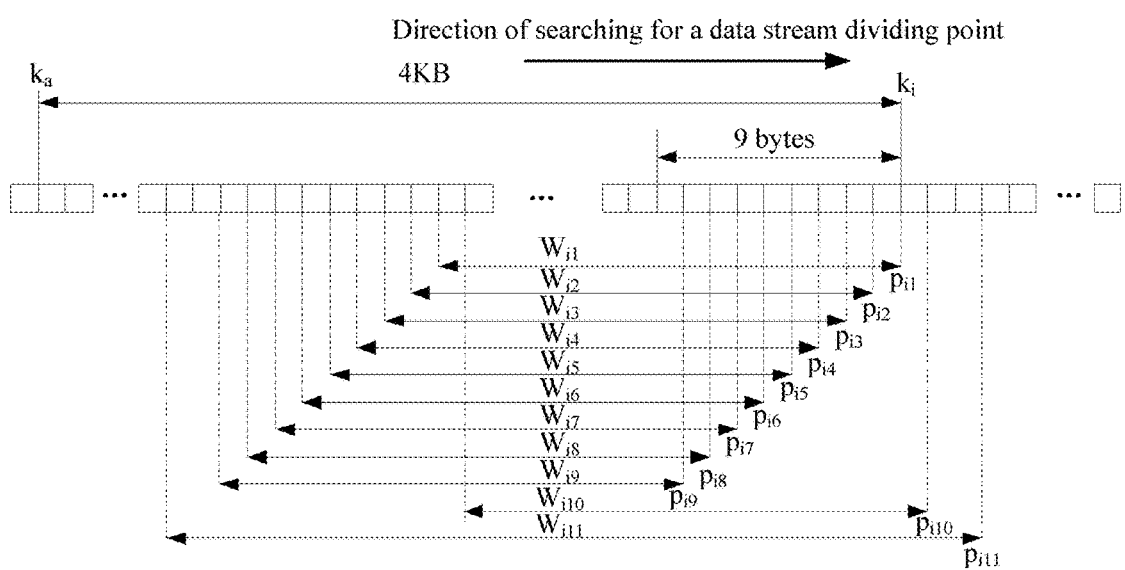
FIG. 11, FIG. 12, and FIG. 13 are schematic diagrams of an implementation manner of searching for a data stream dividing point.
Figure 12:
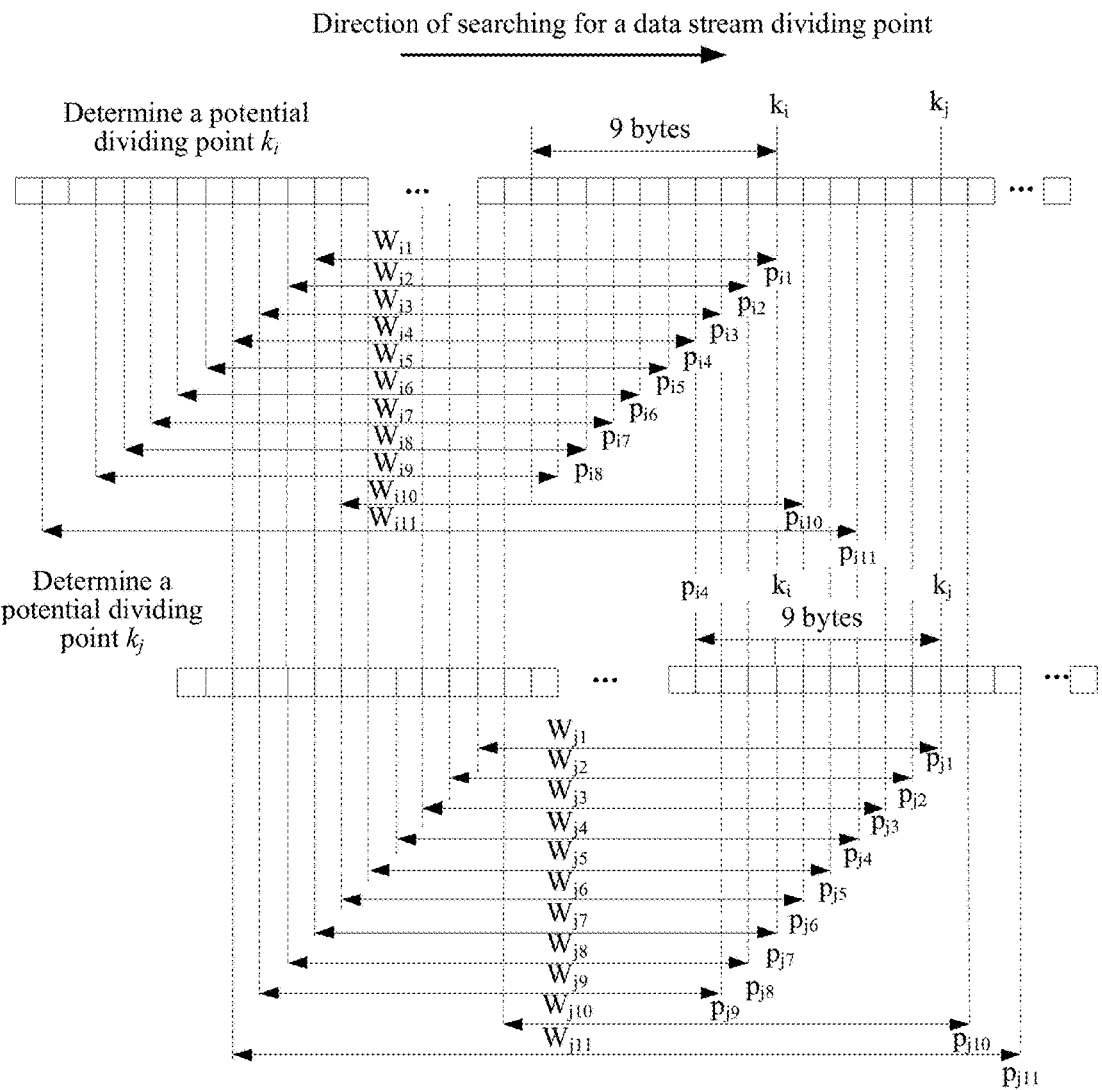

On the basis of the search for a data stream dividing point shown in FIG. 3, in an implementation manner shown in FIG. 11, a rule is preset on a deduplication server 103, where the rule is: for a potential dividing point k, determining 11 points $p_x$, a window $W_x[p_x-A_x, p_x+B_x]$ corresponding to the point $p_x$, and a preset condition $C_x$ corresponding to the window $W_x[p_x-A_x, p_x+B_x]$, where $A_1=A_2=A_3=A_4=A_5=A_6=A_7=A_8=A_9=A_{10}=169$, $A_{11}=182$, $B_1=B_2=B_3=B_4=B_5=B_6=B_7=B_8=B_9=B_{10}=B_{11}=0$, and $C_1=C_2=C_3=C_4=C_5=C_6=C_7=C_8=C_9C_{10}\neq C_{11}$. A distance between $p_x$ and the potential dividing point k is $d_x$ bytes. Specifically, a distance between $p_1$ and the potential dividing point k is 0 byte, a distance between $p_2$ and k is 1 byte, a distance between $p_3$ and k is 2 bytes, a distance between $p_4$ and k is 3 bytes, a distance between $p_5$ and k is 4 bytes, a distance between $p_6$ and k is 5 bytes, a distance between $p_7$ and k is 6 bytes, a distance between $p_8$ and k is 7 bytes, a distance between $p_9$ and k is 8 bytes, a distance between $p_{10}$ and k is 1 byte, a distance between $p_{11}$ and k is 3 bytes, all $p_2$, $p_3$, $p_4$, $p_5$, $p_6$, $p_7$, $p_8$, and $p_9$ are, relative to the potential dividing point k, in a direction opposite to a direction of searching for a data stream dividing point, and both $p_{10}$ and $p_{11}$ are, relative to the potential dividing point k, in the direction of searching for a data stream dividing point. $k_a$ is a data stream dividing point, and the direction of searching for a data stream dividing point shown in FIG. 11 is from left to right. After a minimum data chunk of 4 KB is skipped from the data stream dividing point $k_a$, an end position of the minimum data chunk of 4 KB serves as a next potential dividing point $k_i$, and a point $p_{ix}$ is determined for the potential dividing point $k_i$. In this embodiment, according to the rule preset on the deduplication server 103, x indicates consecutive natural numbers from 1 to 11 separately. In the implementation manner shown in FIG. 11, 11 points are determined for the potential dividing point $k_i$, and are $p_{i1}$, $p_{i2}$, $p_{i3}$, $p_{i4}$, $p_{i5}$, $p_{i6}$, $p_{i7}$, $p_{i8}$, $p_{i9}$, $p_{i10}$, and $p_{i11}$ separately, and windows corresponding to the points $p_{i1}$, $p_{i2}$, $p_{i3}$, $p_{i4}$, $p_{i5}$, $p_{i6}$, $p_{i7}$, $p_{i8}$, $p_{i9}$, $p_{i10}$, and $p_{i11}$ are $W_{i1}[p_{i1}-169, p_{i1}]$, $W_{i2}[p_{i2}-169, p_{i2}]$, $W_{i3}[p_{i3}-169, p_{i3}]$, $W_{i4}[p_{i4}-169, p_{i4}]$, $W_{i5}[p_{i5}-169, p_{i5}]$, $W_{i6}[p_{i6}-169, p_{i6}]$, $W_{i7}[p_{i7}-169, p_{i7}]$, $W_{i8}[p_{i8}-169, p_{i8}]$, $W_{i9}[p_{i9}-169, p_{i9}]$, $W_{i10}[p_{i10}-169, p_{i10}]$, and $W_{i11}[p_{i11}-169, p_{i11}]$ respectively. A distance between $p_{ix}$ and the potential dividing point $k_i$ is $d_x$ bytes. Specifically, a distance between $p_{i1}$ and $k_i$ is 0 byte, a distance between $p_{i2}$ and $k_i$ is 1 byte, a distance between $p_{i3}$ and $k_i$ is 2 bytes, a distance between $p_{i4}$ and $k_i$ is 3 bytes, a distance between $p_{i5}$ and $k_i$ is 4 bytes, a distance between $p_{i6}$ and $k_i$ is 5 bytes, a distance between $p_{i7}$ and $k_i$ is 6 bytes, a distance between $p_{i8}$ and $k_i$ is 7 bytes, a distance between $p_{i9}$ and $k_i$ is 8 bytes, a distance between $p_{i10}$ and $k_i$ is 1 byte, a distance between $p_{i11}$ and $k_i$ is 3 bytes, all $p_{i2}$, $p_{i3}$, $p_{i4}$, $p_{i5}$, $p_{i6}$, $p_{i7}$, $p_{i8}$, and $p_{i9}$ are relative to the potential dividing point $k_i$, in a direction opposite to the direction of searching for a data stream dividing point, and both $p_{i10}$ and $p_{i11}$ are, relative to the potential dividing point $k_i$, in the direction of searching for a data stream dividing point. It is determined whether at least a part of data in the $W_{i1}[p_{i1}-169, p_{i1}]$ meets a preset condition $C_1$, it is determined whether at least a part of data in the $W_{i2}[p_{i2}-169, p_{i2}]$ meets a preset condition $C_2$, it is determined whether at least a part of data in the $W_{i3}[p_{i3}-169, p_{i3}]$ meets a preset condition $C_3$, it is determined whether at least a part of data in the $W_{i4}[p_{i4}-169, p_{i4}]$ meets a preset condition $C_4$, it is determined whether at least a part of data in the $W_{i5}[p_{i5}-169, p_{i5}]$ meets a preset condition $C_5$, it is determined whether at least a part of data in the $W_{i6}[p_{i6}-169, p_{i6}]$ meets a preset condition $C_6$, it is determined whether at least a part of data in the $W_{i7}[p_{i7}-169, p_{i7}]$ meets a preset condition $C_7$, it is determined whether at least a part of data in the $W_{i8}[p_{i8}-169, p_{i8}]$ meets a preset condition $C_8$, it is determined whether at least a part of data in the $W_{i9}[p_{i9}-169, p_{i9}]$ meets a preset condition $C_9$, it is determined whether at least a part of data in the $W_{i10}[p_{i10}-169, p_{i10}]$ meets a preset condition $C_{10}$, and it is determined whether at least a part of data in the $W_{i11}[p_{i11}-169, p_{i11}]$ meets a preset condition $C_{11}$. When it is determined that the at least a part of data in the window $W_{i1}$ meets the preset condition $C_1$, the at least a part of data in the window $W_{i2}$ meets the preset condition $C_2$, the at least a part of data in the window $W_{i3}$ meets the preset condition $C_3$, the at least a part of data in the window $W_{i4}$ meets the preset condition $C_4$, the at least a part of data in the window $W_{i5}$ meets the preset condition $C_5$, the at least a part of data in the window $W_{i6}$ meets the preset condition $C_6$, the at least a part of data in the window $W_{i7}$ meets the preset condition $C_7$, the at least a part of data in the window $W_{i8}$ meets the preset condition $C_8$, the at least a part of data in the window $W_{i9}$ meets the preset condition $C_9$, the at least a part of data in the window $W_{i10}$ meets the preset condition $C_{10}$, and the at least a part of data in the window $W_{i11}$ meets the preset condition $C_{11}$, the current potential dividing point $k_i$ is a data stream dividing point. When it is determined that the at least a part of data in the window $W_{i11}$ does not meet the preset condition $C_{11}$, 1 byte is skipped from the potential dividing point $k_i$ along the direction of searching for a data stream dividing point, so as to obtain a new potential dividing point. For differentiation from the potential dividing point $k_i$, the new potential dividing point is represented as $k_j$ here. When the at least a part of data in any window of the 10 windows $W_{i1}$, $W_{i2}$, $W_{i3}$, $W_{i4}$, $W_{i5}$, $W_{i6}$, $W_{i7}$, $W_{i8}$, $W_{i9}$, and $W_{i10}$ does not meet the corresponding preset condition, for example, $W_{i4}[p_{i4}-169, p_{i4}]$ shown in FIG. 12, N bytes are skipped from the point $p_{i4}$ along the direction of searching for a data stream dividing point, where the N bytes are not greater than $\|B_4\|+\max_x(\|A_x\|+\|(k_i-p_{ix})\|)$. In an implementation manner shown in FIG. 12, the N bytes that are skipped are specifically not greater than 179, and in this embodiment, specifically, N=9, so as to obtain a new potential dividing point. For differentiation from the potential dividing point $k_i$, the new potential dividing point is represented as $k_j$ here. According to the rule preset on the deduplication server 103 in the implementation manner shown in FIG. 11, 11 points are determined for the potential dividing point $k_j$, and are $p_{j1}$, $p_{j2}$, $p_{j3}$, $p_{j4}$, $p_{j5}$, $p_{j6}$, $p_{j7}$, $p_{j8}$, $p_{j9}$, $p_{j10}$, and $p_{j11}$ separately, and windows corresponding to the points $p_{j1}$, $p_{j2}$, $p_{j3}$, $p_{j4}$, $p_{j5}$, $p_{j6}$, $p_{j7}$, $p_{j8}$, $p_{j9}$, $p_{j10}$, and $p_{j11}$ are determined, and are $W_{j1}[p_{j1}-169, p_{j1}]$, $W_{j2}[p_{j2}-169, p_{j2}]$, $W_{j3}[p_{j3}-169, p_{j3}]$, $W_{j4}[p_{j4}-169, p_{j4}]$, $W_{j5}[p_{j5}-169, p_{j5}]$, $W_{j6}[p_{j6}-169, p_{j6}]$, $W_{j7}[p_{j7}-169, p_{j7}]$, $W_{j8}[p_{j8}-169, p_{j8}]$, $W_{j9}[p_{j9}-169, p_{j9}]$, $W_{j10}[p_{j10}-169, p_{j10}]$, and $W_{j11}[p_{j11}-169, p_{j11}]$ respectively. A distance between $p_{jx}$ and the potential dividing point $k_j$ is $d_x$ bytes. Specifically, a distance between p and k is 0 byte, a distance between $p_{j2}$ and $k_j$ is 1 byte, a distance between $p_{j3}$ and $k_j$ is 2 bytes, a distance between $p_{j4}$ and $k_j$ is 3 bytes, a distance between $p_{j5}$ and $k_j$ is 4 bytes, a distance between $p_{j6}$ and k is 5 bytes, a distance between $p_{j7}$ and $k_j$ is 6 bytes, a distance between $p_{j8}$ and $k_j$ is 7 bytes, a distance between $p_{j9}$ and k is 8 bytes, a distance between $p_{j10}$ and k is 1 byte, a distance between $p_{j11}$ and $k_j$ is 3 bytes, all $p_{j2}$, $p_{j3}$, $p_{j4}$, $p_{j5}$, $p_{j6}$, $p_{j7}$, $p_{j8}$, and $p_{j9}$ are, relative to the potential dividing point $k_j$, in a direction opposite to the direction of searching for a data stream dividing point, and both $p_{j10}$ and $p_{j11}$ are, relative to the potential dividing point $k_j$, in the direction of searching for a data stream dividing point. It is determined whether at least a part of data in the $W_{j1}[p_{j1}-169, p_{j1}]$ meets the preset condition $C_1$, it is determined whether at least a part of data in the $W_{j2}[p_{j2}-169, p_{j2}]$ meets the preset condition $C_2$, it is determined whether at least a part of data in the $W_{j3}[p_{j3}-169, p_{j3}]$ meets the preset condition $C_3$, it is determined whether at least a part of data in the $W_{j4}[p_{j4}-169, p_{j4}]$ meets the preset condition $C_4$, it is determined whether at least a part of data in the $W_{j5}[p_{j5}-169, p_{j5}]$ meets the preset condition $C_5$, it is determined whether at least a part of data in the $W_{j6}[p_{j6}-169, p_{j6}]$ meets the preset condition $C_6$, it is determined whether at least a part of data in the $W_{j7}[p_{j7}-169, p_{j7}]$ meets the preset condition $C_7$, it is determined whether at least a part of data in the $W_{j8}[p_{j8}-169, p_{j8}]$ meets the preset condition $C_8$, it is determined whether at least a part of data in the $W_{j9}[p_{j9}-169, p_{j9}]$ meets the preset condition $C_9$, it is determined whether at least a part of data in the $W_{j10}[p_{j10}-169, p_{j10}]$ meets the preset condition $C_{10}$, and it is determined whether at least a part of data in the $W_{j11}[p_{j11}-182, p_{j11}]$ meets the preset condition $C_{11}$. Certainly, in this embodiment of the present invention, the rule is also followed when it is determined whether the potential dividing point $k_a$ is a data stream dividing point, specific implementation is not described again, and reference may be made to the description of determining the potential dividing point $k_i$. When it is determined that the at least a part of data in the window $W_{j1}$ meets the preset condition $C_1$, the at least a part of data in the window $W_{j2}$ meets the preset condition $C_2$, the at least a part of data in the window $W_{j3}$ meets the preset condition $C_3$, the at least a part of data in the window $W_{j4}$ meets the preset condition $C_4$, the at least a part of data in the window $W_{j5}$ meets the preset condition $C_5$, the at least a part of data in the window $W_{j6}$ meets the preset condition $C_6$, the at least a part of data in the window $W_{j7}$ meets the preset condition $C_7$, the at least a part of data in the window $W_{j8}$ meets the preset condition $C_8$, the at least a part of data in the window $W_{j9}$ meets the preset condition $C_9$, the at least a part of data in the window $W_{j10}$ meets the preset condition $C_{10}$, and the at least a part of data in the window $W_{j11}$ meets the preset condition $C_{11}$, the current potential dividing point $k_j$ is a data stream dividing point, and data between $k_j$ and $k_a$ forms 1 data chunk. Meanwhile, a minimum chunk size of 4 KB is skipped in a manner the same as that of $k_a$ to obtain a next potential dividing point, and it is determined, according to the rule preset on the deduplication server 103, whether the next potential dividing point is a data stream dividing point. When it is determined that the potential dividing point $k_j$ is not a data stream dividing point, a next potential dividing point is obtained in a manner the same as that of $k_i$, and it is determined, according to the rule preset on the deduplication server 103 and the foregoing method, whether the next potential dividing point is a data stream dividing point. When no data stream dividing point is found after a set maximum data chunk is exceeded, an end position of the maximum data chunk serves as a forced dividing point.

Figure 13:
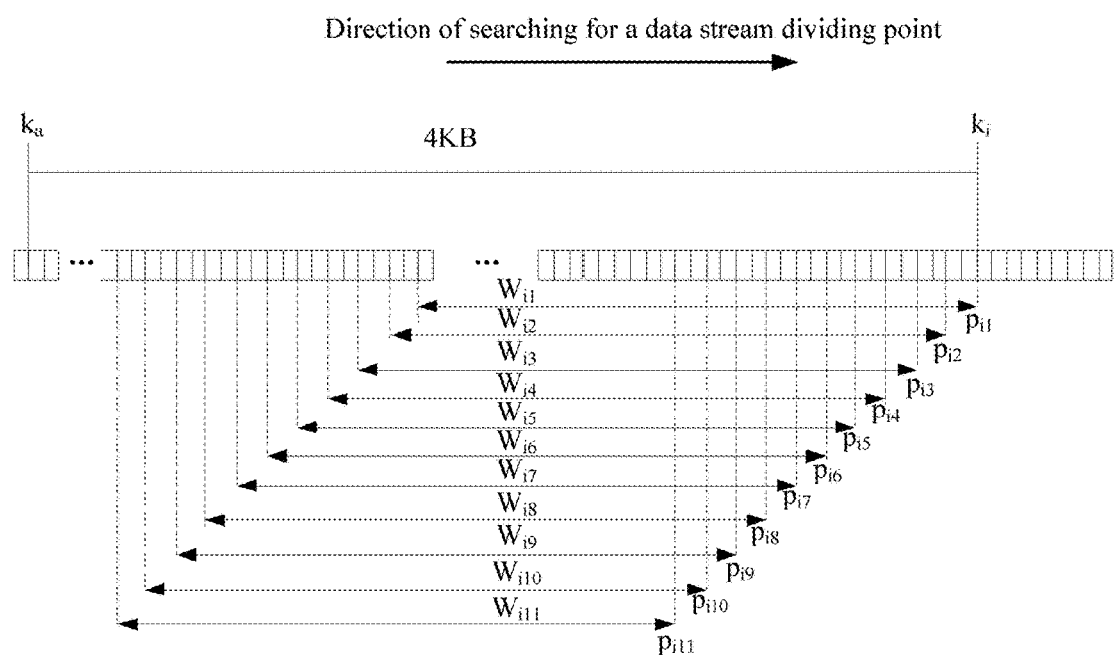
Figure 14:
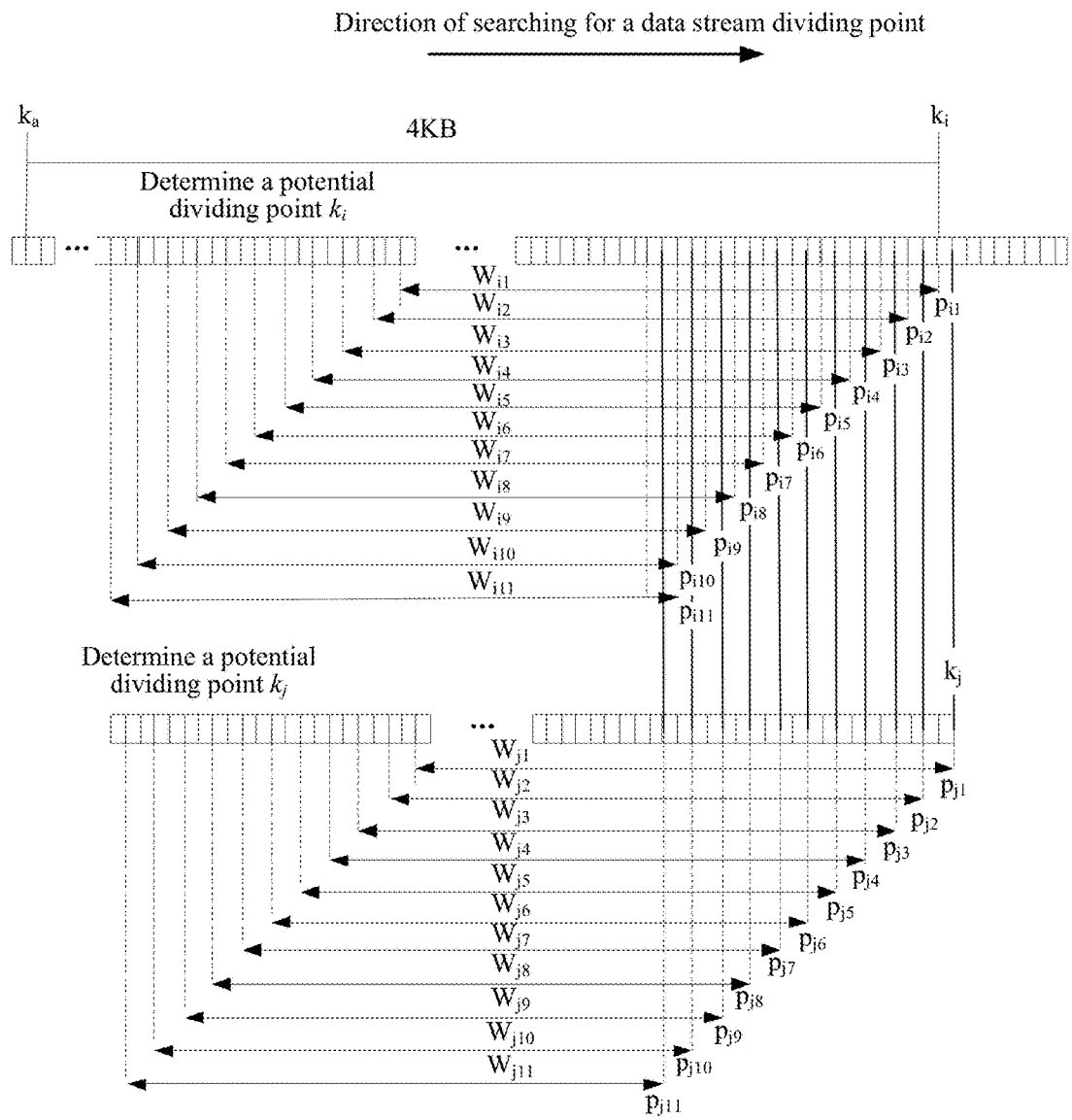
FIG. 14 and FIG. 15 are schematic diagrams of an implementation manner of searching for a data stream dividing point.
Figure 15:
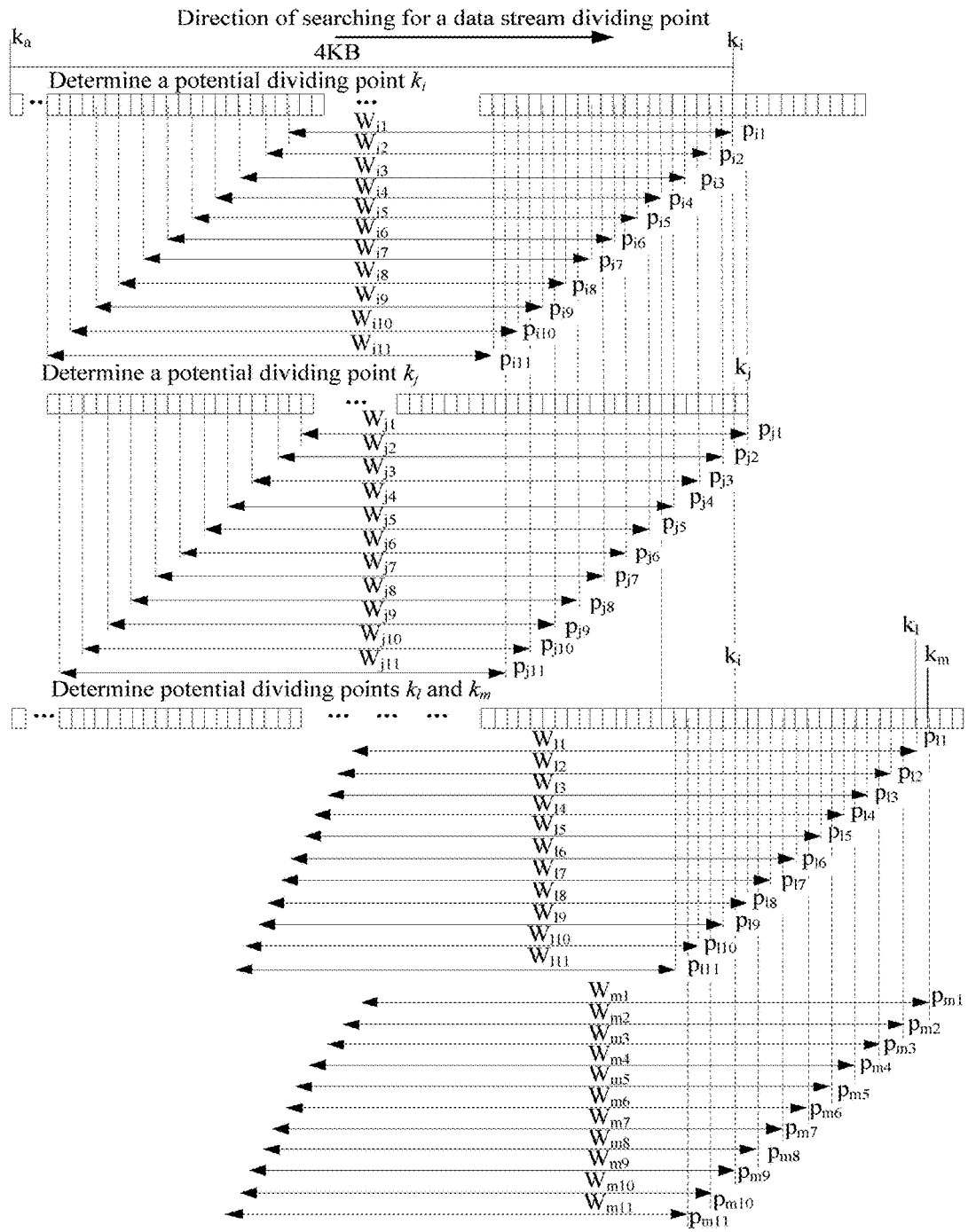

On the basis of the search for a data stream dividing point shown in FIG. 3, in an implementation manner shown in FIG. 13, a rule that is preset on a deduplication server 103 is: for a potential dividing point k, determining 11 points $p_x$, a window $W_x[p_x-A_x, p_x+B_x]$ corresponding to the point $p_x$, and a preset condition $C_x$ corresponding to the window $W_x[p_x-A_x, p_x+B_x]$, where x indicates consecutive natural numbers from 1 to 11 separately, where a probability that at least a part of data in the window $W_x[p_x-A_x, p_x+B_x]$ corresponding to the point $p_x$ meets a preset condition is 1/2, $A_1=A_2=A_3=A_4=A_5=A_6=A_7=A_8=A_9=A_{10}=A_{11}=169$, $B_1=B_2=B_3=B_4=B_5=B_6=B_7=B_8=B_9=B_{10}=B_{11}=0$, and $C_1=C_2=C_3=C_4=C_5=C_6=C_7=C_8=C_9=C_{10}=C_{11}$ where a distance between $p_x$ and the potential dividing point k is $d_x$ bytes. Specifically, a distance between $p_1$ and the potential dividing point k is 0 byte, a distance between $p_2$ and k is 2 bytes, a distance between $p_3$ and k is 4 bytes, a distance between $p_4$ and k is 6 bytes, a distance between $p_5$ and k is 8 bytes, a distance between $p_6$ and k is 10 bytes, a distance between $p_7$ and k is 12 bytes, a distance between $p_8$ and k is 14 bytes, a distance between $p_9$ and k is 16 bytes, a distance between $p_{10}$ and k is 18 bytes, a distance between $p_{11}$ and k is 20 bytes, and relative to the potential dividing point k, all $p_2$, $p_3$, $p_4$, $p_5$, $p_6$ $p_7$, $p_8$, $p_9$, $p_{10}$, and $p_{11}$ are in a direction opposite to a direction of searching for a data stream dividing point. $k_a$ is a data stream dividing point, and the direction of searching for a data stream dividing point shown in FIG. 13 is from left to right. After a minimum data chunk of 4 KB is skipped from the data stream dividing point $k_a$, an end position of the minimum data chunk of 4 KB serves as a next potential dividing point $k_i$, and a point $p_{ix}$ is determined for the potential dividing point $k_i$. In this embodiment, according to the rule preset on the deduplication server 103, x indicates consecutive natural numbers from 1 to 11 separately. In the implementation manner shown in FIG. 13, according to the preset rule, 11 points are determined for the potential dividing point $k_i$, and are $p_{i1}$, $p_{i2}$, $p_{i3}$, $p_{i4}$, $p_{i5}$, $p_{i6}$, $p_{i7}$, $p_{i8}$, $p_{i9}$, $p_{i10}$, and $p_{i11}$ separately, and windows corresponding to the points $p_{i1}$, $p_{i2}$, $p_{i3}$, $p_{i4}$, $p_{i5}$, $p_{i6}$, $p_{i7}$, $p_{i8}$, $p_{i9}$, $p_{i10}$, and $p_{i11}$ are $W_{i1}[p_{i1}-169, p_{i1}]$, $W_{i2}[p_{i2}-169, p_{i2}]$, $W_{i3}[p_{i3}-169, p_{i3}]$, $W_{i4}[p_{i4}-169, p_{i4}]$, $W_{i5}[p_{i5}-169, p_{i5}]$, $W_{i6}[p_{i6}-169, p_{i6}]$, $W_{i7}[p_{i7}-169, p_{i7}]$, $W_{i8}[p_{i8}-169, p_{i8}]$, $W_{i9}[p_{i9}-169, p_{i9}]$, $W_{i10}[p_{i10}-169, p_{i10}]$, and $W_{i11}[p_{i11}-169, p_{i11}]$ respectively. A distance between $p_{ix}$ and the potential dividing point $k_i$ is $d_x$ bytes. Specifically, a distance between $p_{i1}$ and $k_i$ is 0 byte, a distance between $p_{i2}$ and $k_i$ is 2 bytes, a distance between $p_{i3}$ and $k_i$ is 4 bytes, a distance between $p_{i4}$ and $k_i$ is 6 bytes, a distance between $p_{i5}$ and $k_i$ is 8 bytes, a distance between $p_{i6}$ and $k_i$ is 10 bytes, a distance between $p_{i7}$ and $k_i$ is 12 bytes, a distance between $p_{i8}$ and $k_i$ is 14 bytes, a distance between $p_{i9}$ and $k_i$ is 16 bytes, a distance between $p_{i10}$ and $k_i$ is 18 bytes, a distance between $p_{i11}$ and $k_i$ is 20 bytes, and relative to the potential dividing point $k_i$, all $p_{i2}$, $p_{i3}$, $p_{i4}$, $p_{i5}$, $p_{i6}$, $p_{i7}$, $p_{i8}$, $p_{i9}$, $p_{i10}$, and $p_{i11}$ are in a direction opposite to the direction of searching for a data stream dividing point. It is determined whether at least a part of data in $W_{i1}[p_{i1}-169, p_{i1}]$ meets a preset condition $C_1$, it is determined whether at least a part of data in $W_{i2}[p_{i2}-169, p_{i2}]$ meets a preset condition $C_2$, it is determined whether at least a part of data in $W_{i3}[p_{i3}-169, p_{i3}]$ meets a preset condition $C_3$, it is determined whether at least a part of data in $W_{i4}[p_{i4}-169, p_{i4}]$ meets a preset condition $C_4$, it is determined whether at least a part of data in $W_{i5}[p_{i5}-169, p_{i5}]$ meets a preset condition $C_5$, it is determined whether at least a part of data in $W_{i6}[p_{i6}-169, p_{i6}]$ meets a preset condition $C_6$, it is determined whether at least a part of data in $W_{i7}[p_{i7}-169, p_{i7}]$ meets a preset condition $C_7$, it is determined whether at least a part of data in $W_{i8}[p_{i8}-169, p_{i8}]$ meets a preset condition $C_8$, it is determined whether at least a part of data in $W_{i9}[p_{i9}-169, p_{i9}]$ meets a preset condition $C_9$, it is determined whether at least a part of data in $W_{i10}[p_{i10}-169, p_{i10}]$ meets a preset condition $C_{10}$, and it is determined whether at least a part of data in $W_{i11}[p_{i11}-169, p_{i11}]$ meets a preset condition $C_{11}$. When it is determined that the at least a part of data in the window $W_{i1}$ meets the preset condition $C_1$, the at least a part of data in the window W meets the preset condition $C_2$, the at least a part of data in the window $W_{i3}$ meets the preset condition $C_3$, the at least a part of data in the window $W_{i4}$ meets the preset condition $C_4$, the at least a part of data in the window $W_{i5}$ meets the preset condition $C_5$, the at least a part of data in the window $W_{i6}$ meets the preset condition $C_6$, the at least a part of data in the window $W_{i7}$ meets the preset condition $C_7$, the at least a part of data in the window $W_{i8}$ meets the preset condition $C_8$, the at least a part of data in the window $W_{i9}$ meets the preset condition $C_9$, the at least a part of data in the window $W_{i10}$ meets the preset condition $C_{10}$, and the at least a part of data in the window $W_{i11}$ meets the preset condition $C_{11}$, the current potential dividing point $k_i$ is a data stream dividing point. When the at least a part of data in any window of the 11 windows does not meet the corresponding preset condition, for example, as shown in FIG. 14, the at least a part of data in $W_{i4}[p_{i4}-169, p_{i4}]$ does not meet the preset condition $C_4$, a next potential dividing point is selected. For differentiation from the potential dividing point $k_i$, the next potential dividing point is represented as $k_j$ here, where $k_j$ is located on the right of $k_i$, and a distance between $k_j$ and $k_i$ is 1 byte. As shown in FIG. 14, according to the rule preset on the deduplication server 103, 11 points are determined for the potential dividing point $k_j$, and are $p_{j1}$, $p_{j2}$, $p_{j3}$, $p_{j4}$, $p_{j5}$, $p_{j6}$, $p_{j7}$, $p_{j8}$, $p_{j9}$, $p_{j10}$, and $p_{j11}$ separately, and windows corresponding to the points $p_{j1}$, $p_{j2}$, $p_{j3}$, $p_{j4}$, $p_{j5}$, $p_{j6}$, $p_{j7}$, $p_{j8}$, $p_{j9}$, $p_{j10}$, and $p_{j11}$ are determined, and are $W_{j1}[p_{j1}-169, p_{j1}]$, $W_{j2}[p_{j2}-169, p_{j2}]$, $W_{j3}[p_{j3}-169, p_{j3}]$, $W_{j4}[p_{j4}-169, p_{j4}]$, $W_{j5}[p_{j5}-169, p_{j5}]$, $W_{j6}[p_{j6}-169, p_{j6}]$, $W_{j7}[p_{j7}-169, p_{j7}]$, $W_{j8}[p_{j8}-169, p_{j8}]$, $W_{j9}[p_{j9}-169, p_{j9}]$, $W_{j10}[p_{j10}-169, p_{j10}]$, and $W_{j11}[p_{j11}-169, p_{j11}]$ respectively, where $A_1=A_2=A_3=A_4=A_5=A_6=A_7=A_8=A_9=A_{10}=A_{11}=169$, $B_1=B_2=B_3=B_4=B_5=B_6=B_7=B_8=B_9=B_{10}=B_{11}=0$, and $C_1=C_2=C_3=C_4=C_5=C_6=C_7=C_8=C_9=C_{10}=C_{11}$. A distance between $p_{jx}$ and the potential dividing point $k_j$ is $d_x$ bytes. Specifically, a distance between $p_{j1}$ and $k_j$ is 0 byte, a distance between $p_{j2}$ and $k_j$ is 2 bytes, a distance between $p_{j3}$ and $k_j$ is 4 bytes, a distance between $p_{j4}$ and k is 6 bytes, a distance between $p_{j5}$ and $k_j$ is 8 bytes, a distance between $p_{j6}$ and $k_j$ is 10 bytes, a distance between $p_{j7}$ and $k_j$ is 12 bytes, a distance between $p_{j8}$ and $k_j$ is 14 bytes, a distance between $p_{j9}$ and $k_j$ is 16 bytes, a distance between $p_{j10}$ and $k_j$ is 18 bytes, a distance between $p_{j11}$ and $k_j$ is 20 bytes, and relative to the potential dividing point $k_j$, all $p_{j2}$, $p_{j3}$, $p_{j4}$, $p_{j5}$, $p_{j6}$, $p_{j7}$, $p_{j8}$, $p_{j9}$, $p_{j10}$, and $p_{j11}$ are in a direction opposite to the direction of searching for a data stream dividing point. It is determined whether at least a part of data in $W_{j1}[p_{j1}-169, p_{j1}]$ meets the preset condition $C_1$, it is determined whether at least a part of data in $W_{j2}[p_{j2}-169, p_{j2}]$ meets the preset condition $C_2$, it is determined whether at least a part of data in $W_{j3}[p_{j3}-169, p_{j3}]$ meets the preset condition $C_3$, it is determined whether at least a part of data in $W_{j4}[p_{j4}-169, p_{j4}]$ meets the preset condition $C_4$, it is determined whether at least a part of data in $W_{j5}[p_{j5}-169, p_{j5}]$ meets the preset condition $C_5$, it is determined whether at least a part of data in $W_{j6}[p_{j6}-169, p_{j6}]$ meets the preset condition $C_6$, it is determined whether at least a part of data in $W_{j7}[p_{j7}-169, p_{j7}]$ meets the preset condition $C_7$, it is determined whether at least a part of data in $W_{j8}[p_{j8}-169, p_{j8}]$ meets the preset condition $C_8$, it is determined whether at least a part of data in $W_{j9}[p_{j9}-169, p_{j9}]$ meets the preset condition $C_9$, it is determined whether at least a part of data in $W_{j10}[p_{j10}-169,$ $p_{j10}$] meets the preset condition $C_{10}$, and it is determined whether at least a part of data in $W_{j11}[p_{j11}-169, p_{j11}]$ meets the preset condition $C_{11}$. When it is determined that the at least a part of data in the window $W_{j1}$ meets the preset condition $C_1$, the at least a part of data in the window $W_{j2}$ meets the preset condition $C_2$, the at least a part of data in the window $W_{j3}$ meets the preset condition $C_3$, the at least a part of data in the window $W_{j4}$ meets the preset condition $C_4$, the at least a part of data in the window $W_{j5}$ meets the preset condition $C_5$, the at least a part of data in the window $W_{j6}$ meets the preset condition $C_6$, the at least a part of data in the window $W_{j7}$ meets the preset condition $C_7$, the at least a part of data in the window $W_{j8}$ meets the preset condition $C_8$, the at least a part of data in the window $W_{j9}$ meets the preset condition $C_9$, the at least a part of data in the window $W_{j10}$ meets the preset condition $C_{10}$, and the at least a part of data in the window $W_{j11}$ meets the preset condition $C_{11}$, the current potential dividing point $k_j$ is a data stream dividing point. When it is determined that the at least a part of data in any window of the windows $W_{j1}$, $W_{j2}$, $W_{j3}$, $W_{j4}$, $W_{j5}$, $W_{j6}$, $W_{j7}$, $W_{j8}$, $W_{j9}$, $W_{j10}$, and $W_{j11}$ does not meet the preset condition, for example, as shown in FIG. 15, when the at least a part of data in $W_{j3}[p_{j3}-169, p_{j3}]$ does not meet the preset condition $C_3$, the point $p_{i4}$ is located on the left of the point $p_{j3}$ relative to the direction of searching for a data stream dividing point, and 21 bytes are skipped from the point $p_{i4}$ along the direction of searching for a data stream dividing point, so as to obtain a next potential dividing point. For differentiation from the potential dividing points $k_i$ and $k_j$, the next potential dividing point is represented as $k_l$. According to the rule preset on the deduplication server 103 in the implementation manner shown in FIG. 13, 11 points are determined for the potential dividing point $k_l$, and are $p_{l1}$, $p_{l2}$, $p_{l3}$, $p_{l4}$, $p_{l5}$, $p_{l6}$, $p_{l7}$, $p_{l8}$ $p_{l9}$, $p_{l10}$, and $p_{l11}$ separately, windows corresponding to the points $p_{l1}$, $p_{l2}$, $p_{l3}$, $p_{l4}$, $p_{l5}$, $p_{l6}$, $p_{l7}$, $p_{l8}$, $p_{l9}$, $p_{l10}$, and $p_{l11}$ are $W_{l1}[p_{l1}-169, p_{l1}]$, $W_{l2}[p_{l2}-169, p_{l2}]$, $W_{l3}[p_{l3}-169, p_{l3}]$, $W_{l4}[p_{l4}-169, p_{l4}]$, $W_{l5}[p_{l5}-169, p_{l5}]$, $W_{l6}[p_{l6}-169, p_{l6}]$, $W_{l7}[p_{l7}-169, p_{l7}]$, $W_{l8}[p_{l8}-169, p_{l8}]$, $W_{l9}[p_{l9}-169, p_{l9}]$, $W_{l10}[p_{l10}-169, p_{l10}]$, and $W_{l11}[p_{l11}-169, p_{l11}]$ respectively, where a distance between $p_{lx}$ and the potential dividing point $k_l$ is $d_x$ bytes. Specifically, a distance between p and the potential dividing point $k_l$ is 0 byte, a distance between $p_{l2}$ and $k_l$ is 2 bytes, a distance between $p_{l3}$ and $k_l$ is 4 bytes, a distance between $p_{l4}$ and $k_l$ is 6 bytes, a distance between $p_{l5}$ and $k_l$ is 8 bytes, a distance between $p_{l6}$ and $k_l$ is 10 bytes, a distance between $p_{l7}$ and $k_l$ 12 bytes, a distance between $p_{l8}$ and $k_l$ is 14 bytes, a distance between $p_{l9}$ and $k_l$ is 16 bytes, a distance between $p_{l10}$ and $k_l$ is 18 bytes, a distance between $p_{l11}$ and $k_l$ is 20 bytes, and relative to the potential dividing point $k_l$, all $p_{l2}$, $p_{l3}$, $p_{l4}$, $p_{l5}$, $p_{l6}$, $p_{l7}$, $p_{l8}$, $p_{l9}$, $p_{l10}$, and $p_{l11}$ are in a direction opposite to the direction of searching for a data stream dividing point. It is determined whether at least a part of data in $W_{l1}[p_{l1}-169, p_{l1}]$ meets the preset condition $C_1$, it is determined whether at least a part of data in $W_{l2}[p_{l1}-169, p_{l2}]$ meets the preset condition $C_2$, it is determined whether at least a part of data in $W_{l3}[p_{l3}-169, p_{l3}]$ meets the preset condition $C_3$, it is determined whether at least a part of data in $W_{l4}[p_{l4}-169, p_{l4}]$ meets the preset condition $C_4$, it is determined whether at least a part of data in $W_{l5}[p_{l5}-169, p_{l5}]$ meets the preset condition $C_5$, it is determined whether at least a part of data in $W_{l6}[p_{l6}-169, p_{l6}]$ meets the preset condition $C_6$, it is determined whether at least a part of data in $W_{l7}[p_{l7}-169, p_{l7}]$ meets the preset condition $C_7$, it is determined whether at least a part of data in $W_{l8}[p_{l8}-169, p_{l8}]$ meets the preset condition $C_8$, it is determined whether at least a part of data in $W_{l9}[p_{l9}-169, p_{l9}]$ meets the preset condition $C_9$, it is determined whether at least a part of data in $W_{l10}[p_{l10}-169, p_{l10}]$ meets the preset condition $C_{10}$, and it is determined whether at least a part of data in $W_{l11}[p_{l11}-169, p_{l11}]$ meets the preset condition $C_{11}$. When it is determined that the at least a part of data in the window $W_{l1}$ meets the preset condition $C_1$, the at least a part of data in the window $W_{l2}$ meets the preset condition $C_2$, the at least a part of data in the window $W_{l3}$ meets the preset condition $C_3$, the at least a part of data in the window $W_{l4}$ meets the preset condition $C_4$, the at least a part of data in the window $W_{l5}$ meets the preset condition $C_5$, the at least a part of data in the window $W_{l6}$ meets the preset condition $C_6$, the at least a part of data in the window $W_{l7}$ meets the preset condition $C_7$, the at least a part of data in the window $W_{l8}$ meets the preset condition $C_8$, the at least a part of data in the window $W_{l9}$ meets the preset condition $C_9$, the at least a part of data in the window $W_{l10}$ meets the preset condition $C_{10}$, and the at least a part of data in the window $W_{l11}$ meets the preset condition $C_{11}$, the current potential dividing point $k_l$ is a data stream dividing point. When the at least a part of data in any window of the windows $W_{l1}$, $W_{l2}$, $W_{l3}$, $W_{l4}$ $W_{l5}$, $W_{l6}$, $W_{l7}$, $W_{l8}$, $W_{l9}$, $W_{l10}$, and $W_{l11}$ does not meet the preset condition, a next potential dividing point is selected. For differentiation from the potential dividing points $k_i$, $k_j$, and $k_l$, the next potential dividing point is represented as $k_m$, where $k_m$ is located on the right of $k_l$, and a distance between $k_m$ and $k_l$ is 1 byte. According to the rule preset on the deduplication server 103 in the embodiment shown in FIG. 13, 11 points are determined for the potential dividing point $k_m$, and are $p_{m1}$, $p_{m2}$, $p_{m3}$, $p_{m4}$ $p_{m5}$, $p_{m6}$, $p_{m7}$, $p_{m8}$, $p_{m9}$, $p_{m10}$, and $p_{m11}$ separately, and windows corresponding to the points $p_{m1}$, $p_{m2}$, $p_{m3}$, $p_{m4}$ $p_{m5}$, $p_{m6}$, $p_{m7}$, $p_{m8}$, $p_{m9}$, $p_{m10}$, and $p_{m11}$ are $W_{m1}[p_{m1}-169, p_{m1}]$, $W_{m2}[p_{m2}-169, p_{m2}]$, $W_{m3}[p_{m3}-169, p_{m3}]$, $W_{m4}[p_{m4}-169, p_{m4}]$, $W_{m5}[p_{m5}-169, p_{m5}]$, $W_{m6}[p_{m6}-169, p_{m6}]$, $W_{m7}[p_{m7}-169, p_{m7}]$, $W_{m8}[p_{m8}-169, p_{m8}]$, $W_{m9}[p_{m9}-169, p_{m9}]$, $W_{m10}[p_{m10}-169, p_{m10}]$, and $W_{m11}[p_{m11}-169, p_{m11}]$ respectively, where a distance between $p_{mx}$ and the potential dividing point $k_m$ is $d_x$ bytes. Specifically, a distance between $p_{m1}$ and the potential dividing point $k_m$ is 0 byte, a distance between $p_{m2}$ and $k_m$ is 2 bytes, a distance between $p_{m3}$ and $k_m$ is 4 bytes, a distance between $p_{m4}$ and $k_m$ is 6 bytes, a distance between $p_{m5}$ and $k_m$ is 8 bytes, a distance between $p_{m6}$ and $k_m$ is 10 bytes, a distance between $p_{m7}$ and $k_m$ is 12 bytes, a distance between $p_{m8}$ and $k_m$ 14 bytes, a distance between $p_{m9}$ and $k_m$ is 16 bytes, a distance between $p_{m10}$ and $k_m$ is 18 bytes, a distance between $p_{m11}$ and $k_m$ is 20 bytes, and relative to the potential dividing point $k_m$, all $p_{m2}$, $p_{m3}$, $p_{m4}$, $p_{m5}$, $p_{m6}$, $p_{m7}$, $p_{m8}$, $p_{m9}$, $p_{m10}$, and $p_{m11}$ are in a direction opposite to the direction of searching for a data stream dividing point. It is determined whether at least a part of data in $W_{m1}[p_{m1}-169, p_{m2}]$ meets the preset condition $C_1$, it is determined whether at least a part of data in $W_{m2}[p_{m2}-169, p_{m2}]$ meets the preset condition $C_2$, it is determined whether at least a part of data in $W_{m3}[p_{m3}-169, p_{m3}]$ meets the preset condition $C_3$, it is determined whether at least a part of data in $W_{m4}[p_{m4}-169, p_{m4}]$ meets the preset condition $C_4$, it is determined whether at least a part of data in $W_{m5}[p_{m5}-169, p_{m5}]$ meets the preset condition $C_5$, it is determined whether at least a part of data in $W_{m6}[p_{m6}-169, p_{m6}]$ meets the preset condition $C_6$, it is determined whether at least a part of data in $W_{m7}[p_{m7}-169, p_{m7}]$ meets the preset condition $C_7$, it is determined whether at least a part of data in $W_{m8}[p_{m8}-169, p_{m8}]$ meets the preset condition $C_8$, it is determined whether at least a part of data in $W_{m9}[p_{m9}-169, p_{m9}]$ meets the preset condition $C_9$, it is determined whether at least a part of data in $W_{m10}[p_{m10}-169, p_{m10}]$ meets the preset condition $C_{10}$, and it is determined whether at least a part of data in $W_{m11}[p_{m11}-169, p_{m11}]$ meets the preset condition $C_{11}$. When it is determined that the at least a part of data in the window $W_{m1}$ meets the preset condition $C_1$, the at least a part of data in the window $W_{m2}$ meets the preset condition $C_2$, the at least a part of data in the window $W_{m3}$ meets the preset condition $C_3$, the at least a part of data in the window $W_{m4}$ meets the preset condition $C_4$, the at least a part of data in the window $W_{m5}$ meets the preset condition $C_5$, the at least a part of data in the window $W_{m6}$ meets the preset condition $C_6$, the at least a part of data in the window $W_{m7}$ meets the preset condition $C_7$, the at least a part of data in the window $W_{m8}$ meets the preset condition $C_8$, the at least a part of data in the window $W_{m9}$ meets the preset condition $C_9$, the at least a part of data in the window $W_{m10}$ meets the preset condition $C_{10}$, and the at least a part of data in the window $W_{m10}$ meets the preset condition $C_{11}$, the current potential dividing point $k_m$ is a data stream dividing point. When the at least a part of data in any window does not meet the preset condition, skipping is executed according to the solution described above, so as to obtain a next potential dividing point, and it is determine whether the next potential dividing point is a data stream dividing point.

Figure 16:
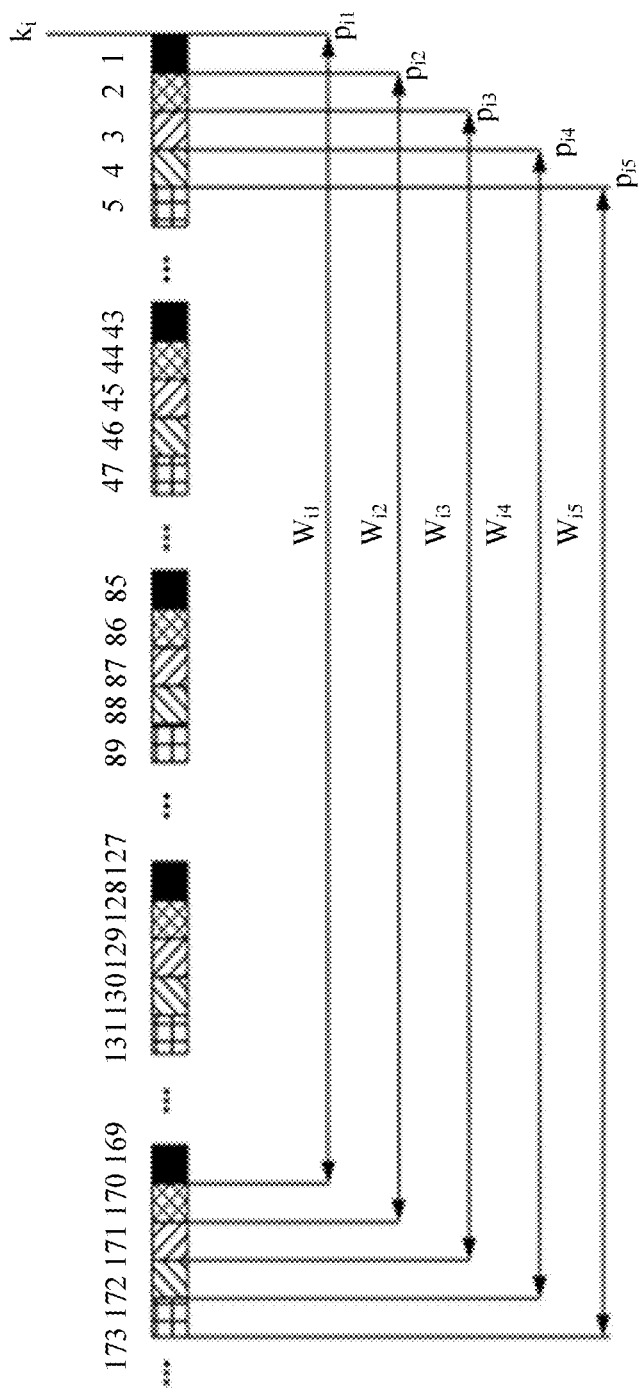
FIG. 16 and FIG. 17 are schematic diagrams of determining whether at least a part of data in a window meets a preset condition.

An embodiment of the present invention provides a method for determining whether at least a part of data in a window $W_{iz}[p_{iz}-A_z, p_{iz}+B_z]$ meets a preset condition $C_z$. In this embodiment, it is determined, by using a random function, whether the at least a part of data in the window $W_{iz}[p_{iz}-A_z, p_{iz}+B_z]$ meets the preset condition $C_z$, and the implementation manner shown in FIG. 5 is used as an example. According to a rule preset on a deduplication server 103, a point $p_{i1}$ and a window $W_{i1}[p_{i1}-169, p_{i1}]$ corresponding to the point $p_{i1}$, are determined for a potential dividing point $k_i$, and it is determined whether at least a part of data in $W_{i1}[p_{i1}-169, p_{i1}]$, meets a preset condition $C_1$. As shown in FIG. 16, $W_{i1}$ represents the window $W_{i1}[p_{i1}-169, p_{i1}]$, and 5 bytes are selected to determine whether the at least a part of data in $W_{i1}[p_{i1}-169, p_{i1}]$ meets the preset condition $C_1$. In FIG. 16, "■" represents 1 selected byte, and there are 42 bytes between two adjacent selected bytes. The selected 5 bytes of data are used repeatedly 51 times to obtain 255 bytes in total, so as to increase randomness. Each byte thereof is formed by 8 bits, which are denoted as $a_{m,1}, \ldots,$ and $a_{m,8}$, representing the 1st bit to the 8th bit of an mth byte in the 255 bytes, and therefore, bits corresponding to the 255 bytes may be represented as:

$$\begin{pmatrix} a_{1,1} & a_{1,2} & L & a_{1,8} \\ a_{2,1} & a_{2,2} & L & a_{2,8} \\ M & M & M & M \\ a_{255,1} & a_{255,2} & L & a_{255,8} \end{pmatrix},$$

where when $a_{m,n}=1$, $V_{am,n}=1$, and when $a_{m,n}=V_{am,n}=-1$, where $a_{m,n}$ represents any one of $a_{m,1}, \ldots,$ and $a_{m,8}$, and a matrix $V_a$ is obtained according to a conversion relationship between $a_{m,n}$ and $V_{am,n}$ from the bits corresponding to the 255 bytes, and may be represented as:

$$\begin{pmatrix} V_{a1,1} & V_{a1,2} & \Lambda & V_{a1,8} \\ V_{a2,1} & V_{a2,2} & \Lambda & V_{a2,8} \\ M & M & M & M \\ V_{a255,1} & V_{a255,2} & \Lambda & V_{a255,8} \end{pmatrix}.$$

A large quantity of random numbers is selected to form a matrix, and once being formed, the matrix formed by the random numbers remains unchanged. For example, 255*8 random numbers are selected from random numbers that follow specific distribution (normal distribution is used as an example here) to form a matrix R:

$$\begin{pmatrix} h_{1,1} & h_{1,2} & L & h_{1,8} \\ h_{2,1} & h_{2,2} & L & h_{2,8} \\ M & M & M & M \\ h_{255,1} & h_{255,2} & L & h_{255,8} \end{pmatrix},$$

where random numbers of an mth row of the matrix $V_a$ and an mth row of the matrix R are multiplied and products are added to obtain a value, which is specifically represented as $S_{am}=V_{am,1}*h_{m,1}+V_{am,2}*h_{m,2}+ \ldots +V_{am,8}*h_{m,8}$. $S_{a1}, S_{a2}, \ldots,$ and $S_{a255}$ are obtained according to the method, and a quantity K of values meeting a specific condition (being greater than 0 is used as an example here) among $S_{a1}, S_{a2}, \ldots,$ and $S_{a255}$ is counted. Because the matrix R follows normal distribution, $S_{am}$ still follows normal distribution as the matrix R does. According to a probability theory, a probability that a random number in normal distribution is greater than 0 is 1/2; a probability that each value among $S_{a1}, S_{a2} \ldots,$ and $S_{a255}$ is greater than 0 is 1/2, and therefore, K meets binomial distribution: $P(k=n)=C_{255}{}^n(1/2)^n(1/2)^{255-n}=C_{255}{}^n(1/2)^{255}$. According to a counting result, it is determined whether the quantity K of values greater than 0 among $S_{a1}, S_{a2}, \ldots,$ and $S_{a255}$ is an even number; a probability that a random number in binomial distribution is an even number is 1/2, and therefore, K meets a condition with a probability of 1/2. When K is an even number, it indicates that the at least a part of data in $W_{i1}[p_{i1}-169, p_{i1}]$ meets the preset condition $C_1$. When K is an odd number, it indicates that the at least a part of data in $W_{i1}[p_{i1}-169, p_{i1}]$ does not meet the preset condition $C_1$. $C_1$ here refers to that the quantity K, which is obtained according to the foregoing manner, of values greater than 0 among $S_{a1}, S_{a2}, \ldots,$ and $S_{a255}$ is an even number. In the implementation manner shown in FIG. 5, for $W_{i1}[p_{i1}-169, p_{i1}]$, $W_{i2}[p_{i2}-169, p_{i2}]$, $W_{i3}[p_{i3}-169, p_{i3}]$, $W_{i4}[p_{i4}-169, p_{i4}]$, $W_{i5}[p_{i5}-169, p_{i5}]$, $W_{i6}[p_{i6}-169, p_{i6}]$, $W_{i7}[p_{i7}-169, p_{i7}]$, $W_{i8}[p_{i8}-169, p_{i8}]$, $W_{i9}[p_{i9}-169, p_{i9}]$, $W_{i10}[p_{i10}-169, p_{i10}]$, and $W_{i11}[p_{i11}-169, p_{i11}]$, the windows are the same in size, that is, all the windows have a size of 169 bytes, and manners of determining whether at least a part of data in a window meets a preset condition are also the same. For details, refer to the foregoing description of determining whether the at least a part of data in $W_{i1}[p_{i1}-169, p_{i1}]$ meets the preset condition $C_1$. Therefore, as shown in FIG. 16, "▧" represents 1 byte selected when it is determined whether at least a part of data in the window $W_{i2}[p_{i2}-169, p_{i2}]$ meets a preset condition $C_2$, and there are 42 bytes between two adjacent selected bytes. Selected 5 bytes of data are used repeatedly 51 times to obtain 255 bytes in total, so as to increase randomness. Each byte thereof is formed by 8 bits, which are denoted as $b_{m,1}, \ldots,$ and $b_{m,8}$, representing the 1st bit to the 8th bit of an mth byte in the 255 bytes, and therefore, bits corresponding to the 255 bytes may be represented as:

$$\begin{pmatrix} b_{1,1} & b_{1,2} & \Lambda & b_{1,8} \\ b_{2,1} & b_{2,2} & \Lambda & b_{2,8} \\ M & M & M & M \\ b_{255,1} & b_{255,2} & \Lambda & b_{255,8} \end{pmatrix},$$

where when $b_{m,n}=1$, $V_{bm,n}=1$, and when $b_{m,n}=0$, $V_{bm,n}=-1$, where $b_{m,n}$ represents any one of $b_{m,1}, \ldots,$ and $b_{m,8}$, and a matrix $V_b$ is obtained according to a conversion relationship between $b_{m,n}$ and $V_{bm,n}$ from the bits corresponding to the 255 bytes, and may be represented as:

$$\begin{pmatrix} V_{b1,1} & V_{b1,2} & \ldots & V_{b1,8} \\ V_{b2,1} & V_{b2,2} & \ldots & V_{b2,8} \\ M & M & M & M \\ V_{b255,1} & V_{b255,2} & \ldots & V_{b255,8} \end{pmatrix}.$$

A manner of determining whether at least a part of data in $W_{i1}[p_{i1}-169, p_{i1}]$ meets a preset condition is the same as a manner of determining whether at least a part of data in the window $W_{i2}[p_{i2}-169, p_{i2}]$ meets a preset condition; therefore the matrix R is used:

$$\begin{pmatrix} h_{1,1} & h_{1,2} & L & h_{1,8} \\ h_{2,1} & h_{2,2} & L & h_{2,8} \\ M & M & M & M \\ h_{255,1} & h_{255,2} & L & h_{255,8} \end{pmatrix},$$

and random numbers of an mth row of the matrix $V_b$ and the mth row of the matrix R are multiplied and products are added to obtain a value, which is specifically represented as $S_{bm}=V_{bm,1}*h_{m,1}+V_{bm,2}*h_{m,2}+ \ldots +V_{bm,8}*h_{m,8}$. $S_{b1}$, $S_{b2}, \ldots,$ and $S_{b255}$ are obtained according to the method, and a quantity K of values meeting a specific condition (being greater than 0 is used as an example here) among $S_{b1}$, $S_{b2}, \ldots,$ and $S_{b255}$ is counted. Because the matrix R follows normal distribution, $S_{bm}$ still follows normal distribution as the matrix R does. According to the probability theory, the probability that a random number in normal distribution is greater than 0 is 1/2; a probability that each value among $S_{b1}, S_{b2}, \ldots,$ and $S_{b255}$ is greater than 0 is 1/2, and therefore, K meets binomial distribution: $P(k=n)=C_{255}^{n}(1/2)^{n}(1/2)^{255-n}=C_{255}^{n}(1/2)^{255}$. According to a counting result, it is determined whether the quantity K of values greater than 0 among $S_{b1}, S_{b2}, \ldots,$ and $S_{b255}$ is an even number; the probability that a random number in binomial distribution is an even number is 1/2, and therefore, K meets a condition with a probability of 1/2. When K is an even number, it indicates that the at least a part of data in $W_{i2}[p_{i2}-169, p_{i2}]$ meets the preset condition $C_2$. When K is an odd number, it indicates that the at least a part of data in $W_{i2}[p_{i2}-169, p_{i2}]$ does not meet the preset condition $C_2$. $C_2$ here refers to that the quantity K, which is obtained according to the foregoing manner, of values greater than 0 among $S_{b1}, S_{b2}, \ldots,$ and $S_{b255}$ is an even number. In the implementation manner shown in FIG. 3, the at least a part of data in $W_{i2}[p_{i2}-169, p_{i2}]$ meets the preset condition $C_2$.

Therefore, as shown in FIG. 16, "▨" represents 1 byte selected when it is determined whether at least a part of data in the window $W_{i3}[p_{i3}-169, p_{i3}]$ meets a preset condition $C_3$, and there are 42 bytes between two adjacent selected bytes. Selected 5 bytes of data are used repeatedly 51 times to obtain 255 bytes in total, so as to increase randomness. Then, the method for determining whether at least a part of data in the windows $W_{i1}[p_{i1}-169, p_{i1}]$ and $W_{i2}[p_{i2}-169, p_{i2}]$ meets a preset condition is used to determine whether the at least a part of data in $W_{i3}[p_{i3}-169, p_{i3}]$ meets the preset condition $C_3$. In the implementation manner shown in FIG. 5, the at least a part of data in $W_{i3}[p_{i3}-169, p_{i3}]$ meets the preset condition. As shown in FIG. 16, "▨" represents 1 byte selected when it is determined whether at least a part of data in the window $W_{i4}[p_{i4}-169, p_{i4}]$ meets a preset condition $C_4$, and there are 42 bytes between two adjacent selected bytes. Selected 5 bytes of data are used repeatedly 51 times to obtain 255 bytes in total, so as to increase randomness. Then, the method for determining whether at least a part of data in windows $W_{i1}[p_{i1}-169, p_{i1}]$, $W_{i2}[p_{i2}-169, p_{i2}]$, and $W_{i3}[p_{i3}-169, p_{i3}]$ meets a preset condition is used to determine whether the at least a part of data in $W_{i4}[p_{i4}-169, p_{i4}]$ meets the preset condition $C_4$. In the implementation manner shown in FIG. 5, the at least a part of data in $W_{i4}[p_{i4}-169, p_{i4}]$ meets the preset condition $C_4$. As shown in FIG. 16, "⊞" represents 1 byte selected when it is determined whether at least a part of data in the window $W_{i5}[p_{i5}-169, p_{i5}]$ meets a preset condition $C_5$, and there are 42 bytes between two adjacent selected bytes. Selected 5 bytes of data are used repeatedly 51 times to obtain 255 bytes in total, so as to increase randomness. Then, the method for determining whether at least a part of data in the windows $W_{i1}[p_{i1}-169, p_{i1}]$, $W_{i2}[p_{i2}-169, p_{i2}]$, $W_{i3}[p_{i3}-169, p_{i3}]$, and $W_{i4}[p_{i4}-169, p_{i4}]$ meets a preset condition is used to determine whether the at least a part of data in $W_{i5}[p_{i5}-169, p_{i5}]$ meets the preset condition $C_5$. In the implementation manner shown in FIG. 5, the at least a part of data in $W_{i5}[p_{i5}-169, p_{i5}]$ does not meet the preset condition $C_5$.

Figure 17:
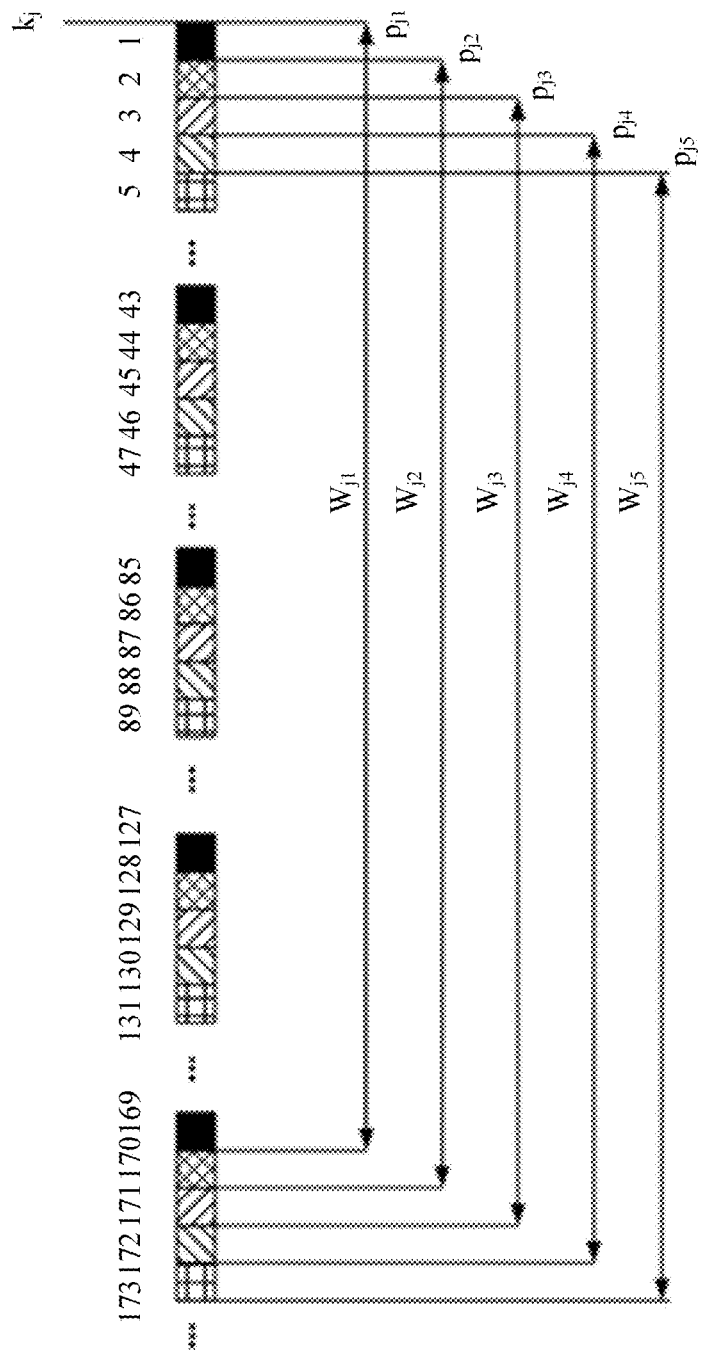

When the at least a part of data in $W_{i5}[p_{i5}-169, p_{i5}]$ does not meet the preset condition $C_5$, 11 bytes are skipped from a point $p_{i5}$, along a direction of searching for a data stream dividing point, and a next potential dividing point $k_j$ is obtained at an end position of an 11th byte. As shown in FIG. 6, according to the rule preset on the deduplication server 103, a point $p_{j1}$ and a window $W_{j1}[p_{j1}-169, p_{j1}]$ corresponding to the point $p_{j1}$ are determined for the potential dividing point $k_j$. A manner of determining whether at least a part of data in the window $W_{j1}[p_{j1}-169, p_{j1}]$ meets the preset condition $C_1$ is the same as a manner of determining whether at least a part of data in the window $W_{i1}[p_{i1}-169, p_{i1}]$ meets the preset condition $C_1$. Therefore, as shown in FIG. 17, $W_{j1}$ represents the window $W_{j1}[p_{j1}-169, p_{j1}]$, and 5 bytes are selected to determine whether the at least a part of data in $W_{j1}[p_{j1}-169, p_{j1}]$, meets the preset condition $C_1$. In FIG. 17, "■" represents 1 selected byte, and there are 42 bytes between two adjacent selected bytes. The selected 5 bytes of data are used repeatedly 51 times to obtain 255 bytes in total, so as to increase randomness. Each byte thereof is formed by 8 bits, which are denoted as $a_{m,1}', \ldots,$ and $a_{m,8}'$, representing the 1st bit to the 8th bit of an mth byte in the 255 bytes, and therefore, bits corresponding to the 255 bytes may be represented as:

$$\begin{pmatrix} a'_{1,1} & a'_{1,2} & \ldots & a'_{1,8} \\ a'_{2,1} & a'_{2,2} & \ldots & a'_{2,8} \\ M & M & M & M \\ a'_{255,1} & a'_{255,2} & \ldots & a'_{255,8} \end{pmatrix},$$

where when $a_{m,n}'=1$, $V_{am,n}'=1$, and when $a_{m,n}'=0$, $V_{am,n}'=-1$, where $a_{m,n}'$ represents any one of $a_{m,1}', \ldots,$ and $a_{m,8}'$, and a matrix $V_a'$ is obtained according to a conversion relationship between $a_{m,n}'$ and $V_{am,n}'$ from the bits corresponding to the 255 bytes, and may be represented as:

$$\begin{pmatrix} V'_{a1,1} & V'_{a1,2} & \ldots & V'_{a1,8} \\ V'_{a2,1} & V'_{a2,2} & \ldots & V'_{a2,8} \\ M & M & M & M \\ V'_{a255,1} & V'_{a255,2} & \ldots & V'_{a255,8} \end{pmatrix}.$$

A manner of determining whether at least a part of data in the window $W_{j1}[p_{j1}-169, p_{j1}]$ meets a preset condition is the same as a manner of determining whether at least a part of data in the window $W_{i1}[p_{i1}-169, p_{i1}]$ meets a preset condition. Therefore, the matrix R is used:

$$\begin{pmatrix} h_{1,1} & h_{1,2} & L & h_{1,8} \\ h_{2,1} & h_{2,2} & L & h_{2,8} \\ M & M & M & M \\ h_{255,1} & h_{255,2} & L & h_{255,8} \end{pmatrix},$$

and random numbers of an mth row of the matrix $V_a'$ and the mth row of the matrix R are multiplied and products are added to obtain a value, which is specifically represented as $S_{am}' = V_{am,1}'*h_{m,1} + V_{am,2}'*h_{m,2} + \ldots + V_{am,8}' *h_{m,8}$. $S_{a1}'$, $S_{a2}'$, ..., and $S_{a255}'$ are obtained according to the method, and a quantity K of values meeting a specific condition (being greater than 0 is used as an example here) among $S_{a1}'$, $S_{a2}'$, ..., and $S_{a255}'$ is counted. Because the matrix R follows normal distribution, $S_{am}'$ still follows normal distribution as the matrix R does. According to the probability theory, the probability that a random number in normal distribution is greater than 0 is 1/2; a probability that each value among $S_{a1}'$, $S_{a2}'$, ..., and $S_{a255}'$ is greater than 0 is 1/2, and therefore, K meets binomial distribution: $P(k=n) = C_{255}^n (1/2)^n (1/2)^{255-n} = C_{255}^n (1/2)^{255}$. According to a counting result, it is determined whether the quantity K of values greater than 0 among $S_{a1}'$, $S_{a2}'$, and $S_{a255}'$ is an even number; the probability that a random number in binomial distribution is an even number is 1/2, and therefore, K meets a condition with a probability of 1/2. When K is an even number, it indicates that the at least a part of data in $W_{j1}[p_{j1}-169, p_{j1}]$ meets the preset condition $C_1$. When K is an odd number, it indicates that the at least a part of data in $W_{j1}[p_{j1}-169, p_{j1}]$ does not meet the preset condition $C_1$.

A manner of determining whether at least a part of data in $W_{i2}[p_{i2}-169, p_{i2}]$ meets the preset condition $C_2$ is the same as a manner of determining whether at least a part of data in $W_{j2}[p_{j2}-169, p_{j2}]$ meets the preset condition $C_2$. Therefore, as shown in FIG. 17, "▨" represents 1 byte selected when it is determined whether the at least a part of data in the window $W_{j2}[p_{j2}-169, p_{j2}]$ meets the preset condition $C_2$, and there are 42 bytes between two adjacent selected bytes. Selected 5 bytes of data are used repeatedly 51 times to obtain 255 bytes in total, so as to increase randomness. Each byte thereof is formed by 8 bits, which are denoted as $b_{m,1}'$, ..., and $b_{m,8}'$, representing the 1st bit to the 8th bit of an mth byte in the 255 bytes, and therefore, bits corresponding to the 255 bytes may be represented as:

$$\begin{pmatrix} b'_{1,1} & b'_{1,2} & \ldots & b'_{1,8} \\ b'_{2,1} & b'_{2,2} & \ldots & b'_{2,8} \\ M & M & M & M \\ b'_{255,1} & b'_{255,2} & \ldots & b'_{255,8} \end{pmatrix},$$

where when $b_{m,n}'=1$, $V_{bm,n}'=1$, and when $b_{m,n}'=0$, $V_{bm,n}'=-1$, where $b_{m,n}'$ represents any one of $b_{m,1}'$, ..., and $b_{m,8}'$, and a matrix $V_b'$ is obtained according to a conversion relationship between $b_{m,n}'$ and $V_{bm,n}'$ from the bits corresponding to the 255 bytes, and may be represented as:

$$\begin{pmatrix} V_{b1,1} & V_{b1,2} & \ldots & V_{b1,8} \\ V_{b2,1} & V_{b2,2} & \ldots & V_{b2,8} \\ M & M & M & M \\ V_{b255,1} & V_{b255,2} & \ldots & V_{b255,8} \end{pmatrix}.$$

Manners of determining whether at least a part of data in windows $W_2[p_2-169, p_2]$ and $W_2[q_2-169, q_2]$ meets a preset condition are the same, and therefore the matrix R is still used:

$$\begin{pmatrix} h_{1,1} & h_{1,2} & L & h_{1,8} \\ h_{2,1} & h_{2,2} & L & h_{2,8} \\ M & M & M & M \\ h_{255,1} & h_{255,2} & L & h_{255,8} \end{pmatrix}.$$

Random numbers of an mth row of the matrix $V_b'$ and the mth row of the matrix R are multiplied and products are added to obtain a value, which is specifically represented as $S_{bm}' = V_{bm,1}'*h_{m,1} + V_{bm,2}'*h_{m,2} + \ldots + V_{bm,8}' *h_{m,8}$. $S_{b1}'$, $S_{b2}'$, ..., and $S_{b255}'$ are obtained according to the method, and a quantity K of values meeting a specific condition (being greater than 0 is used as an example here) among $S_{b1}'$, $S_{b2}'$, and $S_{b255}'$ is counted. Because the matrix R follows normal distribution, $S_{bm}'$ still follows normal distribution as the matrix R does. According to the probability theory, the probability that a random number in normal distribution is greater than 0 is 1/2; a probability that each value among $S_{b1}'$, $S_{b2}'$, and $S_{b255}'$ is greater than 0 is 1/2, and therefore, K meets binomial distribution: $P(k=n) = C_{255}^n (1/2)^n (1/2)^{255-n} = C_{255}^n (1/2)^{255}$. According to a counting result, it is determined whether the quantity K of values greater than 0 among $S_{b1}'$, $S_{b2}'$, ..., and $S_{b255}'$ is an even number; the probability that a random number in binomial distribution is an even number is 1/2, and therefore, K meets a condition with a probability of 1/2. When K is an even number, it indicates that the at least a part of data in $W_{j2}[p_{j2}-169, p_{j2}]$ meets the preset condition $C_2$. When K is an odd number, it indicates that the at least a part of data in $W_{j2}[p_{j2}-169, p_{j2}]$ does not meet the preset condition $C_2$. Similarly, a manner of determining whether at least a part of data in $W_{i3}[p_{i3}-169, p_{i3}]$ meets the preset condition $C_3$ is the same as a manner of determining whether at least a part of data in $W_{j3}[p_{j3}-169, p_{j3}]$ meets the preset condition $C_3$. Similarly, it is determined whether at least a part of data in $W_{j4}[p_{j4}-169, p_{j4}]$ meets the preset condition $C_4$, it is determined whether at least a part of data in $W_{j5}[p_{j5}-169, p_{j5}]$ meets the preset condition $C_5$, it is determined whether at least a part of data in $W_{j6}[p_{j6}-169, p_{j6}]$ meets a preset condition $C_6$, it is determined whether at least a part of data in $W_{j7}[p_{j7}-169, p_{j7}]$ meets a preset condition $C_7$, it is determined whether at least a part of data in $W_{j8}[p_{j8}-169, p_{j8}]$ meets a preset condition $C_8$, it is determined whether at least a part of data in $W_{j9}[p_{j9}-169, p_{j9}]$ meets a preset condition $C_9$, it is determined whether at least a part of data in $W_{j10}[p_{j10}-169, p_{j10}]$ meets a preset condition $C_{10}$, and it is determined whether at least a part of data in $W_{j11}[p_{j11}-169, p_{j11}]$ meets a preset condition $C_{11}$, which are not described herein again.

Still using the implementation manner shown in FIG. 5 as an example, a method for determining whether at least a part of data in a window $W_{iz}[p_{iz}-A_z, p_{iz}+B_z]$ meets a preset condition $C_z$ is provided. In this embodiment, it is determined, by using a random function, whether the at least a part of data in the window $W_{iz}[p_{iz}-A_z, p_{iz}+B_z]$ meets the preset condition $C_z$. According to a rule preset on a deduplication server 103, a point $p_{i1}$ and a window $W_{i1}[p_{i1}-169, p_{i1}]$ corresponding to $p_{i1}$ are determined for a potential dividing point $k_i$, and it is determined whether at least a part of data in $W_{i1}[p_{i1}-169, p_{i1}]$ meets a preset condition $C_1$. As shown in FIG. 16, $W_{i1}$ represents the window $W_{i1}[p_{i1}-169, p_{i1}]$, and 5 bytes are selected to determine whether the at least a part of data in $W_{i1}[p_{i1}-169, p_{i1}]$ meets the preset condition $C_1$. In FIG. 16, "■" represents 1 selected byte, and there are 42 bytes between two adjacent selected bytes "■". In one implementation manner, a hash function is used to calculate the 5 selected bytes, and values obtained by means of calculation by using the hash function are in fixed and even distribution. If a value obtained by means of calculation by using the hash function is an even number, it is determined that the at least a part of data in $W_{i1}[p_{i1}-169, p_{i1}]$ meets the preset condition $C_1$, that is, $C_1$ represents that a value obtained by means of calculation by using the hash function and according to the foregoing manner is an even number. Therefore, a probability that at least a part of data in $W_{i1}[p_{i1}-169, p_{i1}]$ meets a preset condition is 1/2. In the implementation manner shown in FIG. 5, it is determined, by using a hash function, whether at least a part of data in $W_{i2}[p_{i2}-169, p_{i2}]$ meets a preset condition $C_2$, whether at least a part of data in $W_{i3}[p_{i3}-169, p_{i3}]$ meets a preset condition $C_3$, whether at least a part of data in $W_{i4}[p_{i4}-169, p_{i4}]$ meets a preset condition $C_4$, and whether at least a part of data in $W_{i5}[p_{i5}-169, p_{i5}]$ meets a preset condition $C_5$. For specific implementation, reference may be made to the description of the manner of determining, by using a hash function, whether at least a part of data in $W_{i1}[p_{i1}-169, p_{i1}]$ meets the preset condition $C_1$ in the implementation manner shown in FIG. 5, which is not described herein again.

When the at least a part of data in $W_{i5}[p_{i5}-169, p_{i5}]$ does not meet the preset condition $C_5$, 11 bytes are skipped from a point $p_{i5}$ along a direction of searching for a data stream dividing point, and a current potential dividing point $k_j$ is obtained at an end position of an 11th byte. As shown in FIG. 6, according to the rule preset on the deduplication server 103, a point $p_{j1}$ and a window $W_{j1}[p_{j1}-169, p_{j1}]$ corresponding to the point $p_{j1}$ are determined for the potential dividing point $k_j$. A manner of determining whether at least a part of data in the window $W_{j1}[p_{j1}-169, p_{j1}]$ meets the preset condition $C_1$ is the same as a manner of determining whether at least a part of data in the window $W_{i1}[p_{i1}-169, p_{i1}]$ meets the preset condition $C_1$. Therefore, as shown in FIG. 17, $W_{j1}$ represents the window $W_{j1}[p_{j1}-169, p_{j1}]$, and 5 bytes are selected to determine whether the at least a part of data in $W_{j1}[p_{j1}-169, p_{j1}]$ meets the preset condition $C_1$. In FIG. 17, "■" represents 1 selected byte, and there are 42 bytes between two adjacent selected bytes "■". The 5 bytes selected from the window $W_{j1}[p_{j1}-169, p_{j1}]$ are calculated by using a hash function. If an obtained value is an even number, the at least a part of data in $W_{j1}[p_{j1}-169, p_{j1}]$ meets the preset condition $C_1$. In FIG. 17, a manner of determining whether at least a part of data in $W_{i2}[p_{i2}-169, p_{i2}]$ meets the preset condition $C_2$ is the same as a manner of determining whether at least a part of data in $W_{j2}[p_{j2}-169, p_{j2}]$ meets the preset condition $C_2$. Therefore, as shown in FIG. 17, "▨" represents 1 byte selected when it is determined whether the at least a part of data in the window $W_{j2}[p_{j2}-169, p_{j2}]$ meets the preset condition $C_2$, and there are 42 bytes between two adjacent selected bytes "▨". Selected 5 bytes are calculated by using a hash function. If an obtained value is an even number, the at least a part of data in $W_{j2}[p_{j2}-169, p_{j2}]$ meets the preset condition $C_2$. In FIG. 17, a manner of determining whether at least a part of data in $W_{i3}[p_{i3}-169, p_{i3}]$ meets the preset condition $C_3$ is the same as a manner of determining whether at least a part of data in $W_{j3}[p_{j3}-169, p_{j3}]$ meets the preset condition $C_3$. Therefore, as shown in FIG. 17, "▨" represents 1 byte selected when it is determined whether the at least a part of data in the window $W_{j3}[p_{j3}-169, p_{j3}]$ meets the preset condition $C_3$, and there are 42 bytes between two adjacent selected bytes "▨". Selected 5 bytes are calculated by using a hash function. If an obtained value is an even number, the at least a part of data in $W_{j3}[p_{j3}-169, p_{j3}]$ meets the preset condition $C_3$. In FIG. 17, a manner of determining whether at least a part of data in $W_{j4}[p_{j4}-169, p_{j4}]$ meets the preset condition $C_4$ is the same as a manner of determining whether at least a part of data in the window $W_{i4}[p_{i4}-169, p_{i4}]$ meets the preset condition $C_4$. Therefore, as shown in FIG. 17, "▨" represents 1 byte selected when it is determined whether the at least a part of data in the window $W_{j4}[p_{j4}-169, p_{j4}]$ meets the preset condition $C_4$, and there are 42 bytes between two adjacent selected bytes "▨". Selected 5 bytes are calculated by using a hash function. If an obtained value is an even number, the at least a part of data in $W_{j4}[p_{j4}-169, p_{j4}]$ meets the preset condition $C_4$. According to the foregoing method, it is determined whether at least a part of data in $W_{j5}[p_{j5}-169, p_{j5}]$ meets the preset condition $C_5$, it is determined whether at least a part of data in $W_{j6}[p_{j6}-169, p_{j6}]$ meets a preset condition $C_6$, it is determined whether at least a part of data in $W_{j7}[p_{j7}-169, p_{j7}]$ meets a preset condition $C_7$, it is determined whether at least a part of data in $W_{j8}[p_{j8}-169, p_{j8}]$ meets a preset condition $C_8$, it is determined whether at least a part of data in $W_{j9}[p_{j9}-169, p_{j9}]$ meets a preset condition $C_9$, it is determined whether at least a part of data in $W_{j10}[p_{j10}-169, p_{j10}]$ meets a preset condition $C_{10}$, and it is determined whether at least a part of data in $W_{j11}[p_{j11}-169, p_{j11}]$ meets a preset condition $C_{11}$, which are not described herein again.

Using the implementation manner shown in FIG. 5 as an example, a method for determining whether at least a part of data in a window $W_{iz}[p_{iz}-A_z, p_{iz}+B_z]$ meets a preset condition $C_z$ is provided. In this embodiment, it is determined, by using a random function, whether the at least a part of data in the window $W_{iz}[p_{iz}-A_z, p_{iz}+B_z]$ meets the preset condition $C_z$. According to a rule preset on a deduplication server 103, a point $p_{i1}$ and a window $W_{i1}[p_{i1}-169, p_{i1}]$ corresponding to $p_{i1}$ are determined for a potential dividing point $k_i$, and it is determined whether at least a part of data in $W_{i1}[p_{i1}-169, p_{i1}]$ meets a preset condition $C_1$. As shown in FIG. 16, $W_{i1}$ represents the window $W_{i1}[p_{i1}-169, p_{i1}]$, and 5 bytes are selected to determine whether the at least a part of data in $W_{i1}[p_{i1}-169, p_{i1}]$ meets the preset condition $C_1$. In FIG. 16, each of bytes "■" whose sequence numbers are 169, 127, 85, 43, and 1 represents 1 selected byte, and there are 42 bytes between two adjacent selected bytes. The bytes "■" whose sequence numbers are 169, 127, 85, 43, and 1 are converted into decimal values that are represented as $a_1$, $a_2$, $a_3$, $a_4$, and $a_5$ respectively. Because 1 byte is formed by 8 bits, each byte "■" serves as a value, and any $a_r$ of $a_1$, $a_2$, $a_3$, $a_4$, and $a_5$ meets $0 \le a_r \le 255$. $a_1$, $a_2$, $a_3$, $a_4$, and $a_5$ form a 1*5 matrix. 256*5 random numbers are selected from random numbers that follow binomial distribution to form a matrix R that is represented as:

$$\begin{pmatrix} h_{0,1} & h_{0,2} & L & h_{0,5} \\ h_{1,1} & h_{1,2} & L & h_{1,5} \\ M & M & M & M \\ h_{255,5} & h_{255,5} & L & h_{255,5} \end{pmatrix}.$$

The matrix R is searched for a corresponding value according to the value of $a_1$ and a column in which $a_1$ is located. For example, if $a_1=36$, and $a_1$ is located in a 1st column, a value corresponding to $h_{36,1}$ is searched for. The matrix R is searched for a corresponding value according to the value of $a_2$ and a column in which $a_2$ is located. For example, if $a_2=48$, and $a_2$ is located in a 2nd column, a value corresponding to $h_{48,2}$ is searched for. The matrix R is searched for a corresponding value according to the value of $a_3$ and a column in which $a_3$ is located. For example, if $a_3=26$, and $a_3$ is located in a 3rd column, a value corresponding to $h_{26,3}$ is searched for. The matrix R is searched for a corresponding value according to the value of $a_4$ and a column in which $a_4$ is located. For example, if $a_4=26$, and $a_4$ is located in a 4th column, a value corresponding to $h_{26,4}$ is searched for. The matrix R is searched for a corresponding value according to the value of $a_5$ and a column in which $a_5$ is located. For example, if $a_5=88$, and $a_5$ is located in a 5th column, a value corresponding to $h_{88,5}$ is searched for. $S_1=h_{36,1}+h_{48,2}+h_{26,3}+h_{26,4}+h_{88,5}$, and because the matrix R follows binomial distribution, $S_1$ also follows binomial distribution. When $S_1$ is an even number, the at least a part of data in $W_{i1}[p_{i1}-169, p_{i1}]$ meets the preset condition $C_1$; when $S_1$ is an odd number, the at least a part of data in $W_{i1}[p_{i1}-169, p_{i1}]$ does not meet the preset condition $C_1$. A probability that $S_1$ is an even number is 1/2, and $C_1$ represents that $S_1$ that is obtained by means of calculation according to the foregoing manner is an even number. In the embodiment shown in FIG. 5, the at least a part of data in $W_{i1}[p_{i1}-169, p_{i1}]$ meets the preset condition $C_1$. As shown in FIG. 16, "▨" represents 1 byte separately selected when it is determined whether at least a part of data in a window $W_{i2}[p_{i2}-169, p_{i2}]$ meets a preset condition $C_2$. In FIG. 16, bytes are represented as sequence numbers 170, 128, 86, 44, and 2 separately, and there are 42 bytes between two adjacent selected bytes. The bytes "▨" whose sequence numbers are 170, 128, 86, 44, and 2 are converted into decimal values that are represented as $b_1$, $b_2$, $b_3$, $b_4$ and $b_5$ respectively. Because 1 byte is formed by 8 bits, each byte "▨" serves as a value, and any $b_r$ of $b_1$, $b_2$, $b_3$, $b_4$ and $b_5$ meets $0 \leq b_r \leq 255$. $b_1$, $b_2$, $b_3$, $b_4$, and $b_5$ form a 1*5 matrix. In this implementation manner, manners of determining whether at least a part of data in $W_{i1}$ and $W_{i2}$ meets a preset condition are the same, and therefore, the matrix R is still used. The matrix R is searched for a corresponding value according to the value of $b_1$ and a column in which $b_1$ is located. For example, if $b_1=66$, and $b_1$ is located in a 1st column, a value corresponding to $h_{66,1}$ is searched for. The matrix R is searched for a corresponding value according to the value of $b_2$ and a column in which $b_2$ is located. For example, if $b_2=48$, and $b_2$ is located in a 2nd column, a value corresponding to $h_{48,2}$ is searched for. The matrix R is searched for a corresponding value according to the value of $b_3$ and a column in which $b_3$ is located. For example, if $b_3=99$, and $b_3$ is located in a 3rd column, a value corresponding to $h_{99,3}$ is searched for. The matrix R is searched for a corresponding value according to the value of $b_4$ and a column in which $b_4$ is located. For example, if $b_4=26$, and $b_4$ is located in a 4th column, a value corresponding to $h_{26,4}$ is searched for. The matrix R is searched for a corresponding value according to the value of $b_5$ and a column in which $b_5$ is located. For example, if $b_5=90$, and $b_5$ is located in a 5th column, a value corresponding to $h_{90,5}$ is searched for. $S_2=h_{66,1}+h_{48,2}+h_{99,3}+h_{26,4}+h_{90,5}$ and because the matrix R follows binomial distribution, $S_2$ also follows binomial distribution. When $S_2$ is an even number, the at least a part of data in $W_{i2}[p_{i2}-169, p_{i2}]$ meets the preset condition $C_2$; when $S_2$ is an odd number, the at least a part of data in $W_{i2}[p_{i2}-169, p_{i2}]$ does not meet the preset condition $C_2$. A probability that $S_2$ is an even number is 1/2. In the embodiment shown in FIG. 5, the at least a part of data in $W_{i2}[p_{i2}-169, p_{i2}]$ meets the preset condition $C_2$. By using the same rule, separately, it is determined whether at least a part of data in $W_{i3}[p_{i3}-169, p_{i3}]$ meets a preset condition $C_3$, it is determined whether at least a part of data in $W_{i4}[p_{i4}-169, p_{i4}]$ meets a preset condition $C_4$, it is determined whether at least a part of data in $W_{i5}[p_{i5}-169, p_{i5}]$ meets a preset condition $C_5$, it is determined whether at least a part of data in $W_{i6}[p_{i6}-169, p_{i6}]$ meets a preset condition $C_6$, it is determined whether at least a part of data in $W_{i7}[p_{i7}-169, p_{i7}]$ meets a preset condition $C_7$, it is determined whether at least a part of data in $W_{i8}[p_{i8}-169, p_{i8}]$ meets a preset condition $C_8$, it is determined whether at least a part of data in $W_{i9}[p_{i9}-169, p_{i9}]$ meets a preset condition $C_9$, it is determined whether at least a part of data in $W_{i10}[p_{i10}-169, p_{i10}]$ meets a preset condition $C_{10}$, and it is determined whether at least a part of data in $W_{i11}[p_{i11}-169, p_{i11}]$ meets a preset condition $C_{11}$. In the implementation manner shown in FIG. 5, the at least a part of data in $W_{i5}[p_{i5}-169, p_{i5}]$ does not meet the preset condition $C_5$, 11 bytes are skipped from a point $p_{i5}$ along a direction of searching for a data stream dividing point, and a current potential dividing point $k_j$ is obtained at an end position of an 11th byte. As shown in FIG. 6, according to the rule preset on the deduplication server 103, a point $p_{j1}$ and a window $W_{i1}[p_{i1}-169, p_{i1}]$ corresponding to the point $p_{j1}$ are determined for the potential dividing point $k_j$. A manner of determining whether at least a part of data in the window $W_{i1}[p_{i1}-169, p_{i1}]$ meets the preset condition $C_1$ is the same as a manner of determining whether at least a part of data in the window $W_{i1}[p_{i1}-169, p_{i1}]$ meets the preset condition $C_1$. Therefore, as shown in FIG. 17, $W_{j1}$ represents the window $W_{i1}[p_{i1}-169, p_{i1}]$, and it is determined whether the at least a part of data in $W_{i1}[p_{i1}-169, p_{i1}]$ meets the preset condition $C_1$. In FIG. 17, each of bytes "■" whose sequence numbers are 169, 127, 85, 43, and 1 represents 1 selected byte, and there are 42 bytes between two adjacent selected bytes. The bytes "■" whose sequence numbers are 169, 127, 85, 43, and 1 are converted into decimal values that are represented as $a_1'$, $a_2'$, $a_3'$, $a_4'$, and $a_5'$ respectively. Because 1 byte is formed by 8 bits, each byte "■" serves as a value, and any $a_r'$ of $a_1'$, $a_2'$, $a_3'$, $a_4'$, and $a_5'$ meets $0 \leq a_r' \leq 255$. $a_1'$, $a_2'$, $a_3'$, $a_4'$, and $a_5'$ form a 1*5 matrix. The manner of determining whether at least a part of data in the window $W_{j1}[p_{j1}-169, p_{j1}]$ meets the preset condition $C_1$ is the same as the manner of determining whether at least a part of data in the window $W_{i1}[p_{i1}-169, p_{i1}]$ meets the preset condition $C_1$, and therefore, the matrix R is still used, and is represented as:

$$\begin{pmatrix} h_{0,1} & h_{0,2} & L & h_{0,5} \\ h_{1,1} & h_{1,2} & L & h_{1,5} \\ M & M & M & M \\ h_{255,5} & h_{255,5} & L & h_{255,5} \end{pmatrix}.$$

The matrix R is searched for a corresponding value according to the value of $a_1'$ and a column in which $a_1'$ is located. For example, if $a_1'=16$, and $a_1'$ is located in a 1st column, a value corresponding to $h_{16,1}$ is searched for. The matrix R is searched for a corresponding value according to the value of $a_2'$ and a column in which $a_2'$ is located. For example, if $a_2'=98$, and $a_2'$ is located in a 2nd column, a value corresponding to $h_{98,2}$ is searched for. The matrix R is searched for a corresponding value according to the value of $a_3'$ and a column in which $a_3'$ is located. For example, if $a_3'=56$, and $a_3'$ is located in a 3rd column, a value corresponding to $h_{56,3}$ is searched for. The matrix R is searched for a corresponding value according to the value of $a_4'$ and a column in which $a_4'$ is located. For example, if $a_4'=36$, and $a_4'$ is located in a 4th column, a value corresponding to $h_{36,4}$ is searched for. The matrix R is searched for a corresponding value according to the value of $a_5'$ and a column in which $a_5'$ is located. For example, if $a_5'=99$, and $a_5'$ is located in a 5th column, a value corresponding to $h_{99,5}$ is searched for. $S_1'=h_{16,1}+h_{98,2}+h_{56,3}+h_{36,4}+h_{99,5}$, and because the matrix R follows binomial distribution, $S_1'$ also follows binomial distribution. When $S_1'$ is an even number, the at least a part of data in $W_{j1}[p_{j1}-169, p_{j1}]$ meets the preset condition $C_1$; when $S_1'$ is an odd number, the at least a part of data in $W_{j1}[p_{j1}-169, p_{j1}]$ does not meet the preset condition $C_1$. A probability that $S_1'$ is an even number is 1/2.

A manner of determining whether at least a part of data in $W_{i2}[p_{i2}-169, p_{i2}]$ meets the preset condition $C_2$ is the same as a manner of determining whether at least a part of data in $W_{j2}[p_{j2}-169, p_{j2}]$ meets the preset condition $C_2$. Therefore, as shown in FIG. 17, "▨" represents 1 byte selected when it is determined whether the at least a part of data in the window $W_{j2}[p_{j2}-169, p_{j2}]$ meets the preset condition $C_2$, and there are 42 bytes between two adjacent selected bytes. Selected bytes are represented as sequence numbers 170, 128, 86, 44, and 2 separately, and there are 42 bytes between two adjacent selected bytes. The bytes "▨" whose sequence numbers are 170, 128, 86, 44, and 2 are converted into decimal values that are represented as $b_1'$, $b_2'$, $b_3'$, $b_4'$, and $b_5'$ respectively. Because 1 byte is formed by 8 bits, each byte "▨" serves as a value, and any $b_r'$ of $b_1'$, $b_2'$, $b_3'$, $b_4'$, and $b_5'$ meets $0 \le b_r' \le 255$. $b_1'$, $b_2'$, $b_3'$, $b_4'$ and $b_5'$ form a 1*5 matrix. The matrix R the same as that used when it is determined whether the at least a part of data in the window $W_{i2}[p_{i2}-169, p_{i2}]$ meets the preset condition $C_2$ is used. The matrix R is searched for a corresponding value according to the value of $b_1'$ and a column in which $b_1$ is located. For example, if $b_1'=210$, and $b_1'$ is located in a 1st column, a value corresponding to $h_{210,1}$ is searched for. The matrix R is searched for a corresponding value according to the value of $b_2'$ and a column in which $b_2'$ is located. For example, if $b_2'=156$, and $b_2'$ is located in a 2nd column, a value corresponding to $h_{156,2}$ is searched for. The matrix R is searched for a corresponding value according to the value of $b_3'$ and a column in which $b_3'$ is located. For example, if $b_3'=144$, and $b_3'$ is located in a 3rd column, a value corresponding to $h_{144,3}$ is searched for. The matrix R is searched for a corresponding value according to the value of $b_4'$ and a column in which $b_4'$ is located. For example, if $b_4'=60$, and $b_4'$ is located in a 4th column, a value corresponding to $h_{60,4}$ is searched for. The matrix R is searched for a corresponding value according to the value of $b_5'$ and a column in which $b_5'$ is located. For example, if $b_5'=90$, and $b_5'$ is located in a 5th column, a value corresponding to $h_{90,5}$ is searched for. $S_2'=h_{210,1}+h_{156,2}+h_{144,3}+h_{60,4}+h_{90,5}$ The same as the determining condition of $S_2$, when $S_2'$ is an even number, the at least a part of data in $W_{j2}[p_{j2}-169, p_{j2}]$ meets the preset condition $C_2$, and when $S_2'$ is an odd number, the at least a part of data in $W_{j2}[p_{j2}-169, p_{j2}]$ does not meet the preset condition $C_2$. A probability that $S_2'$ is an even number is 1/2.

Similarly, a manner of determining whether at least a part of data in $W_{i3}[p_{i3}-169, p_{i3}]$ meets the preset condition $C_3$ is the same as a manner of determining whether at least a part of data in $W_{j3}[p_{j3}-169, p_{j3}]$ meets the preset condition $C_3$. Similarly, it is determined whether at least a part of data in $W_{j4}[p_{j4}-169, p_{j4}]$ meets the preset condition $C_4$, it is determined whether at least a part of data in $W_{j5}[p_{j5}-169, p_{j5}]$ meets the preset condition $C_5$, it is determined whether at least a part of data in $W_{j6}[p_{j6}-169, p_{j6}]$ meets the preset condition $C_6$, it is determined whether at least a part of data in $W_{j7}[p_{j7}-169, p_{j7}]$ meets the preset condition $C_7$, it is determined whether at least a part of data in $W_{j8}[p_{j8}-169, p_{j8}]$ meets the preset condition $C_8$, it is determined whether at least a part of data in $W_{j9}[p_{j9}-169, p_{j9}]$ meets the preset condition $C_9$, it is determined whether at least a part of data in $W_{j10}[p_{j10}-169, p_{j10}]$ meets the preset condition $C_{10}$, and it is determined whether at least a part of data in $W_{j11}[p_{j11}-169, p_{j11}]$ meets the preset condition $C_{11}$, which are not described herein again.

Using the implementation manner shown in FIG. 5 as an example, a method for determining whether at least a part of data in a window $W_{iz}[p_{iz}-A_z, p_{iz}+B_z]$ meets a preset condition $C_z$ is provided. In this embodiment, it is determined, by using a random function, whether the at least a part of data in the window $W_{iz}[p_{iz}-A_z, p_{iz}+B_z]$ meets the preset condition $C_z$. According to a rule preset on a deduplication server 103, a point $p_{i1}$ and a window $W_{i1}[p_{i1}-169, p_{i1}]$ corresponding to $p_{i1}$ are determined for a potential dividing point and it is determined whether at least a part of data in $W_{i1}[p_{i1}-169, p_{i1}]$ meets a preset condition $C_1$. As shown in FIG. 16, $W_{i1}$ represents the window $W_{i1}[p_{i1}-169, p_{i1}]$, and 5 bytes are selected to determine whether the at least a part of data in $W_{i1}[p_{i1}-169, p_{i1}]$ meets the preset condition $C_1$. In FIG. 16, each of bytes "■" whose sequence numbers are 169, 127, 85, 43, and 1 represents 1 selected byte, and there are 42 bytes between two adjacent selected bytes. The bytes "■" whose sequence numbers are 169, 127, 85, 43, and 1 are converted into decimal values that are represented as $a_1$, $a_2$, $a_3$, $a_4$, and $a_5$ respectively. Because 1 byte is formed by 8 bits, each byte "■" serves as a value, and any $a_s$ of $a_1$, $a_2$, $a_3$, $a_4$, and $a_5$ meets $0 \le a_s \le 255$. $a_1$, $a_2$, $a_3$, $a_4$, and $a_5$ form a 1*5 matrix. 256*5 random numbers are selected from random numbers that follow binomial distribution to form a matrix R that is represented as:

$$\begin{pmatrix} h_{0,1} & h_{0,2} & L & h_{0,5} \\ h_{1,1} & h_{1,2} & L & h_{1,5} \\ M & M & M & M \\ h_{255,5} & h_{255,5} & L & h_{255,5} \end{pmatrix}.$$

256*5 random numbers are selected from random numbers that follow binomial distribution to form a matrix G that is represented as:

$$\begin{pmatrix} g_{0,1} & g_{0,2} & L & g_{0,5} \\ g_{1,1} & g_{1,2} & L & g_{1,5} \\ M & M & M & M \\ g_{255,5} & g_{255,5} & L & g_{255,5} \end{pmatrix}.$$

According to the value of $a_1$ and a column in which $a_1$ is located, for example, $a_1=36$, and $a_1$ is located in a 1st column, the matrix R is searched for a value corresponding to $h_{36,1}$, and the matrix G is searched for a value corresponding to $g_{36,1}$. According to the value of $a_2$ and a column in which $a_2$ is located, for example, $a_2=48$, and $a_2$ is located in a 2nd column, the matrix R is searched for a value corresponding to $h_{48,2}$, and the matrix G is searched for a value corresponding to $g_{48,2}$. According to the value of $a_3$ and a column in which $a_3$ is located, for example, $a_3=26$, and $a_3$ is located in a 3rd column, the matrix R is searched for a value corresponding to $h_{26,3}$, and the matrix G is searched for a value corresponding to $g_{26,3}$. According to the value of $a_4$ and a column in which $a_4$ is located, for example, $a_4=26$, and $a_4$ is located in a 4th column, the matrix R is searched for a value corresponding to $h_{26,4}$, and the matrix G is searched for a value corresponding to $g_{26,4}$. According to the value of $a_5$ and a column in which $a_5$ is located, for example, $a_5=88$, and $a_5$ is located in a 5th column, the matrix R is searched for a value corresponding to $h_{88,5}$, and the matrix G is searched for a value corresponding to $g_{88,5}$. $S_{1h}=h_{36,1}+h_{48,2}+h_{26,3}+h_{26,4}+h_{88,5}$, and because the matrix R follows binomial distribution, $S_{1h}$ also follows binomial distribution. $S_{1g}=g_{36,1}+g_{48,2}+g_{26,3}+g_{26,4}\ g_{88,5}$, and because the matrix G follows binomial distribution, $S_{1g}$ also follows binomial distribution. When one of $S_{1h}$ and $S_{1g}$ is an even number, the at least a part of data in $W_{i1}[p_{i1}-169, p_{i1}]$ meets the preset condition $C_1$; when both $S_{1h}$ and $S_{1g}$ are odd numbers, the at least a part of data in $W_{i1}[p_{i1}-169, p_{i1}]$ does not meet the preset condition $C_1$, and $C_1$ indicates that one of $S_{1h}$ and $S_{1g}$ obtained according to the foregoing method is an even number. Because both $S_{1h}$ and $S_{1g}$ follow binomial distribution, a probability that $S_{1h}$ is an even number is 1/2, a probability that $S_{1g}$ is an even number is 1/2, and a probability that one of $S_{1h}$ and $S_{1g}$ is an even number is 1−1/4=3/4. Therefore, a probability that the at least a part of data in $W_{i1}[p_{i1}-169, p_{i1}]$ meets the preset condition $C_1$ is 3/4. In the embodiment shown in FIG. 5, the at least a part of data in $W_{i1}[p_{i1}-169, p_{i1}]$ meets the preset condition $C_1$. In the implementation manner shown in FIG. 5, for $W_{i1}[p_{i1}-169, p_{i1}]$, $W_{i2}[p_{i2}-169, p_{i2}]$, $W_{i3}[p_{i3}-169, p_{i3}]$, $W_{i4}[p_{i4}-169, p_{i4}]$, $W_{i5}[p_{i5}-169, p_{i5}]$, $W_{i6}[p_{i6}-169, p_{i6}]$, $W_{i7}[p_{i7}-169, p_{i7}]$, $W_{i8}[p_{i8}-169, p_{i8}]$, $W_{i9}[p_{i9}-169, p_{i9}]$, $W_{i10}[p_{i10}-169, p_{i10}]$, and $W_{i11}[p_{i11}-169, p_{i11}]$, the windows are the same in size, that is, all the windows have a size of 169 bytes, and meanwhile manners of determining whether at least a part of data in a window meets a preset condition are also the same. For details, refer to the foregoing description of determining whether the at least a part of data in $W_{i1}[p_{i1}-169, p_{i1}]$ meets the preset condition $C_1$. Therefore, as shown in FIG. 16, "▨" represents 1 byte separately selected when it is determined whether at least a part of data in the window $W_{i2}$ [$p_{i2}-169$, $p_{i2}$] meets the preset condition $C_2$. In FIG. 16, selected bytes are represented as sequence numbers 170, 128, 86, 44, and 2 separately, and there are 42 bytes between two adjacent selected bytes. The bytes "▨" whose sequence numbers are 170, 128, 86, 44, and 2 are converted into decimal values that are represented as $b_1$, $b_2$, $b_3$, $b_4$, and $b_5$ respectively. Because 1 byte is formed by 8 bits, each byte "▨" serves as a value, and any $b_s$ of $b_1$, $b_2$, $b_3$, $b_4$, and $b_5$ meets $0 \le b_s \le 255$. $b_1$, $b_2$, $b_3$, $b_4$, and $b_5$ form a 1*5 matrix. In this implementation manner, manners of determining whether at least a part of data in each window meets a preset condition are the same, and therefore, the same matrices R and G are still used. According to the value of $b_1$ and a column in which $b_1$ is located, for example, $b_1=66$, and $b_1$ is located in a 1st column, the matrix R is searched for a value corresponding to $h_{66,1}$, and the matrix G is searched for a value corresponding to $g_{66,1}$. According to the value of $b_2$ and a column in which $b_2$ is located, for example, $b_2=48$, and $b_2$ is located in a 2nd column, the matrix R is searched for a value corresponding to $h_{48,2}$, and the matrix G is searched for a value corresponding to $g_{48,2}$. According to the value of $b_3$ and a column in which $b_3$ is located, for example, $b_3=99$, and $b_3$ is located in a 3rd column, the matrix R is searched for a value corresponding to $h_{99,3}$, and the matrix G is searched for a value corresponding to $g_{99,3}$. According to the value of $b_4$ and a column in which $b_4$ is located, for example, $b_4=26$, and $b_4$ is located in a 4th column, the matrix R is searched for a value corresponding to $h_{26,4}$, and the matrix G is searched for a value corresponding to $g_{26,4}$ According to the value of $b_5$ and a column in which $b_5$ is located, for example, $b_5=90$, and $b_5$ is located in a 5th column, the matrix R is searched for a value corresponding to $h_{90,5}$, and the matrix G is searched for a value corresponding to $g_{90,5}$ $S_{2h}=h_{66,1}+h_{48,2}+h_{99,3}+h_{26,4}+h_{90,5}$, and because the matrix R follows binomial distribution, $S_{2h}$ also follows binomial distribution. $S_{2g}=g_{66,1}+g_{48,2}+g_{99,3}+g_{26,4}+g_{90,5}$, and because the matrix G follows binomial distribution, $S_{2g}$ also follows binomial distribution. When one of $S_{2h}$ and $S_{2g}$ is an even number, the at least a part of data in $W_{i2}[p_{i2}-169, p_{i2}]$ meets the preset condition $C_2$; when both $S_{2h}$ and $S_{2g}$ are odd numbers, the at least a part of data in $W_{i2}[p_{i2}-169, p_{i2}]$ does not meet the preset condition $C_2$. A probability that one of $S_{2h}$ and $S_{2g}$ is an even number is 3/4. In the embodiment shown in FIG. 5, the at least a part of data in $W_{i2}[p_{i2}-169, p_{i2}]$ meets the preset condition $C_2$. By using the same rule, separately, it is determined whether at least a part of data in $W_{i3}[p_{i3}-169, p_{i3}]$ meets a preset condition $C_3$, it is determined whether at least a part of data in $W_{i4}[p_{i4}-169, p_{i4}]$ meets a preset condition $C_4$, it is determined whether at least a part of data in $W_{i5}[p_{i5}-169, p_{i5}]$ meets a preset condition $C_5$, it is determined whether at least a part of data in $W_{i6}[p_{i6}-169, p_{i6}]$ meets a preset condition $C_6$, it is determined whether at least a part of data in $W_{i7}[p_{i7}-169, p_{i7}]$ meets a preset condition $C_7$, it is determined whether at least a part of data in $W_{i8}[p_{i8}-169, p_{i8}]$ meets a preset condition $C_8$, it is determined whether at least a part of data in $W_{i9}[p_{i9}-169, p_{i9}]$ meets a preset condition $C_9$, it is determined whether at least a part of data in $W_{i10}[p_{i10}-169, p_{i10}]$ meets a preset condition $C_{10}$, and it is determined whether at least a part of data in $W_{i11}[p_{i11}-169, p_{i11}]$ meets a preset condition $C_{11}$. In the implementation manner shown in FIG. 5, the at least a part of data in $W_{i5}[p_{i5}-169, p_{i5}]$ does not meet the preset condition $C_5$, 11 bytes are skipped from a point $p_{i5}$ along a direction of searching for a data stream dividing point, and a current potential dividing point $k_j$ is obtained at an end position of an 11th byte. As shown in FIG. 6, according to the rule preset on the deduplication server 103, a point $p_{j1}$ and a window $W_{j1}[p_{j1}-169, p_{j1}]$ corresponding to the point $p_{11}$ are determined for the potential dividing point $k_j$. A manner of determining whether at least a part of data in the window $W_{i1}[p_{i1}-169, p_{i1}]$ meets the preset condition $C_1$ is the same as a manner of determining whether at least a part of data in the window $W_{i1}[p_{i1}-169, p_{i1}]$ meets the preset condition $C_1$. Therefore, as shown in FIG. 17, $W_{j1}$ represents the window $W_{i1}[p_{i1}-169, p_{i1}]$, and it is determined whether the at least a part of data in $W_{i1}[p_{i1}-169, p_{i1}]$ meets the preset condition $C_1$. In FIG. 17, each of bytes "■" whose sequence numbers are 169, 127, 85, 43, and 1 represents 1 selected byte, and there are 42 bytes between two adjacent selected bytes. The bytes "■" whose sequence numbers are 169, 127, 85, 43, and 1 are converted into decimal values that are represented as $a_1'$, $a_2'$, $a_3'$, $a_4'$, and $a_5'$ respectively. Because 1 byte is formed by 8 bits, each byte "■" serves as a value, and any $a_s'$ of $a_1'$, $a_2'$, $a_3'$, $a_4'$, and $a_5'$ meets $0 \leq a_s' \leq 255$. $a_1'$, $a_2'$, $a_3'$, $a_4'$, and $a_5'$ form a 1*5 matrix. The matrices R and G the same as those used when it is determined whether the at least a part of data in the window $W_{i1}[p_{i1}-169, p_{i1}]$ meets the preset condition $C_1$ are used, and are represented as:

$$\begin{pmatrix} h_{0,1} & h_{0,2} & L & h_{0,5} \\ h_{1,1} & h_{1,2} & L & h_{1,5} \\ M & M & M & M \\ h_{255,5} & h_{255,5} & L & h_{255,5} \end{pmatrix} \text{ and } \begin{pmatrix} g_{0,1} & g_{0,2} & L & g_{0,5} \\ g_{1,1} & g_{1,2} & L & g_{1,5} \\ M & M & M & M \\ g_{255,5} & g_{255,5} & L & g_{255,5} \end{pmatrix}$$

respectively.

According to the value of $a_1'$ and a column in which $a_1'$ is located, for example, $a_1'=16$, and $a_1'$ is located in a 1st column, the matrix R is searched for a value corresponding to $h_{16,1}$, and the matrix G is searched for a value corresponding to $g_{16,1}$. According to the value of $a_2'$ and a column in which $a_2'$ is located, for example, $a_2'=98$, and $a_2'$ is located in a 2nd column, the matrix R is searched for a value corresponding to $h_{98,2}$, and the matrix G is searched for a value corresponding to $g_{98,2}$. According to the value of $a_3'$ and a column in which $a_3'$ is located, for example, $a_3'=56$, and $a_3'$ is located in a 3rd column, the matrix R is searched for a value corresponding to $h_{56,3}$, and the matrix G is searched for a value corresponding to $g_{56,3}$. According to the value of $a_4'$ and a column in which $a_4'$ is located, for example, $a_4'=36$, and $a_4'$ is located in a 4th column, the matrix R is searched for a value corresponding to $h_{36,4}$, and the matrix G is searched for a value corresponding to $g_{36,4}$. According to the value of $a_5'$ and a column in which $a_5'$ is located, for example, $a_5'=99$, and $a_5'$ is located in a 5th column, the matrix R is searched for a value corresponding to $h_{99,5}$, and the matrix G is searched for a value corresponding to $g_{99,5}$. $S_{1h}'=h_{16,1}+h_{98,2}+h_{56,3}+h_{36,4}+h_{99,5}$, and because the matrix R follows binomial distribution, $S_{1h}'$ also follows binomial distribution. $S_{1g}'=g_{16,1}+g_{98,2}\ g_{56,3}+g_{36,4}\ g_{99,5}$, and because the matrix G follows binomial distribution, $S_{1g}'$ also follows binomial distribution. When one of $S_{1h}'$ and $S_{1g}'$ is an even number, the at least a part of data in $W_{j1}[p_{j1}-169, p_{j1}]$ meets the preset condition $C_1$; when both $S_{1h}'$ and $S_{1g}'$ are odd numbers, the at least a part of data in $W_{j1}[p_{j1}-169, p_{j1}]$ does not meet the preset condition $C_1$. A probability that one of $S_{1h}'$ and $S_{1g}'$ is an even number is 3/4.

A manner of determining whether at least a part of data in $W_{i2}[p_{i2}-169, p_{i2}]$ meets the preset condition $C_2$ is the same as a manner of determining whether at least a part of data in $W_{j2}[p_{j2}-169, p_{j2}]$ meets the preset condition $C_2$. Therefore, as shown in FIG. 17, "▨" represents 1 byte selected when it is determined whether the at least a part of data in the window $W_{j2}[p_{j2}-169, p_{j2}]$ meets the preset condition $C_2$, and there are 42 bytes between two adjacent selected bytes. In FIG. 17, selected bytes are represented as sequence numbers 170, 128, 86, 44, and 2 separately, and there are 42 bytes between two adjacent selected bytes. The bytes "▨" whose sequence numbers are 170, 128, 86, 44, and 2 are converted into decimal values that are represented as $b_1'$, $b_2'$, $b_3'$, $b_4'$, and $b_5'$ respectively. Because 1 byte is formed by 8 bits, each byte "▨" serves as a value, and any $b_s'$ of $b_1'$, $b_2'$, $b_3'$, and $b_5'$ meets $0 \leq b_s' \leq 255$. $b_1'$, $b_2'$, $b_3'$, $b_4'$, and $b_5'$ form a 1*5 matrix. The matrices R and G the same as those used when it is determined whether the at least a part of data in the window $W_{i2}[p_{i2}-169, p_{i2}]$ meets the preset condition $C_2$ are used. According to the value of $b_1'$ and a column in which $b_1'$ is located, for example, $b_1'=210$, and $b_1'$ is located in a 1st column, the matrix R is searched for a value corresponding to $h_{210,1}$, and the matrix G is searched for a value corresponding to $g_{210,1}$. According to the value of $b_2'$ and a column in which $b_2'$ is located, for example, $b_2'=156$, and $b_2'$ is located in a 2nd column, the matrix R is searched for a value corresponding to $h_{156,2}$, and the matrix G is searched for a value corresponding to $g_{156,2}$. According to the value of $b_3'$ and a column in which $b_3'$ is located, for example, $b_3'=144$, and $b_3'$ is located in a 3rd column, the matrix R is searched for a value corresponding to $h_{144,3}$ and the matrix G is searched for a value corresponding to $g_{144,3}$. According to the value of $b_4'$ and a column in which $b_4'$ is located, for example, $b_4=60$, and $b_4'$ is located in a 4th column, the matrix R is searched for a value corresponding to $h_{60,4}$, and the matrix G is searched for a value corresponding to $g_{60,4}$. According to the value of $b_5'$ and a column in which $b_5'$ is located, for example, $b_5'=90$, and $b_5'$ is located in a 5th column, the matrix R is searched for a value corresponding to $h_{90,5}$, and the matrix G is searched for a value corresponding to $g_{90,5}$. $S_{2h}'=h_{210,1}+h_{156,2}+h_{144,3}+h_{60,4}+h_{90,5}$, $S_{2g}'=g_{210,1}+g_{156,2}+g_{144,3}+g_{60,4}+g_{90,5}$. When one of $S_{2h}'$ and $S_{2g}'$ is an even number, the at least a part of data in $W_{j2}[p_{j2}-169, p_{j2}]$ meets the preset condition $C_2$; when both $S_{2h}'$ and $S_{2g}'$ are odd numbers, the at least a part of data in $W_{j2}[p_{j2}-169, p_{j2}]$ does not meet the preset condition $C_2$. A probability that one of $S_{2h}'$ and $S_{2g}'$ is an even number is 3/4.

Similarly, a manner of determining whether at least a part of data in $W_{i3}[p_{i3}-169, p_{i3}]$ meets the preset condition $C_3$ is the same as a manner of determining whether at least a part of data in $W_{j3}[p_{j3}-169, p_{j3}]$ meets the preset condition $C_3$. Similarly, it is determined whether at least a part of data in $W_{j4}[p_{j4}-169, p_{j4}]$ meets the preset condition $C_4$, it is determined whether at least a part of data in $W_{j5}[p_{j5}-169, p_{j5}]$ meets the preset condition $C_5$, it is determined whether at least a part of data in $W_{j6}[p_{j6}-169, p_{j6}]$ meets the preset condition $C_6$, it is determined whether at least a part of data in $W_{j7}[p_{j7}-169, p_{j7}]$ meets the preset condition $C_7$, it is determined whether at least a part of data in $W_{j8}[p_{j8}-169, p_{j8}]$ meets the preset condition $C_8$, it is determined whether at least a part of data in $W_{j9}[p_{j9}-169, p_{j9}]$ meets the preset condition $C_9$, it is determined whether at least a part of data in $W_{j10}[p_{j10}-169, p_{j10}]$ meets the preset condition $C_{10}$, and it is determined whether at least a part of data in $W_{j11}[p_{j11}-169, p_{j11}]$ meets the preset condition $C_{11}$, which are not described herein again.

Using the implementation manner shown in FIG. 5 as an example, a method for determining whether at least a part of data in a window $W_{iz}[p_{iz}-A_z, p_{iz}+B_z]$ meets a preset condition $C_z$ is provided. In this embodiment, it is determined, by using a random function, whether the at least a part of data in the window $W_{iz}[p_{iz}-A_z, p_{iz}+B_z]$ meets the preset condition $C_z$. According to a rule preset on a deduplication server 103, a point $p_{i1}$ and a window $W_{i1}[p_{i1}-169, p_{i1}]$ corresponding to $p_{i1}$ are determined for a potential dividing point and it is determined whether at least a part of data in $W_{i1}[p_{i1}-169, p_{i1}]$ meets a preset condition $C_1$. As shown in FIG. 16, $W_{i1}$ represents the window $W_{i1}[p_{i1}-169, p_{i1}]$, and 5 bytes are selected to determine whether the at least a part of data in $W_{i1}[p_{i1}-169, p_{i1}]$ meets the preset condition $C_1$. In FIG. 16, each of bytes "■" whose sequence numbers are 169, 127, 85, 43, and 1 represents 1 selected byte, and there are 42 bytes between two adjacent selected bytes. The bytes "■" whose sequence numbers are 169, 127, 85, 43, and 1 are regarded as 40 sequential bits, which are represented as $a_1, a_2, a_3, a_4, \ldots,$ and $a_{40}$ separately. For any $a_t$ of $a_1, a_2, a_3, a_4, \ldots,$ and $a_{40}$, when $a_t=0$, $V_{at}=-1$, and when $a_t=1$, $V_{at}=1$.

According to a correspondence between $a_t$ and $V_{at}$, $V_{a1}$, $V_{a2}$, $V_{a3}$, $V_{a4}$, and $V_{a40}$ are generated. 40 random numbers are selected from random numbers that follow normal distribution, and are represented as: $h_1$, $h_2$, $h_3$, $h_4$, . . . , and $h_{40}$ separately. $S_a = V_{a1}*h_1 + V_{a2}*h_2 + V_{a3}*h_3 + V_{a4}*h_4 + \ldots + V_{a40}*h_{40}$ Because $h_1$, $h_2$, $h_3$, $h_4$, . . . , and $h_{40}$ follow normal distribution, $S_a$ also follows normal distribution. When $S_a$ is a positive number, the at least a part of data in $W_{i1}[p_{i1}-169, p_{i1}]$ meets the preset condition $C_1$; when $S_a$ is a negative number or 0, the at least a part of data in $W_{i1}[p_{i1}-169, p_{i1}]$ does not meet the preset condition $C_1$. A probability that $S_a$ is a positive number is 1/2. In the embodiment shown in FIG. 5, the at least a part of data in $W_{i1}[p_{i1}-169, p_{i1}]$ meets the preset condition $C_1$. As shown in FIG. 16, "▨" represents 1 byte separately selected when it is determined whether at least a part of data in a window $W_{i2}[p_{i2}-169, p_{i2}]$ meets a preset condition $C_2$. In FIG. 16, selected bytes are represented as sequence numbers 170, 128, 86, 44, and 2 separately, and there are 42 bytes between two adjacent selected bytes. The bytes "▨" whose sequence numbers are 170, 128, 86, 44, and 2 are regarded as 40 sequential bits, which are represented as $b_1$, $b_2$, $b_3$, $b_4$, . . . , and $b_{40}$ separately. For any $b_t$ of $b_1$, $b_2$, $b_3$, $b_4$, . . . , and $b_{40}$, when $b_t=0$, $V_{bt}=-1$, and when $b_t=1$, $V_{bt}=1$. $V_{b3}$, $V_{b2}$, $V_{b3}$, $V_{b4}$, . . . , and $V_{b40}$ are generated according to a correspondence between $b_t$ and $V_{bt}$. A manner of determining whether at least a part of data in the window $W_{i1}[p_{i1}-169, p_{i1}]$ meets the preset condition $C_1$ is the same as a manner of determining whether at least a part of data in the window $W_{i2}[p_{i2}-169, p_{i2}]$ meets the preset condition $C_2$, and therefore, the same random numbers are used: $h_1$, $h_2$, $h_3$, $h_4$, . . . , and $h_{40}$. $S_b = V_{b1}*h_1 + V_{b2}*h_2 + V_{b3}*h_3\ V_{b4}*h_4 + \ldots + V_{b40}*h_{40}$. Because $h_1$, $h_2$, $h_3$, $h_4$, . . . , and $h_{40}$ follow normal distribution, $S_b$ also follows normal distribution. When $S_b$ is a positive number, the at least a part of data in $W_{i2}[p_{i2}-169, p_{i2}]$ meets the preset condition $C_2$; when $S_b$ is a negative number or 0, the at least a part of data in $W_{i2}[p_{i2}-169, p_{i2}]$ does not meet the preset condition $C_2$. A probability that $S_b$ is a positive number is 1/2. In the embodiment shown in FIG. 5, the at least a part of data in $W_{i2}[p_{i2}-169, p_{i2}]$ meets the preset condition $C_2$. By using the same rule, separately, it is determined whether at least a part of data in $W_{i3}[p_{i3}-169, p_{i3}]$ meets a preset condition $C_3$, it is determined whether at least a part of data in $W_{i4}[p_{i4}-169, p_{i4}]$ meets a preset condition $C_4$, it is determined whether at least a part of data in $W_{i5}[p_{i5}-169, p_{i5}]$ meets a preset condition $C_5$, it is determined whether at least a part of data in $W_{i6}[p_{i6}-169, p_{i6}]$ meets a preset condition $C_6$, it is determined whether at least a part of data in $W_{i7}[p_{i7}-169, p_{i7}]$ meets a preset condition $C_7$, it is determined whether at least a part of data in $W_{i8}[p_{i8}-169, p_{i8}]$ meets a preset condition $C_8$, it is determined whether at least a part of data in $W_{i9}[p_{i9}-169, p_{i9}]$ meets a preset condition $C_9$, it is determined whether at least a part of data in $W_{i10}[p_{i10}-169, p_{i10}]$ meets a preset condition $C_{10}$, and it is determined whether at least a part of data in $W_{i11}[p_{i11}-169, p_{i11}]$ meets a preset condition $C_{11}$. In the implementation manner shown in FIG. 5, the at least a part of data in $W_{i5}[p_{i5}-169, p_{i5}]$ does not meet the preset condition $C_5$, 11 bytes are skipped from a point $p_{i5}$ along a direction of searching for a data stream dividing point, and a current potential dividing point $k_j$ is obtained at an end position of an 11th byte. As shown in FIG. 6, according to the rule preset on the deduplication server 103, a point $p_{j1}$ and a window $W_{j1}[p_{j1}-169, p_{j1}]$ corresponding to the point $p_{j1}$ are determined for the potential dividing point $k_j$. A manner of determining whether at least a part of data in the window $W_{j1}[p_{j1}-169, p_{j1}]$ meets the preset condition $C_1$ is the same as the manner of determining whether at least a part of data in the window $W_{i1}[p_{i1}-169, p_{i1}]$ meets the preset condition $C_1$. Therefore, as shown in FIG. 17, $W_{j1}$ represents the window $W_{j1}[p_{j1}-169, p_{j1}]$, and 5 bytes are selected to determine whether the at least a part of data in $W_{j1}[p_{j1}-169, p_{j1}]$ meets the preset condition $C_1$. In FIG. 17, each of bytes "■" whose sequence numbers are 169, 127, 85, 43, and 1 represents 1 selected byte, and there are 42 bytes between two adjacent selected bytes. The bytes "■" whose sequence numbers are 169, 127, 85, 43, and 1 are regarded as 40 sequential bits, which are represented as $a_1'$, $a_2'$, $a_3'$, $a_4'$, . . . , and $a_{40}'$ separately. For any $a_t'$ of $a_1'$, $a_2'$, $a_3'$, $a_4'$, . . . , and $a_{40}'$, when $a_t'=0$, $V_{at}'=-1$, and when $a_t'=1$, $V_{at}'=1$. $V_{a1}'$, $V_{a2}'$, $V_{a3}'$, $V_{a4}'$, . . . , and $V_{40}'$ are generated according to a correspondence between $a_t'$ and $V_{at}'$. The manner of determining whether at least a part of data in the window $W_{j1}[p_{j1}-169, p_{j1}]$ meets the preset condition $C_1$ is the same as the manner of determining whether at least a part of data in the window $W_{i1}[p_{i1}-169, p_{i1}]$ meets the preset condition $C_1$, and therefore, the same random numbers are used: $h_1$, $h_2$, $h_3$, $h_4$, . . . , and $h_{40}$. $S_a' = V_{a1}'*h_1 + V_{a2}'*h_2 + V_{a3}'*h_3 + V_{a4}'*h_4 + \ldots + V_{a40}'*h_{40}$. Because $h_1$, $h_2$, $h_3$, $h_4$, . . . , and $h_{40}$ follow normal distribution, $S_a'$ also follows normal distribution. When $S_a'$ is a positive number, the at least a part of data in $W_{j1}[p_{j1}-169, p_{j1}]$ meets the preset condition $C_1$; when $S_a'$ is a negative number or 0, the at least a part of data in $W_{j1}[p_{j1}-169, p_{j1}]$ does not meet the preset condition $C_1$. A probability that $S_a'$ is a positive number is 1/2.

The manner of determining whether at least a part of data in $W_{j2}[p_{j2}-169, p_{j2}]$ meets the preset condition $C_2$ is the same as a manner of determining whether at least a part of data in $W_{j2}[p_{j2}-169, p_{j2}]$ meets the preset condition $C_2$. Therefore, as shown in FIG. 17, "▨" represents 1 byte selected when it is determined whether the at least a part of data in the window $W_{j2}[p_{j2}-169, p_{j2}]$ meets the preset condition $C_2$, and there are 42 bytes between two adjacent selected bytes. In FIG. 17, selected bytes are represented as sequence numbers 170, 128, 86, 44, and 2 separately, and there are 42 bytes between two adjacent selected bytes. The bytes "▨" whose sequence numbers are 170, 128, 86, 44, and 2 are regarded as 40 sequential bits, which are represented as $b_1'$, $b_2'$, $b_3'$, $b_4'$, . . . , and $b_{40}'$ separately. For any $b_t'$ of $b_1'$, $b_2'$, $b_3'$, $b_4'$, . . . , and $b_{40}'$, when $b_t'=0$, $V_{bt}'=-1$, and when $b_t'=1$, $V_{bt}'=1$. $V_{b1}'$, $V_{b2}'$, $V_{b3}'$, $V_{b4}'$, . . . , and $V_{b40}'$ are generated according to a correspondence between $b_t'$ and $V_{bt}'$. The manner of determining whether at least a part of data in $W_{j2}[p_{j2}-169, p_{j2}]$ meets the preset condition $C_2$ is the same as the manner of determining whether at least a part of data in $W_{j2}[p_{j2}-169, p_{j2}]$ meets the preset condition $C_2$, and therefore, the same random numbers are used: $h_1$, $h_2$, $h_3$, $h_4$, . . . , and $h_{40}$. $S_b' = V_{b1}'*h_1 + V_{b2}'*h_2 + V_{b3}'*\ h_3\ V_{b4}'*h_4 + \ldots + V_{b40}'*h_{40}$. Because $h_1$, $h_2$, $h_3$, $h_4$, . . . , and $h_{40}$ follow normal distribution, $S_b'$ also follows normal distribution. When $S_b'$ is a positive number, the at least a part of data in $W_{j2}[p_{j2}-169, p_{j2}]$ meets the preset condition $C_2$; when $S_b'$ is a negative number or 0, the at least a part of data in $W_{j2}[p_{j2}-169, p_{j2}]$ does not meet the preset condition $C_2$. A probability that $S_b'$ is a positive number is 1/2.

Similarly, a manner of determining whether at least a part of data in $W_{j3}[p_{j3}-169, p_{j3}]$ meets the preset condition $C_3$ is the same as a manner of determining whether at least a part of data in $W_{j3}[p_{j3}-169, p_{j3}]$ meets the preset condition $C_3$. Similarly, it is determined whether at least a part of data in $W_{j4}[p_{j4}-169, p_{j4}]$ meets the preset condition $C_4$, it is determined whether at least a part of data in $W_{j5}[p_{j5}-169, p_{j5}]$ meets the preset condition $C_5$, it is determined whether at least a part of data in $W_{j6}[p_{j6}-169, p_{j6}]$ meets the preset condition $C_6$, it is determined whether at least a part of data in $W_{j7}[p_{j7}-169, p_{j7}]$ meets the preset condition $C_7$, it is determined whether at least a part of data in $W_{j8}[p_{j8}-169, p_{j8}]$ meets the preset condition $C_8$, it is determined whether at least a part of data in $W_{j9}[p_{j9}-169, p_{j9}]$ meets the preset condition $C_9$, it is determined whether at least a part of data in $W_{j10}[p_{j10}-169, p_{j10}]$ meets the preset condition $C_{10}$, and it is determined whether at least a part of data in $W_{j11}[p_{j11}-169, p_{j11}]$ meets the preset condition $C_{11}$, which are not described herein again.

Still using the implementation manner shown in FIG. 5 as an example, a method for determining whether at least a part of data in a window $W_{iz}[p_{iz}-A_z, p_{iz}+B_z]$ meets a preset condition $C_z$ is provided. In this embodiment, it is determined, by using a random function, whether the at least a part of data in the window $W_{iz}[p_{iz}-A_z, p_{iz}+B_z]$ meets the preset condition $C_z$. According to a rule preset on a deduplication server 103, a point $p_{i1}$ and a window $W_{i1}[p_{i1}-169, p_{i1}]$ corresponding to $p_{i1}$ are determined for a potential dividing point $k_i$, and it is determined whether at least a part of data in $W_{i1}[p_{i1}-169, p_{i1}]$ meets a preset condition $C_1$. As shown in FIG. 16, $W_{i1}$ represents the window $W_{i1}[p_{i1}-169, p_{i1}]$, and 5 bytes are selected to determine whether the at least a part of data in $W_{i1}[p_{i1}-169, p_{i1}]$ meets the preset condition $C_1$. In FIG. 16, each of bytes "■" whose sequence numbers are 169, 127, 85, 43, and 1 represents 1 selected byte, and there are 42 bytes between two adjacent selected bytes. Each of the bytes "■" whose sequence numbers are 169, 127, 85, 43, and 1 is converted into 1 decimal number, the range of which is 0-(2^40-1). An even distribution random number generator is used to generate 1 designated value for each decimal number in 0-(2^40-1), and a correspondence R between each decimal number in 0-(2^40-1) and the designated value is recorded. Once being designated, a designated value corresponding to a decimal number remains unchanged, and the designated value follows even distribution. If the designated value is an even number, the at least a part of data in $W_{i1}[p_{i1}-169, p_{i1}]$ meets the preset condition $C_1$; if the designated value is an odd number, the at least a part of data in $W_{i1}[p_{i1}-169, p_{i1}]$ does not meet the preset condition $C_1$. $C_1$ represents that the designated value obtained according to the foregoing method is an even number. Because a probability that a random number in even distribution is an even number is 1/2, a probability that the at least a part of data in $W_{i1}[p_{i1}-169, p_{i1}]$ meets the preset condition $C_1$ is 1/2. In the implementation manner shown in FIG. 5, by using the same rule, separately, it is determined whether at least a part of data in $W_{i2}[p_{i2}-169, p_{i2}]$ meets a preset condition $C_2$, it is determined whether at least a part of data in $W_{i3}[p_{i3}-169, p_{i3}]$ meets a preset condition $C_3$, it is determined whether at least a part of data in $W_{i4}[p_{i4}-169, p_{i4}]$ meets a preset condition $C_4$, and it is determined whether at least a part of data in $W_{i5}[p_{i5}-169, p_{i5}]$ meets a preset condition $C_5$, which are not described herein again.

When the at least a part of data in $W_{i5}[p_{i5}-169, p_{i5}]$ does not meet the preset condition $C_5$, 11 bytes are skipped from a point $p_{i5}$ along a direction of searching for a data stream dividing point, and a current potential dividing point $k_j$ is obtained at an end position of an 11th byte. As shown in FIG. 6, according to the rule preset on the deduplication server 103, a point $p_{j1}$ and a window $W_{j1}[p_{j1}-169, p_{j1}]$ corresponding to the point $p_{j1}$ are determined for the potential dividing point $k_j$. A manner of determining whether at least a part of data in the window $W_{j1}[p_{j1}-169, p_{j1}]$ meets the preset condition $C_1$ is the same as a manner of determining whether at least a part of data in the window $W_{i1}[p_{i1}-169, p_{i1}]$ meets the preset condition $C_1$. Therefore, the same correspondence R between each decimal number in 0-(2^40-1) and a designated value is used. As shown in FIG. 17, $W_{j1}$ represents the window $W_{j1}[p_{j1}-169, p_{j1}]$ and 5 bytes are selected to determine whether the at least a part of data in $W_{j1}[p_{j1}-169, p_{j1}]$ meets the preset condition $C_1$. In FIG. 17, "■" represents 1 selected byte, and there are 42 bytes between two adjacent selected bytes "■". Each of bytes "■" whose sequence numbers are 169, 127, 85, 43, and 1 is converted into 1 decimal number, and R is searched for a designated value corresponding to the decimal number. If the designated value is an even number, the at least a part of data in $W_{j1}[p_{j1}-169, p_{j1}]$ meets the preset condition $C_1$; if the designated value is an odd number, the at least a part of data in $W_{j1}[p_{j1}-169, p_{j1}]$ does not meet the preset condition $C_1$. Because a probability that a random number in even distribution is an even number is 1/2, a probability that the at least a part of data in $W_{j1}[p_{j1}-169, p_{j1}]$ meets the preset condition $C_1$ is 1/2. Similarly, a manner of determining whether at least a part of data in $W_{i2}[p_{i2}-169, p_{i2}]$ meets the preset condition $C_2$ is the same as a manner of determining whether at least a part of data in $W_{j2}[p_{j2}-169, p_{j2}]$ meets the preset condition $C_2$, and a manner of determining whether at least a part of data in $W_{i3}[p_{i3}-169, p_{i3}]$ meets the preset condition $C_3$ is the same as a manner of determining whether at least a part of data in $W_{j3}[p_{j3}-169, p_{j3}]$ meets the preset condition $C_3$. Similarly, it is determined whether at least a part of data in $W_{j4}[p_{j4}-169, p_{j4}]$ meets the preset condition $C_4$, it is determined whether at least a part of data in $W_{j5}[p_{j5}-169, p_{j5}]$ meets the preset condition $C_5$, it is determined whether at least a part of data in $W_{j6}[p_{j6}-169, p_{j6}]$ meets a preset condition $C_6$, it is determined whether at least a part of data in $W_{j7}[p_{j7}-169, p_{j7}]$ meets a preset condition $C_7$, it is determined whether at least a part of data in $W_{j8}[p_{j8}-169, p_{j8}]$ meets a preset condition $C_8$, it is determined whether at least a part of data in $W_{j9}[p_{j9}-169, p_{j9}]$ meets a preset condition $C_9$, it is determined whether at least a part of data in $W_{j10}[p_{j10}-169, p_{j10}]$ meets a preset condition $C_{10}$, and it is determined whether at least a part of data in $W_{j11}[p_{j11}-169, p_{j11}]$ meets a preset condition $C_{11}$, which are not described herein again.

Figure 18:
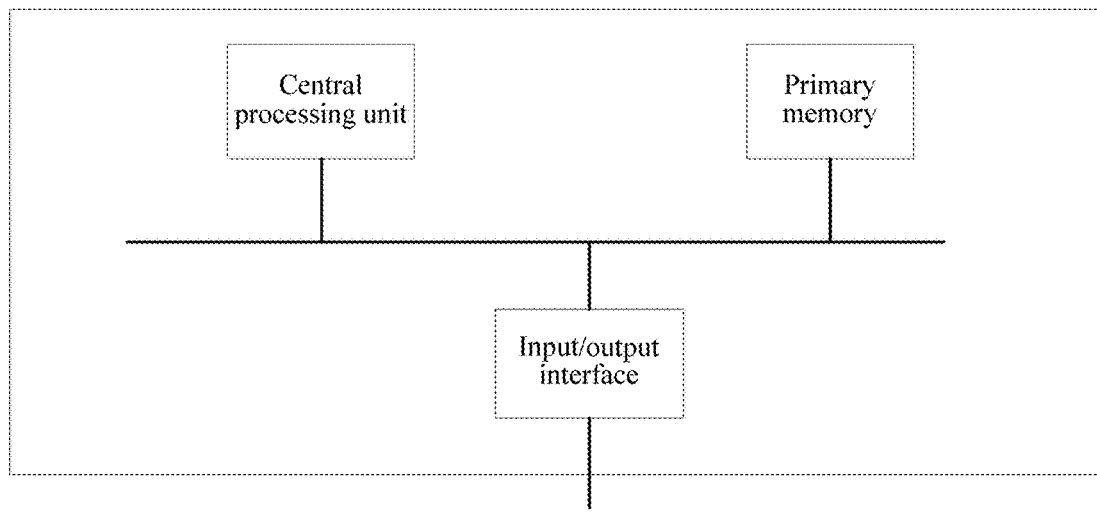
FIG. 18 is a structural diagram of a deduplication server.
Figure 19:
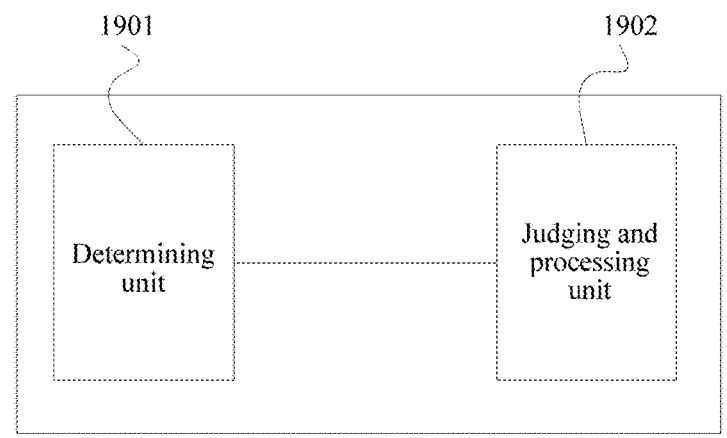
FIG. 19 is a structural diagram of a deduplication server.

The deduplication server 103 in the embodiment of the present invention shown in FIG. 1 refers to an apparatus that can implement a technical solution described in an embodiment of the present invention, and as shown in FIG. 18, usually includes a central processing unit, a primary memory, and an input/output interface. The central processing unit, the primary memory, and the input/output interface communicate with each other. The main memory stores an executable instruction, and the central processing unit executes the executable instruction stored in the primary memory, so as to perform a specific function, for example, searching for a data stream dividing point described in FIG. 4 to FIG. 17 in the embodiments of the present invention. Therefore, as shown in FIG. 19, according to the embodiments of the present invention shown in FIG. 4 to FIG. 17, for the deduplication server 103, a rule is preset on the deduplication server 103, where the rule is: for a potential dividing point k, determining M points $p_x$, a window $W_x[p_x-A_x, p_x+B_x]$ corresponding to the point $p_x$, and a preset condition $C_x$ corresponding to the window $W_x[p_x-A_x, p_x+B_x]$, where x indicates consecutive natural numbers from 1 to M, M≥2, and $A_x$ and $B_x$ are integers. The deduplication server 103 includes a determining unit 1901 and a judging and processing unit 1902. The determining unit 1901 is configured to perform step (a): (a) determining a point $p_{iz}$ and a window $W_{iz}[p_{iz}-A_z, p_{iz}+B_z]$ corresponding to the point $p_{iz}$ for a current potential dividing point $k_i$ according to the rule, where i and z are integers, and $1 \leq z \leq M$. The judging and processing unit 1902 is configured to: determine whether at least a part of data in the window $W_{iz}[p_{iz}-A_z, p_{iz}+B_z]$ meets a preset condition $C_z$;

when the at least a part of data in the window $W_{iz}[p_{iz}-A_z, p_{iz}+B_z]$ does not meet the preset condition $C_z$, skip N minimum units U for searching for a data stream dividing point from the point $p_{iz}$ along a direction of searching for a data stream dividing point, where N*U is not greater than $\|B_z\|+\max_x(\|A_x\|+\|(k_i-p_{ix})\|)$, so as to obtain a new potential dividing point, where the determining unit performs step (a) for the new potential dividing point; and when at least a part of data in each window $W_{ix}[p_{ix}-A_x, p_{ix}+B_x]$ of M windows of the current potential dividing point $k_i$ meets the preset condition $C_x$, select the current potential dividing point k as a data stream dividing point.

Further, the rule further includes that at least two points $p_e$ and $p_f$ meet conditions $A_e=A_f$, $B_e=B_f$, and $C_e=C_f$. Further, the rule further includes: relative to the potential dividing point k, the at least two points $p_e$ and $p_f$ are in a direction opposite to the direction of searching for a data stream dividing point.

Further, the rule further includes that a distance between the at least two points $p_e$ and $p_f$ is 1 U.

Further, the judging and processing unit 1902 is specifically configured to determine, by using a random function, whether the at least a part of data in the window $W_{iz}[p_{iz}-A_z, p_{iz}+B_z]$ meets the preset condition $C_z$. Specifically, the judging and processing unit 1902 is specifically configured to determine, by using a hash function, whether the at least a part of data in the window $W_{iz}[p_{iz}-A_z, p_{iz}+B_z]$ meets the preset condition $C_z$. Specifically, that the judging and processing unit 1902 is specifically configured to determine, by using a random function, whether the at least a part of data in the window $W_{iz}[p_{iz}-A_z, p_{iz}+B_z]$ meets the preset condition $C_z$ specifically includes:

selecting F bytes in the window $W_{iz}[p_{iz}-A_z, p_{iz}+B_z]$, and using the F bytes repeatedly H times to obtain F*H bytes in total, where $F \geq 1$, each byte is formed by 8 bits, which are denoted as $a_{m,1}, \ldots,$ and $a_{m,8}$, representing the 1st bit to the 8th bit of an mth byte in the F*H bytes, bits corresponding to the F*H bytes may be represented as:

$$\begin{pmatrix} a_{1,1} & a_{1,2} & \ldots & a_{1,8} \\ a_{2,1} & a_{2,2} & \ldots & a_{2,8} \\ M & M & M & M \\ a_{F*H,1} & a_{F*H,2} & \ldots & a_{F*H,8} \end{pmatrix},$$

where when $a_{m,n}=1$, $V_{am,n}=1$, and when $a_{m,n}=0$, $V_{am,n}=-1$, where $a_{m,n}$ represents any one of $a_{m,1}, \ldots,$ and $a_{m,8}$, matrix $V_a$ is obtained according to a conversion relationship between $a_{m,n}$ and $V_{am,n}$ from the bits corresponding to the F*H bytes, the matrix $V_a$ is represented as:

$$\begin{pmatrix} V_{a1,1} & V_{a1,2} & \wedge & V_{a1,8} \\ V_{a2,1} & V_{a2,2} & \wedge & V_{a2,8} \\ M & M & M & M \\ V_{aF*H,1} & V_{aF*H,2} & \wedge & V_{aF*H,8} \end{pmatrix},$$

F*H*8 random numbers are selected from random numbers following normal distribution to form a matrix R, the matrix R is represented as:

$$\begin{pmatrix} h_{1,1} & h_{1,2} & \ldots & h_{1,8} \\ h_{2,1} & h_{2,2} & \ldots & h_{2,8} \\ M & M & M & M \\ h_{F*H,1} & h_{F*H,2} & \ldots & h_{F*H,8} \end{pmatrix},$$

random numbers in an mth row of the matrix $V_a$ and an mth row of the matrix R are multiplied and products are added to obtain a value, which is specifically represented as $S_{am}=V_{am,1}*h_{m,1}+V_{am,2}*h_{m,2}+ \ldots +V_{am,8}*h_{m,8}$, $S_{a1}$, $S_{a2}, \ldots,$ and $S_{aF*H}$ are obtained in a same way, a quantity K of values greater than 0 among $S_{a1}, S_{a2}, \ldots,$ and $S_{aF*H}$ is counted, and when K is an even number, the at least a part of data in the window $W_{iz}[p_{iz}-A_z, p_{iz}+B_z]$ meets the preset condition $C_z$.

Further, the judging and processing unit 1902 is configured to: when the at least a part of data in the window $W_{iz}[p_{iz}-A_z, p_{iz}+B_z]$ does not meet the preset condition $C_z$, skip the N minimum units U for searching for a data stream dividing point from the point $p_{iz}$ along the direction of searching for a data stream dividing point, so as to obtain the new potential dividing point, and the determining unit 1901 performs step (a) for the new potential dividing point, where according to the rule, a left boundary of a window $W_{ic}[p_{ic}-A_c, p_{ic}+B_c]$ corresponding to a point $p_{ic}$ that is determined for the new potential dividing point coincides with a right boundary of the window $W_{iz}[p_{iz}-A_z, p_{iz}+B_z]$ or a left boundary of a window $W_{ic}[p_{ic}-A_c, p_{ic}+B_c]$ falls within a range of the window $W_{iz}[p_{iz}-A_z, p_{iz}+B_z]$, where the point $p_{ic}$ determined for the new potential dividing point is a point ranking the first in a sequence, which is obtained according to the direction of searching for a data stream dividing point, of M points that are determined for the new potential dividing point according to the rule.

According to the method for searching for a data stream dividing point based on a server in the embodiments of the present invention shown in FIG. 4 to FIG. 17, a point $p_{ix}$ and a window $W_{iz}[p_{iz}-A_z, p_{iz}+B_z]$ corresponding to the point $p_{ix}$ are determined for a potential dividing point $k_i$, where x indicates consecutive natural numbers from 1 to M separately, and $M \geq 2$. It may be determined in parallel whether at least a part of data in each window of M windows meets a preset condition $C_x$, or it may be determined sequentially whether at least a part of data in windows meets a preset condition, or it may be first determined that at least a part of data in a window $W_{i1}[p_{i1}-A_1, p_{i1}-B_1]$ meets a preset condition $C_1$, then it is determined that at least a part of data in $W_{i2}[p_{i2}-A_2, p_{i2}+B_2]$ meets a preset condition $C_2$, until it is determined that at least a part of data in $W_{im}[p_{im}-A_m, p_{im}+B_m]$ meets a preset condition $C_m$. Other windows in this embodiment are determined in a same manner as the above, which is not described again.

In addition, according to the embodiments of the present invention shown in FIG. 4 to FIG. 17, in actual applications, a rule is preset on the deduplication server 103, where the rule is: for a potential dividing point k, determining M points $p_x$, a window $W_x[p_x-A_x, p_x+B_x]$ corresponding to the point $p_x$, and a preset condition $C_x$ corresponding to the window $W_x[p_x-A_x, p_x+B_x]$, where x indicates consecutive natural numbers from 1 to M separately, and $M \geq 2$. In the preset rule, $A_1, A_2=A_3, \ldots,$ and $A_m$ may be not all equal, $B_1, B_2, B_3 \ldots,$ and $B_m$ may be not all equal, and $C_1, C_2, C_3 \ldots,$ and $C_M$ may also be not all the same. In the implementation manner shown in FIG. 5, for windows $W_{i1}[p_{i1}-169, p_{i1}]$, $W_{i2}[p_{i2}-169, p_{i2}]$, $W_{i3}[p_{i3}-169, p_{i3}]$, $W_{i4}[p_{i4}-169, p_{i4}]$, $W_{i5}[p_{i5}-169, p_{i5}]$, $W_{i6}[p_{i6}-169, p_{i6}]$, $W_{i7}[p_{i7}-169, p_{i7}]$, $W_{i8}$ $[p_{i8}-169, p_{i8}]$, $W_{i9}[p_{i9}-169, p_{i9}]$, $W_{i10}[p_{i10}-169, p_{i10}]$, and $W_{i11}[p_{i11}-169, p_{i11}]$, the windows are the same in size, that is, all the windows have a size of 169 bytes, and meanwhile manners of determining whether at least a part of data in a window meets a preset condition are also the same. For details, refer to the foregoing description of determining whether the at least a part of data in $W_{i1}[p_{i1}-169, p_{i1}]$ meets the preset condition $C_1$. However, in the implementation manner shown in FIG. 11, the windows $W_{i1}[p_{i1}-169, p_{i1}]$, $W_{i2}[p_{i2}-169, p_{i2}]$, $W_{i3}[p_{i3}-169, p_{i3}]$, $W_{i4}[p_{i4}-169, p_{i4}]$, $W_{i5}[p_{i5}-169, p_{i5}]$, $W_{i6}[p_{i6}-169, p_{i6}]$, $W_{i7}[p_{i7}-169, p_{i7}]$, $W_{i8}[p_{i8}-169, p_{i8}]$, $W_{i9}[p_{i9}-169, p_{i9}]$, $W_{i10}[p_{i10}-169, p_{i10}]$, and $W_{i11}[p_{i11}-169, p_{i11}]$ may be different in size, and meanwhile the manners of determining whether at least a part of data in a window meets a preset condition may also be different. In all the embodiments, according to the rule preset on the deduplication server 103, a manner of determining whether at least a part of data in the window $W_{i1}$ meets the preset condition $C_1$ is certainly the same as a manner of determining whether at least a part of data in a window $W_{j1}$ meets the preset condition $C_1$, a manner of determining whether at least a part of data in $W_{j2}$ meets the preset condition $C_2$ is certainly the same as a manner of determining whether at least a part of data in $W_{j2}$ meets the preset condition $C_2$ . . . , and a manner of determining whether at least a part of data in a window $W_{iM}$ meets a preset condition $C_M$ is certainly the same as a manner of determining whether at least a part of data in a window $W_{jM}$ meets the preset condition $C_M$, which are not described herein again. Meanwhile, according to the embodiments of the present invention shown in FIG. 4 to FIG. 17, although M=11 is used as an example, the value of M is not limited to 11 according to an actual requirement, and a person skilled in the art determines the value of M according to the description in the embodiments of the present invention.

According to the embodiments of the present invention shown in FIG. 4 to FIG. 17, the rule is preset on the deduplication server 103, $k_a$, $k_i$, $k_j$, $k_l$, and $k_m$ are potential dividing points obtained in the search for a dividing point along a direction of searching for a data stream dividing point, and $k_a$, $k_i$, $k_j$, $k_l$, and $k_m$ all follow the rule. The window $W_x[p_x-A_x, p_x+B_x]$ in this embodiment of the present invention represents a specific range, and data is selected in the specific range to determine whether the data meets the preset condition $C_x$. Specifically, in the specific range, a part of data may be selected or all data may be selected to determine whether the data meets the preset condition $C_x$. Reference may be made to the window $W_x[p_x-A_x, p_x+B_x]$ for the concept of a window specifically used in this embodiment of the present invention, which is not described herein again.

According to the embodiments of the present invention shown in FIG. 4 to FIG. 17, in the window $W_x[p_x-A_x, p_x+B_x]$, $(p_x-A_x)$ and $(p_x+B_x)$ represent two boundaries of the window $W_x[p_x-A_x, p_x+B_x]$, where $(p_x-A_x)$ represents a boundary, which is in a direction opposite to the direction of searching for a data stream dividing point relative to the point $p_x$, of the window $W_x[p_x-A_x, p_x+B_x]$, and $(p_x+B_x)$ represents a boundary, which is in the direction of searching for a data stream dividing point relative to the point $p_x$, of the window $W_x[p_x-A_x, p_x+B_x]$. Specifically, in the embodiment of the present invention, the direction of searching for a data stream dividing point shown in FIG. 3 to FIG. 15 is from left to right; therefore, $(p_x-A_x)$ represents a boundary (that is, a left boundary), which is in a direction opposite to the direction of searching for a data stream dividing point relative to the point $p_x$, of the window $W_x[p_x-A_x, p_x+B_x]$, and $(p_x+B_x)$ represents a boundary (that is, a right boundary), which is in the direction of searching for a data stream dividing point relative to the point $p_x$, of the window $W_x[p_x-A_x, p_x+B_x]$. If the direction of searching for a data stream dividing point shown in FIG. 3 to FIG. 15 is from right to left, $(p_x-A_x)$ represents a boundary (that is, a right boundary), which is in a direction opposite to the direction of searching for a data stream dividing point relative to the point $p_x$, of the window $W_x[p_x-A_x, p_x+B_x]$, and $(p_x+B_x)$ represents a boundary (that is, a left boundary), which is in the direction of searching for a data stream dividing point relative to the point $p_x$, of the window $W_x[p_x-A_x, p_x\pm B_x]$.

A person of ordinary skill in the art may be aware that, in conjunction with various exemplary units and algorithm steps described in the embodiments of the present invention, a key feature in the embodiments of the present invention may be combined with other technologies and presented in a more complex form; however, the key feature of the present invention is still included. An alternative dividing point may be used in a real environment. For example, in an implementation manner, according to a rule preset on a deduplication server 103, 11 points $p_x$ are determined for a potential dividing point $k_i$, where x indicates consecutive natural numbers from 1 to 11, and a window $W_x[p_x-A_x, p_x+B_x]$ corresponding to $p_x$ and a preset condition $C_x$ corresponding to the window $W_x[p_x-A_x, p_x+B_x]$ are determined. When at least a part of data in each window $W_x[p_x-A_x, p_x+B_x]$ of 11 windows meets the preset condition $C_x$, the potential dividing point is a data stream dividing point. When no dividing point is found when a set maximum data chunk is exceeded, a preset rule for the alternative point may be used in this case. The preset rule for the alternative point is similar to the rule preset on the deduplication server 103, and the preset rule for the alternative point is: for example, for a potential dividing point $k_i$, 10 points $p_x$ are determined, where x indicates consecutive natural numbers from 1 to 10, and a window W $W_x[p_x-A_x, p_x+B_x]$ corresponding to $p_x$ and a preset condition $C_x$ corresponding to the window $W_x[p_x-A_x, p_x+B_x]$ are determined. When at least a part of data in each window $W_x[p_x-A_x, p_x+B_x]$ of 10 windows meets the preset condition $C_x$, the potential dividing point is a data stream dividing point; when no data stream dividing point is found when a set maximum data chunk is exceeded, an end position of the maximum data chunk serves as a forced dividing point.

A rule is preset on the deduplication server 103, and in the rule, M points are determined for a potential dividing point k. It is not necessarily required that there be a potential dividing point k in advance, and the potential dividing point k may be determined by using the determined M points.

An embodiment of the present invention provides a method for searching for a data stream dividing point based on a deduplication server, which, as shown in FIG. 20, includes:

A rule is preset on a deduplication server 103, where the rule is: for a potential dividing point k, determining M windows $W_x[k-A_x, k+B_x]$ and a preset condition $C_x$ corresponding to the window $W_x[k-A_x, k+B_x]$, where x indicates consecutive natural numbers from 1 to M, M≥2, and 4, and B are integers. In the implementation manner shown in FIG. 3, about a value of M, in one implementation manner, a value of M*U is not greater than a preset maximum distance between two adjacent data stream dividing points, that is, a preset maximum length of a data chunk. It is determined whether at least a part of data in a window $W_z[k-A_z, k+B_z]$ meets a preset condition $C_z$, where, z is an integer, $1 \leq z \leq M$, and $(k-A_z)$ and $(k+B_z)$ separately represent two boundaries of the window $W_z$. When it is determined that at least a part of data in any one window $W_z[k-A_z, k+B_z]$ does not meet the preset condition $C_z$, N bytes are skipped from the potential dividing point k along a direction of searching for a data stream dividing point, where $N \leq \|B_z\| + \max_x(\|A_x\|)$. $\|B_z\|$ represents an absolute value of $B_z$ in $W_z[k-A_z, k+B_z]$, $\max_x(\|A_x\|)$ represents a maximum value among the absolute value of $A_x$ in the M windows, and a principle of determining a value of N is specifically introduced in the following embodiments. When it is determined that at least a part of data in each window $W_x[k-A_x, k+B_x]$ of the M windows meets the preset condition $C_x$, the potential dividing point k is a data stream dividing point.

Specifically, for a current potential dividing point k the following steps are performed according to the rule:

Step 2001: Determine a corresponding window $W_{iz}[k_i-A_z, k_i+B_z]$ for the current potential dividing point k, according to the rule, where i and z are integers, and $1 \leq z \leq M$.

Step 2002: Determine whether at least a part of data in the window $W_{iz}[k_i-A_z, k_i+B_z]$ meets the preset condition $C_z$;

when the at least a part of data in the window $W_{iz}[k_i-A_z, k_i+B_z]$ does not meet the preset condition $C_z$, skip N minimum units U for searching for a data stream dividing point from the current potential dividing point $k_i$ along the direction of searching for a data stream dividing point, where $N*U$ is not greater than $\|B_z\| + \max_x(\|A_x\|)$, so as to obtain a new potential dividing point, and perform step 2001; and when at least a part of data in each window $W_{iz}[k_i-A_z, k_i+B_z]$ of M windows of the current potential dividing point $k_i$ meets the preset condition $C_x$, select the current potential dividing point $k_i$ as a data stream dividing point.

Further, the rule further includes that at least two windows $W_{ie}[k_i-A_e, k_i+B_e]$ and $W_{if}[k_i-A_f, k_i+B_f]$ meet conditions $|A_e+B_e|=|A_f+B_f|$, and $C_e=C_f$. Further, the rule further includes that $A_e$ and $A_f$ are positive integers. Still further, the rule further includes $A_e-1=A_f$ and $B_e+1=B_1$. $|A_e+B_e|$ represents a size of the window $W_{ie}$, and $|A_1+B_f|$ represents a size of the window $W_{if}$.

Further, the determining whether at least a part of data in the window $W_{iz}[k_i-A_z, k_i+B_z]$ meets the preset condition $C_z$ specifically includes: determining, by using a random function, whether the at least a part of data in the window $W_{iz}[k_i-A_z, k_i+B_z]$ meets the preset condition $C_z$. Still further, the determining, by using a random function, whether the at least a part of data in the window $W_{iz}[k_i-A_z, k_i+B_z]$ meets the preset condition $C_z$ is specifically: determining, by using a hash function, whether the at least a part of data in the window $W_{iz}[k_i-A_z, k_i+B_z]$ meets the preset condition $C_z$.

When the at least a part of data in the window $W_{iz}[k_i-A_z, k_i+B_z]$ does not meet the preset condition $C_z$, the N minimum units U for searching for a data stream dividing point are skipped from the current potential dividing point $k_i$ along the direction of searching for a data stream dividing point, so as to obtain the new potential dividing point. According to the rule, a left boundary of a window $W_{ic}[k_i-A_c, k_i+B_c]$ that is determined for the new potential dividing point coincides with a right boundary of the window $W_{iz}[k_i-A_z, k_i+B_z]$ or a left boundary of a window $W_{ic}[k_i-A_c, k_i+B_c]$ that is determined for the new potential dividing point falls within a range of the window $W_{iz}[k_i-A_z, k_i+B_z]$, where the window $W_{ic}[k_i-A_c, k_i+B_c]$ determined for the new potential dividing point is a window ranking the first in a sequence, which is obtained according to the direction of searching for a data stream dividing point, of M windows that are determined for the new potential dividing point according to the rule.

In this embodiment of the present invention, a data stream dividing point is searched for by determining whether at least a part of data in a window of M windows meets a preset condition, and when the at least a part of data in the window does not meet the preset condition, a length of $N*U$ is skipped, where $N*U$ is not greater than $\|B_z\| + \max_x(\|A_x\|)$, so as to obtain a next potential dividing point, thereby improving efficiency of searching for a data stream dividing point.

In a process of eliminating duplicate data, to ensure an even size of a data chunk, a size of an average data chunk (also referred to as an average chunk) is considered. That is, while limits on a size of a minimum data chunk and a size of a maximum data chunk are met, the size of the average data chunks is determined to ensure an even size of an obtained data chunk. A probability (represented as P(n)) of finding a data stream dividing point depends on two factors, that is, the quantity M of the windows $W_x[k-A_x, k+B_x]$ and a probability that at least a part of data in the window $W_x[k-A_x, k+B_x]$ meets a preset condition, where the former affects a length for skipping, the latter affects a probability of skipping, and the two together affect the size of the average chunk. Generally, when the size of the average chunk is fixed, as the quantity of $W_x[k-A_x, k+B_x]$ increases, the probability that at least a part of data in a single window $W_x[k-A_x, k+B_x]$, meets a preset condition also increases. For example, a rule is preset on the deduplication server 103, and the rule is: for a potential dividing point k, determining 11 windows $W_x[k-A_x, k+B_x]$, where x indicates consecutive natural numbers from 1 to 11 separately, and a probability that at least a part of data in any window $W_x[k-A_x, k+B_x]$ of the 11 windows meets a preset condition is 1/2. Another group of rules preset on the deduplication server 103 is: determining 24 windows $W_x[k-A_x, k+B_x]$ for the potential dividing point k, where x indicates consecutive natural numbers from 1 to 24 separately, and a probability that at least a part of data in any window $W_x[k-A_x, k+B_x]$ of the 24 windows meets the preset condition $C_x$ is 3/4. For the setting of a probability that at least a part of data in a specific window $W_x[k-A_x, k+B_x]$ meets a preset condition, reference may be made to the description of the part of determining whether at least a part of data in the window $W_x[k-A_x, k+B_x]$ meets a preset condition. P(n) depends on the two factors, that is, the quantity M of windows $W_x[k-A_x, k+B_x]$ and the probability that at least a part of data in the window $W_x[k-A_x, k+B_x]$ meets a preset condition, and P(n) represents: a probability that no data stream dividing point is found after n minimum units for searching for a data stream dividing point in a search from a start position or a previous data stream dividing point of a data stream. A process of calculating P(n) that depends on the two factors is actually an n-step Fibonacci sequence, which is described below in detail. After P(n) is obtained, 1−P(n) is a distribution function of a data stream dividing point, and $(1-P(n))-(1-P(n-1))=P(n-1)-P(n)$ is a probability that a data stream dividing point is found at a distance of n minimum units for searching for a data stream dividing point, that is, a density function of a data stream dividing point. Integration $$\sum_{n=4*1024}^{12*1024} n \times (P(n-1) - P(n))$$

may be performed according to the density function of a data stream dividing point, so as to obtain an expected length of a data stream dividing point, that is, the size of the average chunk, where 4*1024 (bytes) represents a length of the minimum data chunk, and 12*1024 (bytes) represents a length of the maximum data chunk.

Figure 22:
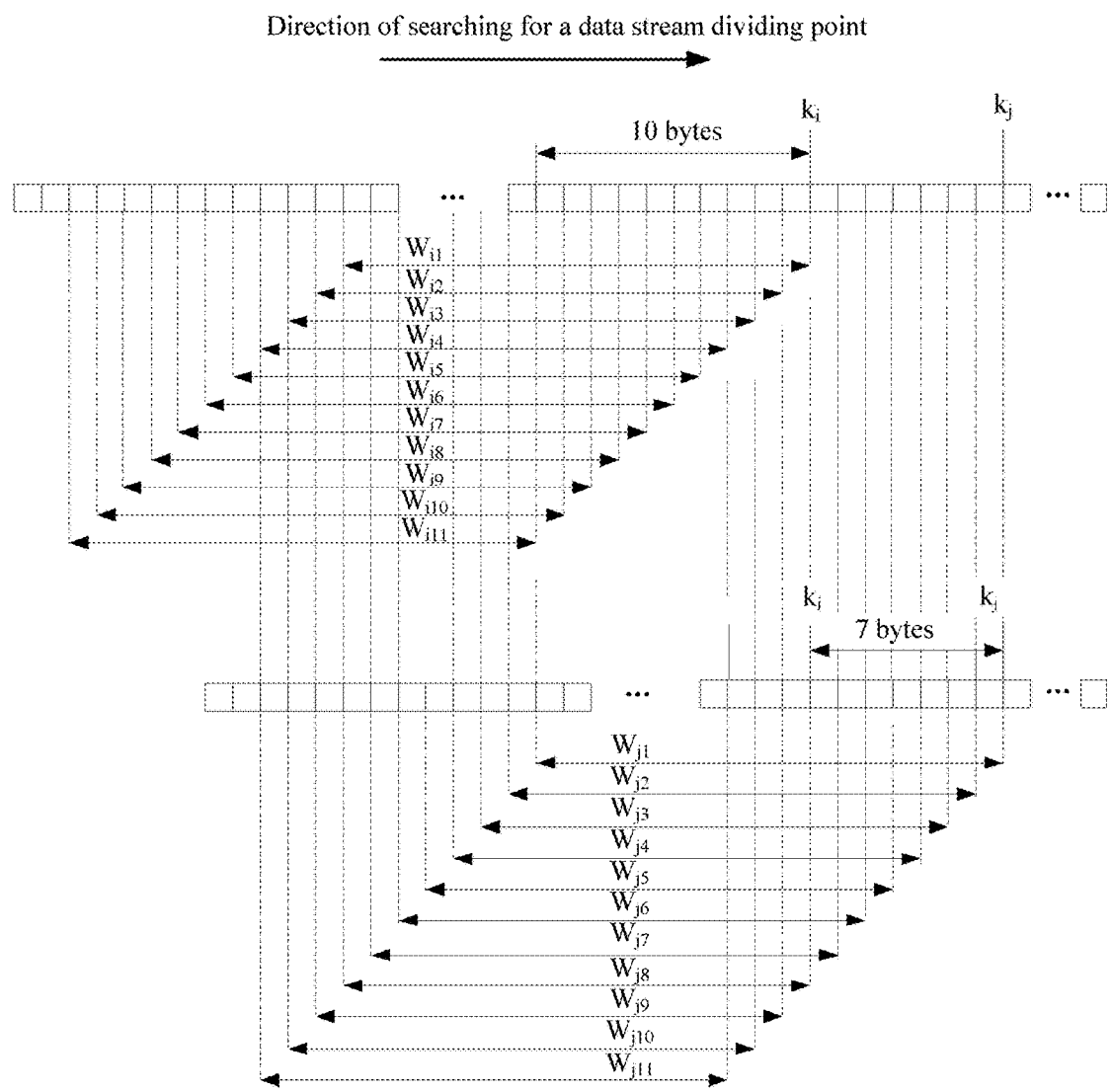

On the basis of the search for a data stream dividing point shown in FIG. 3, in an implementation manner shown in FIG. 21, a rule is preset on a deduplication server 103, where the rule is: for a potential dividing point k, determining 11 windows $W_x[k-A_x, k+B_x]$ and a preset condition $C_x$ corresponding to the window $W_x[k-A_x, k+B_x]$, where x indicates consecutive natural numbers from 1 to 11, and $A_x$ and $B_x$ are integers. $A_1=169$, $B_1=0$; $A_2=170$, $B_2=-1$; $A_3=171$, $B_3=-2$; $A_4=172$, $B_4=-3$; $A_5=173$, $B_5=-4$; $A_6=174$, $B_6=-5$; $A_7=175$, $B_7=-6$; $A_8=176$, $B_8=-7$; $A_9=177$, $B_9=-8$; $A_{10}=178$, $B_{10}=-9$; $A_{11}=179$, $B_{11}=-10$. $C_1=C_2=C_3=C_4=C_5=C_6=C_7=C_8=C_9=C_{10}=C_{11}$. Therefore, the 11 windows are $W_1[k-169, k]$, $W_2[k-170, k-1]$, $W_3[k-171, k-2]$, $W_4[k-172, k-3]$, $W_5[k-173, k-4]$, $W_6[k-174, k-5]$, $W_7[k-175, k-6]$, $W_8[k-176, k-7]$, $W_9[k-177, k-8]$, $W_{10}$, $[k-178, k-9]$, and $W_{11}[k-179, k-10]$. $k_a$ is a data stream dividing point, and a direction of searching for a data stream dividing point shown in FIG. 21 is from left to right. After a minimum data chunk of 4 KB is skipped from the data stream dividing point $k_a$, an end position of the minimum data chunk of 4 KB serves as a next potential dividing point $k_i$. According to the rule preset on the deduplication server 103, a window $W_{ix}[k_i-A_x, k_i+B_x]$ is determined for the potential dividing point $k_i$, and in this embodiment, x indicates consecutive natural numbers from 1 to 11 separately. In the implementation manner shown in FIG. 21, 11 windows are determined for the potential dividing point $k_i$, and are $W_{i1}[k_i-169, k_i]$, $W_{i2}[k_i-170, k_i-1]$, $W_{i3}[k_i-171, k_i-2]$, $W_{i4}[k_i-172, k_i-3]$, $W_{i5}[k_i-173, k_i-4]$, $W_{i6}[k_i-174, k_i-5]$, $W_{i7}[k_i-175, k_i-6]$, $W_{i8}[k_i-176, k_i-7]$, $W_{i9}[k_i-177, k_i-8]$, $W_{i10}[k_i-178, k_i-9]$, and $W_{i11}[k_i-179, k_i-10]$ separately. It is determined whether at least a part of data in $W_{i1}[k_i-169, k_i]$ meets the preset condition $C_1$, it is determined whether at least a part of data in $W_{i2}[k_i-170, k_i-1]$ meets the preset condition $C_2$, it is determined whether at least a part of data in $W_{i3}[k_i-171, k_i-2]$ meets the preset condition $C_3$, it is determined whether at least a part of data in $W_{i4}[k_i-172, k_i-3]$ meets the preset condition $C_4$, it is determined whether at least a part of data in $W_{i5}[k_i-173, k_i-4]$ meets the preset condition $C_5$, it is determined whether at least a part of data in $W_{i6}[k_i-174, k_i-5]$ meets the preset condition $C_6$, it is determined whether at least a part of data in $W_{i7}[k_i-175, k_i-6]$ meets the preset condition $C_7$, it is determined whether at least a part of data in $W_{i8}[k_i-176, k_i-7]$ meets the preset condition $C_8$, it is determined whether at least a part of data in $W_{i9}[k_i-177, k_i-8]$ meets the preset condition $C_9$, it is determined whether at least a part of data in $W_{i10}[k_i-178, k_i-9]$ meets the preset condition $C_{10}$, and it is determined whether at least a part of data in $W_{i11}[k_i-179, k_i-10]$ meets the preset condition $C_{11}$. When it is determined that the at least a part of data in the window $W_{i1}$ meets the preset condition $C_1$, the at least a part of data in the window $W_{i2}$ meets the preset condition $C_2$, the at least a part of data in the window $W_{i3}$ meets the preset condition $C_3$, the at least a part of data in the window $W_{i4}$ meets the preset condition $C_4$, the at least a part of data in the window $W_{i5}$ meets the preset condition $C_5$, the at least a part of data in the window $W_{i6}$ meets the preset condition $C_6$, the at least a part of data in the window $W_{i7}$ meets the preset condition $C_7$, the at least a part of data in the window $W_{i8}$ meets the preset condition $C_8$, the at least a part of data in the window $W_{i9}$ meets the preset condition $C_9$, the at least a part of data in the window $W_{i10}$ meets the preset condition $C_{10}$, and the at least a part of data in the window $W_{i11}$ meets the preset condition $C_{11}$, the current potential dividing point $k_i$ is a data stream dividing point. When the at least a part of data in any window of the 11 windows does not meet the corresponding preset condition, for example, $W_5[k_i-173, k_i-4]$ shown in FIG. 22, N bytes are skipped from the potential dividing point $k_i$ along the direction of searching for a data stream dividing point, where the N bytes are not greater than $\|B_5\|+\max_x(\|A_x\|)$. In an implementation manner shown in FIG. 22, the N bytes that are skipped are not greater than 183 bytes, and in this embodiment, N=7, so as to obtain a new potential dividing point. For differentiation from the potential dividing point $k_i$, the new potential dividing point here is represented as $k_j$ here. According to the implementation manner shown in FIG. 21, a rule is preset on the deduplication server 103, where the rule is: determining a window $W_{jx}[k_j-A_x, k_j+B_x]$ for the potential dividing point $k_j$, where in this embodiment, x indicates consecutive natural numbers from 1 to 11 separately. 11 windows are determined for the potential dividing point $k_j$, and are $W_{j1}[k_j-169, k_j]$, $W_{j2}[k_j-170, k_j-1]$, $W_{j3}[k_j-171, k_j-2]$, $W_{j4}[k_j-172, k_j-3]$, $W_{j5}[k_j-173, k_j-4]$, $W_{j6}[k_j-174, k_j-5]$, $W_{j7}[k_j-175, k_j-6]$, $W_{j8}[k_j-176, k_j-7]$, $W_{j9}[k_j-177, k_j-8]$, $W_{j10}[k_j-178, k_j-9]$, and $W_{j11}[k_j-179, k_j-10]$ separately. As shown in FIG. 22, when the 11th window $W_{j11}[k_j-179, k_j-10]$ is determined for the potential dividing point, to ensure that a range between the potential dividing point $k_i$ and the potential dividing point $k_j$ completely falls within a determining range, in this implementation manner, it may be ensured that a left boundary of the window $W_{j11}[k_j-179, k_j-10]$ coincides with a right boundary $(k_i-4)$ of the window $W_{i5}[k_i-173, k_i-4]$, or falls within a range of the window $W_{i5}[k_i-173, k_i-4]$, where the window $W_{j11}[k_j-179, k_j-10]$ is a window ranking the first in a sequence, which is obtained according to the direction of searching for a data stream dividing point, of the 11 windows that are determined for the potential dividing point $k_j$ according to the rule. Therefore, within such a limit, when at least a part of data in the window $W_{i5}[k_i-173, k_i-4]$ does not meet the preset condition $C_5$, a distance for skipping from the potential dividing point $k_i$ along the direction of searching for a data stream dividing point is not greater than $\|B_5\|+\max_x(\|A_x\|)$. It is determined whether at least a part of data in $W_{j1}[k_j-169, k_j]$ meets the preset condition $C_1$, it is determined whether at least a part of data in $W_{j2}[k_j-170, k_j-1]$ meets the preset condition $C_2$, it is determined whether at least a part of data in $W_{j3}[k_j-171, k_j-2]$ meets the preset condition $C_3$, it is determined whether at least a part of data in $W_{j4}[k_j-172, k_j-3]$ meets the preset condition $C_4$, it is determined whether at least a part of data in $W_{j5}[k_j-173, k_j-4]$ meets the preset condition $C_5$, it is determined whether at least a part of data in $W_{j6}[k_j-174, k_j-5]$ meets the preset condition $C_6$, it is determined whether at least a part of data in $W_{j7}[k_j-175, k_j-6]$ meets the preset condition $C_7$, it is determined whether at least a part of data in $W_{j8}[k_j-176, k_j-7]$ meets the preset condition $C_8$, it is determined whether at least a part of data in $W_{j9}[k_j-177, k_j-8]$ meets the preset condition $C_9$, it is determined whether at least a part of data in $W_{j10}[k_j-178, k_j-9]$ meets the preset condition $C_{10}$, and it is determined whether at least a part of data in $W_{j11}[k_j-179, k_j-10]$ meets the preset condition $C_{11}$. When it is determined that the at least a part of data in the window $W_{j1}$ meets the preset condition $C_1$, the at least a part of data in the window $W_{j2}$ meets the preset condition $C_2$, the at least a part of data in the window $W_{j3}$ meets the preset condition $C_3$, the at least a part of data in the window $W_{j4}$ meets the preset condition $C_4$, the at least a part of data in the window $W_{j5}$ meets the preset condition $C_5$, the at least a part of data in the window $W_{j6}$ meets the preset condition $C_6$, the at least a part of data in the window $W_{j7}$ meets the preset condition $C_7$, the at least a part of data in the window $W_{j8}$ meets the preset condition $C_8$, the at least a part of data in the window $W_{j9}$ meets the preset condition $C_9$, the at least a part of data in the window $W_{j10}$ meets the preset condition $C_{10}$, and the at least a part of data in the window $W_{j11}$ meets the preset condition $C_{11}$, the current potential dividing point $k_j$ is a data stream dividing point, and data between $k_j$ and $k_a$ forms 1 data chunk. Meanwhile, a minimum chunk size of 4 KB is skipped in a manner the same as that of $k_a$ to obtain a next potential dividing point, and according to the rule preset on the deduplication server 103, it is determined whether the next potential dividing point is a data stream dividing point. When it is determined that the potential dividing point $k_j$ is not a data stream dividing point, a next potential dividing point is obtained in a manner the same as that of $k_i$, and it is determined, according to the rule preset on the deduplication server 103 and the foregoing method, whether the next potential dividing point is a data stream dividing point. When no data stream dividing point is found after a set maximum data chunk is exceeded, an end position of the maximum data chunk serves as a forced dividing point.

In the implementation manner shown in FIG. 21, according to the rule preset on the deduplication server 103, starting from determining whether the at least a part of data in $W_{i1}[k_i-169, k_i]$ meets the preset condition $C_1$, when it is determined the at least a part of data in $W_{i1}[k_i-169, k_i]$, the at least a part of data in $W_{i2}[k_i-170, k_i-1]$, the at least a part of data in $W_{i3}[k_i-171, k_i-2]$, and the at least a part of data in $W_{i4}[k_i-172, k_i-3]$ meet the preset conditions $C_1$, $C_2$, $C_3$ and $C_4$ respectively, and it is determined that the at least a part of data in $W_{i5}[k_i-173, k_i-4]$ does not meet the preset condition $C_5$, 6 bytes are skipped from the potential dividing point $k_i$ along the direction of searching for a data stream dividing point, and a new potential dividing point is obtained at an end position of a 6th byte. For differentiation from other potential dividing points, the new potential dividing point is represented as $k_g$ here. According to the rule preset on the deduplication server 103, 11 windows are determined for the potential dividing point $k_g$, and are $W_{g1}[k_g-169, k_g]$, $W_{g2}[k_g-170, k_g-1]$, $W_{g3}[k_g-171, k_g-2]$, $W_{g4}[k_g-172, k_g-3]$, $W_{g5}[k_g-173, k_g-4]$, $W_{g6}[k_g-174, k_g-5]$, $W_{g7}[k_g-175, k_g-6]$, $W_{g8}[k_g-176, k_g-7]$, $W_{g9}[k_g-177, k_g-8]$, $W_{g10}[k_g-178, k_g-9]$, and $W_{g11}[k_g-179, k_g-10]$ separately. It is determined whether at least a part of data in $W_{g1}[k_g-169, k_g]$ meets the preset condition $C_1$, it is determined whether at least a part of data in $W_{g2}[k_g-170, k_g-1]$ meets the preset condition $C_2$, it is determined whether at least a part of data in $W_{g3}[k_g-171, k_g-2]$ meets the preset condition $C_3$, it is determined whether at least a part of data in $W_{g4}[k_g-172, k_g-3]$ meets the preset condition $C_4$, it is determined whether at least a part of data in $W_{g5}[k_g-173, k_g-4]$ meets the preset condition $C_5$, it is determined whether at least a part of data in $W_{g6}[k_g-174, k_g-5]$ meets a preset condition $C_6$, it is determined whether at least a part of data in $W_{g7}[k_g-175, k_g-6]$ meets a preset condition $C_7$, it is determined whether at least a part of data in $W_{g8}[k_g-176, k_g-7]$ meets a preset condition $C_8$, it is determined whether at least a part of data in $W_{g9}[k_g-177, k_g-8]$ meets a preset condition $C_9$, it is determined whether at least a part of data in $W_{g10}[k_g-178, k_g-9]$ meets a preset condition $C_{10}$, and it is determined whether at least a part of data in $W_{g11}[k_g-179, k_g-10]$ meets a preset condition $C_{11}$. The window $W_{g11}[k_g-179, k_g-10]$ coincides with the window $W_{i5}[k_i-173, k_i-4]$, and $C_5=C_{11}$; therefore, when it is determined that the at least a part of data in $W_{i5}[k_i-173, k_i-4]$ does not meet the preset condition $C_5$, a potential dividing point $k_g$ obtained by skipping T bytes from the potential dividing point $k_i$ along the direction of searching for a data stream dividing point still does not meet a condition for serving as a data stream dividing point. Therefore, if repeated calculation exists when 6 bytes are skipped from the potential dividing point $k_i$ along the direction of searching for a data stream dividing point, then repeated calculation can be reduced and efficiency is higher when 7 bytes are skipped from the potential dividing point $k_i$ along the direction of searching for a data stream dividing point. Therefore, a speed of searching for a data stream dividing point is increased. When a probability that at least a part of data in the window $W_x[k-A_x, k+B_x]$ that is determined according to the preset rule meets the preset condition $C_x$ is 1/2, that is, a probability of executing skipping is 1/2, at most $\|B_{11}\|+\|A_{11}\|=189$ bytes can be skipped each time.

In this implementation manner, a preset rule is that: 11 windows $W_x[k-A_x, k+B_x]$ are determined for a potential dividing point k and at least a part of data in the window $W_x[k-A_x, k+B_x]$ meets a preset condition $C_x$, where a probability that at least a part of data in $W_x[k-A_x, k+B_x]$ meets the preset condition $C_x$ is 1/2, where x indicates consecutive natural numbers from 1 to 11 separately, and $A_x$ and $B_x$ are integers. $A_1=169$, $B_1=0$; $A_2=170$, $B_2=-1$; $A_3=171$, $B_3=-2$; $A_4=172$, $B_4=-3$; $A_5=173$, $B_5=-4$; $A_6=174$, $B_6=-5$; $A_7=175$, $B_7=-6$; $A_8=176$, $B_8=-7$; $A_9=177$, $B_9=-8$; $A_{10}=178$, $B_{10}=-9$; $A_{11}=179$, $B_{11}=10$. $C_1=C_2=C_3=C_4=C_5=C_6=C_7=C_8=C_9=C_{10}=C_{11}$. That is, 11 windows are selected for the potential dividing point k, and the 11 windows are consecutive; P(n) can be calculated by using the two factors, that is, the quantity of windows and the probability that at least a part of data in the window $W_x[p_x-A_x, p_x+B_x]$ meets the preset condition $C_x$. A manner of selecting the 11 windows and the determining that at least a part of data in each window of the 11 windows meets the preset condition $C_x$ follow the rule preset on the deduplication server 103, and therefore, whether the potential dividing point k is a data stream dividing point depends on whether it exists that at least a part of data in each window of 11 consecutive windows meets the preset condition $C_x$. A gap between two bytes is referred to as one point. P(n) represents a probability that 11 consecutive windows meeting a condition do not exist among n consecutive windows, that is, a probability that no data stream dividing point exists. After a minimum chunk size of 4 KB is skipped from a file header/previous dividing point, a 4086th point is found by going back by 10 bytes in a direction opposite to the direction of searching for a data stream dividing point, and no data stream dividing point exists at the point; therefore, P(4086)=1, and P(4087)=1, . . . , P(4095)=1, and so on. At an 4096th point, that is, a point which is used to obtain the minimum chunk, with a probability of (1/2)^11, at least a part of data in each window of the 11 windows meets the preset condition $C_x$. Hence, with a probability of (1/2)^11, a data stream dividing point exists; with a probability of 1−(1/2)^11, no data stream dividing point exists; therefore P(4096)=1−(1/2)^11.

Figure 35:
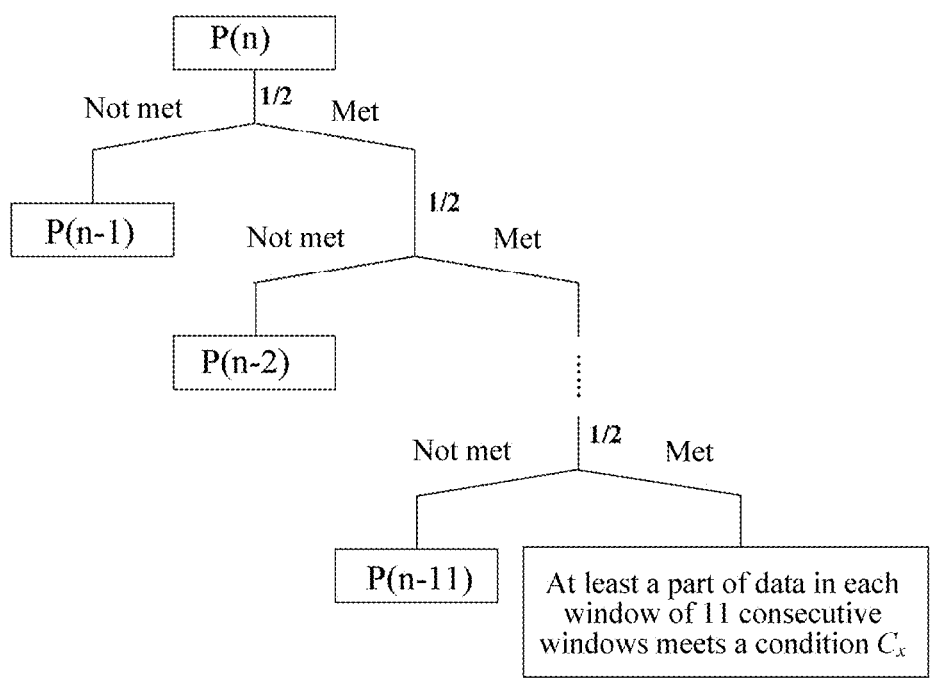

As shown in FIG. 35, in an nth window, there may be 12 cases of obtaining P(n) by means of recursion.

Case 1: With a probability of 1/2, at least a part of data in the nth window does not meet a preset condition; in this case, with a probability of P(n−1), 11 consecutive windows do not exist among (n−1) windows before the nth window, where at least a part of data in each window of the 11 consecutive windows meets a preset condition. Therefore, P(n) includes 1/2*P(n−1). A case in which the at least a part of data in the nth window does not meet the preset condition, and 11 consecutive windows exist among the (n−1) windows before the nth window, where at least a part of data in each window of the 11 consecutive windows meets the preset condition, is not related to P(n).

Case 2: With a probability of 1/2, at least a part of data in the nth window meets a preset condition, and with the probability of 1/2, at least a part of data in an (n−1)th window does not meet a preset condition; in this case, with a probability of P(n−2), 11 consecutive windows do not exist among (n−2) windows before the (n−1)th window, where at least a part of data in each window of the 11 consecutive windows meets a preset condition. Therefore, P(n) includes 1/2*1/2*P(n−2). A case in which the at least a part of data in the nth window meets the preset condition, the at least a part of data in the (n−1)th point window does not meet the preset condition, and 11 consecutive windows exist among the (n−2) windows before the (n−1)th window, where at least a part of data in each window of the 11 consecutive windows meets the preset condition, is not related to P(n).

According to the foregoing description, case 11: With a probability of $(1/2)^{10}$, at least a part of data in nth to (n−9)th windows meets a preset condition, and with a probability of 1/2, at least a part of data in an (n−10)th window does not meet a preset condition; in this case, with a probability of P(n−11), 11 consecutive windows do not exist among (n−11) windows before the (n−10)th window, where at least a part of data in each window of the 11 consecutive windows meets a preset condition. Therefore, P(n) includes $(1/2)^{10}*1/2*P(n-11)$. A case in which the at least a part of data in the nth to (n−9)th windows meets the preset condition, the at least a part of data in the (n−10)th window does not meet the preset condition, and 11 consecutive windows exist among the (n−11) windows before the (n−10)th window, where at least a part of data in each window of the 11 consecutive windows meets the preset condition, is not related to P(n).

Case 12: With a probability of $(1/2)^{11}$, at least a part of data in nth to (n−10) windows meets a preset condition is, and this case is not related to P(n).

Therefore, $P(n)=1/2*P(n-1)+(1/2)^2*P(n-2)+ \ldots + (1/2)^{11}*P(n-11)$. Another preset rule is: for a potential dividing point k, 24 windows $W_x[k-A_x, k+B_x]$ and a preset condition $C_x$ corresponding to the window $W_x[k-A_x, k+B_x]$ are determined, where x indicates consecutive natural numbers from 1 to 11, $A_1$=169, $B_1$=0; $A_2$=170, $B_2$=−1; $A_3$=171, $B_3$=−2; $A_4$=172, $B_4$=−3; $A_5$=173, $B_5$=−4; $A_6$=174, $B_6$=−5; $A_7$=175, $B_7$=−6; $A_8$=176, $B_8$=−7; $A_9$=177, $B_9$=−8; $A_{10}$=178, $B_{10}$=−9; $A_{11}$=179, $B_{11}$=−10, ..., and $A_{24}$=192, $B_{24}$=−23. $C_1=C_2=C_3=C_4=C_5=C_6=C_7=C_8=C_9=\ldots=C_{24}$. A probability that at least a part of data in the window $W_x[k-A_x, k+B_x]$ meets the preset condition $C_x$ is 3/4, and P(n) can be calculated by using the two factors, that is, the quantity of windows and the probability that at least a part of data in the window $W_x [p_x-A_x, p_x+B_x]$ meets the preset condition $C_x$.

Therefore, whether the potential dividing point k is a data stream dividing point depends on whether it exists that at least a part of data in each window of the 24 consecutive windows meets the preset condition $C_x$, and calculation can be performed by using the following formulas:

$$P(1)=1, P(2), \ldots, P(23)=1, P(24)=1-(3/4)^{24}, \text{ and}$$

$$P(n)=1/4*P(n-1)+1/4*(3/4)*P(n-2)+ \ldots + 1/4*(3/4)^{23}*P(n-24).$$

After calculation, P(5*1024)=0.78, P(11*1024)=0.17, and P(12*1024)=0.13. That is, no data stream dividing point is found with a probability of 13% after a search proceeds to a point at a distance of 12 KB from a start position/previous data stream dividing point of a data stream, and forced division is performed. A density function of a data stream dividing point is obtained by using this probability, and after integration, it is obtained that on average, a data stream dividing point is found after a search proceeds to a point at a distance about 7.6 KB from the start position/previous data stream dividing point of the data stream, that is, an average chunk length is about 7.6 KB. Different from that at least a part of data in 11 consecutive windows meets a preset condition with a probability of 1/2, a conventional CDC algorithm can achieve an effect of an average chunk length being 7.6 KB only when one window meets a condition with a probability of $1/2^{12}$.

Figure 23:
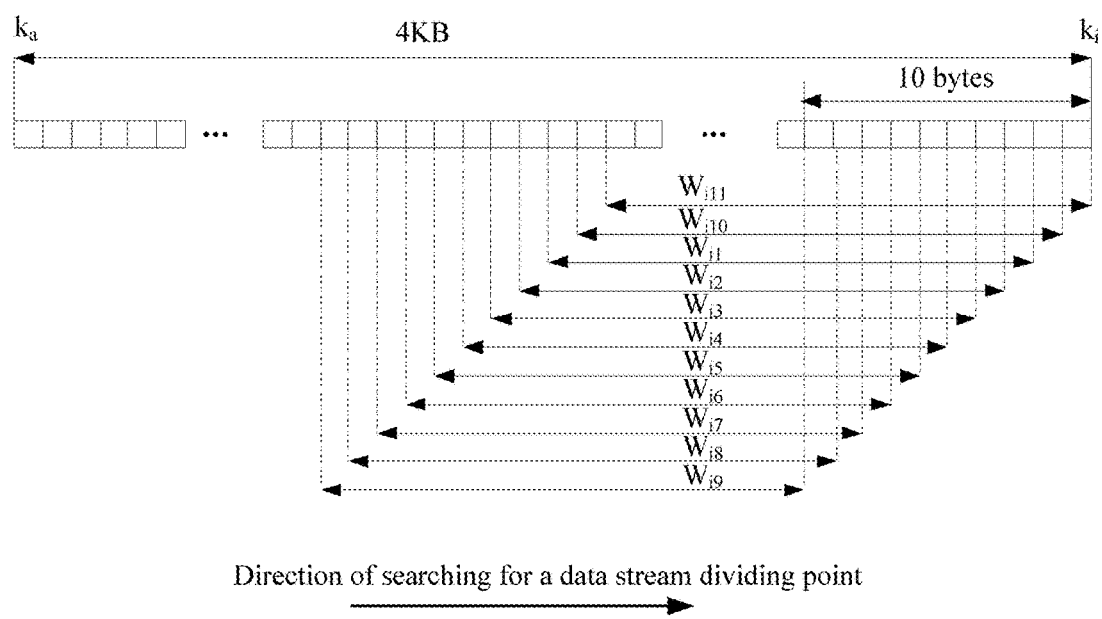
FIG. 23 and FIG. 24 are schematic diagrams of an implementation manner of searching for a data stream dividing point.
Figure 24:
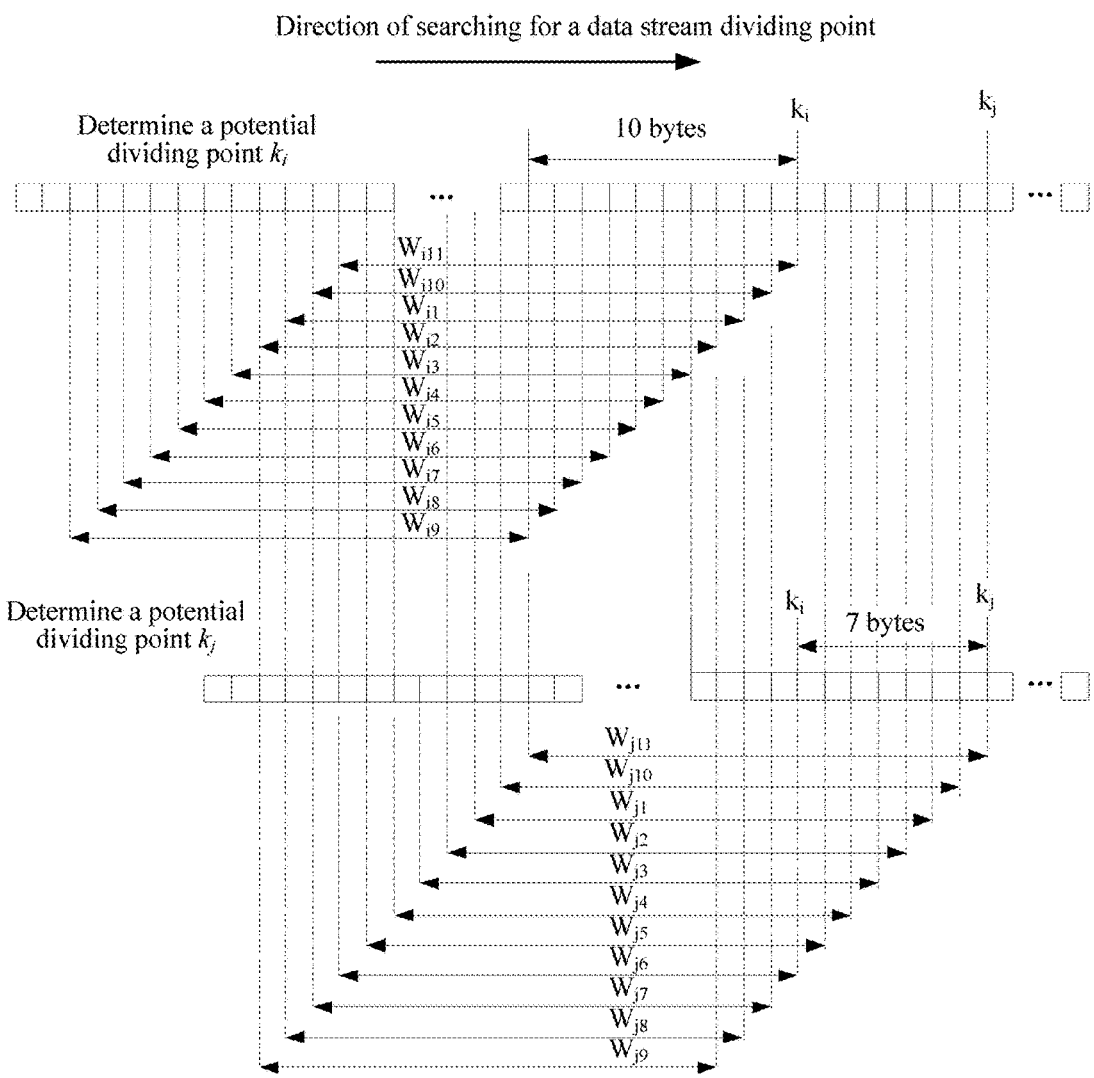

On the basis of the search for a data stream dividing point shown in FIG. 3, in an implementation manner shown in FIG. 23, a rule is preset on a deduplication server 103, where the rule is: for a potential dividing point k, determining 11 windows $W_x[k-A_x, k+B_x]$ and a preset condition $C_x$ corresponding to the window $W_x[k-A_x, k+B_x]$, where x indicates consecutive natural numbers from 1 to 11, and $A_x$ and $B_x$ are integers. A probability that at least a part of data in the window $W_x[k-A_x, k+B_x]$ meets the preset condition $C_x$ is 1/2. $A_1$=171, $B_1$=−2; $A_2$=172, $B_2$=−3; $A_3$=173, $B_3$=−4; $A_4$=174, $B_4$=−5; $A_5$=175, $B_5$=−6; $A_6$=176, $B_6$=−7; $A_7$=177, $B_7$=−8; $A_8$=178, $B_8$=−9; $A_9$=179, $B_9$=−10; $A_{10}$=170, $B_{10}$=−1; $A_{11}$=169, $B_{11}$=0. $C_1=C_2=C_3=C_4=C_5=C_6=C_7=C_8=C_9=C_{10}=C_{11}$. $k_a$ is a data stream dividing point, and a direction of searching for a data stream dividing point shown in FIG. 23 is from left to right. After a minimum data chunk of 4 KB is skipped from the data stream dividing point $k_a$, an end position of the minimum data chunk of 4 KB serves as a next potential dividing point $k_t$. According to the rule preset on the deduplication server 103, for the potential dividing point $k_t$, $W_{ix}[k_t-A_x, k_t+B_x]$ and the preset condition $C_x$ corresponding to the window $W_{ix}[k_t-A_x, k_t+B_x]$ are determined, where x indicates consecutive natural numbers from 1 to 11. Determined 11 windows are $W_{i1}[k_t-171, k_t-2]$, $W_{i2}[k_t-172, k_t-3]$, $W_{i3}[k_t-173, k_t-4]$, $W_{i4}[k_t-174, k_t-5]$, $W_{i5}[k_t-175, k_t-6]$, $W_{i6}[k_t-176, k_t-7]$, $W_{i7}[k_t-177, k_t-8]$, $W_{i8}[k_t-178, k_t-9]$, $W_{i9}[k_t-179, k_t-10]$, $W_{i10}[k_t-170, k_t-1]$, and $W_{i11}[k_t-169, k_t]$ separately. It is determined whether at least a part of data in $W_{i1}[k_t-171, k_t-2]$ meets the preset condition $C_1$, it is determined whether at least a part of data in $W_{i2}[k_t-172, k_t-3]$ meets the preset condition $C_2$, it is determined whether at least a part of data in $W_{i3}[k_t-173, k_t-4]$ meets the preset condition $C_3$, it is determined whether at least a part of data in $W_{i4}[k_t-174, k_t-5]$ meets the preset condition $C_4$, it is determined whether at least a part of data in $W_{i5}[k_t-175, k_t-6]$ meets the preset condition $C_5$, it is determined whether at least a part of data in $W_{i6}[k_t-176, k_t-7]$ meets the preset condition $C_6$, it is determined whether at least a part of data in $W_{i7}[k_t-177, k_t-8]$ meets the preset condition $C_7$, it is determined whether at least a part of data in $W_{i8}[k_t-178, k_t-9]$ meets the preset condition $C_8$, it is determined whether at least a part of data in $W_{i9}[k_t-179, k_t-10]$ meets the preset condition $C_9$, it is determined whether at least a part of data in $W_{i10}[k_t-170, k_t-1]$ meets the preset condition $C_{10}$, and it is determined whether at least a part of data in $W_{i11}[k_t-169, k_t]$ meets the preset condition $C_{11}$. When it is determined that the at least a part of data in the window $W_{i1}$ meets the preset condition $C_1$, the at least a part of data in the window $W_{i2}$ meets the preset condition $C_2$, the at least a part of data in the window $W_{i3}$ meets the preset condition $C_3$, the at least a part of data in the window $W_{i4}$ meets the preset condition $C_4$, the at least a part of data in the window $W_{i5}$ meets the preset condition $C_5$, the at least a part of data in the window $W_{i6}$ meets the preset condition $C_6$, the at least a part of data in the window $W_{i7}$ meets the preset condition $C_7$, the at least a part of data in the window $W_{i8}$ meets the preset condition $C_8$, the at least a part of data in the window $W_{i9}$ meets the preset condition $C_9$, the at least a part of data in the window $W_{i10}$ meets the preset condition $C_{10}$, and the at least a part of data in the window $W_{i11}$ meets the preset condition $C_{11}$, the current potential dividing point $k_i$ is a data stream dividing point. When the at least a part of data in any window of the 11 windows does not meet the corresponding preset condition, as shown in FIG. 24, that the at least a part of data in $W_{i3}[p_{i3}-169, p_{i3}]$ does not meet the preset condition $C_3$, 11 bytes are skipped from a point $p_{i3}$ along a direction of searching for a data stream dividing point is used as an example for description. As shown in FIG. 24, when it is determined that $W_3$ does not meet the preset condition $C_3$, from $k_i$ that serves as a start point, N bytes are skipped along the direction of searching for a data stream dividing point, where the N bytes are not greater than $\|B_3\|+max_x(\|A_x\|)$. In this embodiment, N=7, and a next potential dividing point is obtained at an end position of a 7th byte. For differentiation from the potential dividing point $k_i$, the new potential dividing point is represented as $k_j$ here. According to the rule preset on the deduplication server 103, for the potential dividing point $k_j$, 11 windows $W_{jx}[k_j-A_x, k_j+B_x]$ are determined, and are $W_{j1}[k_j-171, k_j-2]$, $W_{j2}[k_j-172, k_j-3]$, $W_{j3}[k_j-173, k_j-4]$, $W_{j4}[k_j-174, k_j-5]$, $W_{j5}[k_j-175, k_j-6]$, $W_{j6}[k_j-176, k_j-7]$, $W_{j7}[k_j-177, k_j-8]$, $W_{j8}[k_j-178, k_j-9]$, $W_{j9}[k_j-179, k_j-10]$, $[k_j-170, k_j-1]$, and $W_{j11}[k_j-169, k_j]$ separately. It is determined whether at least a part of data in $W_{j1}[k_j-171, k_j-2]$ meets the preset condition $C_1$, it is determined whether at least a part of data in $W_{j2}[k_j-172, k_j-3]$ meets the preset condition $C_2$, it is determined whether at least a part of data in $W_{j3}[k_j-173, k_j-4]$ meets the preset condition $C_3$, it is determined whether at least a part of data in $W_{j4}[k_j-174, k_j-5]$ meets the preset condition $C_4$, it is determined whether at least a part of data in $W_{j5}[k_j-175, k_j-6]$ meets the preset condition $C_5$, it is determined whether at least a part of data in $W_{j6}[k_j-176, k_j-7]$ meets the preset condition $C_6$, it is determined whether at least a part of data in $W_{j7}[k_j-177, k_j-8]$ meets the preset condition $C_7$, it is determined whether at least a part of data in $W_{j8}[k_j-178, k_j-9]$ meets the preset condition $C_8$, it is determined whether at least a part of data in $W_{j9}[k_j-179, k_j-10]$ meets the preset condition $C_9$, it is determined whether at least a part of data in $W_{j10}[k_j-170, k_j-1]$ meets the preset condition $C_{10}$ and it is determined whether at least a part of data in $W_{j11}[k_j-169, k_j]$ meets the preset condition $C_{11}$. Certainly, in this embodiment of the present invention, the rule is also followed when it is determined whether the potential dividing point $k_a$ is a data stream dividing point, specific implementation is not described again, and reference may be made to the description of determining the potential dividing point $k_i$. When it is determined that the at least a part of data in the window $W_{j1}$ meets the preset condition $C_1$, the at least a part of data in the window $W_{j2}$ meets the preset condition $C_2$, the at least a part of data in the window $W_{j3}$ meets the preset condition $C_3$, the at least a part of data in the window $W_{j4}$ meets the preset condition $C_4$, the at least a part of data in the window $W_{j5}$ meets the preset condition $C_5$, the at least a part of data in the window $W_{j6}$ meets the preset condition $C_6$, the at least a part of data in the window $W_{j7}$ meets the preset condition $C_7$, the at least a part of data in the window $W_{j8}$ meets the preset condition $C_8$, the at least a part of data in the window $W_{j9}$ meets the preset condition $C_9$, the at least a part of data in the window $W_{j1}$, meets the preset condition $C_{10}$, and the at least a part of data in the window $W_{j11}$ meets the preset condition $C_{11}$, the current potential dividing point $k_j$ is a data stream dividing point, and data between $k_j$ and $k_a$ forms 1 data chunk. Meanwhile, a minimum chunk size of 4 KB is skipped in a manner the same as that of $k_a$ to obtain a next potential dividing point, and according to the rule preset on the deduplication server 103, it is determined whether the next potential dividing point is a data stream dividing point. When it is determined that the potential dividing point $k_j$ is not a data stream dividing point, a next potential dividing point is obtained in a manner the same as that of $k_i$, and it is determined, according to the rule preset on the deduplication server 103 and the foregoing method, whether the next potential dividing point is a data stream dividing point. When no data stream dividing point is found after a set maximum data chunk is exceeded, an end position of the maximum data chunk serves as a forced dividing point. Certainly, implementation of the method is restricted by a length of the maximum data chunk and a size of a file forming the data stream, which is not described herein again.

Figure 25:
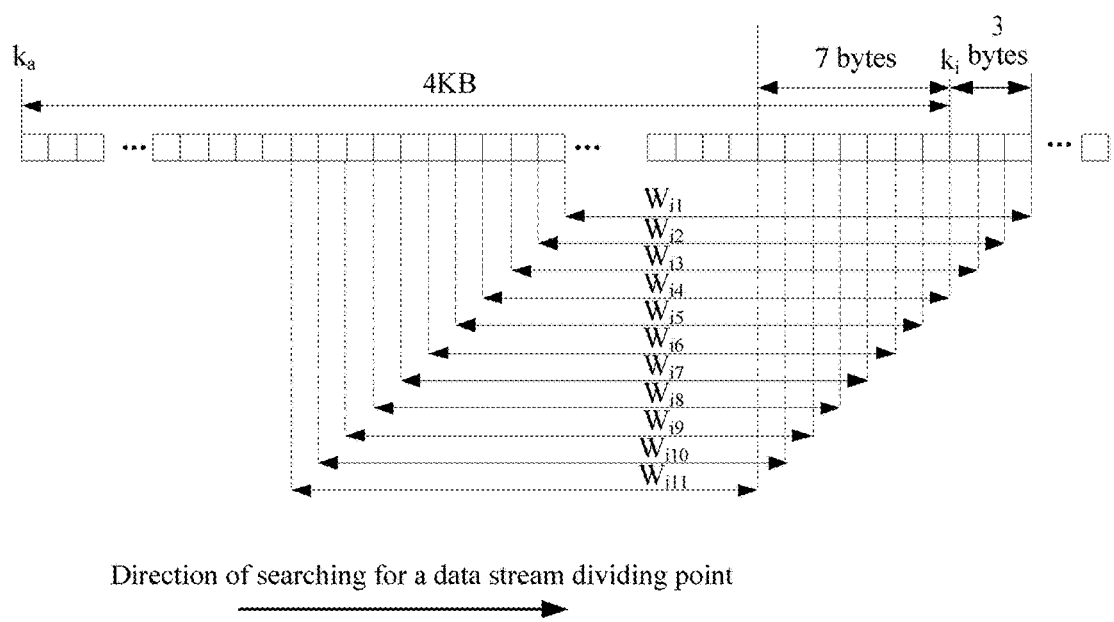
FIG. 25 and FIG. 26 are schematic diagrams of an implementation manner of searching for a data stream dividing point.
Figure 26:
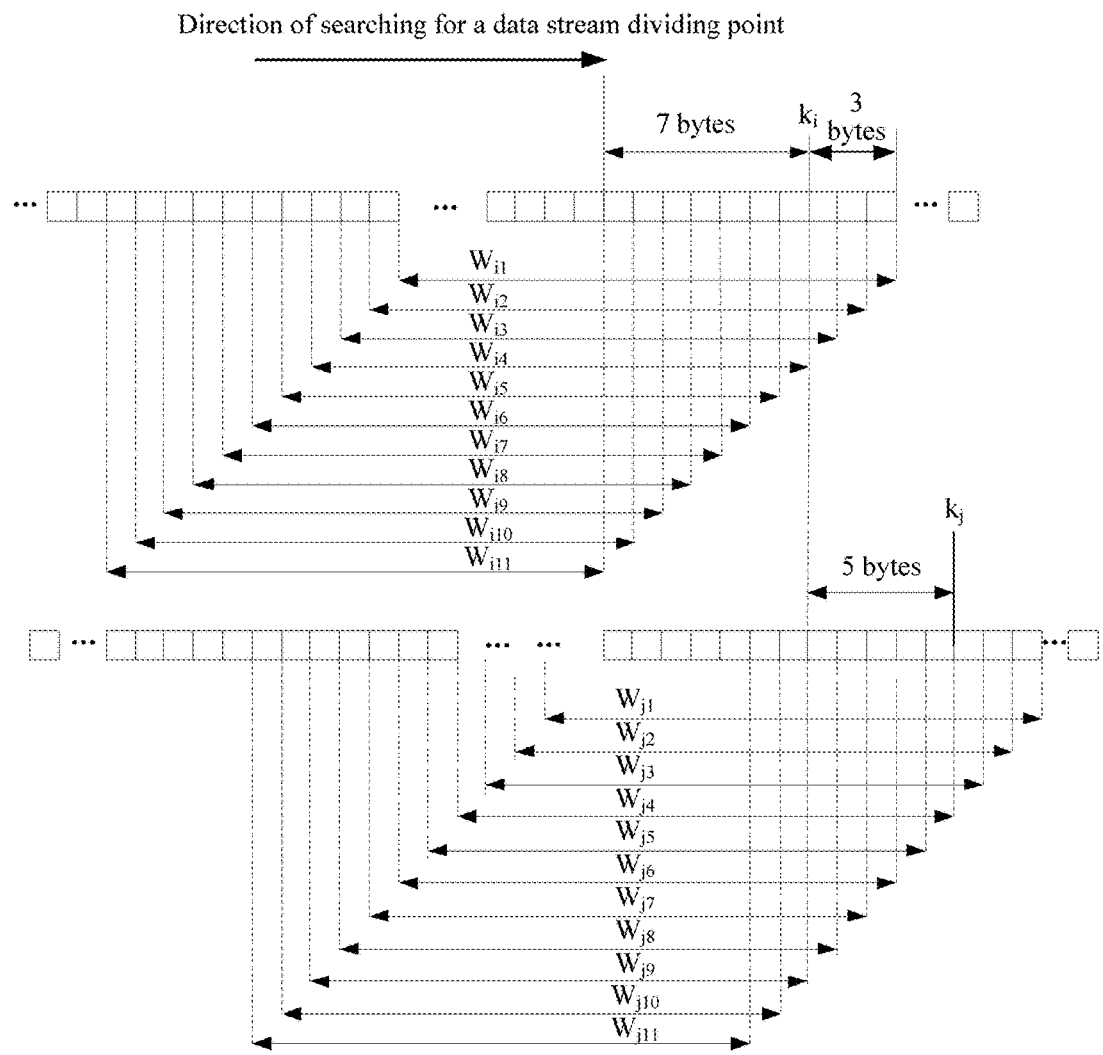

On the basis of the search for a data stream dividing point shown in FIG. 3, in an implementation manner shown in FIG. 25, a rule is preset on a deduplication server 103, where the rule is: for a potential dividing point k, determining 11 windows $W_x[k-A_x, k+B_x]$ and a preset condition $C_x$ corresponding to the window $W_x[k-A_x, k+B_x]$, where x indicates consecutive natural numbers from 1 to 11. $A_1=166$, $B_1=3$; $A_2=167$, $B_2=2$; $A_3=168$, $B_3=1$; $A_4=169$, $B_4=0$; $A_5=170$, $B_5=-1$; $A_6=171$, $B_6=-2$; $A_7=172$, $B_7=-3$; $A_8=173$, $B_8=-4$; $A_9=174$, $B_9=-5$; $A_{10}=175$, $B_{10}=-6$; $A_{11}=176$, $B_{11}=-7$. $C_1=C_2=C_3=C_4=C_5=C_6=C_7=C_8=C_9=C_{10}=C_{11}$, and 11 windows are $W_1[k-166, k+3]$, $W_2[k-167, k+2]$, $W_3[k-168, k+1]$, $W_4[k-169, k]$, $W_5[k-170, k-1]$, $W_6[k-171, k-2]$, $W_7[k-172, k-3]$, $W_8[k-173, k-4]$, $W_9[k-174, k-5]$, $W_{10}[k-175, k-6]$, and $W_{11}[k-176, k-7]$ separately. $k_a$ is a data stream dividing point, and a direction of searching for a data stream dividing point shown in FIG. 25 is from left to right. After a minimum data chunk of 4 KB is skipped from the data stream dividing point $k_a$, an end position of the minimum data chunk of 4 KB serves as a next potential dividing point $k_i$. In this embodiment, according to the rule preset on the deduplication server 103, for the potential dividing point $k_i$, 11 windows $W_{ix}[k-A_x, k+B_x]$ and the preset condition c, corresponding to the window $W_{ix}[k-A_x, k+B_x]$ are determined, where x indicates consecutive natural numbers from 1 to 11 separately. In the implementation manner shown in FIG. 25, for the potential dividing point $k_i$, the 11 windows that are determined are $W_{i1}[k_i-166, k_i+3]$, $W_{i2}[k_i-167, k_i+2]$, $W_{i3}[k_i-168, k_i+1]$, $W_{i4}[k_i-169, k_i]$, $W_{i5}[k_i-170, k_i-1]$, $W_{i6}[k_i-171, k_i-2]$, $W_{i7}[k_i-172, k_i-3]$, $W_{i8}[k_i-173, k_i-4]$, $W_{i9}[k_i-174, k_i-5]$, $W_{i10}[k_i-175, k_i-6]$, and $W_{i11}[k_i-176, k_i-7]$ separately. It is determined whether at least a part of data in $W_{i1}[k_i-166, k_i+3]$ meets the preset condition $C_1$, it is determined whether at least a part of data in $W_{i2}[k_i-167, k_i+2]$ meets the preset condition $C_2$, it is determined whether at least a part of data in $W_{i3}[k_i-168, k_i+1]$ meets the preset condition $C_3$, it is determined whether at least a part of data in $W_{i4}[k_i-169, k_i]$ meets the preset condition $C_4$, it is determined whether at least a part of data in $W_{i5}[k_i-170, k_i-1]$ meets the preset condition $C_5$, it is determined whether at least a part of data in $W_{i6}[k_i-171, k_i-2]$ meets the preset condition $C_6$, it is determined whether at least a part of data in $W_{i7}$ $W_{i7}[k_i-172, k_i-3]$ meets the preset condition $C_7$, it is determined whether at least a part of data in $W_{i8}[k_i-173, k_i-4]$ meets the preset condition $C_8$, it is determined whether at least a part of data in $W_{i9}[k_i-174, k_i-5]$ meets the preset condition $C_9$, it is determined whether at least a part of data in $W_{i10}[k_i-175, k_i-6]$ meets the preset condition $C_{10}$, and it is determined whether at least a part of data in $W_{i11}[k_i-176, k_i-7]$ meets the preset condition $C_{11}$. When it is determined that the at least a part of data in the window $W_{i1}$ meets the preset condition $C_1$, the at least a part of data in the window $W_{i2}$ meets the preset condition $C_2$, the at least a part of data in the window $W_{i3}$ meets the preset condition $C_3$, the at least a part of data in the window $W_{i4}$ meets the preset condition $C_4$, the at least a part of data in the window $W_{i5}$ meets the preset condition $C_5$, the at least a part of data in the window $W_{i6}$ meets the preset condition $C_6$, the at least a part of data in the window $W_{i7}$ meets the preset condition $C_7$, the at least a part of data in the window $W_{i8}$ meets the preset condition $C_8$, the at least a part of data in the window $W_{i9}$ meets the preset condition $C_9$, the at least a part of data in the window $W_{i10}$ meets the preset condition $C_{10}$, and the at least a part of data in the window $W_{i11}$ meets the preset condition $C_{11}$, the current potential dividing point $k_i$ is a data stream dividing point. When the at least a part of data in any window of the 11 windows does not meet the corresponding preset condition, for example, $W_{i7}[k_i-172, k_i-3]$ shown in FIG. 26, N bytes are skipped from the potential dividing point $k_i$ along the direction of searching for a data stream dividing point, where the N bytes are not greater than $\|B_7\|+\max_x(\|A_x\|)$. In an implementation manner shown in FIG. 26, the N bytes which are skipped are not greater than 185 bytes, and in this embodiment, N=5, so as to obtain a new potential dividing point. For differentiation from the potential dividing point $k_i$, the new potential dividing point is represented as $k_j$ here. According to the rule preset on the deduplication server 103 in the implementation manner shown in FIG. 25, for the potential dividing point $k_j$, 11 windows are determined, and are $W_{j1}[k_j-166, k_j+3]$, $W_{j2}[k_j-167, k_j+2]$, $W_{j3}[k_j-168, k_j+1]$, $W_{j4}[k_j-169, k_j]$, $W_{j5}[k_j-170, k_j-1]$, $W_{j6}[k_j-171, k_j-2]$, $W_{j7}[k_j-172, k_j-3]$, $W_{j8}[k_j-173, k_j-4]$, $W_{j9}[k_j-174, k_j-5]$, $W_{j10}[k_j-175, k_j-6]$, and $W_{j11}[k_j-176, k_j-7]$ separately. It is determined whether at least a part of data in $W_{j1}[k_j-166, k_j+3]$ meets the preset condition $C_1$, it is determined whether at least a part of data in $W_{j2}[k_j-167, k_j+2]$ meets the preset condition $C_2$, it is determined whether at least a part of data in $W_{j3}[k_j-168, k_j+1]$ meets the preset condition $C_3$, it is determined whether at least a part of data in $W_{j4}[k_j-169, k_j]$ meets the preset condition $C_4$, it is determined whether at least a part of data in $W_{j5}[k_j-170, k_j-1]$ meets the preset condition $C_5$, it is determined whether at least a part of data in $W_{j6}[k_j-171, k_j-2]$ meets the preset condition $C_6$, it is determined whether at least a part of data in $W_{j7}[k_j-172, k_j-3]$ meets the preset condition $C_7$, it is determined whether at least a part of data in $W_{j8}[k_j-173, k_j-4]$ meets the preset condition $C_8$, it is determined whether at least a part of data in $W_{j9}[k-174, k_j-5]$ meets the preset condition $C_9$, it is determined whether at least a part of data in $W_{j10}[k_j-175, k_j-6]$ meets the preset condition $C_{10}$, and it is determined whether at least a part of data in $W_{j11}[k_j-176, k_j-7]$ meets the preset condition $C_{11}$. Certainly, in this embodiment of the present invention, the rule is also followed when it is determined whether the potential dividing point $k_a$ is a data stream dividing point, specific implementation is not described again, and reference may be made to the description of determining the potential dividing point $k_i$. When it is determined that the at least a part of data in the window $W_{j1}$ meets the preset condition $C_1$, the at least a part of data in the window $W_{j2}$ meets the preset condition $C_2$, the at least a part of data in the window $W_{j3}$ meets the preset condition $C_3$, the at least a part of data in the window $W_{j4}$ meets the preset condition $C_4$, the at least a part of data in the window $W_{j5}$ meets the preset condition $C_5$, the at least a part of data in the window $W_{j6}$ meets the preset condition $C_6$, the at least a part of data in the window $W_{j7}$ meets the preset condition $C_7$, the at least a part of data in the window $W_{j8}$ meets the preset condition $C_8$, the at least a part of data in the window $W_{j9}$ meets the preset condition $C_9$, the at least a part of data in the window $W_{j10}$ meets the preset condition $C_{10}$, and the at least a part of data in the window $W_{j11}$ meets the preset condition $C_{11}$, the current potential dividing point $k_j$ is a data stream dividing point, and data between $k_j$ and $k_a$ forms 1 data chunk. Meanwhile, a minimum chunk size of 4 KB is skipped in a manner the same as that of $k_a$ to obtain a next potential dividing point, and according to the rule preset on the deduplication server 103, it is determined whether the next potential dividing point is a data stream dividing point. When it is determined that the potential dividing point $k_j$ is not a data stream dividing point, a next potential dividing point is obtained in a manner the same as that of $k_i$, and it is determined, according to the rule preset on the deduplication server 103 and the foregoing method, whether the next potential dividing point is a data stream dividing point. When no data stream dividing point is found after a set maximum data chunk is exceeded, an end position of the maximum data chunk serves as a forced dividing point.

Figure 27:
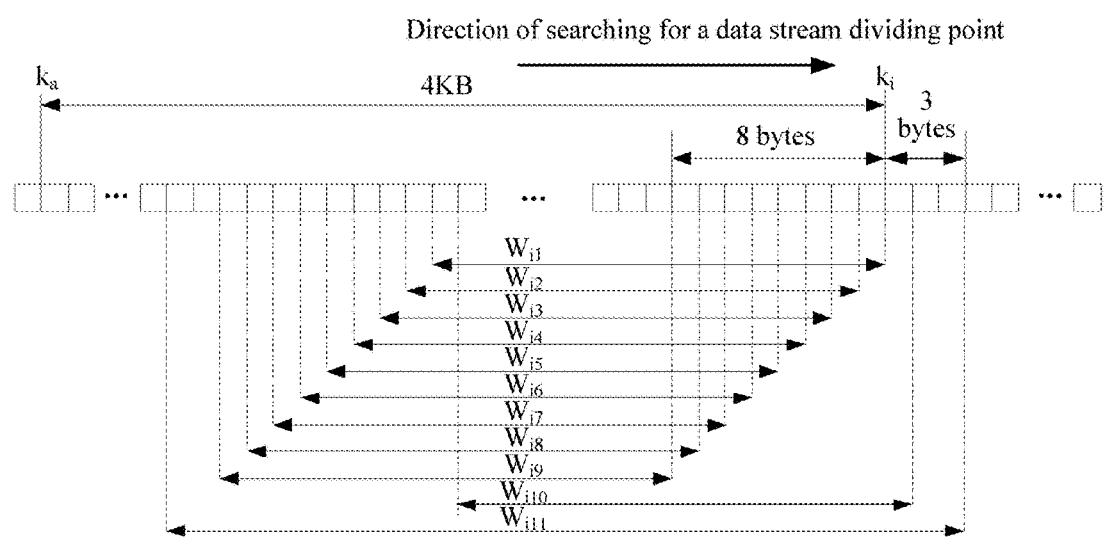
FIG. 27, FIG. 28, and FIG. 29 are schematic diagrams of an implementation manner of searching for a data stream dividing point.
Figure 28:
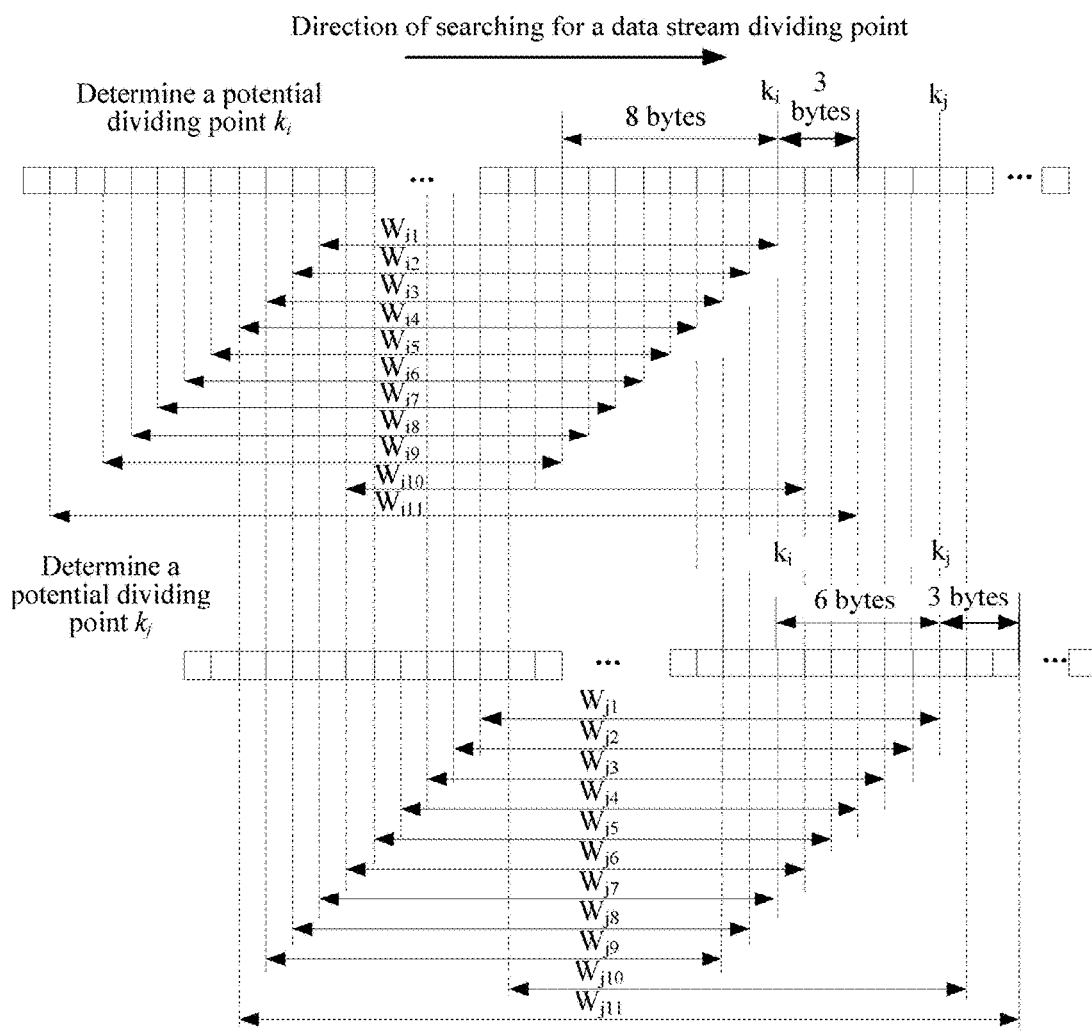

On the basis of the search for a data stream dividing point shown in FIG. 3, in an implementation manner shown in FIG. 27, a rule is preset on a deduplication server 103, where the rule is: for a potential dividing point k, determining 11 windows $W_x[k-A_x, k+B_x]$ and a preset condition $C_x$ corresponding to the window $W_x[k-4, k+B_x]$, where x indicates consecutive natural numbers from 1 to 11. $A_1=169$, $B_1=0$; $A_2=170$, $B_2=-1$; $A_3=171$, $B_3=-2$; $A_4=172$, $B_4=-3$; $A_5=173$, $B_5=-4$; $A_6=17\,4$, $B_6=-5$; $A_7=175$, $B_7=-6$; $A_8=176$, $B_8=-7$; $A_9=177$, $B_9=-8$; $A_{10}=168$, $B_{10}=1$; $A_{11}=179$, $B_{11}=3$. $C_1=C_2=C_3=C_4=C_5=C_6=C_7=C_8=C_9=C_{10}\neq C_{11}$, and 11 windows are $W_1[k-169, k]$, $W_2[k-170, k-1]$, $W_3[k-171, k-2]$, $W_4[k-172, k-3]$, $W_5[k-173, k-4]$, $W_6[k-174, k-5]$, $W_7[k-175, k-6]$, $W_8[k-176, k-7]$, $W_9[k-177, k-8]$, $W_{10}[k-168, k+1]$, and $W_{11}[k-179, k+3]$ separately. $k_a$ is a data stream dividing point, and a direction of searching for a data stream dividing point shown in FIG. 27 is from left to right. After a minimum data chunk of 4 KB is skipped from the data stream dividing point $k_a$, an end position of the minimum data chunk of 4 KB serves as a next potential dividing point $k_i$. In this embodiment, according to the rule preset on the deduplication server 103, for the potential dividing point $k_i$, a window $W_{ix}$, $[k_i-A_x, k_i+B_x]$ is determined, where x indicates consecutive natural numbers from 1 to 11 separately. In the implementation manner shown in FIG. 27, for the potential dividing point $k_i$, 11 windows that are determined are $W_{i1}[k_i-169, k_i]$, $W_{i2}[k_i-170, k_i-1]$, $W_{i3}[k_i-171, k_i-2]$, $W_{i4}[k_i-172, k_i-3]$, $W_{i5}[k_i-173, k_i-4]$, $W_{i6}[k_i-174, k_i-5]$, $W_{i7}[k_i-175, k_i-6]$, $W_{i8}[k_i-176, k_i-7]$, $W_{i9}[k_i-177, k_i-8]$, $W_{i10}[k_i-168, k_i+1]$, and $W_{i11}[k_i-179, k_i+3]$ separately. It is determined whether at least a part of data in $W_{i1}[k_i-169, k_i]$ meets the preset condition $C_1$, it is determined whether at least a part of data in $W_{i2}[k_i-170, k_i-1]$ meets the preset condition $C_2$, it is determined whether at least a part of data in $W_{i3}[k_i-171, k_i-2]$ meets the preset condition $C_3$, it is determined whether at least a part of data in $W_{i4}[k_i-172, k_i-3]$ meets the preset condition $C_4$, it is determined whether at least a part of data in $W_{i5}[k_i-173, k_i-4]$ meets the preset condition $C_5$, it is determined whether at least a part of data in $W_{i6}[k_i-174, k_i-5]$ meets the preset condition $C_6$, it is determined whether at least a part of data in $W_{i7}[k_i-175, k_i-6]$ meets the preset condition $C_7$, it is determined whether at least a part of data in $W_{i8}[k_i-176, $k_i-7$] meets the preset condition $C_8$, it is determined whether at least a part of data in $W_{i9}[k_i-177, k_i-8]$ meets the preset condition $C_9$, it is determined whether at least a part of data in $W_{i10}[k_i-168, k_i+1]$ meets the preset condition $C_{10}$, and it is determined whether at least a part of data in $W_{i11}[k_i-179, k_i+3]$ meets the preset condition $C_{11}$. When it is determined that the at least a part of data in the window $W_{i1}$ meets the preset condition $C_1$, the at least a part of data in the window $W_{i2}$ meets the preset condition $C_2$, the at least a part of data in the window $W_{i3}$ meets the preset condition $C_3$, the at least a part of data in the window $W_{i4}$ meets the preset condition $C_4$, the at least a part of data in the window $W_{i5}$ meets the preset condition $C_5$, the at least a part of data in the window $W_{i6}$ meets the preset condition $C_6$, the at least a part of data in the window $W_{i7}$ meets the preset condition $C_7$, the at least a part of data in the window $W_{i8}$ meets the preset condition $C_8$, the at least a part of data in the window $W_{i9}$ meets the preset condition $C_9$, the at least a part of data in the window $W_{i10}$ meets the preset condition $C_{10}$, and the at least a part of data in the window $W_{i11}$ meets the preset condition $C_{11}$, the current potential dividing point $k_i$ is a data stream dividing point. When it is determined that the at least a part of data in the window $W_{i11}$ does not meet the preset condition $C_{11}$, 1 byte is skipped from the potential dividing point $k_i$ along the direction of searching for a data stream dividing point, so as to obtain a new potential dividing point. For differentiation from the potential dividing point $k_i$, the new potential dividing point is represented as $k_j$ here. When the at least a part of data in any window the 10 windows $W_{i1}$, $W_{i2}$, $W_{i3}$, $W_{i4}$, $W_{i5}$, $W_{i6}$, $W_{i7}$, $W_{i8}$, $W_{i9}$, and $W_{i10}$ does not meet the corresponding preset condition, for example, $W_{i4}$ [$k_i-172, k_i-3$] shown in FIG. 28, N bytes are skipped from the point $k_i$ along the direction of searching for a data stream dividing point, where the N bytes are not greater than $||B_4||+\max_x(||A_x||)$. In an implementation manner shown in FIG. 28, the N bytes that are skipped are not greater than 182 bytes, and in this embodiment, N=6, so as to obtain a new potential dividing point. For differentiation from the potential dividing point $k_i$, the new potential dividing point is represented as $k_j$ here. According the rule preset on the deduplication server 103 in the implementation manner shown in FIG. 27, windows determined for the potential dividing point $k_j$ are $W_{j1}[k_j-169, k_j]$, $W_{j2}[k_j-170, k_j-1]$, $W_{j3}[k_j-171, k_j-2]$, $W_{j4}[k_j-172, k_j-3]$, $W_{j5}[k_j-173, k_j-4]$, $W_{j6}[k_j-174, k_j-5]$, $W_{j7}[k_j-175, k_j-6]$, $W_{j8}[k_j-176, k_j-7]$, $W_{j9}[k_j-177, k_j-8]$, $W_{j10}[k_j-168, k_j+1]$, and $W_{j11}[k_j-179, k_j+3]$ separately. It is determined whether at least a part of data in $W_{j1}[k_j-169, k_j]$ meets the preset condition $C_1$, it is determined whether at least a part of data in $W_{j2}[k_j-170, k_j-1]$ meets the preset condition $C_2$, it is determined whether at least a part of data in $W_{j3}[k_j-171, k_j-2]$ meets the preset condition $C_3$, it is determined whether at least a part of data in $W_{j4}[k_j-172, k_j-3]$ meets the preset condition $C_4$, it is determined whether at least a part of data in $W_{j5}[k_j-173, k_j-4]$ meets the preset condition $C_5$, it is determined whether at least a part of data in $W_{j6}[k_j-174, k_j-5]$ meets the preset condition $C_6$, it is determined whether at least a part of data in $W_{j7}[k_j-175, k_j-6]$ meets the preset condition $C_7$, it is determined whether at least a part of data in $W_{j8}[k_j-176, k_j-7]$ meets the preset condition $C_8$, it is determined whether at least a part of data in $W_{j9}[k_j-177, k_j-8]$ meets the preset condition $C_9$, it is determined whether at least a part of data in $W_{j10}[k_j-168, k_j+1]$ meets the preset condition $C_{10}$, and it is determined whether at least a part of data in $W_{j11}[k_j-179, k_j+3]$ meets the preset condition $C_{j11}$. Certainly, in this embodiment of the present invention, the rule is also followed when it is determined whether the potential dividing point $k_a$ is a data stream dividing point, specific implementation is not described again, and reference may be made to the description of determining the potential dividing point $k_i$. When it is determined that the at least a part of data in the window $W_{j1}$ meets the preset condition $C_1$, the at least a part of data in the window $W_{j2}$ meets the preset condition $C_2$, the at least a part of data in the window $W_{j3}$ meets the preset condition $C_3$, the at least a part of data in the window $W_{j4}$ meets the preset condition $C_4$, the at least a part of data in the window $W_{j5}$ meets the preset condition $C_5$, the at least a part of data in the window $W_{j6}$ meets the preset condition $C_6$, the at least a part of data in the window $W_{j7}$ meets the preset condition $C_7$, the at least a part of data in the window $W_{j8}$ meets the preset condition $C_8$, the at least a part of data in the window $W_{j9}$ meets the preset condition $C_9$, the at least a part of data in the window $W_{j10}$ meets the preset condition $C_{10}$, and the at least a part of data in the window $W_{j11}$ meets the preset condition $C_{11}$, the current potential dividing point $k_j$ is a data stream dividing point, and data between $k_j$ and $k_a$ forms 1 data chunk. Meanwhile, a minimum chunk size of 4 KB is skipped in a manner the same as that of $k_a$ to obtain a next potential dividing point, and according to the rule preset on the deduplication server 103, it is determined whether the next potential dividing point is a data stream dividing point. When it is determined that the potential dividing point $k_j$ is not a data stream dividing point, a next potential dividing point is obtained in a manner the same as that of $k_i$, and it is determined, according to the rule preset on the deduplication server 103 and the foregoing method, whether the next potential dividing point is a data stream dividing point. When no data stream dividing point is found after a set maximum data chunk is exceeded, an end position of the maximum data chunk serves as a forced dividing point.

Figure 29:
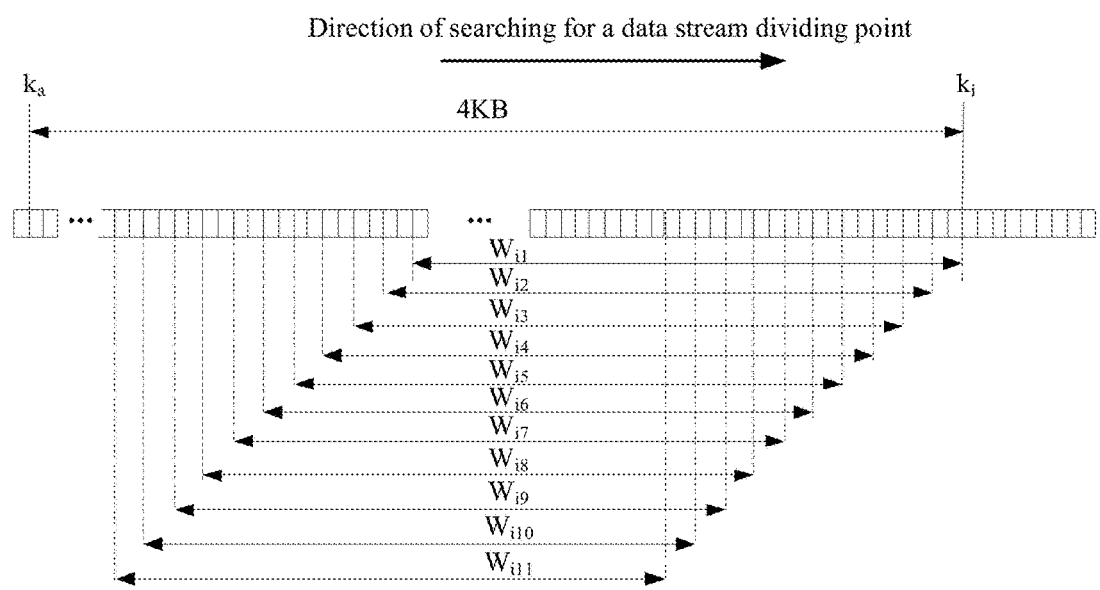
Figure 30:
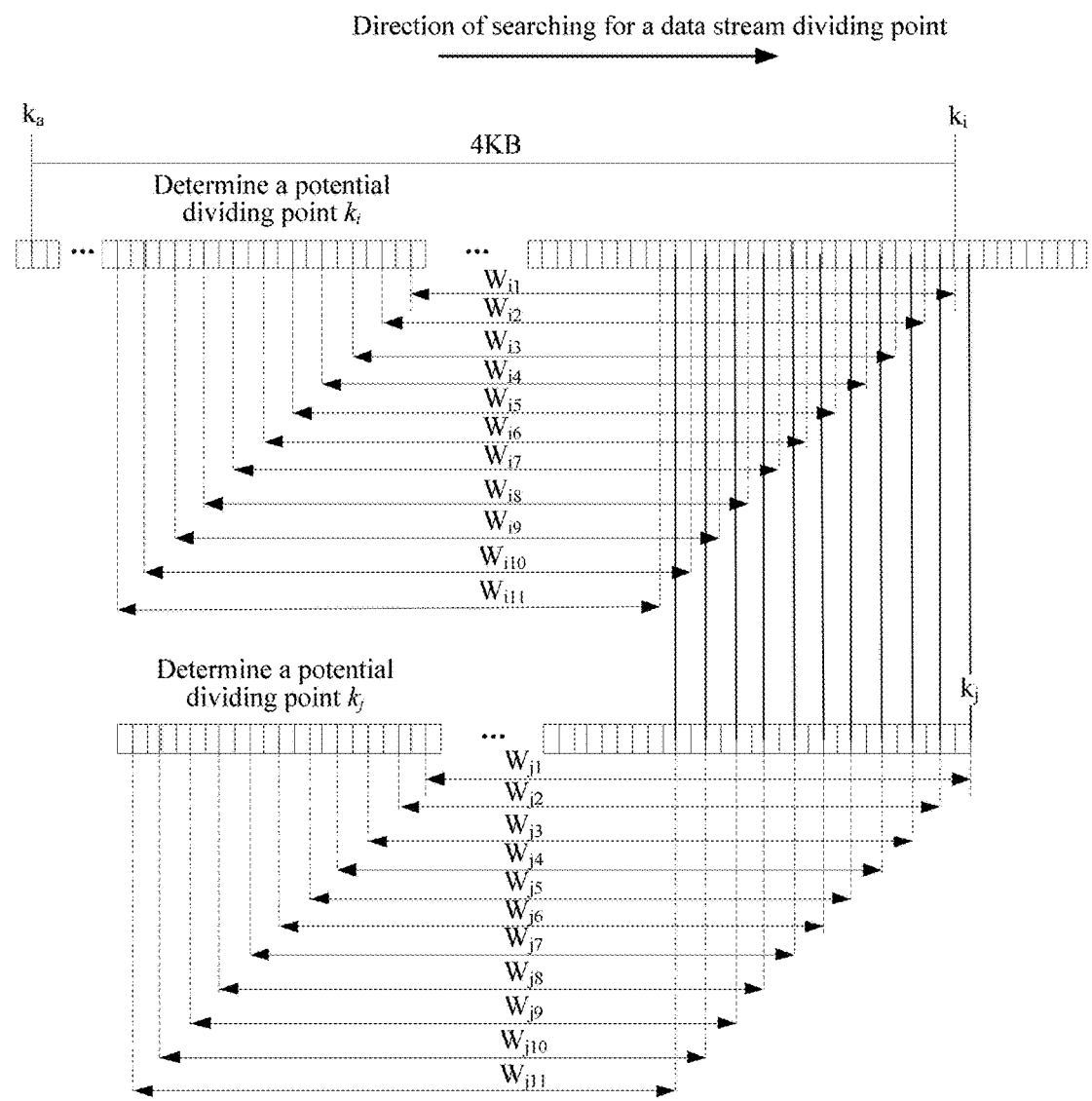
FIG. 30 and FIG. 31 are schematic diagrams of an implementation manner of searching for a data stream dividing point.
Figure 31:
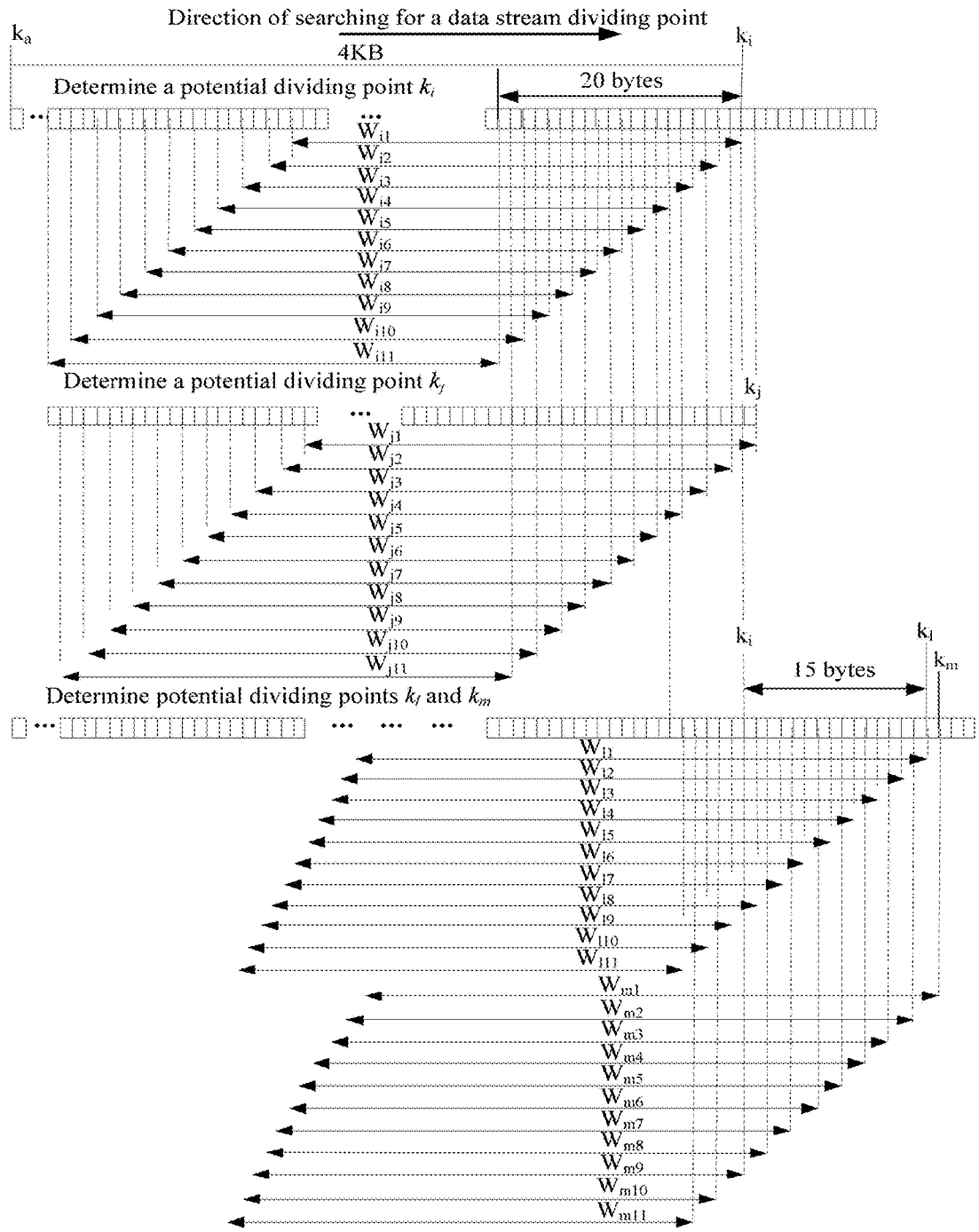

On the basis of the searching for a data stream dividing point shown in FIG. 3, in an implementation manner shown in FIG. 29, a rule is preset on a deduplication server 103, where the rule is: for a potential dividing point k, determining 11 windows $W_x[p_x-A_x, p_x+B_x]$ and a preset condition $C_x$ corresponding to the window $W_x[p_x-A_x, p_x+B_x]$, where x indicates consecutive natural numbers from 1 to 11 separately, where a probability that at least a part of data in the window $W_x$ $p_x-A_x$ $p_x$ $B_x1$ meets a preset condition is 1/2. $A_1$=169, $B_1$=0; $A_2$=171, $B_2$=-2; $A_3$=173, $B_3$=-4; $A_4$=175, $B_4$=-6; $A_5$=177, $B_5$=-8; $A_6$=179, $B_6$=-10; $A_7$=181, $B_7$=-12; $A_8$=183, $B_8$=-14; $A_9$=185, $B_9$=-16; $A_{10}$=187, $B_{10}$=-18; $A_{11}$=189, $B_{11}$=-20. $C_2=C_3=C_4=C_5=C_6=C_7=C_8=C_9=C_{10}=C_{11}$, and the 11 windows are $W_1[k-169, k]$, $W_2[k-171, k-2]$, $W_3[k-173, k-4]$, $W_4[k-175, k-6]$, $W_5[k-177, k-8]$, $W_6[k-179, k-10]$, $W_7[k-181, k-12]$, $W_8[k-183, k-14]$, $W_9[k-185, k-16]$, $W_{10}[k-187, k-18]$, and $W_{11}[k-189, k-20]$ separately. $k_a$ is a data stream dividing point, and a direction of searching for a data stream dividing point shown in FIG. 29 is from left to right. After a minimum data chunk of 4 KB is skipped from the data stream dividing point $k_a$, an end position of the minimum data chunk of 4 KB serves as a next potential dividing point $k_i$, and a point $p_{ix}$ is determined for the potential dividing point $k_i$. In this embodiment, according to the rule preset on the deduplication server 103, x indicates consecutive natural numbers from 1 to 11 separately. In the implementation manner shown in FIG. 29, according to the preset rule, 11 windows determined for the potential dividing point $k_i$ are $W_{i1}[k_i-169, k_i]$, $W_{i2}[k_i-171, k_i-2]$, $W_{i3}[k_i-173, k_i-4]$, $W_{i4}[k_i-175, k_i-6]$, $W_{i5}[k_i-177, k_i-8]$, $W_{i6}[k_i-179, k_i-10]$, $W_{i7}[k_i-181, k_i-12]$, $W_{i8}[k_i-183, k_i-14]$, $W_{i9}[k_i-185, k_i-16]$, $W_{i10}[k_i-187, k_i-18]$, and $W_{i11}[k_i-189, k_i-20]$ separately. It is determined whether at least a part of data in $W_{i1}[k_i-169, k_i]$ meets the preset condition $C_1$, it is determined whether at least a part of data in $W_{i2}[k_i-171, k_i-2]$ meets the preset condition $C_2$, it is determined whether at least a part of data in $W_{i3}[k_i-173, k_i-4]$ meets the preset condition $C_3$, it is determined whether at least a part of data in $W_{i4}[k_i-175, k_i-6]$ meets the preset condition $C_4$, it is determined whether at least a part of data in $W_{i5}[k_i-177, k_i-8]$ meets the preset condition $C_5$, it is determined whether at least a part of data in $W_{i6}[k_i-179, k_i-10]$ meets the preset condition $C_6$, it is determined whether at least a part of data in $W_{i7}[k_i-181, k_i-12]$ meets the preset condition $C_7$, it is determined whether at least a part of data in $W_{i8}[k_i-183, k_i-14]$ meets the preset condition $C_8$, it is determined whether at least a part of data in $W_{i9}[k_i-185, k_i-16]$ meets the preset condition $C_9$, it is determined whether at least a part of data in $W_{i10}[k_1-187, k_i-18]$ meets the preset condition $C_{10}$, and it is determined whether at least a part of data in $W_{i11}[k_i-189, k_i-20]$ meets the preset condition $C_{11}$. When it is determined that the at least a part of data in the window $W_a$ meets the preset condition $C_1$, the at least a part of data in the window $W_{i2}$ meets the preset condition $C_2$, the at least a part of data in the window $W_{i3}$ meets the preset condition $C_3$, the at least a part of data in the window $W_{i4}$ meets the preset condition $C_4$, the at least a part of data in the window $W_{i5}$ meets the preset condition $C_5$, the at least a part of data in the window $W_6$ meets the preset condition $C_6$, the at least a part of data in the window $W_{i7}$ meets the preset condition $C_7$, the at least a part of data in the window $W_{i8}$ meets the preset condition $C_8$, the at least a part of data in the window $W_{i9}$ meets the preset condition $C_9$, the at least a part of data in the window $W_{i10}$ meets the preset condition $C_{10}$, and the at least a part of data in the window $W_{i11}$ meets the preset condition $C_{11}$, the current potential dividing point $k_i$ is a data stream dividing point. When the at least a part of data in any window of the 11 windows does not meet the corresponding preset condition, for example, as shown in FIG. 30, the at least a part of data in $W_{i4}[k_i-175, k_i-6]$ does not meet the preset condition $C_4$, a next potential dividing point is selected. For differentiation from the potential dividing point $k_i$, the next potential dividing point is represented as $k_j$ here, where $k_j$ is located on the right of $k_i$, and a distance between $k_j$ and $k_i$ is 1 byte. As shown in FIG. 30, according to the rule preset on the deduplication server 103, for the potential dividing point $k_j$, 11 windows are determined, and are $W_{j1}[k_j-169, k_j]$, $W_{j2}[k_j-171, k_j-2]$, $W_{j3}[k_j-173, k_j-4]$, $W_{j4}[k_j-175, k_j-6]$, $W_{j5}[k_j-177, k_j-8]$, $W_{j6}[k_j-179, k_j-10]$, $W_{j7}[k_j-181, k_j-12]$, $W_{j8}[k_j-183, k_j-14]$, $W_{j9}[k_j-185, k_j-16]$, $W_{j10}[k_j-187, k_j-18]$, and $W_{j11}[k_j-189, k_j-20]$ separately, where $C_1=C_2=C_3=C_4=C_5=C_6=C_7=C_8=C_9=C_{10}=C_{11}$. It is determined whether at least a part of data in $W_{j1}[k_j-169, k_j]$ meets the preset condition $C_1$, it is determined whether at least a part of data in $W_{j2}[k_j-171, k_j-2]$ meets the preset condition $C_2$, it is determined whether at least a part of data in $W_{j3}[k_j-173, k_j-4]$ meets the preset condition $C_3$, it is determined whether at least a part of data in $W_{j4}[k_j-175, k_j-6]$ meets the preset condition $C_4$, it is determined whether at least a part of data in $W_{j5}[k_j-177, k_j-8]$ meets the preset condition $C_5$, it is determined whether at least a part of data in $W_{j6}[k_j-179, k_j-10]$ meets the preset condition $C_6$, it is determined whether at least a part of data in $W_{j7}[k_j-181, k_j-12]$ meets the preset condition $C_7$, it is determined whether at least a part of data in $W_{j8}[k_j-183, k_j-14]$ meets the preset condition $C_8$, it is determined whether at least a part of data in $W_{j9}[k_j-185, k_j-16]$ meets the preset condition $C_9$, it is determined whether at least a part of data in $W_{j10}[k_j-187, k_j-18]$ meets the preset condition $C_{10}$, and it is determined whether at least a part of data in $W_{j11}[k_j-189, k_j-20]$ meets the preset condition $C_{11}$. When it is determined that the at least a part of data in the window $W_{j1}$ meets the preset condition $C_1$, the at least a part of data in the window $W_{j2}$ meets the preset condition $C_2$, the at least a part of data in the window $W_{j3}$ meets the preset condition $C_3$, the at least a part of data in the window $W_{j4}$ meets the preset condition $C_4$, the at least a part of data in the window $W_{j5}$ meets the preset condition $C_5$, the at least a part of data in the window $W_{j6}$ meets the preset condition $C_6$, the at least a part of data in the window $W_{j7}$ meets the preset condition $C_7$, the at least a part of data in the window $W_{j8}$ meets the preset condition $C_8$, the at least a part of data in the window $W_{j9}$ meets the preset condition $C_9$, the at least a part of data in the window $W_{j10}$ meets the preset condition $C_{10}$, and the at least a part of data in the window $W_{j11}$ meets the preset condition $C_{11}$, the current potential dividing point $k_j$ is a data stream dividing point. When it is determined that the at least a part of data in any window of the windows $W_{j1}$, $W_{j2}$, $W_{j3}$, $W_{j4}$, $W_{j5}$, $W_{j6}$, $W_{j7}$, $W_{j8}$, $W_{j9}$, $W_{j10}$, and $W_{j11}$ does not meet a preset condition, for example, as shown in FIG. 31, when the at least a part of data in $W_{j3}[k_j-173, k_j-4]$ does not meet the preset condition $C_3$, $k_j$ is located on the right of $k_i$ and N bytes are skipped from $k_i$ along the direction of searching for a data stream dividing point, where the N bytes are not greater than $\|B_4\|+\max_X(\|A_x\|)$. In the implementation manner shown in FIG. 28, the N bytes are not greater than 195 bytes, and in this embodiment, N=15, so as to obtain a next potential dividing point. For differentiation from the potential dividing points $k_i$ and $k_j$, the next potential dividing point is represented as $k_l$. According to the rule preset on the deduplication server 103 in the implementation manner in FIG. 29, for the potential dividing point $k_l$, 11 windows are determined, and are $W_{l1}[k_l-169, k_l]$, $W_{l2}[k_l-171, k_l-2]$, $W_{l3}[k_l-173, k_l-4]$, $W_{l4}[k_l-175, k_l-6]$, $W_{l5}[k_l-177, k_l-8]$, $W_{l6}[k_l-179, k_l-10]$, $W_{l7}[k_l-181, k_l-12]$, $W_{l8}[k_l-183, k_l-14]$, $W_{l9}[k_l-185, k_l-16]$, $W_{l10}[k_l-187, k_l-18]$, and $W_{l11}[k_l-189, k_l-20]$ separately. It is determined whether at least a part of data in $W_{l1}[k_l-169, k_l]$ meets the preset condition $C_1$, it is determined whether at least a part of data in $W_{l2}[k_l-171, k_l-2]$ meets the preset condition $C_2$, it is determined whether at least a part of data in $W_{l3}[k_l-173, k_l-4]$ meets the preset condition $C_3$, it is determined whether at least a part of data in $W_{l4}[k_l-175, k_l-6]$ meets the preset condition $C_4$, it is determined whether at least a part of data in $W_{l5}[k_l-177, k_l-8]$ meets the preset condition $C_5$, it is determined whether at least a part of data in $W_{l6}[k_l-179, k_l-10]$ meets the preset condition $C_6$, it is determined whether at least a part of data in $W_{l7}[k_l-181, k_l-12]$ meets the preset condition $C_7$, it is determined whether at least a part of data in $W_{l8}[k_l-183, k_l-14]$ meets the preset condition $C_8$, it is determined whether at least a part of data in $W_{l9}[k_l-185, k_l-16]$ meets the preset condition $C_9$, it is determined whether at least a part of data in $W_{l10}$ [187, $k_l-18$] meets the preset condition $C_{10}$, and it is determined whether at least a part of data in $W_{l11}[k_l-189, k_l-20]$ meets the preset condition $C_{11}$. When it is determined that the at least a part of data in the window $W_{l1}$ meets the preset condition $C_1$, the at least a part of data in the window $W_{l2}$ meets the preset condition $C_2$, the at least a part of data in the window $W_{l3}$ meets the preset condition $C_3$, the at least a part of data in the window $W_{l4}$ meets the preset condition $C_4$, the at least a part of data in the window $W_{l5}$ meets the preset condition $C_5$, the at least a part of data in the window $W_{l6}$ meets the preset condition $C_6$, the at least a part of data in the window $W_{l7}$ meets the preset condition $C_7$, the at least a part of data in the window $W_{l8}$ meets the preset condition $C_8$, the at least a part of data in the window $W_{l9}$ meets the preset condition $C_9$, the at least a part of data in the window $W_{l10}$ meets the preset condition $C_{10}$, and the at least a part of data in the window $W_{l11}$ meets the preset condition $C_{11}$, the current potential dividing point $k_l$ is a data stream dividing point. When the at least a part of data in any window of the windows $W_{l1}$, $W_{l2}$, $W_{l3}$, $W_{l4}$, $W_{l5}$, $W_{l6}$, $W_{l7}$, $W_{l8}$, $W_{l9}$, $W_{l10}$, and $W_{l11}$ does not meet a preset condition, a next potential dividing point is selected. For differentiation from the potential dividing points $k_i$, $k_j$, and $k_l$, the next potential dividing point is represented as $k_m$, where $k_m$ is located on the right of $k_l$, and a distance between $k_m$ and $k_l$ is 1 byte. According to the rule preset on the deduplication server 103 in the embodiment shown in FIG. 29, 11 windows determined for the potential dividing point $k_m$ are $W_{m1}[k_m-169, k_m]$, $W_{m2}[k_m-171, k_m-2]$, $W_{m3}[k_m-173, k_m-4]$, $W_{m4}[k_m-175, k_m-6]$, $W_{m5}[k_m-177, k_m-8]$, $W_{m6}[k_m-179, k_m-10]$, $W_{m7}[k_m-181, k_m-12]$, $W_{m8}[k_m-183, k_m-14]$, $W_{m9}[k_m-185, k_m-16]$, $W_{m10}[k_m-187, k_m-18]$, and $W_{m11}[k_m-189, k_m-20]$ separately. It is determined whether at least a part of data in $W_{m1}[k_m-169, k_m]$ meets the preset condition $C_1$, it is determined whether at least a part of data in $W_{m2}[k_m-171, k_m-2]$ meets the preset condition $C_2$, it is determined whether at least a part of data in $W_{m3}[k_m-173, k_m-4]$ meets the preset condition $C_3$, it is determined whether at least a part of data in $W_{m4}[k_m-175, k_m-6]$ meets the preset condition $C_4$, it is determined whether at least a part of data in $W_{m5}[k_m-177, k_m-8]$ meets the preset condition $C_5$, it is determined whether at least a part of data in $W_{m6}[k_m-179, k_m-10]$ meets the preset condition $C_6$, it is determined whether at least a part of data in $W_{m7}[k_m-181, k_m-12]$ meets the preset condition $C_7$, it is determined whether at least a part of data in $W_{m8}[k_m-183, k_m-14]$ meets the preset condition $C_8$, it is determined whether at least a part of data in $W_{m9}[k_m-185, k_m-16]$ meets the preset condition $C_9$, it is determined whether at least a part of data in $W_{m10}[k_m-187, k_m-18]$ meets the preset condition $C_{10}$, and it is determined whether at least a part of data in $W_{m11}[k_m-189, k_m-20]$ meets the preset condition $C_{11}$. When it is determined that the at least a part of data in the window $W_{m1}$ meets the preset condition $C_1$, the at least a part of data in the window $W_{m2}$ meets the preset condition $C_2$, the at least a part of data in the window $W_{m3}$ meets the preset condition $C_3$, the at least a part of data in the window $W_{m4}$ meets the preset condition $C_4$, the at least a part of data in the window $W_{m5}$ meets the preset condition $C_5$, the at least a part of data in the window $W_{m6}$ meets the preset condition $C_6$, the at least a part of data in the window $W_{m7}$ meets the preset condition $C_7$, the at least a part of data in the window $W_{m}$, meets the preset condition $C_8$, the at least a part of data in the window $W_{m9}$ meets the preset condition $C_9$, the at least a part of data in the window $W_{m10}$ meets the preset condition $C_{10}$, and the at least a part of data in the window $W_{m11}$ meets the preset condition $C_{11}$, the current potential dividing point $k_m$ is a data stream dividing point. When the at least a part of data in any window does not meet a preset condition, skipping is executed according to the solution described above to obtain a next potential dividing point, and it is determined whether the next potential dividing point is a data stream dividing point.

Figure 32:
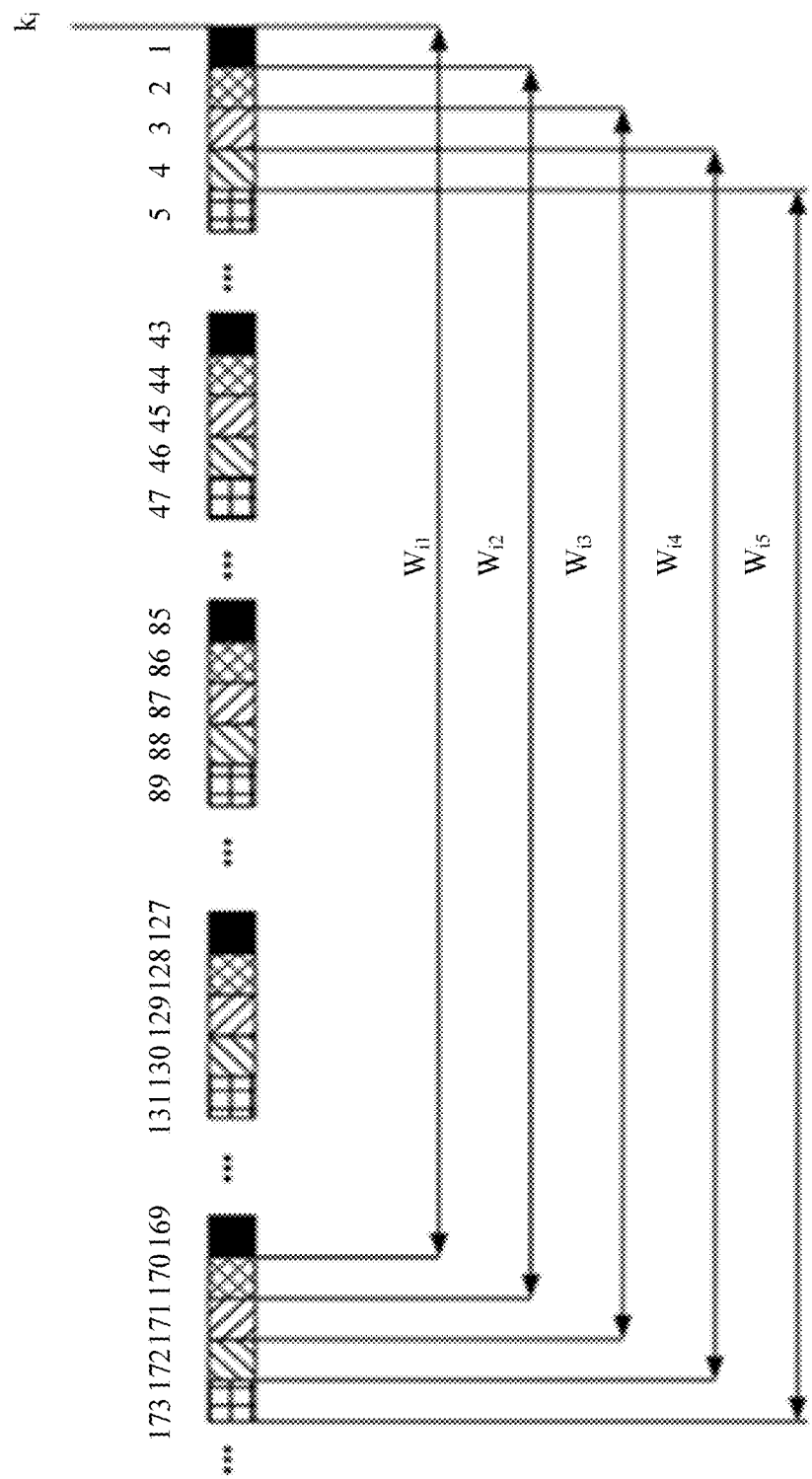
FIG. 32 and FIG. 33 are schematic diagrams of determining whether at least a part of data in a window meets a preset condition.

An embodiment of the present invention provides a method for determining whether at least a part of data in a window $W_{iz}[k_i-A_z, k_i+B_z]$ meets a preset condition $C_z$. In this embodiment, it is determined, by using a random function, whether the at least a part of data in the window $W_{iz}[k_i-A_z, k+B_z]$ meets the preset condition $C_z$, and the implementation manner shown in FIG. 21 is used as an example. According to a rule preset on a deduplication server 103, a window $W_{i1}[k_i-169, k_i]$ is determined for a potential dividing point $k_i$, and it is determined whether at least a part of data in $W_{i1}[k_i-169, k_i]$ meets a preset condition $C_1$. As shown in FIG. 32, $W_{i1}$ represents the window $W_{i1}[k_i-169, k_i]$, and 5 bytes are selected to determine whether the at least a part of data in $W_{i1}[k_i-169, k]$ meets the preset condition $C_1$. In FIG. 32, "■" represents 1 selected byte, and there are 42 bytes between two adjacent selected bytes. The selected 5 bytes of data are used repeatedly 51 times to obtain 255 bytes in total, so as to increase randomness. Each byte thereof is formed by 8 bits, which are denoted as $a_{m,1}, \ldots,$ and $a_{m,8}$, representing the 1st bit to the 8th bit of an mth byte in the 255 bytes, and therefore, bits corresponding to the 255 bytes may be represented as:

$$\begin{pmatrix} a_{1,1} & a_{1,2} & L & a_{1,8} \\ a_{2,1} & a_{2,2} & L & a_{2,8} \\ M & M & M & M \\ a_{255,1} & a_{255,2} & L & a_{255,8} \end{pmatrix},$$

where when $a_{m,n}=1$, $V_{am,n}=1$, and when $a_{m,n}=0$, $V_{am,n}=-1$, where $a_{m,n}$ represents any one of $a_{m,1}, \ldots,$ and $a_{m,8}$, and a matrix $V_a$ is obtained according to a conversion relationship between $a_{m,n}$ and $V_{am,n}$ from the bits corresponding to the 255 bytes, and may be represented as:

$$\begin{pmatrix} V_{a1,1} & V_{a1,2} & \Lambda & V_{a1,8} \\ V_{a2,1} & V_{a2,2} & \Lambda & V_{a2,8} \\ M & M & M & M \\ V_{a255,1} & V_{a255,2} & \Lambda & V_{a255,8} \end{pmatrix}.$$

A large quantity of random numbers is selected to form a matrix. Once being formed, the matrix formed by the random numbers remains unchanged. For example, 255*8 random numbers are selected from random numbers that follow specific distribution (normal distribution is used as an example here) to form a matrix R:

$$\begin{pmatrix} h_{1,1} & h_{1,2} & L & h_{1,8} \\ h_{2,1} & h_{2,2} & L & h_{2,8} \\ M & M & M & M \\ h_{255,1} & h_{255,2} & L & h_{255,8} \end{pmatrix},$$

where random numbers of an mth row of the matrix $V_a$ and an mth row of the matrix R are multiplied and products are added to obtain a value, which is specifically represented as $S_{am}'=V_{am,1}'*h_{m,1}+V_{am,2}'*h_{m,2}+ \ldots +V_{am,8}*h_{m,8}$. $S_{a1}'$, $S_{a2}, \ldots,$ and $S_{a255}$ are obtained according to the method, and a quantity K of values meeting a specific condition (being greater than 0 is used as an example here) among $S_{a1}$, $S_{a2}, \ldots,$ and $S_{a255}$ is counted. Because the matrix R follows normal distribution, $S_{am}$ still follows normal distribution as the matrix R does. According to a probability theory, a probability that a random number in normal distribution is greater than 0 is 1/2; a probability that each value among $S_{a1}$, $S_{a2}, \ldots,$ and $S_{a255}$ is greater than 0 is 1/2, and therefore, K meets binomial distribution: $P(k=n)=C_{255}{}^n(1/2)^n(1/2)^{255-n}=C_{255}{}^n(1/2)^{255}$. According to a counting result, it is determined whether the quantity K of values greater than 0 among $S_{a1}$, $S_{a2}, \ldots,$ and $S_{a255}$ is an even number; a probability that a random number in binomial distribution is an even number is 1/2, and therefore, K meets a condition with a probability of 1/2. When K is an even number, it indicates that the at least a part of data in $W_{i1}[k_i-169, k_i]$ meets the preset condition $C_1$. When K is an odd number, it indicates that the at least a part of data in $W_1[k_i-169, k_i]$ does not meet the preset condition $C_1$. $C_1$ here refers to that the quantity K, which is obtained according to the foregoing manner, of values greater than 0 among $S_{a1}, S_{a2}, \ldots$, and $S_{a255}$ is an even number. In the implementation manner shown in FIG. 21, for $W_{i1}[k_i-169, k_i]$, $W_{i2}[k_i-170, k_i-1]$, $W_{i3}[k_i-171, k_i-2]$, $W_{i4}[k_i-172, k_i-3]$, $W_{i5}[k_i-173, k_i-4]$, $W_{i6}[k_i-174, k_i-5]$, $W_{i7}[k_i-175, k_i-6]$, $W_{i8}[k_i-176, k_i-7]$, $W_{i9}[k_i-177, k_i-8]$, $W_{i10}[k_i-178, k_i+9]$, and $W_{i11}[k_i-179, k_i+10]$ the windows are the same in size, that is, all the windows have a size of 169 bytes, and meanwhile, manners of determining whether at least a part of data in a window meets a preset condition are also the same. For details, refer to the foregoing description of determining whether the at least a part of data in $W_{i1}[k_i-169, k_i]$ meets the preset condition $C_1$. Therefore, as shown in FIG. 32, "▨" represents 1 byte selected when it is determined whether at least a part of data in the window $W_{i2}[k_i-170, k_i-1]$ meets a preset condition $C_2$, and there are 42 bytes between two adjacent selected bytes. Selected 5 bytes of data are used repeatedly 51 times to obtain 255 bytes in total, so as to increase randomness. Each byte thereof is formed by 8 bits, which are denoted as $b_{m,1}, \ldots,$ and $b_{m,8}$, representing the 1st bit to the 8th bit of an mth byte in the 255 bytes, and therefore, bits corresponding to the 255 bytes may be represented as:

$$\begin{pmatrix} b_{1,1} & b_{1,2} & \Lambda & b_{1,8} \\ b_{2,1} & b_{2,2} & \Lambda & b_{2,8} \\ M & M & M & M \\ b_{255,1} & b_{255,2} & \Lambda & b_{255,8} \end{pmatrix},$$

where when $b_{m,n}=1$, $V_{bm,n}=1$, and when $b_{m,n}=0$, $V_{bm,n}=-1$, where $k_{m,n}$ represents any one of $b_{m,1}, \ldots,$ and $b_{m,8}$, and a matrix $V_b$ is obtained according to a conversion relationship between $k_{m,n}$ and $V_{bm,n}$, from the bits corresponding to the 255 bytes, and may be represented as:

$$\begin{pmatrix} V_{b1,1} & V_{b1,2} & \ldots & V_{b1,8} \\ V_{b2,1} & V_{b2,2} & \ldots & V_{b2,8} \\ M & M & M & M \\ V_{b255,1} & V_{b255,2} & \ldots & V_{b255,8} \end{pmatrix}.$$

A manner of determining whether at least a part of data in $W_{i1}[k_i-169, k_i]$ meets a preset condition is the same as a manner of determining whether at least a part of data in the window $W_{i2}[k_i-170, k_i-1]$ meets a preset condition; therefore the matrix R is used:

$$\begin{pmatrix} h_{1,1} & h_{1,2} & L & h_{1,8} \\ h_{2,1} & h_{2,2} & L & h_{2,8} \\ M & M & M & M \\ h_{255,1} & h_{255,2} & L & h_{255,8} \end{pmatrix},$$

and random numbers of an mth row of the matrix $V_b$ and the mth row of the matrix R are multiplied and products are added to obtain a value, which is specifically represented as $S_{bm}=V_{bm,1}*h_{m,1}+V_{bm,2}*h_{m,2}+ \ldots +V_{bm,8}*h_{m,8}$. $S_{b1}, S_{b2} \ldots,$ and $S_{b255}$ are obtained according to the method, and a quantity K of values meeting a specific condition (being greater than 0 is used as an example here) among $S_{b1}, S_{b2}, \ldots,$ and $S_{b255}$ is counted. Because the matrix R follows normal distribution, $S_{bm}$ still follows normal distribution as the matrix R does. According to the probability theory, the probability that a random number in normal distribution is greater than 0 is 1/2; a probability that each value among $S_{b1}, b_2, \ldots,$ and $S_{b255}$ is greater than 0 is 1/2, and therefore, K meets binomial distribution: $P(k=n)=C_{255}^n(1/2)^n(1/2)^{255-n}=C_{255}^n(1/2)^{255}$. According to a counting result, it is determined whether the quantity K of values greater than 0 among $S_{b1}, S_{b2} \ldots,$ and $S_{b255}$ is an even number; the probability that a random number in binomial distribution is an even number is 1/2, and therefore, K meets a condition with a probability of 1/2. When K is an even number, it indicates that the at least a part of data in $W_{i2}[k_i-170, k_i-1]$ meets the preset condition $C_2$. When K is an odd number, it indicates that the at least a part of data in $W_{i2}[k_i-170, k_i-1]$ does not meet the preset condition $C_2$. $C_2$ here refers to that the quantity K, which is obtained according to the foregoing manner, of values greater than 0 among $S_{b1}, S_{b2}, \ldots,$ and $S_{b255}$ is an even number. In the implementation manner shown in FIG. 21, the at least a part of data in $W_{i2}[k_i-170, k_i-1]$ meets the preset condition $C_2$.

Therefore, as shown in FIG. 32, "▨" represents 1 byte selected when it is determined whether at least a part of data in the window $W_{i3}[k_i-171, k_i-2]$ meets a preset condition $C_3$, and there are 42 bytes between two adjacent selected bytes. Selected 5 bytes of data are used repeatedly 51 times to obtain 255 bytes in total, so as to increase randomness. Then, the method for determining whether at least a part of data in the windows $W_{i1}[k_i-169, k_i]$ and $W_{i2}[k_i-170, k_i-1]$ meets a preset condition is used to determine whether at least a part of data in $W_{i3}[k_i-171, k_i-2]$ meets the preset condition $C_3$. In the implementation manner shown in FIG. 21, the at least a part of data in $W_{i3}[k_i-171, k_i-2]$ meets the preset condition. As shown in FIG. 32, "▨" represents 1 byte selected when it is determined whether at least a part of data in the window $W_{i4}[k_i-172, k_i-3]$ meets a preset condition $C_4$, and there are 42 bytes between two adjacent selected bytes. Selected 5 bytes of data are used repeatedly 51 times to obtain 255 bytes in total, so as to increase randomness. Then, the method for determining whether at least a part of data in the windows $W_{i1}[k_i-169, k_i]$, $W_{i2}[k_i-170, k_i-1]$, and $W_{i3}[k_i-171, k_i-2]$ meets a preset condition is used to determine whether the at least a part of data in $W_{i4}[k_i-172, k_i-3]$ meets the preset condition $C_4$. In the implementation manner shown in FIG. 21, the at least a part of data in $W_{i4}[k_i-172, k_i-3]$ meets the preset condition $C_4$. As shown in FIG. 32, "⊞" represents 1 byte selected when it is determined whether at least a part of data in the window $W_{i5}[k_i-173, k_i-4]$ meets a preset condition $C_5$, and there are 42 bytes between two adjacent selected bytes. Selected 5 bytes of data are used repeatedly 51 times to obtain 255 bytes in total, so as to increase randomness. Then, the method for determining whether at least a part of data in the windows $W_{i1}[k_i-169, k_i]$, $W_{i2}[k_i-170, k_i-1]$, $W_{i3}[k_i-171, k_i-2]$, and $W_{i4}[k_i-172, k_i-3]$ meets a preset condition is used to determine whether the at least a part of data in $W_{i5}[k_i-173, k_i-4]$ meets the preset condition $C_5$. In the implementation manner shown in FIG. 21, at least a part of data in $W_{i5}[k_i-173, k_i-4]$ does not meet the preset condition $C_5$.

Figure 33:
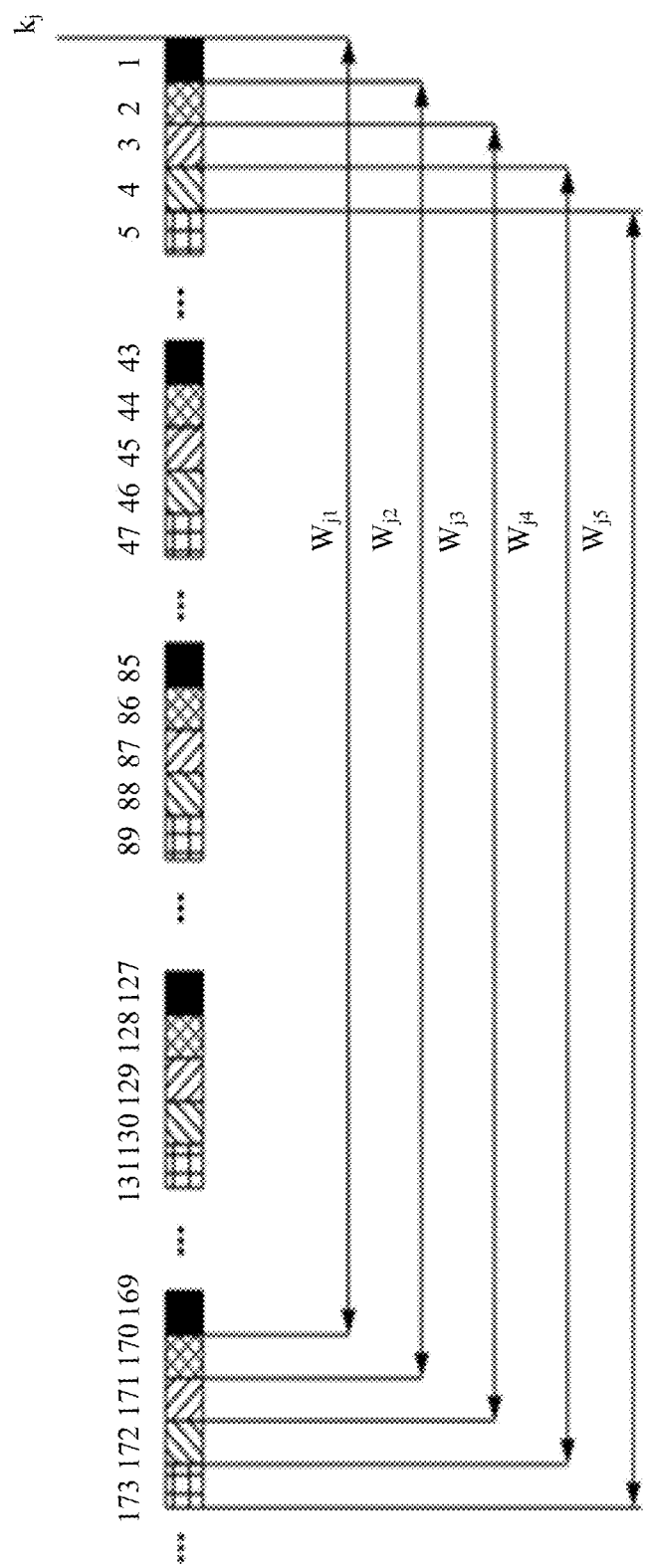

When the at least a part of data in $W_{i5}[k_i-173, k_i-4]$ does not meet the preset condition $C_5$, 7 bytes are skipped from a point $p_{i5}$ along a direction of searching for a data stream dividing point, and a next potential dividing point $k_j$ is obtained at an end position of a 7th byte. As shown in FIG. 22, according to the rule preset on the deduplication server 103, a window $W_{j1}[k_j-169, k_j]$ is determined for the potential dividing point $k_j$. A manner of determining whether at least a part of data in the window $W_{j1}[k_j-169, k_j]$ meets the preset condition $C_1$ is the same as a manner of determining whether at least a part of data in the window $W_{i1}[k_j-169, k_j]$ meets the preset condition $C_1$. Therefore, as shown in FIG. 33, $W_{j1}$ represents a window, and 5 bytes are selected to determine whether the at least a part of data in the window meets the preset condition $C_1$. In FIG. 33, "■" represents 1 selected byte, and there are 42 bytes between two adjacent selected bytes. The selected 5 bytes of data are used repeatedly 51 times to obtain 255 bytes in total, so as to increase randomness. Each byte thereof is formed by 8 bits, which are denoted as $a_{m,1}', \ldots,$ and $a_{m,8}'$, representing the 1st bit to the 8th bit of an mth byte in the 255 bytes, and therefore, bits corresponding to the 255 bytes may be represented as:

$$\begin{pmatrix} a_{1,1}' & a_{1,2}' & \ldots & a_{1,8}' \\ a_{2,1}' & a_{2,2}' & \ldots & a_{2,8}' \\ M & M & M & M \\ a_{255,1}' & a_{255,2}' & \ldots & a_{255,8}' \end{pmatrix},$$

where when $a_{m,n}'=1$, $V_{am,n}'=1$, and when $a_{m,n}'=0$, $V_{am,n}'=-1$, where $a_{m,n}'$ represents any one of $a_{m,1}', \ldots,$ and $a_{m,8}'$, and a matrix $V_a'$ is obtained according to a conversion relationship between $a_{m,n}'$ and $V_{am,n}'$ from the bits corresponding to the 255 bytes, and may be represented as:

$$\begin{pmatrix} V_{a1,1}' & V_{a1,2}' & \ldots & V_{a1,8}' \\ V_{a2,1}' & V_{a2,2}' & \ldots & V_{a2,8}' \\ M & M & M & M \\ V_{a255,1}' & V_{a255,2}' & \ldots & V_{a255,8}' \end{pmatrix}.$$

A manner of determining whether at least a part of data in the window meets a preset condition is the same as a manner of determining whether at least a part of data in the window $W_{i1}[k_j-169, k_j]$ meets a preset condition. Therefore the matrix R is used:

$$\begin{pmatrix} h_{1,1} & h_{1,2} & L & h_{1,8} \\ h_{2,1} & h_{2,2} & L & h_{2,8} \\ M & M & M & M \\ h_{255,1} & h_{255,2} & L & h_{255,8} \end{pmatrix},$$

and random numbers of an mth row of the matrix $V_a'$ and the mth row of the matrix R are multiplied and products are added to obtain a value, which is specifically represented as $S_{am}'=V_{am,1}'*h_{m,1}+V_{am,2}'*h_{m,2}+\ldots+V_{am,8}'*h_{m,8}$. $S_{a1}', S_{a2}', \ldots, S_{a255}'$ are obtained according to the method, and a quantity K of values meeting a specific condition (being greater than 0 is used as an example here) among $S_{a1}', S_{a2}',$ and $S_{a255}'$ is counted. Because the matrix R follows normal distribution, $S_{am}'$ still follows normal distribution as the matrix R does. According to the probability theory, the probability that a random number in normal distribution is greater than 0 is 1/2; a probability that each value among $S_{a1}', S_{a2}', \ldots,$ and $S_{a255}'$ is greater than 0 is 1/2, and therefore K meets binomial distribution: $P(k=n)=C_{255}^n (1/2)^n (1/2)^{255-n}=C_{255}^n (1/2)^{255}$. According to a counting result, it is determined whether the quantity K of values greater than 0 among $S_{a1}, S_{a2}', \ldots,$ and $S_{a255}'$ is an even number; the probability that a random number in binomial distribution is an even number is 1/2, and therefore, K meets a condition with a probability of 1/2. When K is an even number, it indicates that the at least a part of data in $W_{j1}[k_j-169, k_j]$ meets the preset condition $C_1$. When K is an odd number, it indicates that the at least a part of data in $W_{j1}[k_j-169, k_j]$ does not meet the preset condition $C_1$.

A manner of determining whether at least a part of data in $W_{i2}[k_t-170, k_t-1]$ meets the preset condition $C_2$ is the same as a manner of determining whether at least a part of data in $W_{j2}[k_j-170, k_j-1]$ meets the preset condition $C_2$. Therefore, as shown in FIG. 33, "▨" represents 1 byte selected when it is determined whether the at least a part of data in the window $W_{j2}[k_j-170, k_j-1]$ meets the preset condition $C_2$, and there are 42 bytes between two adjacent selected bytes. Selected 5 bytes of data are used repeatedly 51 times to obtain 255 bytes in total, so as to increase randomness. Each byte thereof is formed by 8 bits, which are denoted as $b_{m,1}', \ldots,$ and $b_{m,8}'$, representing the 1st bit to the 8th bit of an mth byte in the 255 bytes, and therefore, bits corresponding to the 255 bytes may be represented as:

$$\begin{pmatrix} b_{1,1}' & b_{1,2}' & \ldots & b_{1,8}' \\ b_{2,1}' & b_{2,2}' & \ldots & b_{2,8}' \\ M & M & M & M \\ b_{255,1}' & b_{255,2}' & \ldots & b_{255,8}' \end{pmatrix},$$

where when $b_{m,n}'=1$, $V_{bm,n}'=1$, and when $b_{m,n}'=0$, $V_{bm,n}'=-1$, where $b_{m,n}'$ represents any one of $b_{m,1}', \ldots,$ and $b_{m,8}'$, and a matrix $V_b'$ is obtained according to a conversion relationship between $b_{m,n}'$ and $V_{bm,n}'$ from the bits corresponding to the 255 bytes, and may be represented as:

$$\begin{pmatrix} V_{b1,1} & V_{b1,2} & \ldots & V_{b1,8} \\ V_{b2,1} & V_{b2,2} & \ldots & V_{b2,8} \\ M & M & M & M \\ V_{b255,1} & V_{b255,2} & \ldots & V_{b255,8} \end{pmatrix}.$$

A manner of determining whether at least a part of data in the window $W_{i2}[k_t-170, k_t-1]$ meets the preset condition $C_1$ is the same as a manner of determining whether at least a part of data in $W_{j2}[k_j-170, k_j-1]$ meets the preset condition $C_1$, and therefore the matrix R is still used:

$$\begin{pmatrix} h_{1,1} & h_{1,2} & L & h_{1,8} \\ h_{2,1} & h_{2,2} & L & h_{2,8} \\ M & M & M & M \\ h_{255,1} & h_{255,2} & L & h_{255,8} \end{pmatrix}.$$

Random numbers of an mth row of the matrix $V_b'$ and the mth row of the matrix R are multiplied and products are added to obtain a value, which is specifically represented as $S_{bm}'=V_{bm,1}'*h_{m,1}+V_{bm,2}'*h_{m,2}+\ldots+V_{bm,8}'*h_{m,8}$. $S_{b1}', S_{b2}', \ldots,$ and $S_{b2}'$ are obtained according to the method, and a quantity K of values meeting a specific condition (being greater than 0 is used as an example here) among $S_{b1}'$, $S_{b2}'$, . . . , and $S_{b255}'$ is counted. Because the matrix R follows normal distribution, $S_{bm}'$ still follows normal distribution as the matrix R does. According to the probability theory, the probability that a random number in normal distribution is greater than 0 is 1/2; a probability that each value among $S_{b1}'$, $S_{b2}'$, . . . , and $S_{b255}'$ is greater than 0 is 1/2, and therefore K meets binomial distribution: $P(k=n)=C_{255}{}^n(1/2)^n(1/2)^{255-n}=C_{255}{}^n(1/2)^{255}$. According to a counting result, it is determined whether the quantity K of values greater than 0 among $S_{b1}'$, $S_{b2}'$, . . . , and $S_{b255}'$ is an even number; the probability that a random number in binomial distribution is an even number is 1/2, and therefore, K meets a condition with a probability of 1/2. When K is an even number, it indicates that the at least a part of data in $W_{j2}[k_j-170, k_j-1]$ meets the preset condition $C_2$. When K is an odd number, it indicates that the at least a part of data in $W_{j2}[k_j-170, k_j-1]$ does not meet the preset condition $C_2$. Similarly, a manner of determining whether at least a part of data in $W_{i3}[k_i-171, k_i-2]$ meets the preset condition $C_3$ is the same as a manner of determining whether at least a part of data in $W_{j3}[k_j-171, k_j-2]$ meets the preset condition $C_3$. Similarly, it is determined whether at least a part of data in $W_{j4}[k_j-172, k_j-3]$ meets the preset condition $C_4$, it is determined whether at least a part of data in $W_{j5}[k_j-173, k_j-4]$ meets the preset condition $C_5$, it is determined whether at least a part of data in $W_{j6}[k_j-174, k_j-5]$ meets a preset condition $C_6$, it is determined whether at least a part of data in $W_{j7}[k_j-175, k_j-6]$ meets a preset condition $C_7$, it is determined whether at least a part of data in $W_{j8}[k_j-176, k_j-7]$ meets a preset condition $C_8$, it is determined whether at least a part of data in $W_{j9}[k_j-177, k_j-8]$ meets a preset condition $C_9$, it is determined whether at least a part of data in $W_{j10}[k_j-178, k_j-9]$ meets a preset condition $C_{10}$, and it is determined whether at least a part of data in $W_{j11}[k_j-179, k_j-10]$ meets a preset condition $C_{11}$, which are not described herein again.

In this embodiment, it is determined, by using a random function, whether at least a part of data in a window $W_{iz}[k_i-A_z, k+B_z]$ meets a preset condition $C_z$. The implementation manner shown in FIG. 21 is still used as an example. According to a rule preset on a deduplication server 103, a window $W_{i1}[k_i-169, k_i]$ is determined for a potential dividing point $k_i$, and it is determined whether at least a part of data in $W_{i1}[k_i-169, k_i]$ meets the preset condition $C_1$. As shown in FIG. 32, $W_{i1}$ represents the window $W_{i1}[k_i-169, k_i]$, and 5 bytes are selected to determine whether the at least a part of data in $W_{i1}[k_i-169, k_i]$ meets the preset condition $C_1$. In FIG. 32, "■" represents 1 selected byte, and there are 42 bytes between two adjacent selected bytes "■". In one implementation manner, a hash function is used to calculate the selected 5 bytes, and values obtained by means of calculation by using the hash function are in fixed and even distribution. If a value obtained by means of calculation by using the hash function is an even number, it is determined that the at least a part of data in $W_{i1}[k_i-169, k_i]$ meets the preset condition $C_1$. That is, $C_1$ represents that a value obtained according to the foregoing manner and by means of calculation by using the hash function is an even number. Therefore, a probability that at least a part of data in $W_{i1}[k_i-169, k_i]$ meets a preset condition is 1/2. In the implementation manner shown in FIG. 21, it is determined, by using a hash function, whether at least a part of data in $W_{i2}[k_i-170, k_i-1]$ meets a preset condition $C_2$ whether at least a part of data in $W_{i3}[k_i-171, k_i-2]$ meets a preset condition $C_3$, whether at least a part of data in $W_{i4}[k_i-172, k_i-3]$ meets a preset condition $C_4$ and whether at least a part of data in $W_{i5}[k_i-173, k_i-4]$ meets a preset condition $C_5$. For specific implementation, reference may be made to the description of the manner of determining, by using a hash function, whether at least a part of data in $W_{i1}[k_i-169, k_i]$ meets the preset condition $C_1$ in the implementation manner shown in FIG. 21, which is not described herein again.

When the at least a part of data in $W_{i5}[k_i-173, k_i-4]$ does not meet the preset condition $C_5$, 7 bytes are skipped from the potential dividing point $k_i$ along a direction of searching for a data stream dividing point, and a current potential dividing point $k_j$ is obtained at an end position of a 7th byte. As shown in FIG. 22, according to the rule preset on the deduplication server 103, a window $W_{j1}[k_j-169, k_j]$ is determined for the potential dividing point $k_j$. A manner of determining whether at least a part of data in the window $W_{j1}[k_j-169, k_j]$ meets the preset condition $C_1$ is the same as a manner of determining whether at least a part of data in the window $W_{i1}[k_i-169, k_i]$ meets the preset condition $C_1$. Therefore, as shown in FIG. 33, $W_{j1}$ represents the window $W_{j1}[k_j-169, k_j]$, and 5 bytes are selected to determine whether the at least a part of data in $W_{j1}[k_j-169, k_j]$ meets the preset condition $C_1$. In FIG. 33, "■" represents 1 selected byte, and there are 42 bytes between two adjacent selected bytes "■". The 5 bytes selected from the window $W_{j1}[k_j-169, k_j]$ are calculated by using a hash function. If an obtained value is an even number, the at least a part of data in $W_{j1}, [k_j-169, k_j]$ meets the preset condition $C_1$. In FIG. 33, a manner of determining whether at least a part of data in $W_{j2}[k_i-170, k_i-1]$ meets the preset condition $C_2$ is the same as a manner of determining whether at least a part of data in $W_{j2}[k_j-170, k_j-1]$ meets the preset condition $C_2$. Therefore, as shown in FIG. 33, "▨" represents 1 byte selected when it is determined whether the at least a part of data in the window $W_{j2}[k_j-170, k_j-1]$ meets the preset condition $C_2$, and there are 42 bytes between two adjacent selected bytes "▨". Selected 5 bytes are calculated by using a hash function. If an obtained value is an even number, the at least a part of data in $W_{j2}[k_j-170, k_j-1]$ meets the preset condition $C_2$. In FIG. 33, a manner of determining whether at least a part of data in $W_{i3}[k_i-171, k_i-2]$ meets the preset condition $C_3$ is the same as a manner of determining whether at least a part of data in $W_{j3}[k_j-171, k_j-2]$ meets the preset condition $C_3$. Therefore, as shown in FIG. 33, "▧" represents 1 byte selected when it is determined whether the at least a part of data in the window $W_{j3}[k_j-171, k_j-2]$ meets the preset condition $C_3$, and there are 42 bytes between two adjacent selected bytes "▧". Selected 5 bytes are calculated by using a hash function. If an obtained value is an even number, the at least a part of data in $W_{j3}[k_j-171, k_j-2]$ meets the preset condition $C_3$. In FIG. 33, a manner of determining whether at least a part of data in $W_{j4}[k_j-172, k_j-3]$ meets the preset condition $C_4$ is the same as a manner of determining whether at least a part of data in the window $W_{i4}[k_i-172, k_i-3]$ meets the preset condition $C_4$. Therefore, as shown in FIG. 33, "▩" represents 1 byte selected when it is determined whether the at least a part of data in the window $W_{j4}[k_j-172, k_j-3]$ meets the preset condition $C_4$, and there are 42 bytes between two adjacent selected bytes "▩". Selected 5 bytes are calculated by using a hash function. If an obtained value is an even number, the at least a part of data in $W_{j4}[k_j-172, k_j-3]$ meets the preset condition $C_4$. According to the foregoing method, it is determined whether at least a part of data in $W_{j5}[k_j-173, k_j-4]$ meets the preset condition $C_5$, it is determined whether at least a part of data in $W_{j6}[k_j-174, k_j-5]$ meets a preset condition $C_6$, it is determined whether at least a part of data in $W_{j7}[k_j-175, k_j-6]$ meets a preset condition $C_7$, it is determined whether at least a part of data in $W_{j8}[k_j-176, k_j-7]$ meets a preset condition $C_8$, it is determined whether at least a part of data in $W_{j9}[k_j-177, k_j-8]$ meets a preset condition $C_9$, it is determined whether at least a part of data in $W_{j10}[k_j-178, k_j-9]$ meets a preset condition $C_{10}$, and it is determined whether at least a part of data in $W_{j11}[k_j-179, k_j-10]$ meets a preset condition $C_{11}$, which are not described herein again.

In this embodiment, it is determined, by using a random function, whether at least a part of data in a window $W_{iz}[k_i-A_z, k_i+B_z]$ meets a preset condition $C_z$. The implementation manner shown in FIG. 21 is used as an example. According to a rule preset on a deduplication server 103, a window $W_{i1}[k_i-169, k_i]$ is determined for a potential dividing point $k_i$, and it is determined whether at least a part of data in $W_{i1}[k_i-169, k_i]$ meets the preset condition $C_1$. As shown in FIG. 32, $W_{i1}$ represents the window $W_{i1}[k_i-169, k_i]$, and 5 bytes are selected to determine whether the at least a part of data in $W_{i1}[k_i-169, k_i]$ meets the preset condition $C_1$. In FIG. 32, each of bytes "■" whose sequence numbers are 169, 127, 85, 43, and 1 represents 1 selected byte, and there are 42 bytes between two adjacent selected bytes. The bytes "■" whose sequence numbers are 169, 127, 85, 43, and 1 are converted into decimal values that are represented as $a_1, a_2, a_3, a_4$, and $a_5$ respectively. Because 1 byte is formed by 8 bits, each byte "■" serves as a value, and any $a_r$ of $a_1, a_2, a_3, a_4$, and $a_5$ meets $0 \le a_r \le 255$. $a_1, a_2, a_3, a_4$, and $a_5$ form a 1*5 matrix. 256*5 random numbers are selected from random numbers that follow binomial distribution to form a matrix R that is represented as:

$$\begin{pmatrix} h_{0,1} & h_{0,2} & L & h_{0,5} \\ h_{1,1} & h_{1,2} & L & h_{1,5} \\ M & M & M & M \\ h_{255,5} & h_{255,5} & L & h_{255,5} \end{pmatrix}.$$

The matrix R is searched for a corresponding value according to the value of $a_1$ and a column in which $a_1$ is located. For example, if $a_1=36$, and $a_1$ is located in a 1st column, a value corresponding to $h_{36,1}$ is searched for. The matrix R is searched for a corresponding value according to the value of $a_2$ and a column in which $a_2$ is located. For example, if $a_2=48$, and $a_2$ is located in a 2nd column, a value corresponding to $h_{48,2}$ is searched for. The matrix R is searched for a corresponding value according to the value of $a_3$ and a column in which $a_3$ is located. For example, if $a_3=26$, and $a_3$ is located in a 3rd column, a value corresponding to $h_{26,3}$ is searched for. The matrix R is searched for a corresponding value according to the value of $a_4$ and a column in which where $a_4$ is located. For example, if $a_4=26$, and $a_4$ is located in a 4th column, a value corresponding to $h_{26,4}$ is searched for. The matrix R is searched for a corresponding value according to the value of $a_5$ and a column in which $a_5$ is located. For example, if $a_5=88$, and $a_5$ is located in a 5th column, a value corresponding to $h_{88,5}$ is searched for. $S_1 = h_{36,1} + h_{48,2} + h_{26,3} + h_{26,4} + h_{88,5}$, and because the matrix R follows binomial distribution, $S_1$ also follows binomial distribution. When $S_1$ is an even number, the at least a part of data in $W_{i1}[k_i-169, k_i]$ meets the preset condition $C_1$; when $S_1$ is an odd number, the at least a part of data in $W_{i1}[k_i-169, k_i]$ does not meet the preset condition $C_1$. A probability that $S_1$ is an even number is 1/2, and $C_1$ represents that $S_1$ that is obtained by means of calculation according to the foregoing manner is an even number. In the embodiment shown in FIG. 21, the at least a part of data in $W_{i1}[k_i-169, k_i]$ meets the preset condition $C_1$. As shown in FIG. 32, "▨" represents 1 byte separately selected when it is determined whether at least a part of data in the window $W_{i2}[k_i-170, k_i-1]$ meets a preset condition $C_2$. In FIG. 32, selected bytes are represented as sequence numbers 170, 128, 86, 44, and 2 separately, and there are 42 bytes between two adjacent selected bytes. The bytes "▨" whose sequence numbers are 170, 128, 86, 44, and 2 are converted into decimal values that are represented as $b_1, b_2, b_3, b_4$, and $b_5$ respectively. Because 1 byte is formed by 8 bits, each byte "▨" serves as a value, and any $b_r$ of $b_1, b_2, b_3, b_4$, and $b_5$ meets $0 \le b_r \le 255$. $b_1, b_2, b_3, b_4$ and $b_5$ form a 1*5 matrix. In this implementation manner, manners of determining whether at least a part of data in $W_{i1}$ and $W_{i2}$ meets a preset condition are the same, and therefore the matrix R is still used. The matrix R is searched for a corresponding value according to the value of $b_1$ and a column in which $b_1$ is located. For example, if $b_1=66$, and $b_1$ is located in a 1st column, a value corresponding to $h_{66,1}$ is searched for. The matrix R is searched for a corresponding value according to the value of $b_2$ and a column in which $b_2$ is located. For example, if $b_2=48$, and $b_2$ is located in a 2nd column, a value corresponding to $h_{48,2}$ is searched for. The matrix R is searched for a corresponding value according to the value of $b_3$ and a column in which $b_3$ is located. For example, if $b_3=99$, and $b_3$ is located in a 3rd column, a value corresponding to $h_{99,3}$ is searched for. The matrix R is searched for a corresponding value according to the value of $b_4$ and a column in which $b_4$ is located. For example, if $b_4=26$, and $b_4$ is located in a 4th column, a value corresponding to $h_{26,4}$ is searched for. The matrix R is searched for a corresponding value according to the value of $b_5$ and a column in which $b_5$ is located. For example, if $b_5=90$, and $b_5$ is located in a 5th column, a value corresponding to $h_{90,5}$ is searched for. $S_2 = h_{66,1} + h_{48,2} + h_{99,3} + h_{26,4} + h_{90,5}$, and because the matrix R follows binomial distribution, $S_2$ also follows binomial distribution. When $S_2$ is an even number, the at least a part of data in $W_{i2}[k_i-170, k_i-1]$ meets the preset condition $C_2$; when $S_2$ is an odd number, the at least a part of data in $W_{i2}[k_i-170, k_i-1]$ does not meet the preset condition $C_2$. A probability that $S_2$ is an even number is 1/2. In the embodiment shown in FIG. 21, the at least a part of data in $W_{i2}[k_i-170, k_i-1]$ meets the preset condition $C_2$. By using the same rule, separately, it is determined whether at least a part of data in $W_{i3}[k_i-171, k_i-2]$ meets a preset condition $C_3$, it is determined whether at least a part of data in $W_{i4}[k_i-172, k_i-3]$ meets a preset condition $C_4$, it is determined whether at least a part of data in $W_{i5}[k_i-173, k_i-4]$ meets a preset condition $C_5$, it is determined whether at least a part of data in $W_{i6}[k_i-174, k_i-5]$ meets a preset condition $C_6$, it is determined whether at least a part of data in $W_{i7}[k_i-175, k_i-6]$ meets a preset condition $C_7$, it is determined whether at least a part of data in $W_{i8}[k_i-176, k_i-7]$ meets a preset condition $C_8$, it is determined whether at least a part of data in $W_{i9}[k_i-177, k_i-8]$ meets a preset condition $C_9$, it is determined whether at least a part of data in $W_{i10}[k_i-178, k_i-9]$ meets a preset condition $C_{10}$, and it is determined whether at least a part of data in $W_{i11}[k_i-179, k_i-10]$ meets a preset condition $C_{11}$. In the implementation manner shown in FIG. 21, the at least a part of data in $W_{i5}[k_i-173, k_i-4]$ does not meet the preset condition $C_5$, 7 bytes are skipped from the potential dividing point $k_i$ along a direction of searching for a data stream dividing point, and a current potential dividing point $k_j$ is obtained at an end position of a 7th byte. As shown in FIG. 22, according to the rule preset on the deduplication server 103, a window $W_{j1}[k_i-169, k_j]$ is determined for the potential dividing point $k_j$. A manner of determining whether at least a part of data in the window $W_{j1}[k_j-169, k_j]$ meets the preset condition $C_1$ is the same as a manner of determining whether at least a part of data in the window $W_{i1}[k_i-169, k_i]$ meets the preset condition $C_1$. Therefore, as shown in FIG. 33, $W_{j1}$ represents the window $W_{j1}[k_j-169, k_j]$, and it is determined whether the at least a part of data in $W_{j1}[k_j-169, k_j]$ meets the preset condition $C_1$. In FIG. 33, each of bytes "■" whose sequence numbers are 169, 127, 85, 43, and 1 represents 1 selected byte, and there are 42 bytes between two adjacent selected bytes. The bytes "■" whose sequence numbers are 169, 127, 85, 43, and 1 are converted into decimal values that are represented as $a_1'$, $a_2'$, $a_3'$, $a_4'$, and $a_5'$ respectively. Because 1 byte is formed by 8 bits, each byte "■" serves as a value, and any $a_r'$ of $a_1'$, $a_2'$, $a_3'$, $a_4'$, and $a_5'$ meets $0 \le a_r' \le 255$. $a_1'$, $a_2'$, $a_3'$, $a_4'$, and $a_5'$ form a 1*5 matrix. The manner of determining whether at least a part of data in the window $W_{j1}[k_j-169, k_j]$ meets the preset condition $C_1$ is the same as the manner of determining whether at least a part of data in the window $W_{i1}[k_i-169, k_i]$ meets the preset condition $C_1$. Therefore, the matrix R is still used, and is represented as:

$$\begin{pmatrix} h_{0,1} & h_{0,2} & L & h_{0,5} \\ h_{1,1} & h_{1,2} & L & h_{1,5} \\ M & M & M & M \\ h_{255,5} & h_{255,5} & L & h_{255,5} \end{pmatrix}.$$

The matrix R is searched for a corresponding value according to the value of $a_1'$ and a column in which $a_1'$ is located. For example, if $a_1'=16$, and $a_1'$ is located in a 1st column, a value corresponding to $h_{16,1}$ is searched for. The matrix R is searched for a corresponding value according to the value of $a_2'$ and a column in which $a_2'$ is located. For example, if $a_2'=98$, and $a_2'$ is located in a 2nd column, a value corresponding to $h_{98,2}$ is searched for. The matrix R is searched for a corresponding value according to the value of $a_3'$ and a column in which $a_3'$ is located. For example, if $a_3'=56$, and $a_3'$ is located in a 3rd column, a value corresponding to $h_{56,3}$ is searched for. The matrix R is searched for a corresponding value according to the value of $a_4'$ and a column in which $a_4'$ is located. For example, if $a_4'=36$, and $a_4'$ is located in a 4th column, a value corresponding to $h_{36,4}$ is searched for. The matrix R is searched for a corresponding value according to the value of $a_5'$ and a column in which $a_5'$ is located. For example, if $a_5'=99$, and $a_5'$ is located in a 5th column, a value corresponding to $h_{99,5}$ is searched for. $S_1'=h_{16,1}+h_{98,2}+h_{56,3}+h_{36,4}+h_{99,5}$, and because the matrix R follows binomial distribution, $S_1'$ also follows binomial distribution. When $S_1'$ is an even number, the at least a part of data in $W_{j1}[k_j-169, k_j]$ meets the preset condition $C_1$; when $S_1'$ is an odd number, the at least a part of data in $W_{j1}[k_j-169, k_j]$ does not meet the preset condition $C_1$. A probability that $S_1'$ is an even number is 1/2.

A manner of determining whether at least a part of data in $W_{i2}[k_i-170, k_i-1]$ meets the preset condition $C_2$ is the same as a manner of determining whether at least a part of data in $W_{j2}[k_j-170, k_j-1]$ meets the preset condition $C_2$. Therefore, as shown in FIG. 33, "▨" represents 1 byte selected when it is determined whether the at least a part of data in the window $W_{j2}[k_j-170, k_j-1]$ meets the preset condition $C_2$, and there are 42 bytes between two adjacent selected bytes. Selected bytes are represented as sequence numbers 170, 128, 86, 44, and 2 separately, and there are 42 bytes between two adjacent selected bytes. The bytes "▨" whose sequence numbers are 170, 128, 86, 44, and 2 are converted into decimal values that are represented as $b_1'$, $b_2'$, $b_3'$, $b_4'$, and $b_5'$ respectively. Because 1 byte is formed by 8 bits, each byte "▨" serves as a value, and any $b_r'$ of $b_1'$, $b_2'$, $b_3'$, $b_4'$, and $b_5'$ meets $0 \le b_r' \le 255$. $b_1'$, $b_2'$, $b_3'$, $b_4'$, and $b_5'$ form a 1*5 matrix. The matrix R the same as that used when it is determined whether the at least a part of data in the window $W_{i2}[k_i-170, k_i-1]$ meets the preset condition $C_2$ is used. The matrix R is searched for a corresponding value according to the value of $b_1'$ and a column in which $b_1'$ is located. For example, if $b_1'=210$, and $b_1'$ is located in a 1st column, a value corresponding to $h_{210,1}$ is searched for. The matrix R is searched for a corresponding value according to the value of $b_2'$ and a column in which $b_2'$ is located. For example, if $b_2'=156$, and $b_2'$ is located in a 2nd column, a value corresponding to $h_{156,2}$ is searched for. The matrix R is searched for a corresponding value according to the value of $b_3'$ and a column in which $b_3'$ is located. For example, if $b_3'=144$, and $b_3'$ is located in a 3rd column, a value corresponding to $h_{144,3}$ is searched for. The matrix R is searched for a corresponding value according to the value of and a column in which is located. For example, if $b_4'=60$, and is located in a 4th column, a value corresponding to $h_{60,4}$ is searched for. The matrix R is searched for a corresponding value according to the value of $b_5'$ and a column in which $b_5'$ is located. For example, if $b_5'=90$, and $b_5'$ is located in a 5th column, a value corresponding to $h_{90,5}$ is searched for. $S_2'=h_{210,1}+h_{156,2}+h_{144,3}+h_{60,4}+h_{90,5}$ The same as the determining condition of $S_2$, when $S_2'$ is an even number, the at least a part of data in $W_{j2}[k_j-170, k_j-1]$ meets the preset condition $C_2$, and when $S_2'$ is an odd number, the at least a part of data in $W_{j2}[k_j-170, k_j-1]$ does not meet the preset condition $C_2$. A probability that $S_2'$ is an even number is 1/2.

Similarly, a manner of determining whether at least a part of data in $W_{i3}[k_i-171, k_i-2]$ meets the preset condition $C_3$ is the same as a manner of determining whether at least a part of data in $W_{j3}[k_j-171, k_j-2]$ meets the preset condition $C_3$. Similarly, it is determined whether at least a part of data in $W_{j4}[k_j-172, k_j-3]$ meets the preset condition $C_4$, it is determined whether at least a part of data in $W_{j5}[k_j-173, k_j-4]$ meets the preset condition $C_5$, it is determined whether at least a part of data in $W_{j6}[k_j-174, k_j-5]$ meets the preset condition $C_6$, it is determined whether at least a part of data in $W_{j7}[k_j-175, k_j-6]$ meets the preset condition $C_7$, it is determined whether at least a part of data in $W_{j8}[k_j-176, k_j-7]$ meets the preset condition $C_8$, it is determined whether at least a part of data in $W_{j9}[k_j-177, k_j-8]$ meets the preset condition $C_9$, it is determined whether at least a part of data in $W_{j10}[k_j-178, k_j-9]$ meets the preset condition $C_{10}$, and it is determined whether at least a part of data in $W_{j11}[k_j-179, k_j-10]$ meets the preset condition $C_{11}$, which are not described herein again.

In this embodiment, it is determined, by using a random function, whether at least a part of data in a window $W_{iz}[k_i-A_z, k_i+B_z]$ meets a preset condition $C_z$. The implementation manner shown in FIG. 21 is used as an example. According to a rule preset on a deduplication server 103, a window $W_{i1}[k_i-169, k_i]$ is determined for a potential dividing point $k_i$, and it is determined whether at least a part of data in $W_{i1}[k_i-169, k_i]$ meets a preset condition $C_1$. As shown in FIG. 32, $W_{i1}$ represent the window $W_{i1}[k_i-169, k_i]$, and 5 bytes are selected to determine whether the at least a part of data in $W_{i1}[k_i-169, k_i]$ meets the preset condition $C_1$. In FIG. 32, each of bytes "■" whose sequence numbers are 169, 127, 85, 43, and 1 represents 1 selected byte, and there are 42 bytes between two adjacent selected bytes. The bytes "■" whose sequence numbers are 169, 127, 85, 43, and 1 are converted into decimal values that are represented as $a_1$, $a_2$, $a_3$, $a_4$, and $a_5$ respectively. Because 1 byte is formed by 8 bits, each byte "■" serves as a value, and any as of $a_1$, $a_2$, $a_3$, $a_4$, and $a_5$ meets $0 \leq a_s \leq 255$. $a_1$, $a_2$, $a_3$, $a_4$ and $a_5$ form a 1*5 matrix. 256*5 random numbers are selected from random numbers that follow binomial distribution to form a matrix R that is represented as:

$$\begin{pmatrix} h_{0,1} & h_{0,2} & L & h_{0,5} \\ h_{1,1} & h_{1,2} & L & h_{1,5} \\ M & M & M & M \\ h_{255,5} & h_{255,5} & L & h_{255,5} \end{pmatrix}.$$

256*5 random numbers are selected from random numbers that follow binomial distribution to form a matrix G that is represented as:

$$\begin{pmatrix} g_{0,1} & g_{0,2} & L & g_{0,5} \\ g_{1,1} & g_{1,2} & L & g_{1,5} \\ M & M & M & M \\ g_{255,5} & g_{255,5} & L & g_{255,5} \end{pmatrix}.$$

According to the value of $a_1$ and a column in which $a_1$ is located, for example, $a_1=36$, and $a_1$ is located in a 1st column, the matrix R is searched for a value corresponding to $h_{36,1}$, and the matrix G is searched for a value corresponding to $g_{36,1}$. According to the value of $a_2$ and a column in which $a_2$ is located, for example, $a_2=48$, and $a_2$ is located in a 2nd column, the matrix R is searched for a value corresponding to $h_{48,2}$, and the matrix G is searched for a value corresponding to $g_{48,2}$. According to the value of $a_3$ and a column in which $a_3$ is located, for example, $a_3=26$, and $a_3$ is located in a 3rd column, the matrix R is searched for a value corresponding to $h_{26,3}$, and the matrix G is searched for a value corresponding to $g_{26,3}$. According to the value of $a_4$ and a column in which $a_4$ is located, for example, $a_4=26$, and $a_4$ is located in a 4th column, the matrix R is searched for a value corresponding to $h_{26,4}$, and the matrix G is searched for a value corresponding to $g_{26,4}$. According to the value of $a_5$ and a column in which $a_5$ is located, for example, $a_5=88$, and $a_5$ is located in a 5th column, the matrix R is searched for a value corresponding to $h_{88,5}$, and the matrix G is searched for a value corresponding to $g_{88,5}$. $S_{1h}=h_{36,1}+h_{48,2}+h_{26,3}+h_{26,4}+h_{88,5}$, and because the matrix R follows binomial distribution, $S_{1h}$ also follows binomial distribution. $S_{1g}=g_{36,1}+g_{48,2}+g_{26,3}+g_{26,4}\ g_{88,5}$, and because the matrix G follows binomial distribution, $S_{1g}$ also follows binomial distribution. When one of $S_{1h}$ and $S_{1g}$ is an even number, the at least a part of data in $W_{i1}[k_i-169, k_i]$ meets the preset condition $C_1$; when both $S_{1h}$ and $S_{1g}$ are odd numbers, the at least a part of data in $W_{i1}[k_i-169, k_i]$ does not meet the preset condition $C_1$, and $C_1$ indicates that one of $S_{1h}$ and $S_{1g}$ obtained according to the foregoing method is an even number. Because both $S_{1h}$ and $S_{1g}$ follow binomial distribution, a probability that $S_{1h}$ is an even number is 1/2, a probability that $S_{1g}$ is an even number is 1/2, and a probability that one of $S_{1h}$ and $S_{1g}$ is an even number is $1-1/4=3/4$. Therefore, a probability that the at least a part of data in $W_{i1}[k_i-169, k_i]$ meets the preset condition $C_1$ is 3/4. In the embodiment shown in FIG. 21, the at least a part of data in $W_{i1}[k_i-169, k_i]$ meets the preset condition $C_1$. In the implementation manner shown in FIG. 21, for $W_{i1}[k_i-169, k_i]$, $W_{i1}[k_i-170, k_i-1]$, $W_{i3}[k_i-171, k_i-2]$, $W_{i4}[k_i-172, k_i-3]$, $W_{i5}[k_i-173, k_i-4]$, $W_{i6}[k_i-174, k_i-5]$, $W_{i7}[k_i-175, k_i-6]$, $W_{i8}[k_i-176, k_i-7]$, $W_{i9}[k_i-177, k_i-8]$, $W_{i10}[k_i-178, k_i-9]$, and $W_{i11}[k_i-179, k_i-10]$, the windows are the same in size, that is, all the windows have a size of 169 bytes, and meanwhile manners of determining whether at least a part of data in a window meets a preset condition are also the same. For details, refer to the foregoing description of determining whether the at least a part of data in $W_{i1}[k_i-169, k_i]$ meets the preset condition $C_1$. Therefore, as shown in FIG. 32, "▨" represents 1 byte separately selected when it is determined whether at least a part of data in the window $W_{i2}[k_i-170, k_i-1]$ meets a preset condition $C_2$. In FIG. 32, selected bytes are represented as sequence numbers 170, 128, 86, 44, and 2 separately, and there are 42 bytes between two adjacent selected bytes. The bytes "▨" whose sequence numbers are 170, 128, 86, 44, and 2 are converted into decimal values that are represented as $b_1$, $b_3$, $b_3$, $b_4$, and $b_5$ respectively. Because 1 byte is formed by 8 bits, each byte "▨" serves as a value, and any $b_s$ of $b_1$, $b_3$, $b_3$, $b_4$ and $b_5$ meets $0 \leq b_s \leq 255$. $b_1$, $b_2$, $b_3$, $b_4$, and $b_5$ form a 1*5 matrix. In this implementation manner, manners of determining whether at least a part of data in each window meets a preset condition are the same, and therefore the same matrices R and G are still used. According to the value of $b_1$ and a column in which $b_1$ is located, for example, $b_1=66$, and $b_1$ is located in a 1st column, the matrix R is searched for a value corresponding to $h_{66,1}$, and the matrix G is searched for a value corresponding to $g_{66,1}$. According to the value of $b_2$ and a column in which $b_2$ is located, for example, $b_2=48$, and $b_2$ is located in a 2nd column, the matrix R is searched for a value corresponding to $h_{48,2}$, and the matrix G is searched for a value corresponding to $g_{48,2}$. According to the value of $b_3$ and a column in which $b_3$ is located, for example, $b_3=99$, and $b_3$ is located in a 3rd column, the matrix R is searched for a value corresponding to $h_{99,3}$, and the matrix G is searched for a value corresponding to $g_{99,3}$. According to the value of $b_4$ and a column in which $b_4$ is located, for example, $b_4=26$, and $b_4$ is located in a 4th column, the matrix R is searched for a value corresponding to $h_{26,4}$, and the matrix G is searched for a value corresponding to $g_{26,4}$. According to the value of $b_5$ and a column in which $b_5$ is located, for example, $b_5=90$, and $b_5$ is located in a 5th column, the matrix R is searched for a value corresponding to $h_{90,5}$, and the matrix G is searched for a value corresponding to $g_{90,5}$. $S_{2h}=h_{66,1}+h_{48,2}+h_{99,3}+h_{26,4}+h_{90,5}$, and because the matrix R follows binomial distribution, $S_{2h}$ also follows binomial distribution. $S_{2g}=g_{66,1}\ g_{48,2}+g_{99,3}\ g_{26,4}+g_{90,5}$, and because the matrix G follows binomial distribution, $S_{2g}$ also follows binomial distribution. When one of $S_{2h}$ and $S_{2g}$ is an even number, the at least a part of data in $W_{i2}[k_i-170, k_i-1]$ meets the preset condition $C_2$; when both $S_{2h}$ and $S_{2g}$ are odd numbers, the at least a part of data in $W_{i2}[k_i-170, k_i-1]$ does not meet the preset condition $C_2$. A probability that one of $S_{2h}$ and $S_{2g}$ is an even number is 3/4. In the embodiment shown in FIG. 21, the at least a part of data in $W_{i2}[k_i-170, k_i-1]$ meets the preset condition $C_2$. By using the same rule, separately, it is determined whether at least a part of data in $W_{i3}[k_i-171, k_i-2]$ meets a preset condition $C_3$, it is determined whether at least a part of data in $W_{i4}[k_i-172, k_i-3]$ meets a preset condition $C_4$, it is determined whether at least a part of data in $W_{i5}[k_i-173, k_i-4]$ meets a preset condition $C_5$, it is determined whether at least a part of data in $W_{i6}[k_i-174, k_i-5]$ meets a preset condition $C_6$, it is determined whether at least a part of data in $W_{i7}[k_i-175, k_i-6]$ meets a preset condition $C_7$, it is determined whether at least a part of data in $W_{i8}[k_i-176, k_i-7]$ meets a preset condition $C_8$, it is determined whether at least a part of data in $W_{i9}[k_i-177, k_i-8]$ meets a preset condition $C_9$, it is determined whether at least a part of data in $W_{i10}[k_i-178, k_i-9]$ meets a preset condition $C_{10}$, and it is determined whether at least a part of data in $W_{i11}[k_i-179, k_i-10]$ meets a preset condition $C_{11}$. In the implementation manner shown in FIG. 21, the at least a part of data in $W_{i5}[k_i-173, k_i-4]$ does not meet the preset condition $C_5$, 7 bytes are skipped from the potential dividing point $k_i$ along a direction of searching for a data stream dividing point, and a current potential dividing point $k_j$ is obtained at an end position of a 7th byte. As shown in FIG. 22, according to the rule preset on the deduplication server 103, a window $W_{j1}[k_j-169, k_j]$ is determined for the potential dividing point $k_j$. A manner of determining whether at least a part of data in the window $W_{j1}[k_j-169, k_j]$ meets the preset condition $C_1$ is the same as a manner of determining whether at least a part of data in the window $W_{i1}[k_i-169, k_i]$ meets the preset condition $C_1$. Therefore, as shown in FIG. 33, $W_{j1}$ represents the window $W_{j1}[k_j-169, k_j]$, and it is determined whether the at least a part of data in $W_{j1}[k_j-169, k_j]$ meets the preset condition $C_1$. In FIG. 33, each of bytes "■" whose sequence numbers are 169, 127, 85, 43, and 1 represents 1 selected byte, and there are 42 bytes between two adjacent selected bytes. The bytes "■" whose sequence numbers are 169, 127, 85, 43, and 1 are converted into decimal values that are represented as $a_1'$, $a_2'$, $a_3'$, $a_4'$, and $a_5'$ respectively. Because 1 byte is formed by 8 bits, each byte "■" serves as a value, and any $a_s'$ of $a_1'$, $a_2'$, $a_3'$, $a_4'$, and $a_5'$ meets $0 \leq a_s' \leq 255$. $a_1'$, $a_2'$, $a_3'$, $a_4'$ and $a_5'$ form a 1*5 matrix. The matrices R and G the same as those used when it is determined whether the at least a part of data in the window $W_{i1}[k_i-169, k_i]$ meets the preset condition $C_1$ are used, and are represented as:

$$\begin{pmatrix} h_{0,1} & h_{0,2} & L & h_{0,5} \\ h_{1,1} & h_{1,2} & L & h_{1,5} \\ M & M & M & M \\ h_{255,5} & h_{255,5} & L & h_{255,5} \end{pmatrix} \text{ and } \begin{pmatrix} g_{0,1} & g_{0,2} & L & g_{0,5} \\ g_{1,1} & g_{1,2} & L & g_{1,5} \\ M & M & M & M \\ g_{255,5} & g_{255,5} & L & g_{255,5} \end{pmatrix}$$

respectively.

According to the value of $a_1'$ and a column in which $a_1'$ is located, for example, $a_1'=16$, and $a_1'$ is located in a 1st column, the matrix R is searched for a value corresponding to $h_{16,1}$, and the matrix G is searched for a value corresponding to $g_{16,1}$. According to the value of $a_2'$ and a column in which $a_2'$ is located, for example, $a_2'=98$, and $a_2'$ is located in a 2nd column, the matrix R is searched for a value corresponding to $h_{98,2}$, and the matrix G is searched for a value corresponding to $g_{98,2}$. According to the value of $a_3'$ and a column in which $a_3'$ is located, for example, $a_3'=56$, and $a_3'$ is located in a 3rd column, the matrix R is searched for a value corresponding to $h_{56,3}$, and the matrix G is searched for a value corresponding to $g_{56,3}$. According to the value of $a_4'$ and a column in which $a_4'$ is located, for example, $a_4'=36$, and $a_4'$ is located in a 4th column, the matrix R is searched for a value corresponding to $h_{36,4}$, and the matrix G is searched for a value corresponding to $g_{36,4}$. According to the value of $a_5'$ and a column in which $a_5'$ is located, for example, $a_5'=99$, and $a_5'$ is located in a 5th column, the matrix R is searched for a value corresponding to $h_{99,5}$, and the matrix G is searched for a value corresponding to $g_{99,5}$. $S_{1h}'=h_{16,1}+h_{98,2}+h_{56,3}+h_{36,4}\ h_{99,5}$, and because the matrix R follows binomial distribution, $S_{1h}'$ also follows binomial distribution. $S_{1g}'=g_{16,1}+g_{98,2}+g_{56,3}+g_{36,4}+g_{99,5}$, and because the matrix G follows binomial distribution, $S_{1g}'$ also follows binomial distribution. When one of $S_{1h}'$ and $S_{1g}'$ is an even number, the at least a part of data in $W_{j1}[k_j-169, k_j]$ meets the preset condition $C_1$; when both $S_{1h}'$ and $S_{1g}'$ are odd numbers, the at least a part of data in $W_{j1}[k_j-169, k_j]$ does not meet the preset condition $C_1$. A probability that one of $S_{1h}'$ and $S_{1g}'$ is an even number is 3/4.

A manner of determining whether at least a part of data in $W_{i2}[k_i-170, k_i-1]$ meets the preset condition $C_2$ is the same as a manner of determining whether at least a part of data in $W_{j2}[k_j-170, k_j-1]$ meets the preset condition $C_2$. Therefore, as shown in FIG. 33, "▨" represents 1 byte selected when it is determined whether the at least a part of data in the window $W_{j2}[k_j-170, k_j-1]$ meets the preset condition $C_2$, and there are 42 bytes between two adjacent selected bytes. In FIG. 33, selected bytes are represented as sequence numbers 170, 128, 86, 44, and 2 separately, and there are 42 bytes between two adjacent selected bytes. The bytes "▨" whose sequence numbers are 170, 128, 86, 44, and 2 are converted into decimal values that are represented as $b_1'$, $b_2'$, $b_3'$, $b_4'$, and $b_5'$ respectively. Because 1 byte is formed by 8 bits, each byte "▨" serves as a value, and any $b_s'$ of $b_1'$, $b_2'$, $b_3'$, $b_4'$, and $b_5'$ meets $0 \leq b_s' \leq 255$. $b_1'$, $b_2'$, $b_3'$, $b_4'$, and form a 1*5 matrix. The matrices R and G the same as those used when it is determined whether the at least a part of data in the window $W_{i2}[k_i-170, k_i-1]$ meets the preset condition $C_2$ are used. According to the value of $b_1'$ and a column in which $b_1'$ is located, for example, $b_1'=210$, and $b_1'$ is located in a 1st column, the matrix R is searched for a value corresponding to $h_{210,1}$, and the matrix G is searched for a value corresponding to $g_{210,1}$. According to the value of $b_2'$ and a column in which $b_2'$ is located, for example, $b_2'=156$, and $b_2'$ is located in a 2nd column, the matrix R is searched for a value corresponding to $h_{156,2}$, and the matrix G is searched for a value corresponding to $g_{156,2}$ According to the value of $b_3'$ and a column in which $b_3'$ is located, for example, $b_3'=144$, and $b_3'$ is located in a 3rd column, the matrix R is searched for a value corresponding to $h_{144,3}$, and the matrix G is searched for a value corresponding to $g_{144,3}$. According to the value of $b_4'$ and a column in which $b_4'$ is located, for example, $b_4'=60$, and $b_4'$ is located in a 4th column, the matrix R is searched for a value corresponding to $h_{60,4}$, and the matrix G is searched for a value corresponding to $g_{60,4}$. According to the value of $b_5'$ and a column in which $b_5'$ is located, for example, $b_5'=90$, and $b_5'$ is located in a 5th column, the matrix R is searched for a value corresponding to $h_{90,5}$, and the matrix G is searched for a value corresponding to $g_{90,5}$. $S_{2h}'=h_{210,1}+h_{156,2}+h_{144,3}+h_{60,4}+h_{90,5}$, and $S_{2g}'=g_{210,1}+g_{156,2}+g_{144,3}+g_{60,4}+g_{90,5}$. When one of $S_{2h}'$ and $S_{2g}'$ is an even number, the at least a part of data in $W_{j2}[k_j-170, k_j-1]$ meets the preset condition $C_2$; when both $S_{2h}'$ and $S_{2g}'$ are odd numbers, the at least a part of data in $W_{j2}[k_j-170, k_j-1]$ does not meet the preset condition $C_2$. A probability that one of $S_{2h}'$ and $S_{2g}'$ is an even number is 3/4.

Similarly, a manner of determining whether at least a part of data in $W_{i3}[k_i-171, k_i-2]$ meets the preset condition $C_3$ is the same as a manner of determining whether at least a part of data in $W_{j3}[k_j-171, k_j-2]$ meets the preset condition $C_3$. Similarly, it is determined whether at least a part of data in $W_{j4}[k_j-172, k_j-3]$ meets the preset condition $C_4$, it is determined whether at least a part of data in $W_{j5}[k_j-173, k_j-4]$ meets the preset condition $C_5$, it is determined whether at least a part of data in $W_{j6}[k_j-174, k_j-5]$ meets the preset condition $C_6$, it is determined whether at least a part of data in $W_{j7}[k_j-175, k_j-6]$ meets the preset condition $C_7$, it is determined whether at least a part of data in $W_{j8}[k_j-176, k_j-7]$ meets the preset condition $C_8$, it is determined whether at least a part of data in $W_{j9}[k_j-177, k_j-8]$ meets the preset condition $C_9$, it is determined whether at least a part of data in $W_{j10}[k_j-178, k_j-9]$ meets the preset condition $C_{10}$, and it is determined whether at least a part of data in $W_{j11}[k_j-179, k_j-10]$ meets the preset condition $C_{11}$, which are not described herein again.

In this embodiment, it is determined, by using a random function, whether at least a part of data in the window $W_{iz}[k_i-A_z, k_i+B_z]$ meets the preset condition $C_z$. The implementation manner shown in FIG. 21 is used as an example. According to a rule preset on a deduplication server 103, a window $W_{i1}[k_i-169, k_i]$ is determined for a potential dividing point $k_i$, and it is determined whether at least a part of data in $W_{i1}[k_i-169, k_i]$ meets a preset condition $C_1$. As shown in FIG. 32, $W_{i1}$ represents the window $W_{i1}[k_i-169, k_i]$, and 5 bytes are selected to determine whether the at least a part of data in $W_{i1}[k_i-169, k_i]$ meets the preset condition $C_1$. In FIG. 32, each of bytes "■" whose sequence numbers are 169, 127, 85, 43, and 1 represents 1 selected byte, and there are 42 bytes between two adjacent selected bytes. The bytes "■" whose sequence numbers are 169, 127, 85, 43, and 1 are regarded as 40 sequential bits, which are represented as $a_1, a_2, a_3, a_4, \ldots$, and $a_{40}$ separately. For any $a_t$ of $a_1, a_2, a_3, a_4, \ldots$, and $a_{40}$, when $a_t=0$, $V_{at}=-1$, and when $a_t=1$, $V_{at}=1$. According to a correspondence between $a_t$ and $V_{at}$, $V_{a1}, V_{a2}, V_{a3}, V_{a4}, \ldots$, and $V_{a40}$ are generated. 40 random numbers are selected from random numbers that follow normal distribution, and are represented as: $h_1, h_2, h_3, h_4, \ldots$, and $h_{40}$ separately. $S_a = V_{a1}*h_1 + V_{a2}*h_2 + V_{a3}*h_3 V_{a4}*h_4 + \ldots + V_{a40}*h_{40}$ Because $h_1, h_2, h_3, h_4, \ldots$, and $h_{40}$ follow normal distribution, $S_a$ also follows normal distribution. When $S_a$ is a positive number, the at least a part of data in $W_{i1}[k_i-169, k_i]$ meets the preset condition $C_1$; when $S_a$ is a negative number or 0, the at least a part of data in $W_{i1}[k_i-169, k_i]$ does not meet the preset condition $C_1$. A probability that $S_a$ is a positive number is 1/2. In the embodiment shown in FIG. 21, the at least a part of data in $W_{i1}[k_i-169, k_i]$ meets the preset condition $C_1$. As shown in FIG. 32, "▨" represents 1 byte separately selected when it is determined whether at least a part of data in a window $W_{i2}[k_i-170, k_i-1]$ meets a preset condition $C_2$. In FIG. 32, selected bytes are represented as sequence numbers 170, 128, 86, 44, and 2 separately, and there are 42 bytes between two adjacent selected bytes. The bytes "▨" whose sequence numbers are 170, 128, 86, 44, and 2 are regarded as 40 sequential bits, which are represented as $b_1, b_2, b_3, b_4, \ldots$, and $b_{40}$ separately. For any $b_t$ of $b_1, b_2, b_3, b_4, \ldots$, and $b_{40}$, when $b_t=0$, $V_{bt}=-1$, and when $b_t=1$, $V_{bt}=1$. According to a correspondence between $b_t$ and $V_{bt}, V_{b1}, V_{b2}, V_{b3}, V_{b4}, \ldots$, and $V_{b40}$ are generated. A manner of determining whether at least a part of data in the window $W_{i1}[k_i-169, k_i]$ meets the preset condition $C_1$ is the same as a manner of determining whether at least a part of data in the window $W_{i2}[k_i-170, k_i-1]$ meets the preset condition $C_2$. Therefore, the same random numbers are used: $h_1, h_2, h_3, h_4, \ldots$, and $h_{40}$, and $S_b = V_{b1}* + V_{b2}*h_2 + V_{b3}*h_3 V_{b4}*h_4 + \ldots + V_{b40}*h_{40}$. Because $h_1, h_2, h_3, h_4, \ldots$, and $h_{40}$ follow normal distribution, $S_b$ also follows normal distribution. When $S_b$ is a positive number, the at least a part of data in $W_{i2}[k_i-170, k_i-1]$ meets the preset condition $C_2$; when $S_b$ is a negative number or 0, the at least a part of data in $W_{i2}[k_i-170, k_i-1]$ does not meet the preset condition $C_2$. A probability that $S_b$ is a positive number is 1/2. In the embodiment shown in FIG. 21, the at least a part of data in $W_{i2}[k_i-170, k_i-1]$ meets the preset condition $C_2$. By using the same rule, separately it is determined whether at least a part of data in $W_{i3}[k_i-171, k_i-2]$ meets a preset condition $C_3$, it is determined whether at least a part of data in $W_{i4}[k_i-172, k_i-3]$ meets a preset condition $C_4$, it is determined whether at least a part of data in $W_{i5}[k_i-173, k_i-4]$ meets a preset condition $C_5$, it is determined whether at least a part of data in $W_{i6}[k_i-174, k_i-5]$ meets a preset condition $C_6$, it is determined whether at least a part of data in $W_{i7}[k_i-175, k_i-6]$ meets a preset condition $C_7$, it is determined whether at least a part of data in $W_{i8}[k_i-176, k_i-7]$ meets a preset condition $C_8$, it is determined whether at least a part of data in $W_{i9}[k_i-177, k_i-8]$ meets a preset condition $C_9$, it is determined whether at least a part of data in $W_{i10}[k_i-178, k_i-9]$ meets a preset condition $C_{10}$, and it is determined whether at least a part of data in $W_{i11}[k_i-179, k_i-10]$ meets a preset condition $C_{11}$. In the implementation manner shown in FIG. 21, the at least a part of data in $W_{i5}[k_i-173, k_i-4]$ does not meet the preset condition $C_5$, 7 bytes are skipped from the potential dividing point $k_i$ along a direction of searching for a data stream dividing point, and a current potential dividing point $k_j$ is obtained at an end position of a 7th byte. As shown in FIG. 22, according to the rule preset on the deduplication server 103, a window $W_{j1}[k_j-169, k_j]$ is determined for the potential dividing point $k_j$. A manner of determining whether at least a part of data in the window $W_{j1}[k_j-169, k_j]$ meets the preset condition $C_1$ is the same as the manner of determining whether at least a part of data in the window $W_{i1}[k_i-169, k_i]$ meets the preset condition $C_1$. Therefore, as shown in FIG. 33, $W_{j1}$ represents the window $W_{j1}[k_j-169, k_j]$, and 5 bytes are selected to determine whether at least a part of data in $W_{j1}[k_j-169, k_j]$ meets the preset condition $C_1$. In FIG. 33, each of bytes "■" whose sequence numbers are 169, 127, 85, 43, and 1 in FIG. 33 represents 1 selected byte, and there are 42 bytes between two adjacent selected bytes. The bytes "■" whose sequence numbers are 169, 127, 85, 43, and 1 are regarded as 40 sequential bits, which are represented as $a_1', a_2', a_3', a_4', \ldots$, and $a_{40}'$ separately. For any $a_t'$ of $a_1', a_2', a_3', a_4', \ldots$, and $a_{40}'$, when $a_t'=0$, $V_{at}'=-1$, and when $a_t'=1$, $V_{at}'=1$. According to a correspondence between $a_t'$ and $V_{at}', V_{a1}', V_{a2}', V_{a3}', V_{a4}, \ldots$, and $V_{a40}'$ are generated. The manner of determining whether at least a part of data in the window $W_{j1}[k_j-169, k_j]$ meets the preset condition $C_1$ is the same as the manner of determining whether at least a part of data in the window $W_{i1}[k_i-169, k_i]$ meets the preset condition $C_1$. Therefore, the same random numbers are used: $h_1, h_2, h_3, h_4, \ldots$, and $h_{40}$. $S_a' = V_{a1}'*h_1 + V_{a2}'*h_2 + V_{a3}'*h_3 + V_{a4}'*h_4 + \ldots + V_{a40}'*h_{40}$. Because $h_1, h_2, h_3, h_4, \ldots$, and $h_{40}$ follow normal distribution, $S_a'$ also follows normal distribution. When $S_a'$ is a positive number, the at least a part of data in $W_{j1}[k_j-169, k_j]$ meets the preset condition $C_1$; when $S_a'$ is a negative number or 0, the at least a part of data in $W_{j1}[k_j-169, k_j]$ does not meet the preset condition $C_1$. A probability that $S_a'$ is a positive number is 1/2.

The manner of determining whether at least a part of data in $W_{i2}[k_i-170, k_i-1]$ meets the preset condition $C_2$ is the same as a manner of determining whether at least a part of data in $W_{j2}[k_j-170, k_j-1]$ meets the preset condition $C_2$. Therefore, as shown in FIG. 33, "▨" represents 1 byte selected when it is determined whether the at least a part of data in the window $W_{j2}[k_j-170, k_j-1]$ meets the preset condition $C_2$, and there are 42 bytes between two adjacent selected bytes. In FIG. 33, selected bytes are represented as sequence numbers 170, 128, 86, 44, and 2 separately, and there are 42 bytes between two adjacent selected bytes. The bytes "▨" whose sequence numbers are 170, 128, 86, 44, and 2 are regarded as 40 sequential bits, which are represented as $b_1', b_2', b_3', b_4', \ldots$, and $b_{40}'$ separately. For any $b_t'$ of $b_1', b_2', b_3', b_4', \ldots$, and $b_{40}'$, when $b_t'=0$, $V_{bt}'=-1$, and when $b_t'=1$, $V_{bt}'=1$. According to a correspondence between $b_t'$ and $V_{bt}', V_{b1}', V_{b2}', V_{b3}', V_{b4}', \ldots$, and $V_{b40}'$ are generated. The manner of determining whether at least a part of data in $W_{i2}[k_i-170, k_i-1]$ meets the preset condition $C_2$ is the same as the manner of determining whether at least a part of data in $W_{j2}[k_j-170, k_j-1]$ meets the preset condition $C_2$. Therefore, the same random numbers are used: $h_1, h_2, h_3, h_4, \ldots$, and $h_{40}$, and $S_b'=V_{b1}'*h_1+V_{b2}'*h_2+V_{b3}'*h_3\ V_{b4}'*h_4+ \ldots +V_{b40}'*h_{40}$. Because $h_1, h_2, h_3, h_4, \ldots$, and $h_{40}$ follow normal distribution, $S_b'$ also follows normal distribution. When $S_b'$ is a positive number, the at least a part of data in $W_{j2}[k_j-170, k_j-1]$ meets the preset condition $C_2$; when $S_b'$ is a negative number or 0, the at least a part of data in $W_{j2}[k_j-170, k_j-1]$ does not meet the preset condition $C_2$. A probability that $S_b'$ is a positive number is 1/2.

Similarly, a manner of determining whether at least a part of data in $W_{i3}[k_i-171, k_i-2]$ meets the preset condition $C_3$ is the same as a manner of determining whether at least a part of data in $W_{j3}[k_j-171, k_j-2]$ meets the preset condition $C_3$. Similarly, it is determined whether at least a part of data in $W_{j4}[k_j-172, k_j-3]$ meets the preset condition $C_4$, it is determined whether at least a part of data in $W_{j5}[k_j-173, k_j-4]$ meets the preset condition $C_5$, it is determined whether at least a part of data in $W_{j6}[k_j-174, k_j-5]$ meets the preset condition $C_6$, it is determined whether at least a part of data in $W_{j7}[k_j-175, k_j-6]$ meets the preset condition $C_7$, it is determined whether at least a part of data in $W_{j8}[k_j-176, k_j-7]$ meets the preset condition $C_8$, it is determined whether at least a part of data in $W_{j9}[k_j-177, k_j-8]$ meets the preset condition $C_9$, it is determined whether at least a part of data in $W_{j10}[k_j-178, k_j-9]$ meets the preset condition $C_{10}$, and it is determined whether at least a part of data in $W_{j11}[k_j-179, k_j-10]$ meets the preset condition $C_{11}$, which are not described herein again.

In this embodiment, it is determined, by using a random function, whether at least a part of data in a window $W_{iz}[k_i-A_z, k_i+B_z]$ meets a preset condition $C_z$. The implementation manner shown in FIG. 21 is still used as an example. According to a rule preset on a deduplication server 103, for the potential dividing point $k_i$, a window $W_{i1}[k_i-169, k_i]$ is determined for a potential dividing point $k_i$, and it is determined whether at least a part of data in $W_{i1}[k_i-169, k_i]$ meets a preset condition $C_1$. As shown in FIG. 32, $W_{i1}$ represents the window $W_{i1}[k_i-169, k_i]$, and 5 bytes are selected to determine whether the at least a part of data in $W_{i1}[k_i-169, k_i]$ meets the preset condition $C_1$. In FIG. 32, each of bytes "■" whose sequence numbers are 169, 127, 85, 43, and 1 represents 1 selected byte, and there are 42 bytes between two adjacent selected bytes. Each of the bytes "■" whose sequence numbers are 169, 127, 85, 43, and 1 is converted into 1 decimal number, the range of which is 0-($2^{40}$-1). An even distribution random number generator is used to generate 1 designated value for each decimal number in 0-($2^{40}$-1), and a correspondence R between each decimal number in 0-($2^{40}$-1) and the designated value is recorded. Once being designated, a designated value corresponding to a decimal number remains unchanged, and the designated value follows even distribution. If the designated value is an even number, the at least a part of data in $W_{i1}[k_i-169, k_i]$ meets the preset condition $C_1$; if the designated value is an odd number, the at least a part of data in $W_{i1}[k_i-169, k_i]$ does not meet the preset condition $C_1$. $C_1$ represents that the designated value obtained according to the foregoing method is an even number. Because a probability that a random number in even distribution is an even number is 1/2, a probability that the at least a part of data in $W_{i1}[k_i-169, k_i]$ meets the preset condition $C_1$ is 1/2. In the implementation manner shown in FIG. 21, by using the same rule, separately, it is determined whether at least a part of data in $W_{i2}[k_i-170, k_i-1]$ meets a preset condition $C_2$ it is determined whether at least a part of data in $W_{i3}[W_i-171, k_i-2]$ meets a preset condition $C_3$, it is determined whether at least a part of data in $W_{i4}[k_i-172, k_i-3]$ meets a preset condition $C_4$, it is determined whether at least a part of data in $W_{i5}[k_i-173, k_i-4]$ meets a preset condition $C_5$, which are not described herein again.

When the at least a part of data in $W_{i5}[k_i-173, k_i-4]$ does not meet the preset condition $C_5$, 7 bytes are skipped from the potential dividing point $k_i$ along a direction of searching for a data stream dividing point, and a current potential dividing point $k_j$ is obtained at an end position of a 7th byte. As shown in FIG. 22, according to the rule preset on the deduplication server 103, a window $W_{j1}[k_j-169, k_j]$ is determined for the potential dividing point $k_j$. A manner of determining whether at least a part of data in the window $W_{j1}[k_j-169, k_j]$ meets the preset condition $C_1$ is the same as a manner of determining whether at least a part of data in the window $W_{i1}[k_i-169, k_i]$ meets the preset condition $C_1$. Therefore, the same correspondence R between each decimal number in 0-($2^{40}$-1) and a designated value is used. As shown in FIG. 33, $W_{j1}$ represents the window, and 5 bytes are selected to determine whether the at least a part of data in $W_{j1}[k_j-169, k_j]$ meets the preset condition $C_1$. In FIG. 33, "■" represents 1 selected byte, and there are 42 bytes between two adjacent selected bytes "■". Each of bytes "■" whose sequence numbers 169, 127, 85, 43, and 1 is converted into 1 decimal number, and R is searched for a designated value corresponding to the decimal number. If the designated value is an even number, the at least a part of data in $W_{j1}[k_j-169, k_j]$ meets the preset condition $C_1$; if the designated value is an odd number, the at least a part of data in $W_{j1}[k_j-169, k_j]$ does not meet the preset condition $C_1$. Because a probability that a random number in even distribution is an even number is 1/2, a probability that the at least a part of data in $W_{j1}[k_j-169, k_j]$ meets the preset condition $C_1$ is 1/2. Similarly, a manner of determining whether at least a part of data in $W_{i2}[k_i-170, k_i]$ meets the preset condition $C_2$ is the same as a manner of determining whether at least a part of data in $W_{j2}[k_j-170, k_j-1]$ meets the preset condition $C_2$, and a manner of determining whether at least a part of data in $W_{i3}[k_i-171, k_i-2]$ meets the preset condition $C_3$ is the same as a manner of determining whether at least a part of data in $W_{j3}[k_j-171, k_j-2]$ meets the preset condition $C_3$. Similarly, it is determined whether at least a part of data in $W_j[k_j-172, k_j-3]$ meets the preset condition $C_4$ it is determined whether at least a part of data in $W_{j5}[k_j-173, k_j-4]$ meets the preset condition $C_5$, it is determined whether at least a part of data in $W_{j6}[k_j-174, k_j-5]$ meets the preset condition $C_6$, it is determined whether at least a part of data in $W_{j7}[k_j-175, k_j-6]$ meets the preset condition $C_7$, it is determined whether at least a part of data in $W_{j8}[k_j-176, k_j-7]$ meets the preset condition $C_8$, it is determined whether at least a part of data in $W_{j9}[k_j-177, k_j-8]$ meets the preset condition $C_9$, it is determined whether at least a part of data in $W_{j10}[k_j-178, k_j-9]$ meets the preset condition $C_{10}$, and it is determined whether at least a part of data in $W_{j11}[k_j-179, k_j-10]$ meets the preset condition $C_{11}$, which are not described herein again.

The deduplication server 103 in the embodiment of the present invention shown in FIG. 1 refers to an apparatus that can implement a technical solution described in an embodiment of the present invention, and as shown in FIG. 18, usually includes a central processing unit, a primary memory, and an input/output interface. The central processing unit, the primary memory, and the input/output interface communicate with each other. The main memory stores an executable instruction, and the central processing unit executes the executable instruction stored in the main memory to perform a specific function, so that the deduplication server 103 has a specific function, for example, searching for a data stream dividing point described in FIG. 20 to FIG. 33 in the embodiments of the present invention. Therefore, as shown in FIG. 19, according to the embodiments of the present invention shown in FIG. 20 to FIG. 33, for the deduplication server 103, a rule is preset on the deduplication server 103, where the rule is: for a potential dividing point k, determining M windows $W_x[k-A_x, k+B_x]$ and a preset condition $C_x$ corresponding to the window $W_x[k-A_x, k+B_x]$, where x indicates consecutive natural numbers from 1 to M, M≥2, and $A_x$ and $B_x$ are integers.

The deduplication server 103 includes a determining unit 1901 and a judging and processing unit 1902. The determining unit 1901 is configured to perform step (a):

(a) determining a corresponding window $W_{iz}[k_i-A_z, k_i+B_z]$ for a current potential dividing point $k_i$ according to the rule, where i and z are integers, and 1≤z≤M.

The judging and processing unit 1902 is configured to: determine whether at least a part of data in the window $W_{iz}[k_i-A_z, k_i+B_z]$ meets a preset condition $C_z$;

when the at least a part of data in the window $W_{iz}[k_i-A_z, k_i+B_z]$ does not meet the preset condition $C_z$, skip N minimum units U for searching for a data stream dividing point from the current potential dividing point $k_i$ along a direction of searching for a data stream dividing point, where N*U is not greater than $\|B_z\|+\max_x(\|A_x\|)$, so as to obtain a new potential dividing point, where the determining unit 1901 performs step (a) for the new potential dividing point; and when at least a part of data in each window $W_{ix}[k_i-A_x, k_i+B_x]$ of M windows of the current potential dividing point $k_i$ meets the preset condition $C_x$, select the current potential dividing point $k_i$ as a data stream dividing point.

Further, the rule further includes that at least two windows $W_{ie}[k_i-A_e, k_i+B_e]$ and $W_{if}[k_i-A_f, k_i+B_f]$ meet conditions $|A_e+B_e|=|A_f+B_f|$ and $C_e=C_f$. Further, the rule further includes that $A_e$ and $A_f$ are positive integers. Further, the rule further includes $A_e-1=A_f$ and $B_e+1=B_f$.

Further, the judging and processing unit 1902 is specifically configured to determine, by using a random function, whether the at least a part of data in the window $W_{iz}[k_i-A_z, k_i+B_z]$ meets the preset condition $C_z$. Still further, the judging and processing unit 1902 specifically determines, by using a hash function, whether the at least a part of data in the window $W_{iz}[k_i-A_z, k_i+B_z]$ meets the preset condition $C_z$.

Further, the judging and processing unit 1902 is configured to: when the at least a part of data in the window $W_{iz}[k_i-A_z, k_i+B_z]$ does not meet the preset condition $C_z$, skip the N minimum units U for searching for a data stream dividing point from the current potential dividing point $k_i$ along the direction of searching for a data stream dividing point, so as to obtain the new potential dividing point, and the determining unit 1901 performs step (a) for the new potential dividing point, where according to the rule, a left boundary of a window $W_{ic}[k_i-A_c, k_i+B_c]$ that is determined for the new potential dividing point coincides with a right boundary of the window $W_{iz}[k_i-A_z, k_i+B_z]$ or a left boundary of a window $W_{ic}[k_i-A_c, k_i+B_c]$ that is determined for the new potential dividing point falls within a range of the window $W_{iz}[k_i-A_z, k_i+B_z]$, where the window $W_{ic}[k_i-A_c, k_i+B_c]$ determined for the new potential dividing point is a window ranking the first in a sequence, which is obtained according to the direction of searching for a data stream dividing point, of M windows that are determined for the new potential dividing point according to the rule.

Further, that the judging and processing unit 1902 determines, by using a random function, whether the at least a part of data in the window $W_{iz}[k_i-A_z, k_i+B_z]$ meets the preset condition $C_z$ specifically includes:

selecting F bytes in the window $W_{iz}[k_i-A_z, k_i+B_z]$, and using the F bytes repeatedly H times to obtain F*H bytes in total, where F≥1, each byte is formed by 8 bits, which are denoted as $a_{m,1}, \ldots,$ and $a_{m,8}$, representing the 1st bit to the 8th bit of an mth byte in the F*H bytes, bits corresponding to the F*H bytes may be represented as:

$$\begin{pmatrix} a_{1,1} & a_{1,2} & \ldots & a_{1,8} \\ a_{2,1} & a_{2,2} & \ldots & a_{2,8} \\ M & M & M & M \\ a_{F*H,1} & a_{F*H,2} & \ldots & a_{F*H,8} \end{pmatrix},$$

where when $a_{m,n}=1$, $V_{am,n}=1$, and when $a_{m,n}=0$, $V_{am,n}=-1$, where $a_{m,n}$ represents any one of $a_{m,1}, \ldots,$ and $a_{m,8}$, matrix $V_a$ is obtained according to a conversion relationship between $a_{m,n}$ and $V_{am,n}$ from the bits corresponding to the F*H bytes, the matrix $V_a$ is represented as:

$$\begin{pmatrix} V_{a1,1} & V_{a1,2} & \Lambda & V_{a1,8} \\ V_{a2,1} & V_{a2,2} & \Lambda & V_{a2,8} \\ M & M & M & M \\ V_{aF*H,1} & V_{aF*H,2} & \Lambda & V_{aF*H,8} \end{pmatrix},$$

F*H*8 random numbers are selected from random numbers following normal distribution to form a matrix R, the matrix R is represented as:

$$\begin{pmatrix} h_{1,1} & h_{1,2} & \ldots & h_{1,8} \\ h_{2,1} & h_{2,2} & \ldots & h_{2,8} \\ M & M & M & M \\ h_{F*H,1} & h_{F*H,2} & \ldots & h_{F*H,8} \end{pmatrix},$$

random numbers in an mth row of the matrix $V_a$ and an mth row of the matrix R are multiplied and products are added to obtain a value, which is specifically represented as $S_{am}=V_{am,1}*h_{m,1}+V_{am,2}*h_{m,2}+ \ldots +V_{am,8}*h_{m,8}$, $S_{a1}$, $S_{a2}, \ldots,$ and $S_{aF*H}$ are obtained in a same way, a quantity K of values greater than 0 among $S_{a1}, S_{a2}, \ldots,$ and $S_{aF*H}$ is counted, and when K is an even number, the at least a part of data in the window $W_{iz}[k_i-A_z, k_i+B_z]$ meets the preset condition $C_z$.

According to the method for searching for a data stream dividing point based on a server in the embodiments of the present invention shown in FIG. 20 to FIG. 33, a window $W_{ix}[k_i=A_x, k_i+B_x]$ is determined for a potential dividing point k, where, x indicates consecutive natural numbers from 1 to M separately, and M≥2. It may be determined in parallel whether at least a part of data in each window of M windows meets a preset condition $C_x$, or it may be determined sequentially whether at least a part of data in windows meets a preset condition, or it may be first determined that at least a part of data in a window $W_{i1}[p_{i1}-A_1, p_{i1}+B_1]$ meets a preset condition $C_1$, then it is determined that at least a part of data in $W_{i2}[p_{i2}-A_2, p_{i2}+B_2]$ meets a preset condition $C_2$, until it is determined that at least a part of data in $W_{im}[p_{im}-$ $A_m$, $p_{im}+B_m$] meets a preset condition $C_m$. Other windows in this embodiment are determined in a same manner as the above, which is not described again.

In addition, according to the embodiments of the present invention shown in FIG. 20 to FIG. 33, a rule is preset on the deduplication server 103, where the rule is: determining M windows $W_x[k-A_x, k+B_x]$ for a potential dividing point k and a preset condition $C_x$ corresponding to the window $W_x[k-A_x, k+B_x]$, where x indicates consecutive natural numbers from 1 to M separately, and M≥2. In the preset rule, $A_1$, $A_2$, $A_3$ . . . , and $A_m$ may be not all equal, $B_1$, $B_2$, $B_3$ . . . , and $B_m$ may be not all equal, and $C_1$, $C_2$, $C_3$ . . . , and $C_M$ may also be not all the same. In the implementation manner shown in FIG. 21, for $W_{i1}[k, -169, k_i]$, $W_{i2}[k_i-170, k_i-1]$, $W_{i3}[k_i-171, k_i-2]$, $W_{i4}[k_i-172, k_i-3]$, $W_{i5}[k_i-173, k_i-4]$, $W_{i6}[k_i-174, k_i-5]$, $W_{i7}[k_i-175, k_i-6]$, $W_{i8}[k_i-176, k_i-7]$, $W_{i9}[k_i-177, k_i-8]$, $W_{i10}[k_i-178, k_i-9]$, and $W_{i11}[k_i-179, k_i-10]$, the windows are the same in size, that is, all the windows have a size of 169 bytes, and meanwhile manners of determining whether at least a part of data in a window meets a preset condition are also the same. For details, refer to the foregoing description of determining whether the at least a part of data in W $[k_i-169, k_i]$ meets the preset condition $C_1$. However, in the implementation manner shown in FIG. 11, the windows $W_{i1}[k, -169, k_i]$, $W_{i2}[k_i-170, k_i-1]$, $W_{i3}[k_i-171, k_i-2]$, $W_{i4}[k_i-172, k_i-3]$, $W_{i5}[k_i-173, k_i-4]$, $W_{i6}[k_i-174, k_i-5]$, $W_{i7}[k_i-175, k_i-6]$, $W_{i8}[k_i-176, k_i-7]$, $W_{i9}[k_i-177, k_i-8]$, $W_{i10}[k_i-168, k_i+1]$, and $W_{i11}[k_i-179, k_i+3]$ may be different in size, and meanwhile the manners of determining whether at least a part of data in a window meets a preset condition may also be different. In all embodiments, according to the rule preset on the deduplication server 103, a manner of determining whether at least a part of data in the window $W_{i1}$ meets the preset condition $C_1$ is certainly the same as a manner of determining whether at least a part of data in a window $W_{j1}$ meets the preset condition $C_1$, a manner of determining whether at least a part of data in $W_{i2}$ meets the preset condition $C_2$ is certainly the same as a manner of determining whether at least a part of data in $W_{j2}$ meets the preset condition $C_2$, . . . , and a manner of determining whether at least a part of data in a window $W_{iM}$ meets a preset condition $C_M$ is certainly the same as a manner of determining whether at least a part of data in a window $W_{jM}$ meets the preset condition $C_M$, which are not described herein again.

According to the embodiments of the present invention shown in FIG. 20 to FIG. 33, the rule is preset on the deduplication server 103, $k_a$, $k_i$, $k_j$, $k_l$, and $k_m$ are potential dividing points obtained in the search for a dividing point along a direction of searching for a data stream dividing point, and $k_a$, $k_i$, $k_j$, $k_l$, and $k_m$ all follow the rule. In this embodiment of the present invention, the window $W_x[k-A_x, k+B_x]$ represents a specific range, and data is selected in the specific range to determine whether the data meets the preset condition $C_x$. Specifically, in the specific range, a part of data may be selected or all data may be selected to determine whether the data meets the preset condition $C_x$. Reference may be made to the window $W_x[k-A_x, k+_x]$ for the concept of a window specifically used in this embodiment of the present invention, which is not described herein again.

In the window $W_x[k-A_x, k+B_x]$, $(k-A_x)$ and $(k+B_x)$ represent two boundaries of the window $W_x[k-A_x, k+B_x]$, where $(k-A_x)$ represents a boundary, which is in a direction opposite to the direction of searching for a data stream dividing point relative to the potential dividing point k, of the window $W_x[k-A_x, k+B_x]$, and $(k+B_x)$ represents a boundary, which is in the direction of searching for a data stream dividing point relative to the potential dividing point k, of the window $W_x[k-A_x, k+B_x]$. Specifically, in the embodiment of the present invention, the direction of searching for a data stream dividing point shown in FIG. 20 to FIG. 33 is from left to right; therefore, $(k-A_x)$ represents a boundary (that is, a left boundary), which is in a direction opposite to the direction of searching for a data stream dividing point relative to the potential dividing point k, of the window $W_x[k-A_x, k+B_x]$, and $(k+B_x)$ represents a boundary (that is, a right boundary), which is in the direction of searching for a data stream dividing point relative to the potential dividing point k, of the window $W_x[k-A_x, k+B_x]$. If the direction of searching for a data stream dividing point shown in FIG. 20 to FIG. 33 is from right to left, $(k-A_x)$ represents a boundary (that is, a right boundary), which is in a direction opposite to the direction of searching for a data stream dividing point relative to the potential dividing point k, of the window $W_x[k-A_x, k+B_x]$, and $(k+B_x)$ represents a boundary (that is, a left boundary), which is in the direction of searching for a data stream dividing point relative to the potential dividing point k, of the window $W_x[k-A_x, k+B_x]$.

A person of ordinary skill in the art may be aware that, in conjunction with various exemplary units and algorithm steps described in FIG. 20 to FIG. 33 of the embodiments of the present invention, a key feature in the embodiments of the present invention may be combined with other technologies and presented in a more complex form; however, the key feature of the present invention is still included. An alternative dividing point may be used in a real environment. For example, in an implementation manner, according to a rule preset on a deduplication server 103, for a potential dividing point $k_i$, 11 windows $W_x[k-A_x, k+B_x]$ and a preset condition $C_x$ corresponding to the window $W_x[k-A_x, k+B_x]$ are determined, where x indicates consecutive natural numbers from 1 to 11. When at least a part of data in each window $W_x[k-A_x, k+B_x]$ of the 11 windows meets the preset condition $C_x$, the potential dividing point $k_i$ is a data stream dividing point. When no dividing point is found after a set maximum data chunk is exceeded, a preset rule for the alternative point may be used. The preset rule for the alternative point is similar to the rule preset on the deduplication server 103, and the preset rule for the alternative point is: for example, for a potential dividing point $k_i$, determining 10 windows $W_x[k-A_x, k+B_x]$ and a preset condition $C_x$ corresponding to the window $W_x[k-A_x, k+B_x]$, where x indicates consecutive natural numbers from 1 to 10. When it is determined that at least a part of data in each window $W_x[k-A_x, k+B_x]$ of the 10 windows meets the preset condition $C_x$, the potential dividing point $k_i$ is a data stream dividing point. When no data stream dividing point is found after a set maximum data chunk is exceeded, an end position of the maximum data chunk serves as a forced dividing point.

According to the embodiments of the present invention shown in FIG. 20 to FIG. 33, a rule is preset on the deduplication server 103, and in the rule, M windows are determined for a potential dividing point k. It is not necessarily required that there be a potential dividing point k in advance, and the potential dividing point k may be determined by using the determined M windows.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several provided embodiments, it should be understood that the disclosed system and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable non-volatile storage medium. Based on such an understanding, the technical solutions of the present invention essentially, or the part contributing to the prior art, or some of the technical solutions may be implemented in a form of a software product. The software product is stored in a non-volatile storage medium, and includes several instructions for instructing a computer device (which may be a personal computer, a server, or a network device) to perform all or some of the steps of the methods described in the embodiments of the present invention. The foregoing non-volatile storage medium includes: any medium that can store program code, such as a USB flash drive, a removable hard disk, a read-only memory (ROM), a magnetic disk, or an optical disc.

What is claimed is:

1. A method performed by a server processor for searching for a data stream dividing point and for dividing data into a plurality of portions the method comprising:
    determining a window $W_x[k-A_x, k+B_x]$ and a preset condition $C_x$ corresponding to the window $W_x[k-A_x, k+B_x]$ based on a dividing rule, wherein x indicates consecutive natural numbers from 1 to M, M≥2, and $A_x$ and $B_x$ are integers for establishing a potential dividing point k,
    determining a corresponding window $W_{iz}[k_i-A_z, k_i+B_z]$ for a current potential dividing point $k_i$ based to the dividing rule, wherein i and z are integers, and 1≤z≤M;
    determining whether at least a part of data in the window $W_{iz}[k_i-A_z, k_i+B_z]$ meets a preset condition $C_z$; and
    when the at least a part of data in the window $W_{iz}[k_i-A_z, k_i+B_z]$ does not meet the preset condition $C_z$, skipping N minimum units U for searching for a data stream dividing point from the current potential dividing point $k_i$ along a direction of searching for a data stream dividing point, wherein N*U is not greater than $\|B_z\|+\max_x(\|A_x\|)$, so as to obtain a new potential dividing point; and
    when at least a part of data in each window $W_{ix}[k_i-A_x, k_i+B_x]$ of M windows of the current potential dividing point $k_i$ meets the preset condition $C_x$, dividing the data stream at the current potential dividing point $k_i$.

2. The method according to claim 1, wherein the dividing rule further comprises that at least two windows $W_{ie}[k_i-A_e, k_i+B_e]$ and $W_{if}[k_i-A_f, k_i+B_f]$ meet conditions $|A_e+B_e|=|A_f+B_f|$ and $C_e=C_f$.

3. The method according to claim 2, wherein the dividing rule further comprises that $A_e$ and $A_f$ are positive integers.

4. The method according to claim 2, wherein the dividing rule further comprises $A_e-1=A_f$ and $B_e+1=B_f$.

5. The method according to claim 1, wherein determining, by using a random function, whether the at least a part of data in the window $W_{iz}[k_i-A_z, k_i+B_z]$ meets the preset condition $C_z$.

6. The method according to claim 5, wherein the determining, by using a random function, whether the at least a part of data in $W_{iz}[k_i-A_z, k_i+B_z]$ meets the preset condition $C_z$ is specifically: determining, by using a hash function, whether the at least a part of data in $W_{iz}[k_i-A_z, k_i+B_z]$ meets the preset condition $C_z$.

7. The method according to claim 5, wherein selecting F bytes in the window $W_{iz}[k_i-A_z, k_i+B_z]$, and using the F bytes repeatedly H times to obtain F*H bytes in total, wherein F≥1, each byte is formed by 8 bits, which are denoted as $a_{m,1}, \ldots,$ and $a_{m,8}$, representing the 1st bit to the 8th bit of an mth byte in the F*H bytes, bits corresponding to the F*H bytes can be represented as:

$$\begin{pmatrix} a_{1,1} & a_{1,2} & \ldots & a_{1,8} \\ a_{2,1} & a_{2,2} & \ldots & a_{2,8} \\ M & M & M & M \\ a_{F*H,1} & a_{F*H,2} & \ldots & a_{F*H,8} \end{pmatrix},$$

wherein when $a_{m,n}=1$, $V_{am,n}=1$, and when $a_{m,n}=0$, $V_{am,n}=-1$, wherein $a_{m,n}$ represents any one of $a_{m,1}, \ldots,$ and $a_{m,8}$, a matrix $V_a$ is obtained according to a conversion relationship between $a_{m,n}$ and $V_{am,n}$ from the bits corresponding to the F*H bytes, the matrix $V_a$ is represented as:

$$\begin{pmatrix} V_{a1,1} & V_{a1,2} & \wedge & V_{a1,8} \\ V_{a2,1} & V_{a2,2} & \wedge & V_{a2,8} \\ M & M & M & M \\ V_{aF*H,1} & V_{aF*H,2} & \wedge & V_{aF*H,8} \end{pmatrix},$$

F*H*8 random numbers are selected from random numbers following normal distribution to form a matrix R, the matrix R is represented as:

$$\begin{pmatrix} h_{1,1} & h_{1,2} & \ldots & h_{1,8} \\ h_{2,1} & h_{2,2} & \ldots & h_{2,8} \\ M & M & M & M \\ h_{F*H,1} & h_{F*H,2} & \ldots & h_{F*H,8} \end{pmatrix},$$

random numbers in an mth row of the matrix $V_a$ and an mth row of the matrix R are multiplied and products are added to obtain a value, which is specifically represented as $S_{am}=V_{am,1}*h_{m,1}+V_{am,2}*h_{m,2}+\ldots+V_{am,8}*h_{m8}$, $S_{a1}$, $S_{a2}, \ldots$, and $S_{aF*H}$ are obtained in a same way, a quantity K of values greater than 0 among $S_{a1}, S_{a2}, \ldots$, and $S_{aF*H}$ is counted, and when K is an even number, the at least a part of data in the window $W_{iz}[k_i-A_z, k_i+B_z]$ meets the preset condition $C_z$.

8. The method according to claim 1, wherein when the at least a part of data in the window $W_{iz}[k_i-A_z, k_i+B_z]$ does not meet the preset condition $C_z$, the N minimum units U for searching for a data stream dividing point are skipped from the current potential dividing point $k_i$ along the direction of searching for a data stream dividing point, so as to obtain the new potential dividing point, and based on the dividing rule, a left boundary of a window $W_{ic}[k_i-A_c, k_i+B_c]$ that is determined for the new potential dividing point coincides with a right boundary of the window $W_{iz}[k_i-A_z, k_i+B_z]$ or a left boundary of a window $W_{ic}[k_i-A_c, k_i+B_c]$ that is determined for the new potential dividing point falls within a range of the window $W_{iz}[k_i-A_z, k_i+B_z]$, wherein the window $W_{ic}[k_i-A_c, k_i+B_c]$ determined for the new potential dividing point is a window ranking the first in a sequence, which is obtained according to the direction of searching for a data stream dividing point, of M windows that are determined for the new potential dividing point based on the dividing rule.

9. A server for searching for a data stream dividing point for dividing data into a plurality of portions, comprising:
a central processing unit and a primary memory, the central processing unit communicates with the primary memory to execute computer instructions stored therein to perform the steps of:
determining a window $W_x[k-A_x, k+B_x]$ and a preset condition $C_x$ corresponding to the window $W_x[k-A_x, k+B_x]$ based on a dividing rule, wherein x indicates consecutive natural numbers from 1 to M, M≥2, and $A_x$ and $B_x$ are integers for establishing a potential dividing point k;
determining a corresponding window $W_{iz}[k_i-A_z, k_i+B_z]$ for a current potential dividing point $k_i$ based on the dividing rule, wherein i and z are integers, and 1≤z≤M;
determining whether at least a part of data in the window $W_{iz}[k_i-A_z, k_i+B_z]$ meets a preset condition $C_z$;
when the at least a part of data in the window $W_{iz}[k_i-A_z, k_i+B_z]$ does not meet the preset condition $C_z$, skipping N minimum units U for searching for a data stream dividing point from the current potential dividing point $k_i$ along a direction of searching for a data stream dividing point, wherein N*U is not greater than $\|B_z\|+\max_x(\|A_x\|)$, so as to obtain a new potential dividing point; and
when at least a part of data in each window $W_{ix}[k_i-A_x, k_i+B_x]$ of M windows of the current potential dividing point $k_i$ meets the preset condition $C_x$, dividing the data stream at the current potential dividing point $k_i$.

10. The server according to claim 9, wherein the dividing rule further comprises that at least two windows $W_{ie}[k_i-A_e, k_i+B_e]$ and $W_{if}[k_i-A_f, k_i+B_f]$ meet conditions $|A_e+B_e|=|A_f+B_f|$ and $C_e=C_f$.

11. The server according to claim 10, wherein the dividing rule further comprises that $A_e$ and $A_f$ are positive integers.

12. The server according to claim 10, wherein the dividing rule further comprises $A_e-1=A_f$ and $B_e+1=B_f$.

13. The server according to claim 9, wherein the central processing unit is specifically configured to determine, by using a random function, whether the at least a part of data in the window $W_{iz}[k_i-A_z, k_i+B_z]$ meets the preset condition $C_z$.

14. The server according to claim 13, wherein the central processing unit is specifically configured to determine, by using a hash function, whether the at least a part of data in the window $W_{iz}[k_i-A_z, k_i+B_z]$ meets the preset condition $C_z$.

15. The server according to claim 14, wherein the determining, by the central processing unit by using a random function, whether the at least a part of data in the window $W_{iz}[k_i-A_z, k_i+B_z]$ meets the preset condition $C_z$ specifically comprises:
selecting F bytes in the window $W_{iz}[k_i-A_z, k_i+B_z]$, and using the F bytes repeatedly H times to obtain F*H bytes in total, wherein F≥1, each byte is formed by 8 bits, which are denoted as $a_{m,1}, \ldots,$ and $a_{m,8}$, representing the 1st bit to the 8th bit of an mth byte in the F*H bytes, bits corresponding to the F*H bytes can be represented as:

$$\begin{pmatrix} a_{1,1} & a_{1,2} & \ldots & a_{1,8} \\ a_{2,1} & a_{2,2} & \ldots & a_{2,8} \\ M & M & M & M \\ a_{F*H,1} & a_{F*H,2} & \ldots & a_{F*H,8} \end{pmatrix},$$

wherein when $a_{m,n}=1$, $V_{am,n}=1$, and when $a_{m,n}=0$, $V_{am,n}=-1$, wherein $a_{m,n}$ represents any one of $a_{m,1}, \ldots,$ and $a_{m,8}$, a matrix $V_a$ is obtained according to a conversion relationship between $a_{m,n}$ and $V_{am,n}$ from the bits corresponding to the F*H bytes, the matrix $V_a$ is represented as:

$$\begin{pmatrix} V_{a1,1} & V_{a1,2} & \Lambda & V_{a1,8} \\ V_{a2,1} & V_{a2,2} & \Lambda & V_{a2,8} \\ M & M & M & M \\ V_{aF*H,1} & V_{aF*H,2} & \Lambda & V_{aF*H,8} \end{pmatrix},$$

F*H*8 random numbers are selected from random numbers following normal distribution to form a matrix R, the matrix R is represented as:

$$\begin{pmatrix} h_{1,1} & h_{1,2} & \ldots & h_{1,8} \\ h_{2,1} & h_{2,2} & \ldots & h_{2,8} \\ M & M & M & M \\ h_{F*H,1} & h_{F*H,2} & \ldots & h_{F*H,8} \end{pmatrix},$$

random numbers in an mth row of the matrix $V_a$ and an mth row of the matrix R are multiplied and products are added to obtain a value, which is specifically represented as $S_{am}=V_{am,1}*h_{m,1}+V_{am,2}*h_{m,2}+\ldots+V_{am,8}*h_{m8}$, $S_{a1}, S_{a2}, \ldots,$ and $S_{aF*H}$ are obtained in a same way, a quantity K of values greater than 0 among $S_{a1}, S_{a2}, \ldots,$ and $S_{aF*H}$ is counted, and when K is an even number, the at least a part of data in the window $W_{iz}[k_i-A_z, k_i+B_z]$ meets the preset condition $C_z$.

16. The server according to claim 9, wherein when the at least a part of data in the window $W_{iz}[k_i-A_z, k_i+B_z]$ does not meet the preset condition $C_z$, the N minimum units U for searching for a data stream dividing point are skipped from the current potential dividing point $k_i$ along the direction of searching for a data stream dividing point, so as to obtain the new potential dividing point, and based on the dividing rule, a left boundary of a window $W_{ic}[k_i-A_c, k_i+B_c]$ that is determined for the new potential dividing point coincides with a right boundary of the window $W_{iz}[k_i-A_z, k_i+B_z]$ or a left boundary of a window $W_{ic}[k_i-A_c, k_i+B_c]$ that is determined for the new potential dividing point falls within a range of the window $W_{iz}[k_i-A_z, k_i+B_z]$, wherein the window $W_{ic}[k_i-A_c, k_i+B_c]$ determined for the new potential dividing point is a window ranking the first in a sequence, which is obtained according to the direction of searching for a data stream dividing point, of M windows that are determined for the new potential dividing point based on the dividing rule.

17. A non-transitory computer-readable storage medium, wherein the computer-readable storage medium is configured to store executable computer instructions for execution by a processor that prompts the processor to determine a potential dividing point k for dividing data into a plurality of portions by:
  determining a window $W_x[k-A_x, k+B_x]$ and a preset condition $C_x$ corresponding to the window $W_x[k-A_x, k+B_x]$ based on a dividing rule, wherein x indicates consecutive natural numbers from 1 to M, M≥2, and $A_x$ and $B_x$ are integers;
  determining a corresponding window $W_{iz}[k_i-A_z, k_i+B_z]$ for a current potential dividing point $k_i$ based on the dividing rule, wherein i and z are integers, and 1≤z≤M;
  determining whether at least a part of data in the window $W_{iz}[k_i-A_z, k_i+B_z]$ meets a preset condition $C_z$; and
  when the at least a part of data in the window $W_{iz}[k_i-A_z, k_i+B_z]$ does not meet the preset condition $C_z$, skipping N minimum units U for searching for a data stream dividing point from the current potential dividing point $k_i$ along a direction of searching for a data stream dividing point, wherein N*U is not greater than $\|B_z\|+\max_x(\|A_x\|)$, so as to obtain a new potential dividing point; and
  when at least a part of data in each window $W_{ix}[k_i-A_x, k_i+B_x]$ of M windows of the current potential dividing point $k_i$ meets the preset condition $C_x$, selecting the current potential dividing point $k_i$ as a data stream dividing point.

18. The non-transitory computer-readable storage medium according to claim 17, wherein the dividing rule further comprises that at least two windows $W_{ie}[k_i-A_e, k_i+B_e]$ and $W_{if}[k_i-A_f, k_i+B_f]$ meet conditions $|A_e+B_e|=|A_f+B_f|$ and $C_e=C_f$.

19. The non-transitory computer-readable storage medium according to claim 18, wherein the dividing rule further comprises that $A_e$ and $A_f$ are positive integers.

20. The non-transitory computer-readable storage medium according to claim 18, wherein the dividing rule further comprises $A_e-1=A_f$ and $B_e+1=B_f$.

21. The non-transitory computer-readable storage medium according to claim 17, wherein:
  determining, by using a random function, whether the at least a part of data in the window $W_{iz}[k_i-A_z, k_i+B_z]$ meets the preset condition $C_z$.

22. The non-transitory computer-readable storage medium according to claim 21, wherein determining, by the server by using a hash function, whether the at least a part of data in the window $W_{iz}[k_i-A_z, k_i+B_z]$ meets the preset condition $C_z$.

23. The non-transitory computer-readable storage medium according to claim 21, wherein the determining, by using a random function, whether the at least a part of data in the window $W_{iz}[k_i-A_z, k_i+B_z]$ meets the preset condition $C_z$ specifically comprises:
  selecting F bytes in the window $W_{iz}[k_i-A_z, k_i+B_z]$, and using the F bytes repeatedly H times to obtain F*H bytes in total, wherein F≥1, each byte is formed by 8 bits, which are denoted as $a_{m,1}, \ldots,$ and $a_{m,8}$, representing the 1st bit to the 8th bit of an mth byte in the F*H bytes, bits corresponding to the F*H bytes can be represented as:

$$\begin{pmatrix} a_{1,1} & a_{1,2} & \ldots & a_{1,8} \\ a_{2,1} & a_{2,2} & \ldots & a_{2,8} \\ M & M & M & M \\ a_{F*H,1} & a_{F*H,2} & \ldots & a_{F*H,8} \end{pmatrix},$$

wherein when $a_{m,n}=1$, $V_{am,n}=1$, and when $a_{m,n}=0$, $V_{am,n}=-1$, wherein $a_{m,n}$ represents any one of $a_{m,1}, \ldots,$ and $a_{m,8}$, a matrix $V_a$ is obtained according to a conversion relationship between $a_{m,n}$ and $V_{am,n}$ from the bits corresponding to the F*H bytes, the matrix $V_a$ is represented as:

$$\begin{pmatrix} V_{a1,1} & V_{a1,2} & \Lambda & V_{a1,8} \\ V_{a2,1} & V_{a2,2} & \Lambda & V_{a2,8} \\ M & M & M & M \\ V_{aF*H,1} & V_{aF*H,2} & \Lambda & V_{aF*H,8} \end{pmatrix},$$

F*H*8 random numbers are selected from random numbers following normal distribution to form a matrix R, the matrix R is represented as:

$$\begin{pmatrix} h_{1,1} & h_{1,2} & \ldots & h_{1,8} \\ h_{2,1} & h_{2,2} & \ldots & h_{2,8} \\ M & M & M & M \\ h_{F*H,1} & h_{F*H,2} & \ldots & h_{F*H,8} \end{pmatrix},$$

random numbers in an mth row of the matrix $V_a$ and an mth row of the matrix R are multiplied and products are added to obtain a value, which is specifically represented as $S_{am}=V_{am,1}*h_{m,1}+V_{am2}*h_{m2}+\ldots+V_{am,8}*h_{m,8}$, $S_{a1}, S_{a2}, \ldots,$ and $S_{aF*H}$ are obtained in a same way, a quantity K of values greater than 0 among $S_{a1}, S_{a2}, \ldots,$ and $S_{aF*H}$ is counted, and when K is an even number, the at least a part of data in the window $W_{iz}[k_i-A_z, k_i+B_z]$ meets the preset condition $C_z$.

24. The non-transitory computer-readable storage medium according to claim 17, wherein when the at least a part of data in the window $W_{iz}[k_i-A_z, k_i+B_z]$ does not meet the preset condition $C_z$, the N minimum units U for searching for a data stream dividing point are skipped from the current potential dividing point $k_i$ along the direction of searching for a data stream dividing point, so as to obtain the new potential dividing point, and based on the dividing rule, a left boundary of a window $W_{ic}[k_i-A_c, k_i+B_c]$ that is determined for the new potential dividing point coincides with a right boundary of the window $W_{iz}[k_i-A_z, k_i+B_z]$ or a left boundary of a window $W_{ic}[k_i-A_c, k_i+B_c]$ that is determined for the new potential dividing point falls within a range of the window $W_{iz}[k_i-A_z, k_i+B_z]$, wherein the window $W_{ic}[k_i-A_c, k_i+B_c]$ determined for the new potential dividing point is a window ranking the first in a sequence, which is obtained according to the direction of searching for a data stream dividing point, of M windows that are determined for the new potential dividing point based on the dividing rule.

* * * * *